US008473382B2

(12) United States Patent
Jung et al.

(10) Patent No.: US 8,473,382 B2
(45) Date of Patent: Jun. 25, 2013

(54) VIRTUAL COLLATERAL FOR REAL-WORLD OBLIGATIONS

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 709 days.

(21) Appl. No.: 11/364,895

(22) Filed: Feb. 28, 2006

(65) Prior Publication Data

US 2007/0203817 A1   Aug. 30, 2007

(51) Int. Cl.
*G06Q 40/00* (2012.01)

(52) U.S. Cl.
USPC .............................................. 705/35; 705/37

(58) Field of Classification Search
USPC .......... 463/25; 382/173; 711/163; 705/35–37
See application file for complete search history.

(56) References Cited

U.S. PATENT DOCUMENTS

| 4,569,526 | A | 2/1986 | Hamilton |
| 5,008,853 | A | 4/1991 | Bly et al. |
| 5,192,854 | A | 3/1993 | Counts |
| 5,203,848 | A | 4/1993 | Wang |
| 5,220,657 | A | 6/1993 | Bly et al. |
| 5,241,466 | A | 8/1993 | Perry et al. |
| 5,261,045 | A | 11/1993 | Scully et al. |
| 5,323,315 | A | * 6/1994 | Highbloom ...................... 705/38 |
| 5,333,868 | A | 8/1994 | Goldfarb |
| 5,337,407 | A | 8/1994 | Bates et al. |
| 5,388,196 | A | 2/1995 | Pajak et al. |
| 5,513,129 | A | 4/1996 | Bolas et al. |
| 5,643,088 | A | 7/1997 | Vaughn et al. |
| 5,651,117 | A | 7/1997 | Arbuckle |
| 5,696,965 | A | 12/1997 | Dedrick |
| 5,788,574 | A | 8/1998 | Ornstein et al. |
| 5,791,991 | A | 8/1998 | Small |
| 5,795,228 | A | 8/1998 | Trumbull et al. |
| 5,802,296 | A | 9/1998 | Morse et al. |

(Continued)

FOREIGN PATENT DOCUMENTS

| EP | 1 326 170 A1 | 7/2003 |
| JP | 11143944 A | 5/1999 |

(Continued)

OTHER PUBLICATIONS

Online: Virtual trade gets real: Buying virtual goods on the internet is one thing; killing for it is quite another. Aleks Krotoski reports Aleks Krotoski. The Guardian. London (UK): Jun. 16, 2005. p. 23.*

(Continued)

*Primary Examiner* — William Rankins

(57) ABSTRACT

A method and system provides transactions and arrangements in virtual world environments. A user can participate in transactions to acquire virtual property and related virtual rights. In some implementations, real-world and virtual parties can be involved in virtual collateral transactions as well as conditional transfers and/or revocations involving various types of virtual objects and virtual rights. A possible relinquishment of designated aspects of the virtual collateral may result from unsatisfactory compliance with a real-world obligation or virtual world obligation that is secured by the virtual collateral.

31 Claims, 107 Drawing Sheets

U.S. PATENT DOCUMENTS

| | | |
|---|---|---|
| 5,806,045 A | 9/1998 | Biorge et al. |
| 5,808,612 A | 9/1998 | Merrick et al. |
| 5,823,879 A | 10/1998 | Goldberg et al. |
| 5,850,442 A | 12/1998 | Muftic |
| 5,870,030 A | 2/1999 | DeLuca et al. |
| 5,884,029 A | 3/1999 | Brush, II et al. |
| 5,890,995 A | 4/1999 | Bobick et al. |
| 5,926,179 A | 7/1999 | Matsuda et al. |
| 5,937,391 A | 8/1999 | Ikeda et al. |
| 5,938,196 A | 8/1999 | Antoja |
| 5,946,664 A | 8/1999 | Ebisawa |
| 5,956,038 A | 9/1999 | Rekimoto |
| 5,956,700 A | 9/1999 | Landry |
| 5,964,660 A | 10/1999 | James et al. |
| 5,964,661 A | 10/1999 | Dodge |
| 5,978,780 A | 11/1999 | Watson |
| 5,983,003 A | 11/1999 | Lection et al. |
| 5,983,196 A | 11/1999 | Wendkos |
| 6,009,458 A | 12/1999 | Hawkins et al. |
| 6,024,643 A | 2/2000 | Begis |
| 6,036,601 A | 3/2000 | Heckel |
| 6,057,856 A | 5/2000 | Miyashita et al. |
| 6,106,395 A | 8/2000 | Begis |
| 6,119,229 A | 9/2000 | Martinez et al. |
| 6,135,646 A | 10/2000 | Kahn et al. |
| 6,152,856 A | 11/2000 | Studor et al. |
| 6,246,991 B1 | 6/2001 | Abe et al. |
| 6,251,017 B1 | 6/2001 | Leason et al. |
| 6,253,193 B1 | 6/2001 | Ginter et al. |
| 6,267,675 B1 | 7/2001 | Lee |
| 6,282,522 B1 | 8/2001 | Davis et al. |
| 6,298,374 B1 | 10/2001 | Sasaki et al. |
| 6,330,547 B1 * | 12/2001 | Martin ............ 705/38 |
| 6,332,127 B1 | 12/2001 | Bandera et al. |
| 6,375,466 B1 | 4/2002 | Juranovic |
| 6,380,952 B1 | 4/2002 | Mass et al. |
| 6,396,509 B1 | 5/2002 | Cheng |
| 6,450,407 B1 | 9/2002 | Freeman et al. |
| 6,467,686 B1 | 10/2002 | Guthrie et al. |
| 6,476,830 B1 | 11/2002 | Farmer et al. |
| 6,505,773 B1 | 1/2003 | Palmer et al. |
| 6,523,829 B1 | 2/2003 | Walker et al. |
| 6,545,682 B1 | 4/2003 | Ventrella et al. |
| 6,571,216 B1 | 5/2003 | Garg et al. |
| 6,591,250 B1 | 7/2003 | Johnson et al. |
| 6,609,970 B1 | 8/2003 | Luciano, Jr. |
| 6,616,533 B1 | 9/2003 | Rashkovskiy |
| 6,625,578 B2 | 9/2003 | Spaur et al. |
| 6,632,142 B2 | 10/2003 | Keith |
| 6,643,751 B2 * | 11/2003 | Rosenquist et al. ......... 711/163 |
| 6,663,105 B1 | 12/2003 | Sullivan et al. |
| 6,672,961 B1 | 1/2004 | Uzun |
| 6,726,427 B2 | 4/2004 | Jarvis et al. |
| 6,729,884 B1 | 5/2004 | Kelton et al. |
| 6,769,691 B1 | 8/2004 | Kim |
| 6,791,549 B2 | 9/2004 | Hubrecht et al. |
| 6,793,580 B2 | 9/2004 | Sinclair et al. |
| 6,850,643 B1 * | 2/2005 | Smith et al. ............ 382/173 |
| 6,884,166 B2 | 4/2005 | Leen et al. |
| 6,935,952 B2 | 8/2005 | Walker et al. |
| 6,950,169 B2 | 9/2005 | Ma et al. |
| 6,954,728 B1 | 10/2005 | Kusumoto et al. |
| 6,965,868 B1 | 11/2005 | Bednarek |
| 7,020,632 B1 | 3/2006 | Kohls et al. |
| 7,036,082 B1 | 4/2006 | Dalrymple et al. |
| 7,054,830 B1 | 5/2006 | Eggleston et al. |
| 7,055,740 B1 | 6/2006 | Schultz et al. |
| 7,115,034 B2 | 10/2006 | Kuwahara |
| 7,124,088 B2 | 10/2006 | Bauer et al. |
| 7,147,562 B2 | 12/2006 | Ohara et al. |
| 7,169,051 B1 | 1/2007 | Mossbarger |
| 7,169,501 B2 | 1/2007 | Suganuma et al. |
| 7,228,260 B2 | 6/2007 | Fujino et al. |
| 7,249,139 B2 | 7/2007 | Chuah et al. |
| 7,275,987 B2 | 10/2007 | Shimakawa et al. |
| 7,289,130 B1 | 10/2007 | Satoh et al. |
| 7,319,992 B2 | 1/2008 | Gaos |
| 7,333,943 B1 | 2/2008 | Charuk et al. |
| 7,373,377 B2 | 5/2008 | Altieri |
| 7,455,221 B2 | 11/2008 | Sheaffer |
| 7,483,857 B2 | 1/2009 | Bansal et al. |
| 7,494,416 B2 | 2/2009 | Walker et al. |
| 7,523,486 B1 | 4/2009 | Turner |
| 7,593,864 B2 | 9/2009 | Shuster |
| 7,614,944 B1 | 11/2009 | Hughes et al. |
| 7,620,592 B2 | 11/2009 | O'Mara et al. |
| 7,660,778 B1 | 2/2010 | Nichols |
| 7,672,884 B2 | 3/2010 | Schuster et al. |
| 7,690,997 B2 | 4/2010 | Van Luchene et al. |
| 7,698,178 B2 | 4/2010 | Chu |
| 7,722,453 B2 | 5/2010 | Lark et al. |
| 7,865,566 B2 | 1/2011 | Ashtekar et al. |
| 7,901,288 B2 | 3/2011 | Barsness et al. |
| 7,908,554 B1 | 3/2011 | Blattner |
| 7,913,176 B1 | 3/2011 | Blattner et al. |
| 2001/0027430 A1 | 10/2001 | Sabourian |
| 2001/0037316 A1 | 11/2001 | Shiloh |
| 2001/0040341 A1 | 11/2001 | Kamille |
| 2001/0047328 A1 | 11/2001 | Triola |
| 2001/0054003 A1 | 12/2001 | Chien et al. |
| 2001/0056383 A1 | 12/2001 | Shuster |
| 2001/0056399 A1 | 12/2001 | Saylors |
| 2002/0013722 A1 | 1/2002 | Kanaga |
| 2002/0016655 A1 | 2/2002 | Joao |
| 2002/0019744 A1 | 2/2002 | Yamamoto |
| 2002/0022516 A1 | 2/2002 | Forden |
| 2002/0029252 A1 | 3/2002 | Segan et al. |
| 2002/0032037 A1 | 3/2002 | Segawa |
| 2002/0073043 A1 * | 6/2002 | Herman et al. ............ 705/64 |
| 2002/0087465 A1 | 7/2002 | Ganesan et al. |
| 2002/0090985 A1 | 7/2002 | Tochner et al. |
| 2002/0091635 A1 | 7/2002 | Dilip et al. |
| 2002/0095375 A1 | 7/2002 | Taneda et al. |
| 2002/0095523 A1 | 7/2002 | Shimakawa et al. |
| 2002/0107756 A1 | 8/2002 | Hammons et al. |
| 2002/0113809 A1 | 8/2002 | Akazawa et al. |
| 2002/0120554 A1 | 8/2002 | Vega |
| 2002/0120935 A1 | 8/2002 | Huber et al. |
| 2002/0125312 A1 | 9/2002 | Ogilvie |
| 2002/0128952 A1 | 9/2002 | Melkomian et al. |
| 2002/0138445 A1 | 9/2002 | Laage et al. |
| 2002/0142841 A1 | 10/2002 | Boushy |
| 2002/0142842 A1 | 10/2002 | Easley et al. |
| 2002/0147669 A1 | 10/2002 | Taylor et al. |
| 2002/0152155 A1 * | 10/2002 | Greenwood et al. ............ 705/38 |
| 2002/0152156 A1 | 10/2002 | Tyson-Quah |
| 2002/0174055 A1 | 11/2002 | Dick et al. |
| 2002/0178054 A1 | 11/2002 | Ader |
| 2002/0178120 A1 | 11/2002 | Reid et al. |
| 2002/0186244 A1 | 12/2002 | Matsuda et al. |
| 2002/0188760 A1 | 12/2002 | Kuwahara |
| 2002/0198735 A1 | 12/2002 | Tolbert |
| 2003/0014266 A1 | 1/2003 | Brown et al. |
| 2003/0014423 A1 | 1/2003 | Chuah et al. |
| 2003/0036987 A1 | 2/2003 | Omiya |
| 2003/0037101 A1 | 2/2003 | Torabi |
| 2003/0046689 A1 | 3/2003 | Gaos |
| 2003/0064807 A1 | 4/2003 | Walker et al. |
| 2003/0069787 A1 | 4/2003 | Tendon et al. |
| 2003/0097331 A1 | 5/2003 | Cohen |
| 2003/0105688 A1 | 6/2003 | Brown et al. |
| 2003/0105705 A1 | 6/2003 | Eyre |
| 2003/0107173 A1 | 6/2003 | Satloff et al. |
| 2003/0115132 A1 | 6/2003 | Iggland |
| 2003/0118575 A1 * | 6/2003 | Grob et al. .............. 424/94.1 |
| 2003/0144940 A1 | 7/2003 | Kochansky et al. |
| 2003/0154092 A1 | 8/2003 | Bouron et al. |
| 2003/0155715 A1 | 8/2003 | Walker et al. |
| 2003/0156134 A1 | 8/2003 | Kim |
| 2003/0187768 A1 | 10/2003 | Ryan et al. |
| 2003/0207237 A1 | 11/2003 | Glezerman |
| 2003/0216184 A1 | 11/2003 | Kigoshi |
| 2003/0220884 A1 | 11/2003 | Choi et al. |
| 2004/0051718 A1 | 3/2004 | Bennett et al. |
| 2004/0058731 A1 | 3/2004 | Rossides |
| 2004/0073488 A1 | 4/2004 | Etuk et al. |
| 2004/0082377 A1 | 4/2004 | Seelig et al. |

| | | | |
|---|---|---|---|
| 2004/0128518 | A1 | 7/2004 | Cavers et al. |
| 2004/0133472 | A1 | 7/2004 | Leason et al. |
| 2004/0148221 | A1 | 7/2004 | Chu |
| 2004/0158492 | A1 | 8/2004 | Lopez et al. |
| 2004/0220850 | A1 | 11/2004 | Ferrer et al. |
| 2005/0010534 | A1 | 1/2005 | Groz |
| 2005/0021472 | A1 | 1/2005 | Gettman et al. |
| 2005/0043094 | A1 | 2/2005 | Nguyen et al. |
| 2005/0051965 | A1 | 3/2005 | Gururajan |
| 2005/0055296 | A1 | 3/2005 | Hattersley et al. |
| 2005/0059480 | A1 | 3/2005 | Soukup et al. |
| 2005/0060260 | A1 | 3/2005 | Masuda et al. |
| 2005/0086069 | A1 | 4/2005 | Watson et al. |
| 2005/0086605 | A1 | 4/2005 | Ferrer et al. |
| 2005/0137015 | A1 | 6/2005 | Rogers et al. |
| 2005/0137904 | A1* | 6/2005 | Lane et al. .................. 705/1 |
| 2005/0148388 | A1 | 7/2005 | Vayra et al. |
| 2005/0153766 | A1 | 7/2005 | Harmon |
| 2005/0153771 | A1 | 7/2005 | Ghela |
| 2005/0170883 | A1 | 8/2005 | Muskin |
| 2005/0177492 | A1* | 8/2005 | Camping .................. 705/38 |
| 2005/0182693 | A1 | 8/2005 | Alivandi |
| 2005/0192071 | A1 | 9/2005 | Matsuno et al. |
| 2005/0203835 | A1 | 9/2005 | Nhaissi et al. |
| 2005/0216346 | A1 | 9/2005 | Kusumoto et al. |
| 2005/0235008 | A1* | 10/2005 | Camping et al. ............ 707/202 |
| 2005/0288963 | A1* | 12/2005 | Parrish ............... 705/2 |
| 2006/0026044 | A1 | 2/2006 | Smith |
| 2006/0080613 | A1 | 4/2006 | Savant |
| 2006/0111934 | A1 | 5/2006 | Meggs |
| 2006/0206376 | A1 | 9/2006 | Gibbs et al. |
| 2006/0224480 | A1* | 10/2006 | Bent et al. .................. 705/35 |
| 2006/0234795 | A1 | 10/2006 | Dhunjishaw et al. |
| 2007/0061202 | A1 | 3/2007 | Ellis et al. |
| 2007/0087820 | A1* | 4/2007 | Van Luchene et al. ......... 463/25 |
| 2007/0087822 | A1 | 4/2007 | Van Luchene |
| 2007/0117615 | A1* | 5/2007 | Van Luchene ............ 463/25 |
| 2007/0179867 | A1 | 8/2007 | Glazer et al. |
| 2008/0139318 | A1 | 6/2008 | Van Luchene et al. |
| 2009/0006124 | A1 | 1/2009 | Sinclair et al. |
| 2009/0204420 | A1 | 8/2009 | Ganz |

FOREIGN PATENT DOCUMENTS

| | | |
|---|---|---|
| WO | WO 02/20111 A2 | 3/2002 |
| WO | WO 02/067178 A1 | 8/2002 |
| WO | WO 02/077758 A2 | 10/2002 |
| WO | WO 2005/064502 A1 | 7/2005 |

OTHER PUBLICATIONS

Stephens, Molly; "Sales of in-game assets: An illustration of the continuing failure of intellectual property law to protect digital creators"; Texas Law Review; bearing a date of May 2002; pp. 1513 1535; vol. 80, No. 6; printed on Nov. 6, 2009.*
MicroLoans take offbeat collateral The Wall Street Journal. Sunday Gazette—Mail. Charleston, W.V.: Feb. 13, 2005. p. 5.D.*
War of the Worlds ; These imaginary places may only exist in cyberspace but their booming economies and bitter rivalries are causing chaos in the real world, including shady financial deals and even murder. Mark White reports on attempts to control virtual reality; [First Edition] Mark White. The Independent on Sunday. London (UK): Jul. 31, 2005. pg.*
U.S. Appl. No. 12/005,047, Jung et al.
U.S. Appl. No. 12/004,110, Jung et al.
U.S. Appl. No. 11/654,398, Jung et al.
U.S. Appl. No. 11/653,092, Jung et al.
U.S. Appl. No. 11/652,379, Jung et al.
U.S. Appl. No. 11/642,991, Jung et al.
U.S. Appl. No. 11/607,794, Jung et al.
U.S. Appl. No. 11/605,939, Jung et al.
U.S. Appl. No. 11/601,599, Jung et al.
U.S. Appl. No. 11/600,602, Jung et al.
U.S. Appl. No. 11/599,631, Jung et al.
U.S. Appl. No. 11/589,318, Jung et al.
U.S. Appl. No. 11/582,837, Jung et al.
U.S. Appl. No. 11/540,911, Jung et al.
U.S. Appl. No. 11/364,498, Jung et al.
U.S. Appl. No. 11/342,368, Jung et al.
U.S. Appl. No. 11/283,551, Jung et al.
U.S. Appl. No. 11/274,759, Jung et al.
U.S. Appl. No. 11/234,878, Jung et al.
U.S. Appl. No. 11/234,867, Jung et al.
U.S. Appl. No. 11/234,848, Jung et al.
U.S. Appl. No. 11/234,847, Jung et al.
U.S. Appl. No. 11/203,686, Jung et al.
U.S. Appl. No. 11/202,964, Jung et al.
U.S. Appl. No. 11/192,342, Jung et al.
U.S. Appl. No. 11/191,252, Jung et al.
U.S. Appl. No. 11/191,248, Jung et al.
U.S. Appl. No. 11/191,233, Jung et al.
U.S. Appl. No. 11/185,524, Jung et al.
U.S. Appl. No. 11/185,446, Jung et al.
U.S. Appl. No. 11/184,564, Jung et al.
U.S. Appl. No. 11/107,381, Jung et al.
U.S. Appl. No. 11/107,380, Jung et al.
U.S. Appl. No. 11/096,212, Jung et al.
U.S. Appl. No. 11/069,905, Jung et al.
U.S. Appl. No. 11/069,894, Jung et al.
U.S. Appl. No. 11/068,736, Jung et al.
U.S. Appl. No. 12/291,349, Jung et al.
U.S. Appl. No. 12/291,336, Jung et al.
U.S. Appl. No. 12/291,160, Jung et al.
U.S. Appl. No. 12/291,020, Jung et al.
U.S. Appl. No. 12/290,679, Jung et al.
U.S. Appl. No. 11/982,393, Jung et al.
U.S. Appl. No. 11/981,635, Jung et al.
U.S. Appl. No. 11/980,315, Jung et al.
U.S. Appl. No. 11/975,723, Jung et al.
U.S. Appl. No. 11/975,367, Jung et al.
U.S. Appl. No. 11/974,515, Jung et al.
U.S. Appl. No. 11/974,174, Jung et al.
U.S. Appl. No. 11/906,777, Jung et al.
U.S. Appl. No. 11/827,376, Jung et al.
Baig, Edward C.; "Slip into a second skin with an online avatar"; USA Today; bearing a date of Nov. 11, 2003; pp. 1-3; located at http://www.usatoday.com/tech/columnist/edwardbaig/2003-11-11-baig_x.htm; printed on Apr. 1, 2008.
Bartle, Richard A.; "Designing of Virtual Worlds: Bibliography"; bearing a date of Jun. 17, 2003; pp. 1-36; located at http://www.mud.co.uk/dvw/bibliography.html; printed on Mar. 24, 2008.
Burgess et al.; "Controlling the Virtual World: Governance of On-Line Communities"; bearing a date of 1999; pp. 1-2; located at http://cse.stanford.edu/classes/cs201-projects-98-99/controlling-the-virtual-world/case/index.html; printed on Mar. 24, 2008; Stanford University.
Castronova, Edward; "Virtual Worlds: A First-Hand Account of Market and Society on the Cyberian Frontier"; bearing a date of Dec. 2001; pp. 1-40; located at http://papers.ssrn.com/abstract=294828; Munich, Germany.
Rhode, Steve; "Avoid credit card balance transfers requiring new purchases"; Gannett News Service; bearing a date of Jul. 18, 2003; pp. 1-3; Myvesta.org Inc.; printed on Apr. 8, 2008.
"Star Wars Galaxies: An Empire Divided"; Adventure Manual; bearing a date of Jun. 26, 2003; total pp. 1-9; LucasFilm Entertainment Company Ltd.
"Star Wars Galaxies: An Empire Divided"; Adventure Manual; bearing a date of Jun. 26, 2003; total pp. 75; LucasFilm Entertainment Company Ltd.
"There, Inc. Delivers a Brave New Online World to Consumers; Company Unveils There 'Limited Access' and Teams With Industry Leaders Including ATI, HP, and iVillage to Provide Consumers with compelling 3D World; Nike and Levi's Provide Immersive Brand Experience to Members."; Goliath Business Knowledge on Demand; bearing a date of Oct. 27, 2003; pp. 1-7; PR Newswire; Menlo Park, CA; printed on Apr. 8, 2008.
U.S. Appl. No. 12/290,674, Jung et al.
U.S. Appl. No. 12/290,653, Jung et al.
U.S. Appl. No. 12/290,458, Jung et al.
U.S. Appl. No. 12/290,358, Jung et al.

Bloomfield, Robert; "Patenting Virtual Commerce"; pp. 1-5; located at http://terranova.blogs.com/terra_nova/2008/06/last-week-i-rec.html; printed on Jun. 25, 2008.

Patenting Virtual Commerce | Metanomics—Business and Policy in the Metaverse; "Patenting Virtual Commerce"; submitted by Robert Bloomfield; pp. 1-2; located at http://www.metanomics.net/21-jun-2008/patenting-virtual-commerce; printed on Jun. 25, 2008

"About Deposits and Withdrawals"; Project Entropia; pp. 1; located at http://www.project-entropia.com/Content.ajp?id=1303; printed on Jan. 27, 2005.

"About Project Entropia"; Project Entropia; pp. 1; located at http://www.project-entropia.com/about/Index.ajp; printed on Jan. 27, 2005

"Bank Account Game"; pp. 1-2; located at http://www.educationallearninggames.com/bank-account-game.asp; Educational Learning Games.com; printed on Dec. 10, 2004.

Becker, David; "Real cash for virtual goods"; CNET News.Com; bearing a date of Feb. 8, 2005; pp. 1-4; CNET Networks, Inc.; located at http://news.com.com/2102-1043_3-5566704.html?tag=st.util.print; printed on Feb. 8, 2005.

Book, Betsy; "Moving Beyond the Game: Social Virtual Worlds"; State of Play 2 Conference, Dec. XX04; Cultures of Play Panel; pp. 1-13; printed on Jul. 14, 2005.

"Charge It! Math and Money Board Games"; pp. 1-2; located at http://www.educationallearninggames.com/charge-it-board-game-money-board-game.asp; Educational Learning Games.com; printed on Jan. 27, 2005.

Cringely, Robert X.; "The Wild Ones, The Best Way to Protect Sales of Virtual Goods Can Be Found Inside the Game, Itself"; bearing a date of May 13, 2004; pp. 1-3; located at http://www.pbs.org/cringley/pulpit/pulpit20040513.html; printed on Jul. 14, 2005.

"Escrow.com Protects Online Buyers and Sellers from Fraud"; bearing a date of 1999-2005; pp. 1; Escrow.com; located at: https://www.escrow.com/index.asp; printed on Jul. 13, 2005.

"'Game theft' led to fatal attack"; located at http://news.bbc.co.uk/2/hi/technology/439715.stm; BBC News; bearing a date of Mar. 31, 2005; printed on Apr. 11, 2005.

"Gaming Open Market—The next generation of game commodity trading. Frequently asked questions"; pp. 1-4; located at http://www.gamingopenmarket.com/faq.php; printed on Jul. 13, 2005.

Gentile, Gary; "Advertisers seek piece of video-game action"; Seattle Post-Intelligencer; May 21, 2005; pp. A1 and A11.

Gentile, Gary; "Products Places Liberally in Video Games"; May 23, 2005; pp. 1-3; abcNews; located at http://abcnews.go.com/Business/print?id=778965; printed on Jun. 17, 2005.

Graham-Rowe, Duncan; "Garners turn cities into a battleground"; NewScientist.com; Jun. 12, 2005; pp. 1-3; located at: http://www.newscientist.com/article.ns?id=dn7498; printed on Jun. 17, 2005.

Haines, Lester; "Spurned woman deletes ex's gaming data"; pp. 1-2; located at http://www.theregister.co.uk/2005/01/21/spurned_womans_revenge/; The Register; bearing a date of Jan. 21, 2005; printed on Apr. 14, 2005.

Harrow, Jeffrey R.; "Future Brief, A Publication of New Global Initiatives, Inc."; bearing a date of 2004; pp. 1-5; located at http://www.futurebrief.com/Harrow-12.pdf; printed on Jul. 13, 2005.

Hershman, Tania; "Advertisers: Game on"; pp. 1; located at http://www.technologyreview.com/articles/05/05/issue/forward_advertisers.asp?p=1; TechnologyReview.com; bearing a date of May 2005; printed on Apr. 14, 2005.

Hilts, Peter; "Boys are from Neopets, Girls are from Barbie.com" Computer Bits; Jun. 2003, pp. 1-4; vol. 13 No. 6; located at http://info.neopets.com/computerbits.html; printed on May 17, 2005.

"IGE Frequently Asked Questions"; IGE; pp. 1-12; located at http://www.ige.com/FrequentyAskedQuestions.aspx; printed on Jan. 27, 2005.

Knight, Will; "Smart shoes decide on television time"; May 18, 2005; pp. 1-2; located at http://newscientist.com/article.ns?id=dn7395&print=true; NewScientist.com; printed on Jun. 17, 2005.

Kushner, David; "Engineering Everquest Online Gaming Demands Heavyweight Data Centers"; IEEE Spectrum; Jul. 2005; pp. 34-39; Institute of Electrical and Electronics Engineers, Inc.; New York, NY.

Kushner, David; "Engineering Everquest Online gaming demands heavyweight data centers"; IEEE Spectrum Online; Jul. 11, 2005; pp. 1-7; bearing a date of Jun. 30, 2005; located at http://www.spectrum.ieee.org/WEBONLY/publicfeature/jul05/0705eq.html; printed on Jul. 11, 2005.

"Monopoly Tycoon"; Atari Australia & New Zealand; pp. 1; located at http://www.atari.com.au/games/info.do?id=191; Atari Australia Pty Ltd.; printed on Mar. 1, 2005.

"New World Notes: Business Model Prototype"; Jun. 2, 2005; pp. 1-3; located at http://secondlife.blogs.com/nwn/2005/06/business_model_.html#more; printed on Jun. 8, 2005.

"Our Business"; IGE; bearing a date of 2001-2004; pp. 1-2; located at http://www.ige.com/corporate.aspx?lang=en; printed on Jan. 27, 2005.

"Penn State Behrend Establishes Credit Card Research Center"; Penn State Erie: The Behrend College; bearing dates of Nov. 22, 2004 and Sep. 27, 2004; pp. 1-2; located at http://www.pserie.psu.edu/newscal/news2004/november-creditcenter.htm; printed on Dec. 8, 2004.

Sandhana, Lakshmi; "Pacman comes to life virtually"; pp. 1-3; BBC News; bearing a date of Jun. 6, 2005; located at http://news.bbc.co.uk/1/hi/technology/4607449.stm; printed on Jun. 17, 2005.

"Second Life: Your World. Your Imagination."; bearing a date of 2005; pp. 1; Linden Research, Inc.; located at http://secondlife.com/; printed on Jun. 8, 2005.

"Spending Challenge"; The Mint: It Makes Cents; bearing a date of 2002; pp. 1-3; Northwestern Mutual; located at http://www.themint.org/tryit/spendingchallenge.php; printed on Jan. 26, 2005.

Terdiman, Daniel; "Sony Gets Real on Virtual Goods"; Wired News; bearing a date of Apr. 20, 2005; pp. 1-3; Lycos Inc.; located at http://wired.com/news/print/0,1294,67280,00.html; printed on Apr. 21, 2005.

Terdiman, Daniel; "Virtual Trade Tough Nut to Crack"; Wired News; bearing a date of Dec. 20, 2004; pp. 1-3; Lycos Inc.; located at http://wired.com/news/print/0,1294,66074,00.html; printed on Jan. 27, 2005.

"The Entertainment of the Future is already here"; Project Entropia; bearing a date of Jan. 27, 2005; pp. 1; located at http://www.project-entropia.com/Index.ajp; printed on Jan. 27, 2005.

Thompson, Clive; "Game Theories"; The Walrus Magazine; pp. 1-21; bearing a date of 2004; located at http://www.walrusmagazine.com/article.pl?sid=04/05/06/1929205&mode=nested&tid=1; printed on Jun. 17, 2005.

"TradEnable (I-escrow): Online Payment Service"; bearing a date of 2004; pp. 1-3; Stylusinc.om; located at http://stylusinc.com/WebEnable/Sales/tradenable.php; printed on Jul. 13, 2005.

Walker, Frank; "Coming soon: a PC combat game that shoots back"; The Sydney Morning Herald; bearing a date of Apr. 3, 2005; pp. 1-2; located at http://www.smh.com.au/news/World/Coming-soon-a-PC-combat-game-that-shoots-back/2005/04/02/1112302293552.html?oneclick=true; printed on Apr. 11, 2005.

Ward, Mark; "Life lessons in virtual adultery"; BBC News; bearing a date of Apr. 11, 2005; pp. 1-2; located at http://news.bbc.co.uk/2/hi/technology/4432019.stm; printed on Apr. 14, 2005.

U.S. Appl. No. 12/286,532, Jung et al.
U.S. Appl. No. 12/286,530, Jung et al.
U.S. Appl. No. 12/286,127, Jung et al.
U.S. Appl. No. 12/286,096, Jung et al.
U.S. Appl. No. 12/231,298, Jung et al.
U.S. Appl. No. 12/221,446, filed Jul. 31, 2008, Jung et al.
U.S. Appl. No. 12/221,459, filed Jul. 31, 2008, Jung et al.
U.S. Appl. No. 12/221,447, filed Jul. 31, 2008, Jung et al.
U.S. Appl. No. 12/221,254, filed Jul. 30, 2008, Jung et al.
U.S. Appl. No. 12/220,675, filed Jul. 24, 2008, Jung et al.

Biggs, Stuart; "Enter danger zone, Matrix-style Governments worry about the hazardous reality-blurring effects of online gaming"; South China Morning Post; bearing a date of Aug. 30, 2005; pp. 1-2; © 2005 South China Morning Post Publishers Ltd.

Kushner, David; "My Avatar, My Self"; Technology Review; bearing a date of Apr. 2004; pp. 50-55; vol. 107 No. 3; printed on Nov. 9, 2009.

Langberg, Mike; "Virtual World There Innovative to an Extent"; bearing a date of Nov. 27, 2003; San Jose Mercury News; p. 1G; printed on Nov. 9, 2009.

Stephens, Molly; "Sales of in-game assets: An illustration of the continuing failure of intellectual property law to protect digital creators"; Texas Law Review; bearing a date of May 2002; pp. 1513-1535; vol. 80, No. 6; printed on Nov. 6, 2009.

White, Mark; "War of the Worlds"; Independent on Sunday; bearing a date of Jul. 31, 2005; pp. 1-4; Financial Times; © 2005 Independent Digital UK Ltd.

U.S. Appl. No. 12/658,618, Jung et al.

U.S. Appl. No. 12/658,613, Jung et al.

U.S. Appl. No. 12/658,609, Jung et al.

U.S. Appl. No. 12/658,600, Jung et al.

Bartle, Richard A.; "Pitfalls of Virtual Property"; Themis Group; bearing a date of Apr. 2004; pp. 1-22.

Grimmelmann, James; "Virtual Worlds as Comparative Law"; New York Law School Law Review; bearing a date of Dec. 8, 2004; pp. 147-184; vol. 49.

U.S. Appl. No. 12/661,997, Jung et al.

U.S. Appl. No. 12/661,996, Jung et al.

European Search Report; European App. No. EP 06 78 8839; Aug. 11, 2010; pp. 1-6.

U.S. Appl. No. 13/532,238, Jung et al.

Cook, Michelle; "Cyber Stars Taking Over?: Some Have Albums, Others Have Shows. Now One Will Star With Al Pacino"; The Vancouver Sun; bearing a date of Aug. 17, 2000; pp. 1-2; The Vancouver Sun; Vancouver, B.C.

Gwinn, Eric; "Space Invaders: Why Ads are Infiltrating Video Games"; Edmonton Journal; bearing a date of Apr. 23, 2004; pp. 1-3; Edmonton Journal; Edmonton, Alta.

Monk, Katherine; "Demand for Virtual Ad Space Growing: Companies Targeting Segment of 18-to-34 Year-Old Males"; The Windsor Star; bearing a date of Sep. 4, 2004; pp. 1-2; The Windsor Star; Windsor, Ont.

"Social Networks Research Report"; Wildbit; bearing a date of 2005; pp. 1-36; Wildbit, LLC; located at http://www.wildbit.com.

Solman, Gregory; "Wow Factor About to Spike for Ads in Online Games"; Adweek; bearing a date of May 24, 2004; pp. 1-2; vol. 45, Iss. 21; VNU eMedia, Inc.; New York.

Stanley, T.L.; "Massive Launches Ad Server for Games"; Advertising Age; bearing a date of Oct. 18, 2004; pp. 1-2; vol. 75, Iss. 42; Crain Communications, Incorporated; Chicago.

"Virtual Advertising: Digitopia"; New Media Age; bearing a date of Mar. 18, 2004; pp. 1-4; Centaur Communications Ltd.; London.

Fugazi, Nobody (Taran Rampersad); "The Evolution of Business in Second Life"; Avvenimenti Iblei Magazine Online—Business & SL; Feb. 28, 2000; printed on Feb. 7, 2011; pp. 1-4; No. 4; located at: http://www.avvenimentiiblei.com/the-evolution-of-business-in-second-life-by-nobody-fugazi-taran-rampersad.

U.S. Appl. No. 13/373,358, Jung et al.

"American Express and Zynga Announce Strategic Relationship to Make Virtual Goods and Game Cards Available for Purchase Using Membership Rewards® Points"; News: Press Release; About.American.Expresss.com; bearing a date Nov. 30, 2010; printed on Jan. 20, 2010; pp. 1-2; New York; located at: http://about.americanexpress.com/news/pr/2010/zynga.aspx.

Ashby, Alicia; "MindArk Brings Real Banking Into Entropia Universe"; Engage Digital; bearing a date of Mar. 18, 2009; printed on Jan. 20, 2012; pp. 1-3; located at http://www.engagedigital.com/blog/2009/03/18/mindark-brings-real-banking-into-entropia-universe/.

"Discontinuation of MetaCard Service on Feb. 28, 2010"; MetaCard Announcement; FirstMeta; printed on Jan. 20, 2012; pp. 1-4; located at: http://www.firstmeta.com/public/MCannounce.html.

"EpicWin"; iTunes Preview; Apple Store iTunes; printed on Jan. 16, 2012; pp. 1-3; located at http://itunes.apple.com/us/app/epicwin/id372927221?mt=8&ign-mpt=uo%3D4.

"EpicWin Gives You Loot for Doing Your Chores"; STP World: Slide to Play; bearing a date of Aug. 18, 2010; printed on Jan. 16, 2010; located at: http://www.slidetoplay.com/story/epicwin-gives-you-loot-for-doing-your-chores.

"EpicWin: Pre-Release Trailer"; Video, posted on YouTube; printed on Jan. 16, 2012; pp. 1-3; located at: http://www.youtube.com/watch?v=AmKwF_Si734&feature=popt00us03.

Goad, Libe; "Zynga Reinstates Offers in PetVille and Other Games"; Blog Games; bearing a date of Jun. 13, 2010; printed on Jan. 20, 2012; pp. 1-3; located at: http://blog.games.com/2010/01/13/zyga-reinstates-off-in-farmville-and-other-games/.

Gomez, Mel; "Chinese Insurance Company Insures Virtual Goods"; www.tek-lado.com; bearing a date of Jul. 11, 2011; printed on Jan. 20, 2012; pp. 1-4; Tek Lado; located at: http://www.tek-lado.com/2011/07/11/chinese-insurance-company-insures-vitual-goods/.

"Join Xbox Live Rewards"; rewards.xbox.com; bearing a date of 2012; printed on Jan. 20, 2012; pp. 1-2; Microsoft Corporation; located at: http://rewards.xbox.com/.

"Legacy Locker—Return Home"; Legacy Locker; bearing a date of 2009; printed on Jan. 20, 2012; pp. 1-4; located at: http://legacylocker.com/.

"MetaCard™"; FirstMeta; bearing a date of 2007; printed on Jan. 20, 2012; one (1) page; located at http://firstmeta.com/consumers.

Morales, Angela; "FarmVille Netflix Sponsored Link: 150 Free Farm Cash"; Blog Games; bearing a date of Aug. 16, 2010; printed on Jan. 20, 2012; pp. 1-3; located at: http://blog.games.com/2010/08/16/farmville-netflix-sponsored-link-150-free-farm-cash/.

Osborne, Emily, et al.; "Digital Legacy"; Step Journal; bearing a date of May 2010; printed on Jan. 23, 2012; pp. 1-2; located at: http://www.stepjournal.org/journal_archive/2010/step_may_2010/digital_legacy.aspx.

Saint, Nick; "Wacky: Zynga Gives Away Free FarmVille Cash With Purchases of Real Life Vegetables"; Business Insider; bearing a date of May 21, 2010; pp. 1-2; located at: http://articles.businessinsider.com/2010-05-21/tech/30016153_1_zynga-virtual-currency-farmville.

Simon, Mallory; "New Services Promise Online Life After Death"; CNN.com/technology; bearing a date of May 18, 2009; printed on Jan. 20, 2012; pp. 1-3; located at: http://www.cnn.com/2009/TECH/05/18/death.online/index.html?iref=t2test_techmon.

"World of Warcraft Rewards Visa$_{ADDAC,AXA}$®"; us.battle.net; bearing a date of 2012; printed on http://us.battle.net/wow/en/services/rewards-visa/.

* cited by examiner

FIG. 27A

| GAME ACCOUNT STATUS ⟵ 980 | | | | | |
|---|---|---|---|---|---|
| RESPONSIBLE REAL-WORLD PARTY 1030 | | | | | |
| REAL-WORLD CONTACT INFORMATION 1032 | | | | | |
| VALUE CATEGORY 1000 | PAYABLE AMOUNT 1020 | IDENTITY OF CREDITOR(S) 1022 | RECEIVABLE AMOUNT 1024 | IDENTITY OF DEBTOR(S) 1026 | CURRENTLY OWNED NOW 1028 |
| VIRTUAL CURRENCY 1002 | | | | | |
| DISCOUNT COUPONS 1004 | | | | | |
| AWARD POINTS 1006 | | | | | |
| ACCESS TICKETS 1008 | | | | | |
| EXPERIENCE MEDAL 1010 | | | | | |
| LEVEL PERMITS 1012 | | | | | |
| BONUS VOUCHERS 1014 | | | | | |
| SKILL MERITS 1016 | | | | | |
| OTHER VALUE SYMBOLS 1018 | | | | | |
| STATUS DATE 1034 | USER ID 1035 | VIRTUAL CHARACTER ID 1036 | GAME ACCOUNT NUMBER 1037 | PERFORMANCE RATING 1038 | |

FIG. 27B

981 — TRANSFER RECORDS

| TRANSFER DATE 919 | PERMISSION REQUIRED? (YES OR NO) 921 | NEW VIRTUAL DEBTOR 923 | NEW RESPONSIBLE REAL-WORLD DEBTOR 925 | NEW VIRTUAL CREDITOR 927 | NEWLY ASSIGNED REAL-WORLD CREDITOR 929 | BALANCE OWED AT TRANSFER DATE 931 |
|---|---|---|---|---|---|---|
| | | | | | | |
| | | | | | | |
| | | | | | | |
| | | | | | | |
| | | | | | | |

| TRANSACTION DATE 907 | ORIGINAL DEBTOR 908 | ORIGINAL CREDITOR 909 | DUE DATE 913 | VALUE(S) ACQUIRED 915 | ORIGINAL AMOUNT OWED 917 |

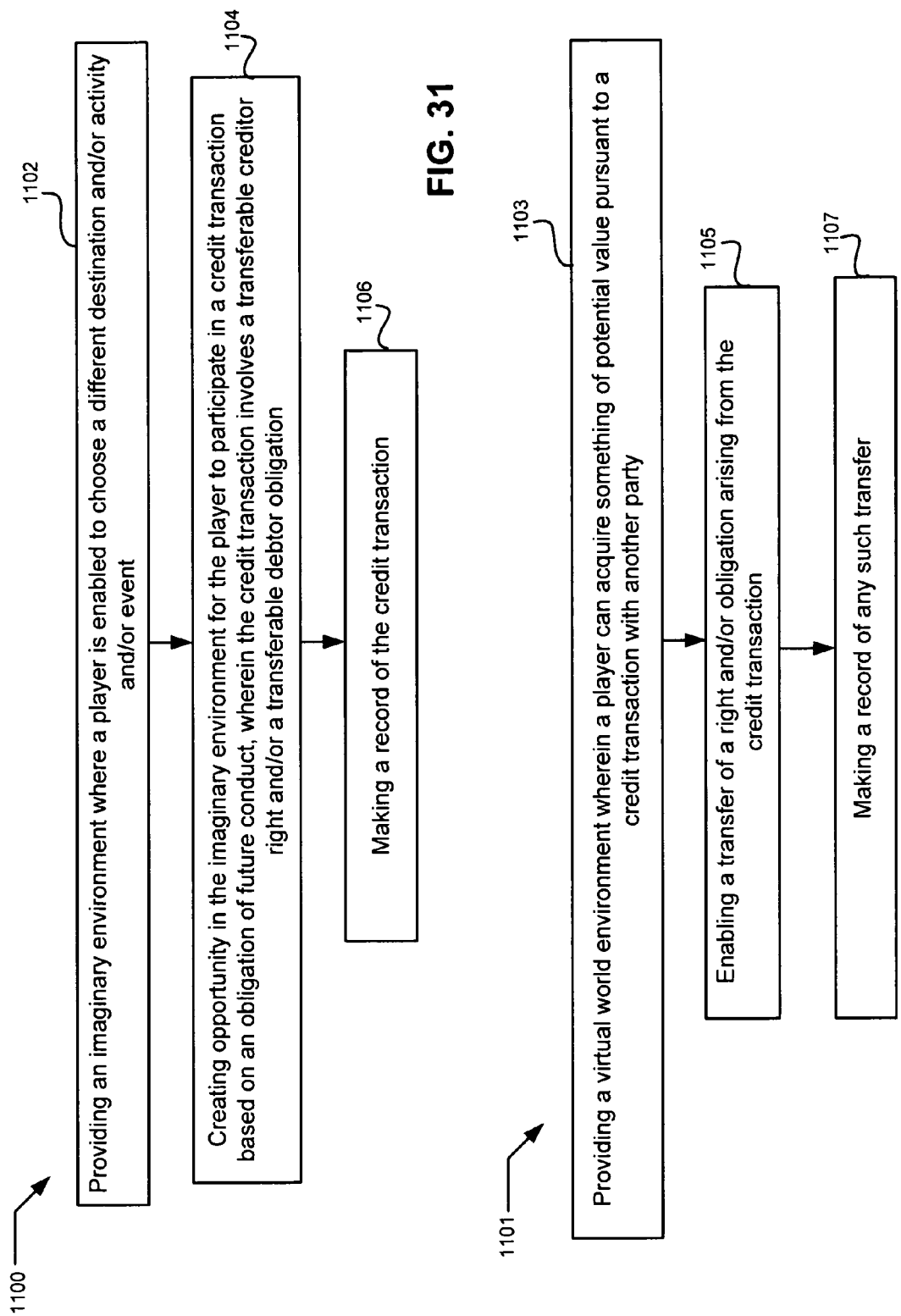

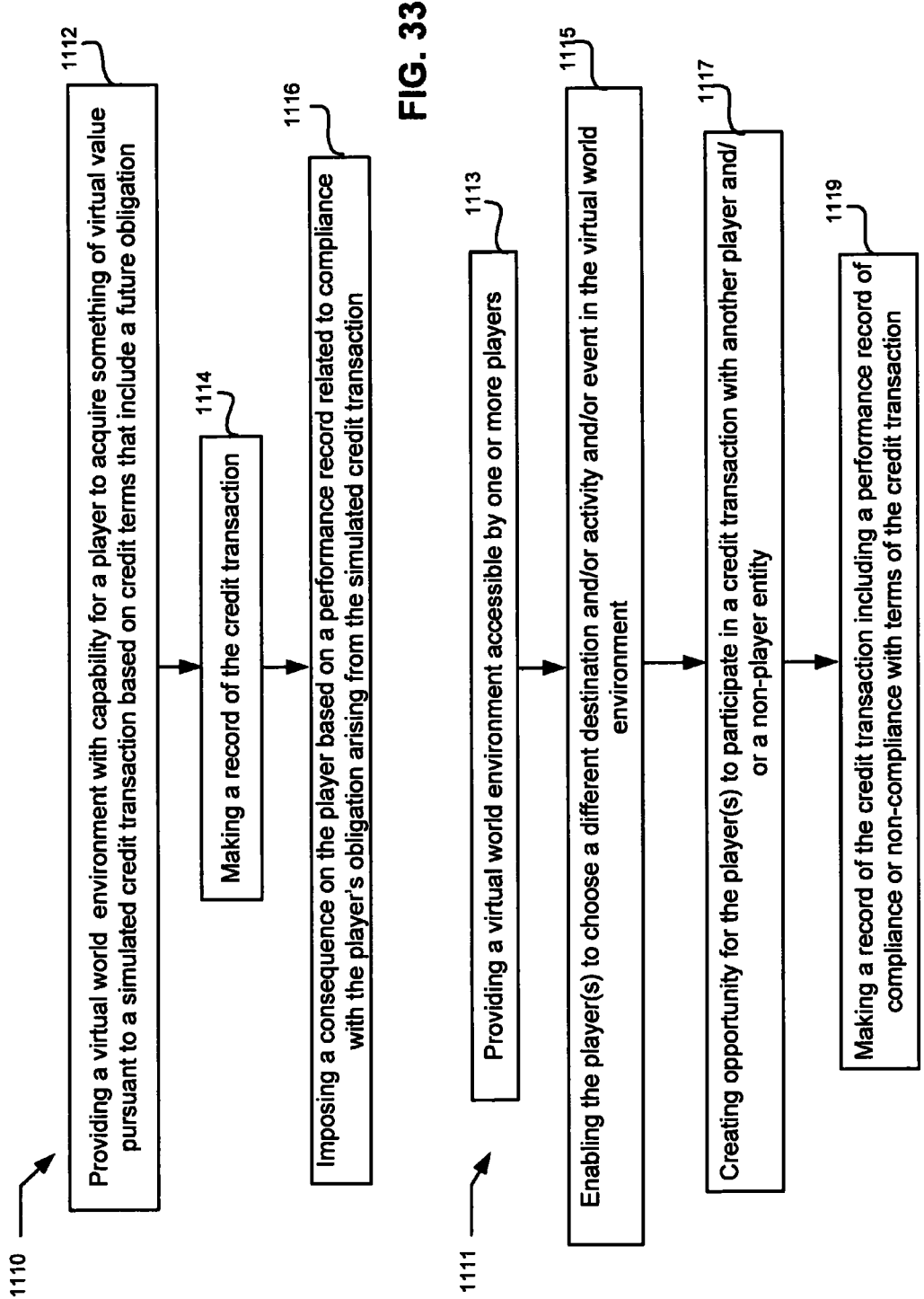

VIRTUAL COLLATERAL FOR REAL-WORLD OBLIGATIONS

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the herein listed application(s) to the extent such subject matter is not inconsistent herewith; the present application also claims the earliest available effective filing date(s) from, and also incorporates by reference in its entirety all subject matter of any and all parent, grandparent, great-grandparent, etc. applications of the herein listed application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

For purposes of the USPTO extra-statutory requirements, the present application constitutes a continuation in part of the following currently co-pending commonly owned United States patent applications. The subject matter of the applications listed below are incorporated by reference in their entirety in the present application to the extent such subject matter is not inconsistent herewith.

Ser. No. 11/051,514 filed on Feb. 4, 2005, entitled "Virtual Credit In Simulated Environments", naming Edward K. Y. Jung, Royce A. Levien, Mark A. Malamud, and John D. Rinaldo, Jr. as inventors, and issued as U.S. Pat. No. 7,958,047 on Jun. 7, 2011.

Ser. No. 11/069,906 filed on Feb. 28, 2005, entitled "Hybrid Charge Account for Virtual World Credit", naming Edward K. Y. Jung, Royce A. Levien, Mark A. Malamud, and John D. Rinaldo, Jr. as inventors.

Ser. No. 11/096,265 filed Mar. 30, 2005, entitled "Virtual Credit with Transferability", naming Edward K. Y. Jung, Royce A. Levien, Mark A. Malamud, and John D. Rinaldo, Jr. as inventors.

Ser. No. 11/184,567 filed Jul. 18, 2005, entitled "Third Party Control Over Virtual World Characters", naming Edward K. Y. Jung, Royce A. Levien, Robert W. Lord, Mark A. Malamud, and John D. Rinaldo, Jr. as inventors.

Ser. No. 11/192,320 filed Jul. 28, 2005, entitled "Rating Notification for Virtual World Environment", naming Edward K. Y. Jung, Royce A. Levien, Robert W. Lord, Mark A. Malamud, and John D. Rinaldo, Jr. as inventors.

Ser. No. 11/213,442 filed on Aug. 26, 2005, entitled "Virtual World Escrow User Interface", naming Edward K. Y. Jung, Royce A. Levien, Robert W. Lord, Mark A. Malamud, and John D. Rinaldo, Jr. as inventors.

Ser. No. 11/228,043 filed on Sep. 15, 2005, entitled "Real World Interaction with Virtual World Privileges", naming Edward K. Y. Jung, Royce A. Levien, Robert W. Lord, Mark A. Malamud, and John D. Rinaldo, Jr. as inventors.

Ser. No. 11/236,875 filed on Sep. 27, 2005, entitled "Real-World Incentives Offered to Virtual World Participants", naming Edward K. Y. Jung, Royce A. Levien, Robert W. Lord, Mark A. Malamud, and John D. Rinaldo, Jr. as inventors.

Ser. No. 11/238,684 filed Sep. 29, 2005, entitled "Probability Adjustment of a Virtual World Loss Event", naming Edward K. Y. Jung, Royce A. Levien, Robert W. Lord, Mark A. Malamud, and John D. Rinaldo, Jr. as inventors.

Ser. No. 11/242,647 filed Oct. 3, 2005, entitled "Virtual World Property Disposition After Real-World Occurrence", naming Edward K. Y. Jung, Royce A. Levien, Robert W. Lord, Mark A. Malamud, and John D. Rinaldo, Jr. as inventors, and issued as U.S. Pat. No. 7,720,687 on May 18, 2010.

Ser. No. 11/242,619 filed Oct. 3, 2005, entitled "Virtual World Property Disposition After Virtual World Occurrence", naming Edward K. Y. Jung, Royce A. Levien, Robert W. Lord, Mark A. Malamud, and John D. Rinaldo, Jr. as inventors.

Ser. No. 11/251,624 filed Oct. 14, 2005, entitled "Disposition of Proprietary Virtual Rights", naming Edward K. Y. Jung, Royce A. Levien, Robert W. Lord, Mark A. Malamud, and John D. Rinaldo, Jr. as inventors.

Ser. No. 11/256,695 filed Oct. 21, 2005, entitled "Disposition of Component Virtual Property Rights.", naming Edward K. Y. Jung, Royce A. Levien, Robert W. Lord, Mark A. Malamud, and John D. Rinaldo, Jr. as inventors, and issued as U.S. Pat. No. 7,937,314 on May 3, 2011.

Ser. No. 11/264,824 filed Nov. 1, 2005, entitled "Virtual World Interconnection Technique.", naming Edward K. Y. Jung, Royce A. Levien, Robert W. Lord, Mark A. Malamud, and John D. Rinaldo, Jr. as inventors.

Ser. No. 11/305,878 filed Dec. 15, 2005, entitled "Virtual World Reversion Rights", naming Edward K. Y. Jung, Royce A. Levien, Robert W. Lord, Mark A. Malamud, and John D. Rinaldo, Jr. as inventors, and issued as U.S. Pat. No. 7,720,733 on May 18, 2010.

Ser. No. 11/314,967 filed Dec. 21, 2005, entitled "Resolution of Virtual World Revocable Transfers", naming Edward K. Y. Jung, Royce A. Levien, Robert W. Lord, Mark A. Malamud, and John D. Rinaldo, Jr. as inventors.

Ser. No. 11/340,832 filed Jan. 26, 2005, entitled "Context Determinants in Virtual World Environments", naming Edward K. Y. Jung, Royce A. Levien, Robert W. Lord, Mark A. Malamud, and John D. Rinaldo, Jr. as inventors.

Ser. No. 11/364,498 filed February 27, 2006 entitled "Security Arrangements for Virtual World Obligations", naming Edward K. Y. Jung, Royce A. Levien, Robert W. Lord, Mark A. Malamud, and John D. Rinaldo, Jr. as inventors.

Ser. No. 11/305,878 filed Dec. 15, 2005, entitled "Virtual World Reversion Rights", naming Edward K. Y. Jung, Royce A. Levien, Robert W. Lord, Mark A. Malamud, and John D. Rinaldo, Jr. as inventors, and issued at U.S. Pat. No. 7,720,733 on May 18, 2010.

Ser. No. 11/283,551 filed Nov. 18, 2005, entitled "Real-world Profile Data for Making Virtual World Contacts", naming Edward K. Y. Jung, Royce A. Levien, Robert W. Lord, Mark A. Malamud, and John D. Rinaldo, Jr. as inventors.

Ser. No. 11/274,759 filed Nov. 15, 2005, entitled "Use of Patron Profiles in Virtual World Environment", naming Edward K. Y. Jung, Royce A. Levien, Robert W. Lord, Mark A. Malamud, and John D. Rinaldo, Jr. as inventors.

Ser. No. 11/234,878 filed Sep. 23, 2005, entitled "Tracking a Participant Loss in a Virtual World", naming Edward K. Y. Jung, Royce A. Levien, Robert W. Lord, Mark A. Malamud, and John D. Rinaldo, Jr. as inventors.

Ser. No. 11/234,867 filed Sep. 23, 2005, entitled "Reporting a Participant Loss in a Virtual World", naming Edward K. Y. Jung, Royce A. Levien, Robert W. Lord, Mark A. Malamud, and John D. Rinaldo, Jr. as inventors.

Ser. No. 11/234,848 filed Sep. 23, 2005, entitled "Reporting a Non-Mitigated Loss in a Virtual World", naming Edward K. Y. Jung, Royce A. Levien, Robert W. Lord, Mark A. Malamud, and John D. Rinaldo, Jr. as inventors.

Ser. No. 11/234,847 filed Sep. 23, 2005, entitled "Identifying a Participant Loss in a Virtual World", naming Edward K. Y. Jung, Royce A. Levien, Robert W. Lord, Mark A. Malamud, and John D. Rinaldo, Jr. as inventors.

Ser. No. 11/202,964 filed Aug. 12, 2005, entitled "Rating Technique for Virtual World Environment", naming Edward K. Y. Jung, Royce A. Levien, Robert W. Lord, Mark A. Malamud, and John D. Rinaldo, Jr. as inventors.

Ser. No. 11/192,342 filed Jul. 28, 2005, entitled "Selecting Auxiliary Control Features for Virtual World Environment", naming Edward K. Y. Jung, Royce A. Levien, Robert W. Lord, Mark A. Malamud, and John D. Rinaldo, Jr. as inventors.

Ser. No. 11/191,252 filed Jul. 27, 2005, entitled "Risk Mitigation in a Virtual World", naming Edward K. Y. Jung, Royce A. Levien, Robert W. Lord, Mark A. Malamud, and John D. Rinaldo, Jr. as inventors, and issued at U.S. Pat. No. 8,096,882 on Jan. 17, 2012.

Ser. No. 11/191,248 filed Jul. 27, 2005, entitled "Participating in Risk Mitigation in a Virtual World", naming Edward K. Y. Jung, Royce A. Levien, Robert W. Lord, Mark A. Malamud, and John D. Rinaldo, Jr. as inventors.

Ser. No. 11/191,233 filed Jul. 27, 2005, entitled "Providing Risk Mitigation in a Virtual World", naming Edward K. Y. Jung, Royce A. Levien, Robert W. Lord, Mark A. Malamud, and John D. Rinaldo, Jr. as inventors.

Ser. No. 11/185,524 filed Jul. 19, 2005, entitled "Virtual World Escrow", naming Edward K. Y. Jung, Royce A. Levien, Robert W. Lord, Mark A. Malamud, and John D. Rinaldo, Jr. as inventors.

Ser. No. 11/185,446 filed Jul. 19, 2005, entitled "Virtual World Escrow Environment", naming Edward K. Y. Jung, Royce A. Levien, Robert W. Lord, Mark A. Malamud, and John D. Rinaldo, Jr. as inventors.

Ser. No. 11/184,564 filed Jul. 18, 2005, entitled "Supervisory Authority in Virtual World Environment", naming Edward K. Y. Jung, Royce A. Levien, Robert W. Lord, Mark A. Malamud, and John D. Rinaldo, Jr. as inventors.

Ser. No. 11/107,381 filed Apr. 15, 2005, entitled "Follow-up Contacts with Virtual World Participants", naming Edward K. Y. Jung, Royce A. Levien, Robert W. Lord, Mark A. Malamud, and John D. Rinaldo, Jr. as inventors.

Ser. No. 11/107,380 filed Apr. 15, 2005, entitled "Participation Profiles of Virtual World Players", naming Edward K. Y. Jung, Royce A. Levien, Mark A. Malamud, and John D. Rinaldo, Jr. as inventors, and issued at U.S. Pat. No. 8,060,829 on Nov. 15, 2011.

Ser. No. 11/096,212 filed Mar. 30, 2005, entitled "Multi-Player Game Using Simulated Credit Transactions", naming Edward K. Y. Jung, Royce A. Levien, Robert W. Lord, Mark A. Malamud, and John D. Rinaldo, Jr. as inventors.

Ser. No. 11/069,905 filed Feb. 28, 2005, entitled "Payment Options for Virtual Credit", naming Edward K. Y. Jung, Royce A. Levien, Robert W. Lord, Mark A. Malamud, and John D. Rinaldo, Jr. as inventors, and issued at U.S. Pat. No. 7,774,275 on Aug. 10, 2010.

Ser. No. 11/069,894 filed Feb. 28, 2005, entitled "Financial Ventures Based on Virtual Credit", naming Edward K. Y. Jung, Royce A. Levien, Robert W. Lord, Mark A. Malamud, and John D. Rinaldo, Jr. as inventors.

Ser. No. 11/068,736 filed Feb. 28, 2005, entitled "Compensation Techniques for Virtual Credit Transactions", naming Edward K. Y. Jung, Royce A. Levien, Robert W. Lord, Mark A. Malamud, and John D. Rinaldo, Jr. as inventors.

BACKGROUND

This application relates generally to transactions involving virtual world environments.

Virtual world environments often include imaginary characters participating in fictional events, activities and transactions. There are educational, financial and entertainment benefits in creating new and challenging ways for providing participation transactions related to virtual world environments.

SUMMARY

Method and system embodiments involving something of current or potential value in a virtual world environment as disclosed herein may take different forms. For example, one or more computer program products having process instructions may be incorporated in a computerized system.

An exemplary computerized virtual world system that is operably associated with one or more computer program products having instructions thereon may include computer means operatively coupled with a virtual world environment, an interface link providing real-world access to the computer means, and data records including a record of one or more real-world obligations involving virtual collateral posted as security for a particular real-world obligation.

Some process implementation features disclosed herein relate to a method of providing collateral for an obligation, including identifying a real-world arrangement that includes an ongoing or future obligation, confirming a willingness of a beneficiary of the real-world arrangement to accept something of virtual world value as collateral for the obligation; and allowing implementation of an arrangement that designates specified virtual world collateral as at least partial security for performance of the obligation.

Some embodiments are implemented in a computer program product having program instructions configured to perform a process that associates information in a computer system, including computer-readable signal-bearing media for encoding the instructions. An exemplary process incorporated in the computer program product may include enabling one or more parties to make an arrangement that includes a real-world obligation, wherein the real-world obligation includes virtual world collateral as security for the real-world obligation. Other possible aspects of the encoded exemplary process may include providing for disposition of virtual world collateral in the event of unsatisfactory performance of the real-world obligation, and making a record of the arrangement including a performance record regarding compliance or non-compliance with the real-world obligation. In some implementations the computer-readable signal-bearing media for encoding the process instructions may include a storage medium and/or a communication medium.

In some computer program embodiments, an exemplary process may be encoded on storage and/or signal transmission media accessible to multiple virtual world patrons having logon capabilities at different locations. Other computer program product embodiments may have an exemplary process encoded on storage and/or signal transmission media capable of functional operation on localized computer apparatus accessible to an individual virtual world patron.

The transactions involving virtual world environments which are disclosed herein for purposes of illustration may be entered into by many different types of participants and/or entities, depending on advantages arising from embodiments and implementations that may be desired by the parties, credit entities, the players, virtual environment owner, game world operator, third party virtual and real-world businesses, and others having an interest or involvement in the virtual world arrangements and transactions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 27A illustrates exemplary database records for a player's virtual world game account status.

FIG. 27B illustrates exemplary database records for virtual credit transaction transfer records.

FIGS. 31-34 are high level flow charts showing exemplary processes for some embodiments.

DETAILED DESCRIPTION

Figure 1:
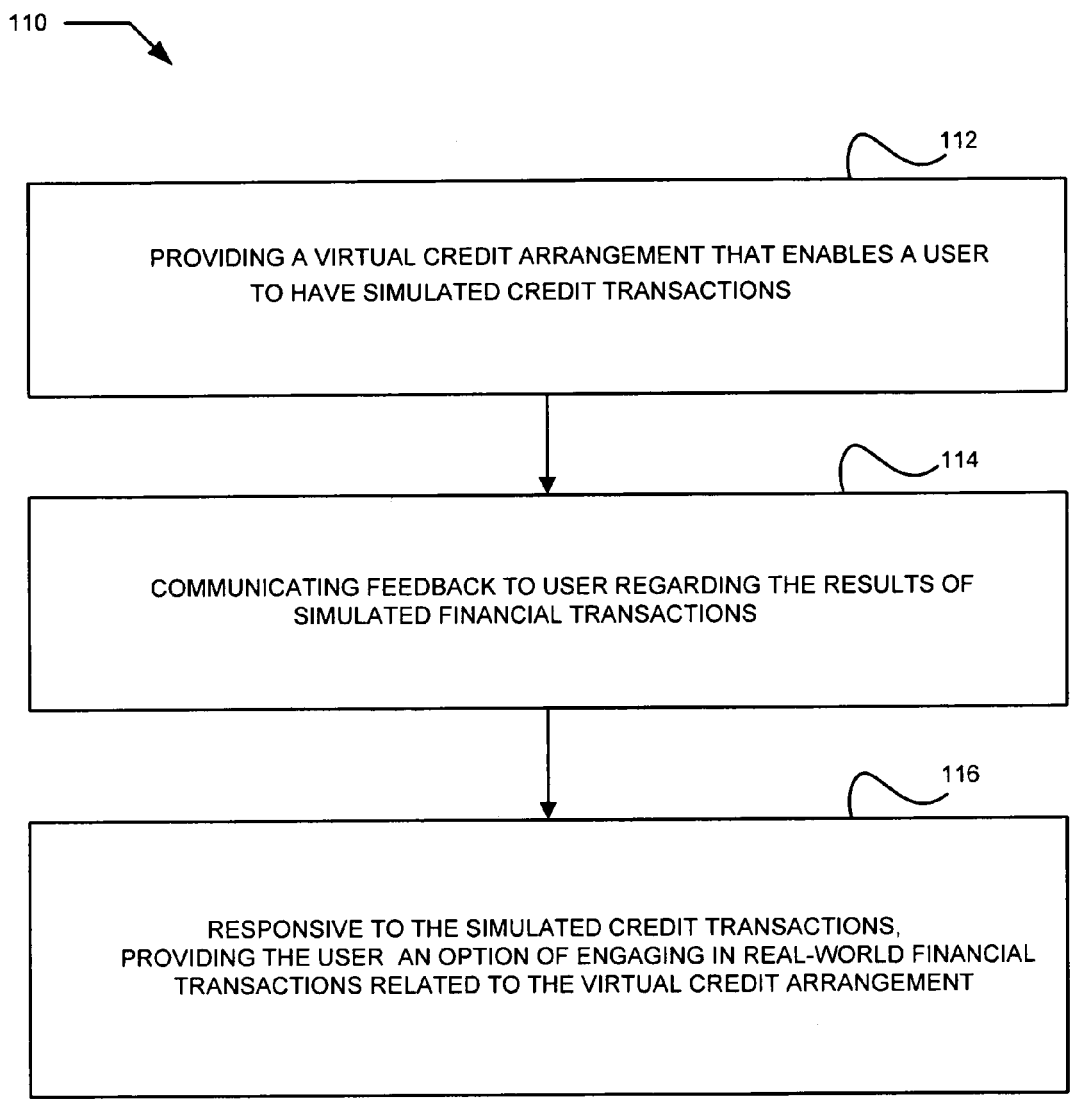
FIG. 1 is a high level flow chart showing an exemplary process for some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described in more detail herein, this disclosure describes a method and system for a virtual credit arrangement that enables a user to have simulated credit transactions. Feedback is communicated to the user regarding results of the simulated credit transactions. Responsive to the simulated credit transactions, the user is provided an option of engaging in real-world financial transactions related to the virtual credit arrangement.

In one aspect of the method and system disclosed herein, a virtual account is provided to a user. The user is enabled to make simulated purchases of foods and/or services and/or items of value. The user receives feedback regarding results of the simulated purchases. Responsive to an experience of making the simulated purchases and receiving the feedback, a transition by the user to usage of an actual financial account is facilitated. A further aspect relates to selection of credit terms for simulated purchases of virtual goods and/or services and/or items of value. In some embodiments, certain virtual account terms are programmed—e.g. automatically by a machine under program control—based on user demographic information or other past performance records. In other embodiments certain virtual account terms are varied by the user.

In some embodiments, users are enabled to make simulated purchases or incur simulated credit obligations that are posted to virtual accounts, and users are enabled to make simulated compensation against balances due or obligations owed for virtual accounts. In some instances, users are enabled to make remuneration with something of real value. In other instances, users are enabled to make remuneration with something of virtual value.

The completion of performance benchmarks may be required in some embodiments before allowing transfer to a higher participation level of a virtual credit account. Completion of performance benchmarks may be required before facilitating transition of a user to an actual financial account. In some instances, a user may have an unrestricted option to make transition to an actual financial account.

In some implementations, the system and method provides a simulated environment that enables purchases of various virtual products and/or virtual services and/or virtual items to be made by a plurality of users at different locations. Such purchases may involve credit transactions based on role playing world activities.

Referring to a process 110 shown in the exemplary flow chart of FIG. 1, a virtual credit arrangement is provided in order to enable a user to have simulated credit transactions (block 112). Feedback is communicated to the user regarding results of the simulated financial transactions (block 114). Responsive to the simulated credit transactions, the user is provided with an option of engaging in real-world financial transactions (block 116) related to the virtual credit arrangement. As discussed in more detail herein, such virtual credit arrangements can involve various types of credit arrangements made by the user, under standard or customized credit terms that may involve different forms of compensation such as real-world money, fictional money, action commitments, bartered items, etc.

Figure 2:
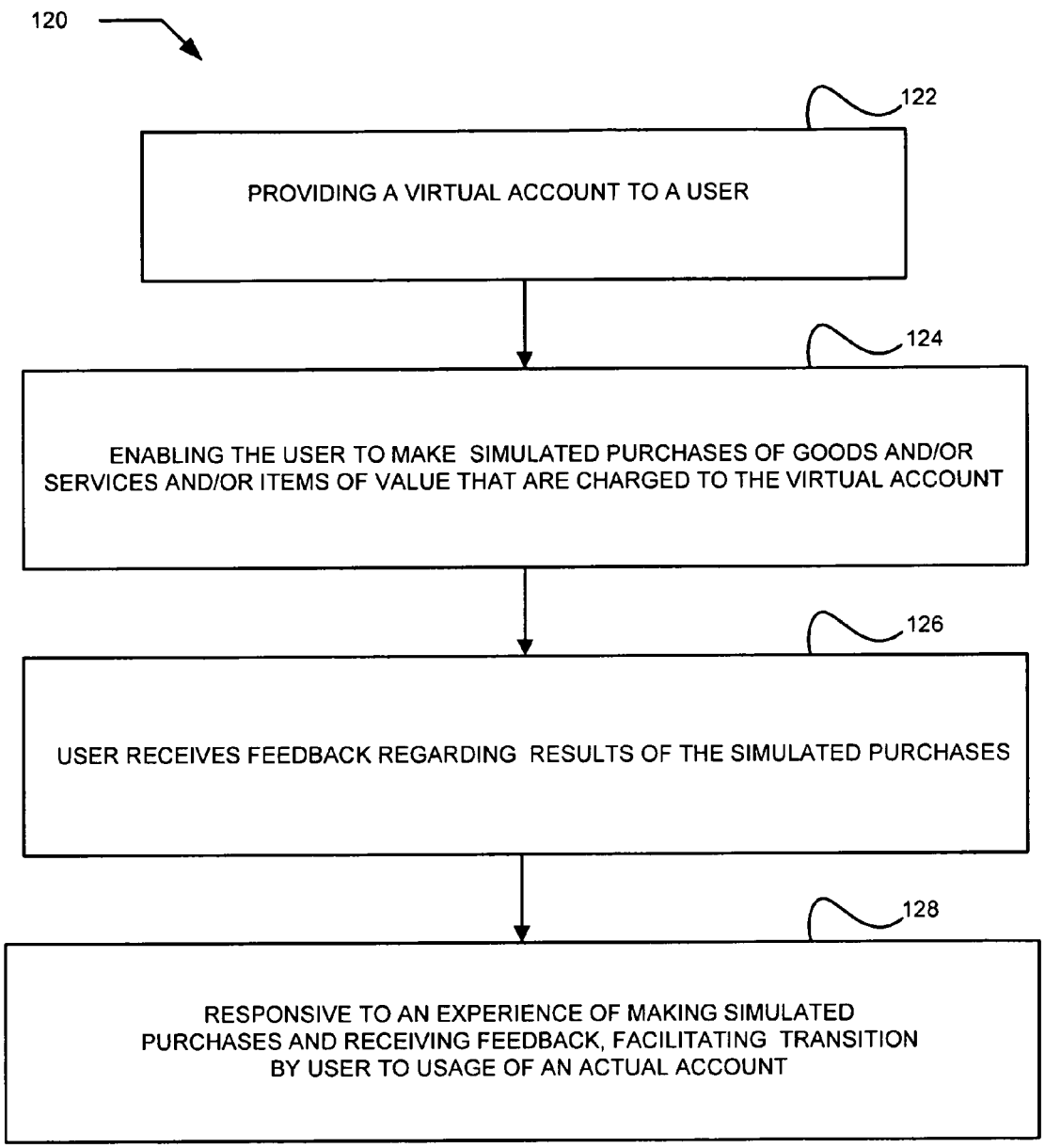
FIG. 2 is another high level flow chart showing a different exemplary process for other embodiments.

Another process 120 shown in the exemplary flow chart of FIG. 2 provides a virtual account to a user (block 122). The user is enabled to make simulated purchases of goods and/or services and/or items of value that are charged to the virtual account (block 124). The user receives feedback (block 126) regarding results of the simulated purchases. Responsive to the user's experience of making simulated purchases and receiving feedback, a transition of the user to usage of an actual account is facilitated (block 128).

The processes of FIGS. 1 and 2 can be implemented with various types of technology, including but not limited to hardware, firmware and/or software systems based on computerized data communications and processing as discussed in more detail herein.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

Figure 3:
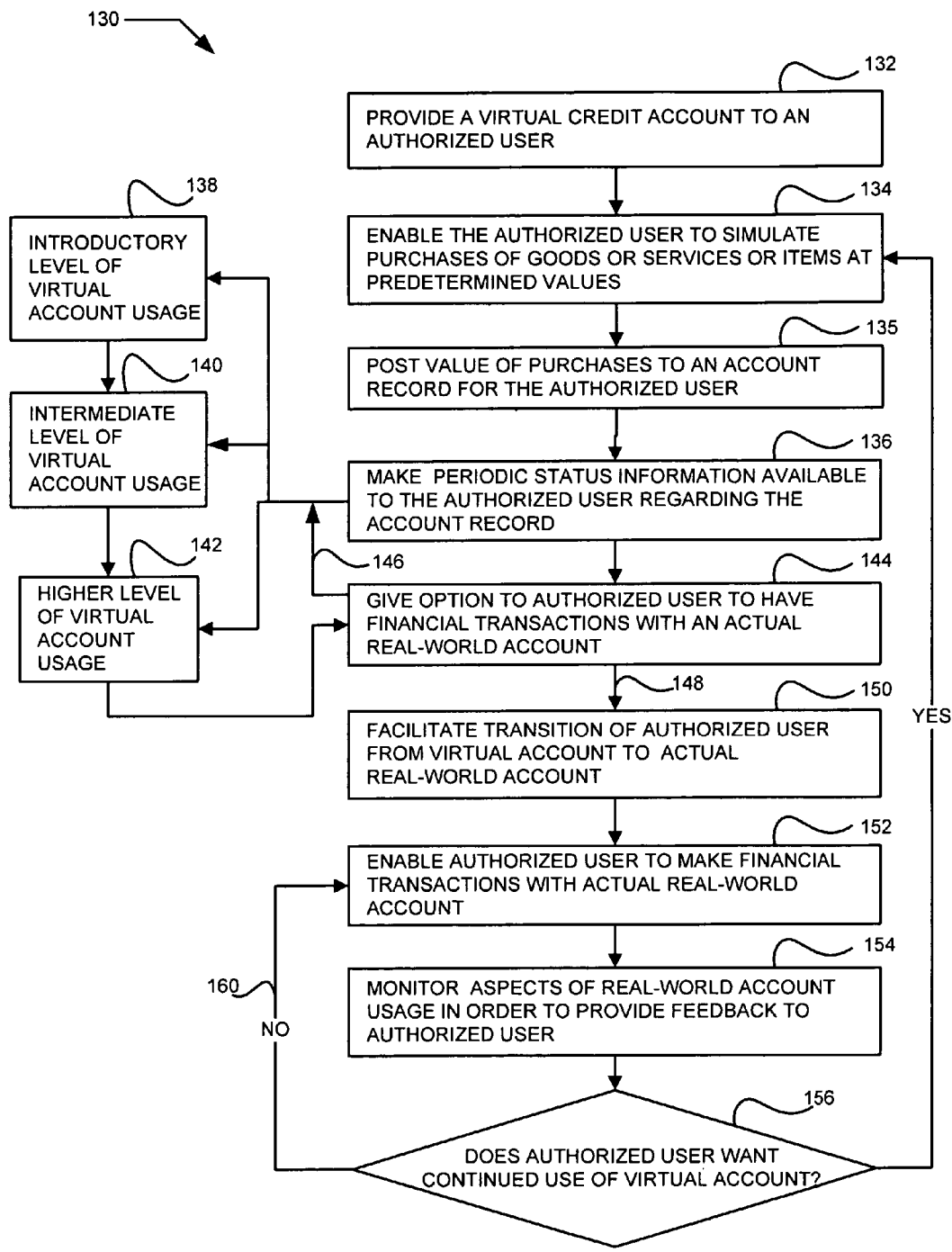
FIG. 3 is a more detailed flow chart showing a further exemplary process for additional embodiments.

A more detailed exemplary flow chart of FIG. 3 shows a process 130 involving alternative usage of both a virtual credit account and a real-world account. As an initial step for new users, a virtual credit account is provided to an authorized user (block 132). The authorized user is enabled to simulated purchases of goods or services or items at predetermined values (block 134). The value of the purchases is posted to an account record (block 135). Periodic feedback including status information is made available to the authorized user regarding the virtual credit account record (block 136).

Various levels of participation are provided for usage of the virtual credit account. Of course any number of levels with different types of credit opportunities for virtual account usage could be incorporated into embodiments, perhaps depending upon the desired financial, educational, and entertainment goals of a system designer as well as possibly depending upon the skill, experience and sophistication of the authorized user. By way of example only, the illustrated process 130 of FIG. 3 includes an introductory level (block 138), an intermediate level (block 140) and a higher level (block 142). After participating in one or more levels of virtual account usage, an authorized user is given an option to have financial transactions with an actual real-world account (block 144). The authorized user may choose to continue (see arrow 146) using the virtual credit account, or take the option (see arrow 148) for transition to the actual real-world account. In some embodiments, the user may have an unrestricted option to make the transition to the actual real-world account. Some embodiments may allow the user to have the option of using either the virtual credit account or an actual financial account during given time periods.

If the option for transition to the actual real-world account is exercised, the transition of the authorized user is facilitated from the virtual credit account to the actual real-world account (block 150). The authorized user can then be enabled to make financial transactions with the actual real-world account (block 152). Aspects of usage of the real-world account may be monitored (block 154) in order to provide feedback to the authorized user. It is to be emphasized that usage of the real-world account does not preclude continued use of the virtual credit account. If the authorized user wants to continue use of the virtual credit account (block 156), then such continued use is made available. Continued use of the real-world account is also made available (see arrow 160).

Figure 4:
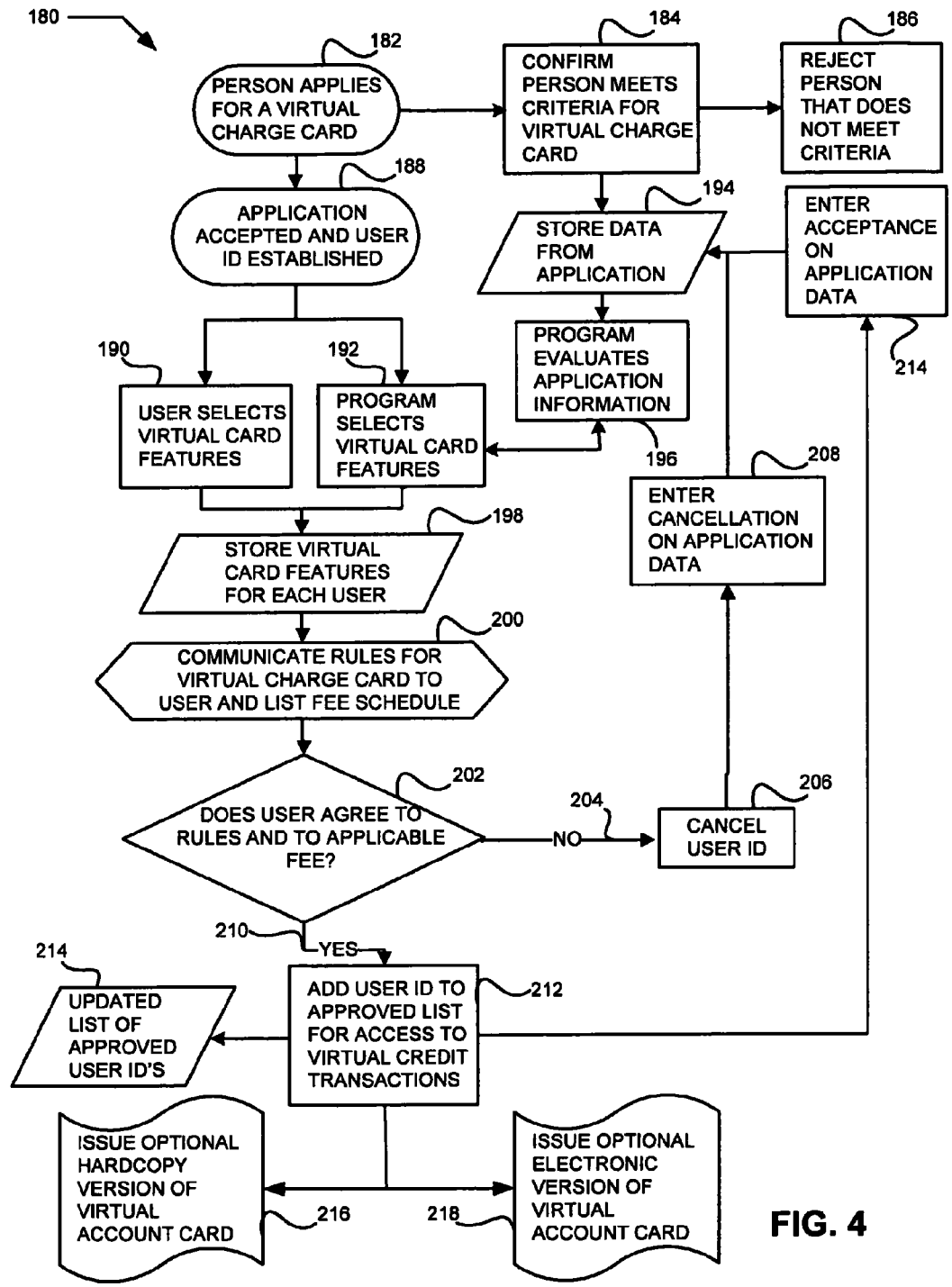
FIG. 4 is another more detailed flow chart showing an exemplary application process for a virtual charge card.

The detailed exemplary flow chart of FIG. 4 shows a process 180 for implementing an application procedure for a virtual charge card. A person who is not already an authorized user can make application (block 182) for a virtual charge card. An evaluation or screening confirms whether or not the person meets predetermined criteria (block 184) for having the virtual charge card. Persons that do not meet the criteria are rejected (block 186). When a person does meet the criteria, their application is accepted and a user ID established (block 188).

In some instances the virtual card features such as credit terms, payment terms, penalties, benefits, and the like may be selected by the user (block 190). In other instances a program may select the virtual card features (block 192), which features may be determined from stored application data (block 194) that is evaluated by the program (block 196). The virtual card features that are selected for each user are stored (block 198) for future reference. Where virtual account terms for a virtual card are being programmed for a new user, such programming may be based on user demographic information.

As part of the application procedure, a fee schedule and virtual card rules are presented to the user (block 200) for consideration. In order to continue the application process, the user decides whether to agree to the rules and applicable fees (block 202). If no agreement occurs (see arrow 204), the user ID is canceled (block 206), and the cancellation is entered (block 208) for storage with the other application data. If agreement is confirmed (see arrow 210), the user ID is added to the approved list (blocks 212, 214) that controls the access to virtual credit transactions involving the virtual credit cards, and the acceptance is also entered (block 214) for storage with the other application data.

A further feature offered to an approved user is the optional issuance of a hardcopy version of the virtual account card (block 216), and also the optional issuance of an electronic version of the virtual account card (block 218).

Figure 5:
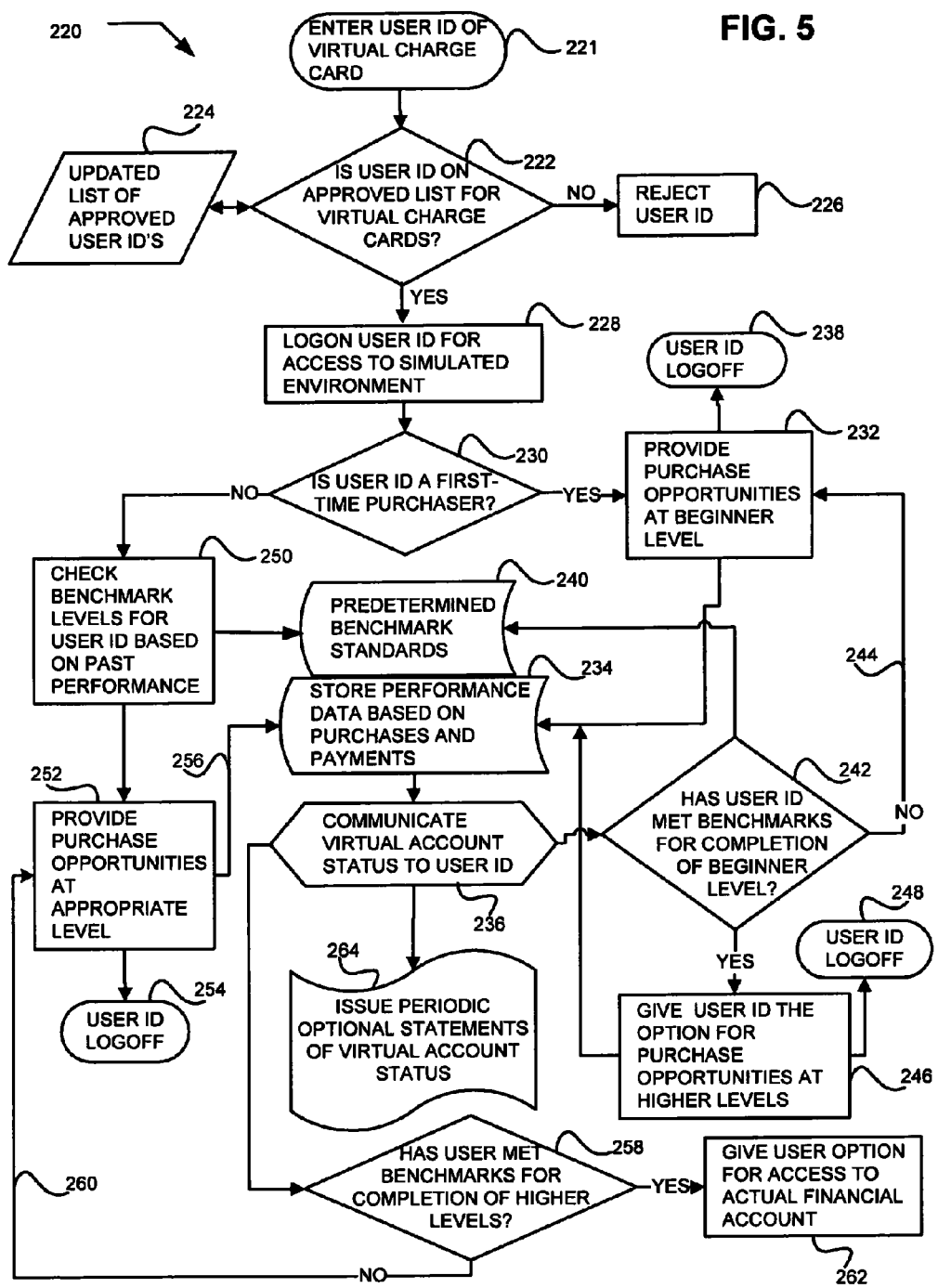
FIG. 5 is a detailed flow chart showing an exemplary manner of using a virtual charge card.

The detailed exemplary flow chart of FIG. 5 shows a process 220 for incorporating benchmark completion as a basis for giving an authorized user the option of having access to an actual financial account. A person is requested to enter the user ID (block 221) of a virtual charge card. The user ID is processed (block 222) to determine whether it is on an updated approved list (block 224). If not found on the updated approved list, the user ID is rejected (block 226). If found on the update approved list, the user ID is approved for logon to have access to a simulated environment (block 228).

A determination may be made to detect a user ID that is a first-time purchaser (block 230). If so, purchase opportunities are made available to the user ID at a beginner level (block 232). Any purchases and/or payments involving the virtual charge card are stored (block 234) as part of a performance data base for future reference. In some instances, revised virtual account terms for the virtual charge card may be programmed based on past performance records maintained in the performance data base. The virtual account status is periodically communicated to the user (block 236). There is no urgency imposed on the user to advance to another participation level, and user logoff (block 238) is available from the beginner level.

A user at the beginner level in this embodiment qualifies for advancement to another participation level when it has been determined that such user has met predetermined benchmark standards (block 240) for completion of the beginner level (block 242). Upon failure to meet such a beginner level benchmark standard, the user can return (see arrow 244) to purchase opportunities at the beginner level. In the event the beginner level benchmarks standards have been met, the user ID is given the option for purchase opportunities at higher levels (block 246). User logoff (block 248) is also available to exit from such higher levels.

When an approved user ID is not a first-time purchaser, a query is made (block 250) to check the stored past performance data (block 234) as compared to the stored benchmark standards (block 240) for this particular user ID. Based on the results of the query, purchase opportunities are provided at the appropriate participation level (block 252), along with a previously described user ID logoff (block 254). Any purchases and/or payments involving virtual credit transactions at these higher participation levels are also stored (see arrow 256) in the performance data base (block 234). The virtual account status is also periodically communicated (block 236) to the users at these higher participation levels.

When a review (block 258) determines that benchmark standards for completion at higher levels have not been met, the user can return (see arrow 260) for further purchase opportunities at such higher levels. Upon satisfactory completion of the higher level benchmark standards, the user has an option for access to an actual financial account (block 262). It is noted that this process embodiment provides for the issuance of periodic optional statements (block 264) indicating the status of the virtual charge card accounts.

Figure 6:
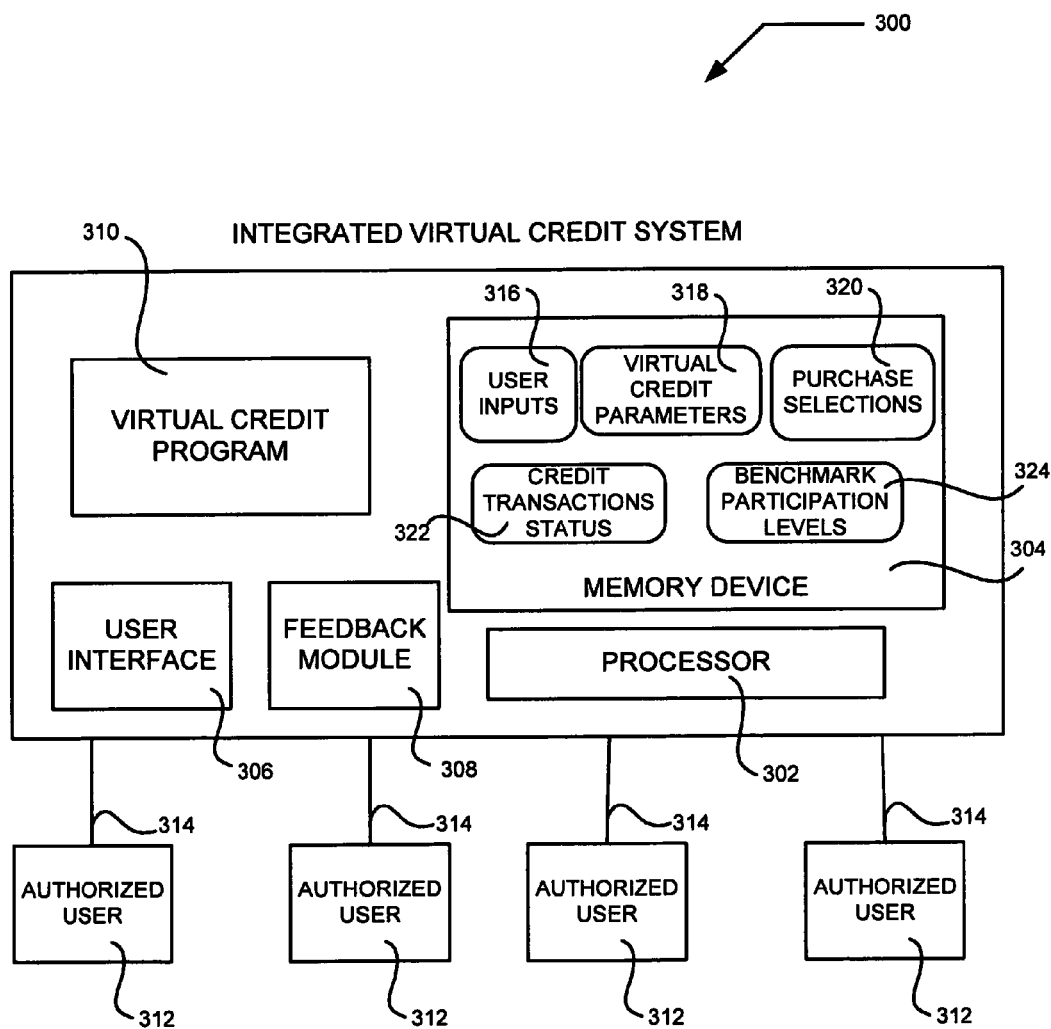
FIG. 6 is a schematic block diagram for an exemplary implementation of some embodiments.

Referring to the schematic block diagram of FIG. 6, an exemplary embodiment of an integrated virtual credit system 300 includes a processor 302, memory device 304, user interface 306, feedback module 308, and virtual credit program 310. A plurality of authorized users 312 who may be at different locations have bi-directional communication links 314 with the virtual credit system 300 in order to submit inputs via the user interface 306 and to receive informational messages from the feedback module 308. The virtual credit program 310 may include one or more computer program products with a carrier medium having program instructions thereon. Such computer program products may run on multiple computer devices or run on an integrated computer system, depending on the circumstances.

The memory device 304 provides re-writable storage capability associated with each authorized user 312. The various categories of data stored in the memory device 304 include user inputs 316, virtual credit parameters 318, purchase selections 320, credit transactions status 322, and benchmark participation levels 324. This system enables multiple users to make simulated purchases or incur simulated credit obligations that are associated with and posted to different virtual accounts. The multiple users are also enabled to make simulated compensation against balances due or obligations owed for the different virtual accounts.

Figure 7:
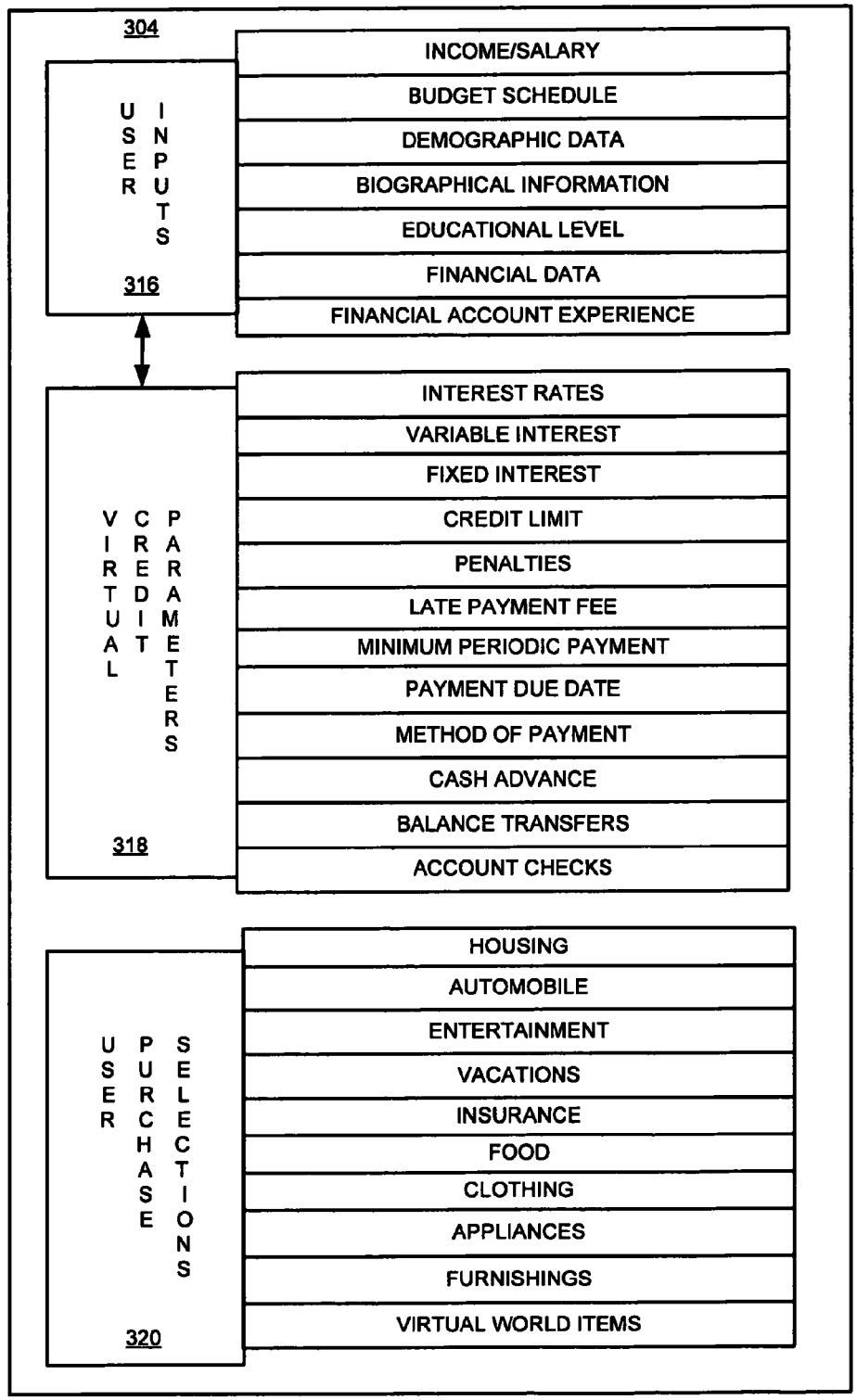
FIG. 7 is a schematic block diagram showing exemplary categories of informational data that may be involved in some embodiments.

The schematic block diagram of FIG. 7 shows an illustrative but not exhaustive list of data categories that can be accessed in the memory 304 by the user interface 306 and the feedback module 308. For example, user inputs 316 may include categories such as income/salary, budget schedule, demographic data, biographical information, educational level, financial, and financial account experience. As an additional example, virtual credit parameters 318 may include categories such as interest rates, variable interest, fixed interest, credit limit, penalties, late payment fee, minimum periodic payment, payment due date, method of payment, cash advance, balance transfers, and account checks. As a further example, user purchase selections 320 may include categories such as housing, automobile, entertainment, vacations, insurance, food, clothing, appliances, furnishings, and virtual world items.

Figure 8:
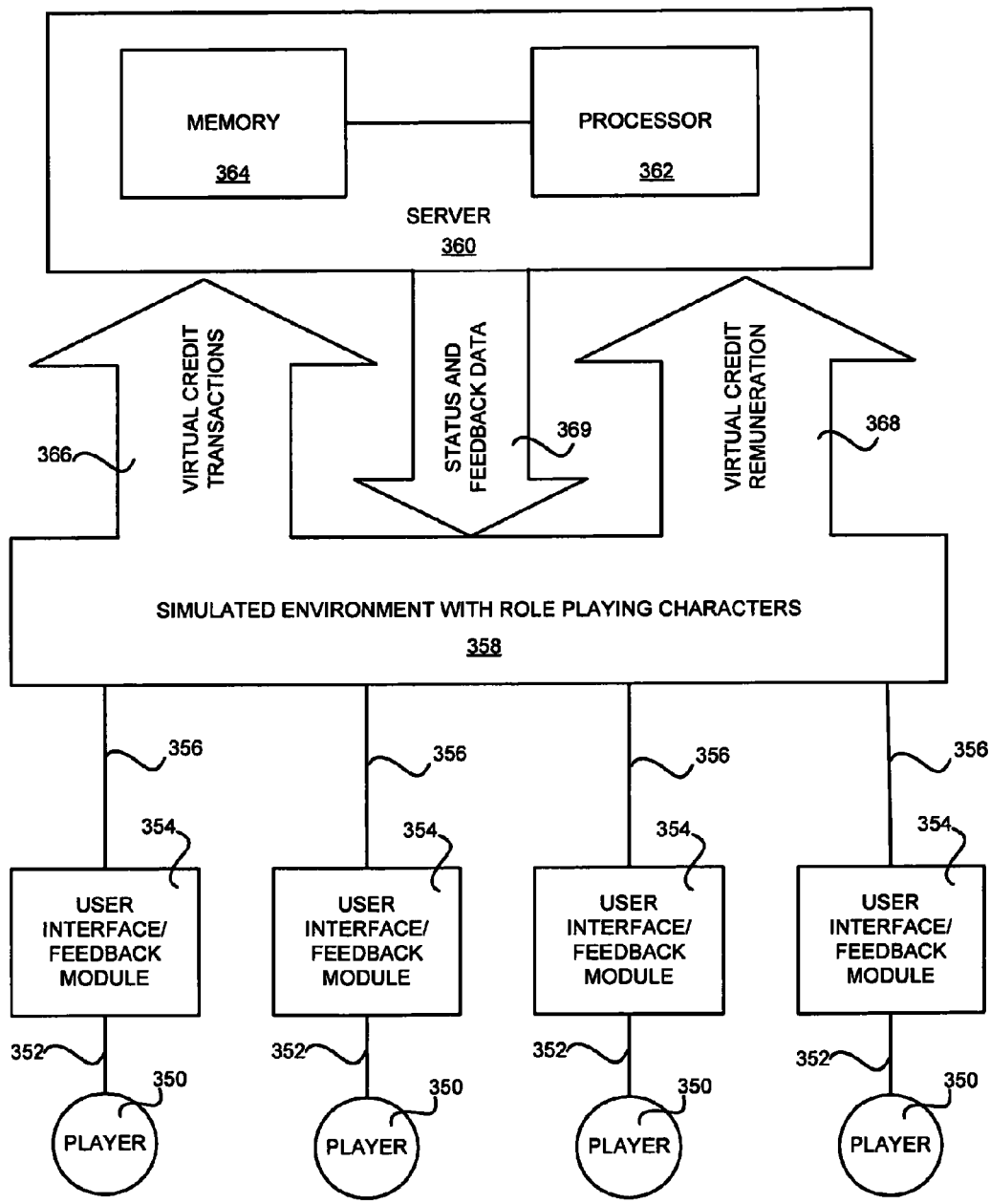
FIG. 8 is a schematic functional diagram showing a possible implementation in a simulated environment with role playing characters.

The schematic block diagram of FIG. 8 shows an exemplary embodiment for a multi-player system implemented in a simulated environment with role playing characters. Of course, other types of simulated environments have the capability for practicing the disclosed methods and techniques, particularly where multiple players interact with the simulated environment over extended periods of time. In many instances the players can logon for a period of participation, and from time to time logoff in order to carry out their real-world activities and obligations, sometimes perpetuating the fictional role playing over many weeks and months.

As shown in FIG. 8, individual players 350 have access via a first bi-directional communication link 352 to a user interface/feedback module 354 with connects through a second bi-directional communication link 356 to a simulated environment 358. Such players can interact with each other or with characters, events, purchase opportunities, competitions, and the like that are provided in the simulated environment 358. The bi-directional communication links also serve to provide player access to products and/or services and/or other items of value that can be acquired pursuant to a virtual credit arrangement.

A server 360 includes a processor 362 connected with a memory 364 in order to receive, store, update, process, and transmit information data and messages regarding virtual credit arrangements related to the simulated environment 358. In that regard, various details regarding virtual credit transactions are transmitted through a third communication link 366 to the server 360. Similarly various details regarding virtual credit remuneration or compensation are transmitted through a fourth communication link 368 to the server. Another communication link 369 enables status and feedback information to be communicated back to the simulated environment 358, and in some instances back to the players 350.

Figure 9:
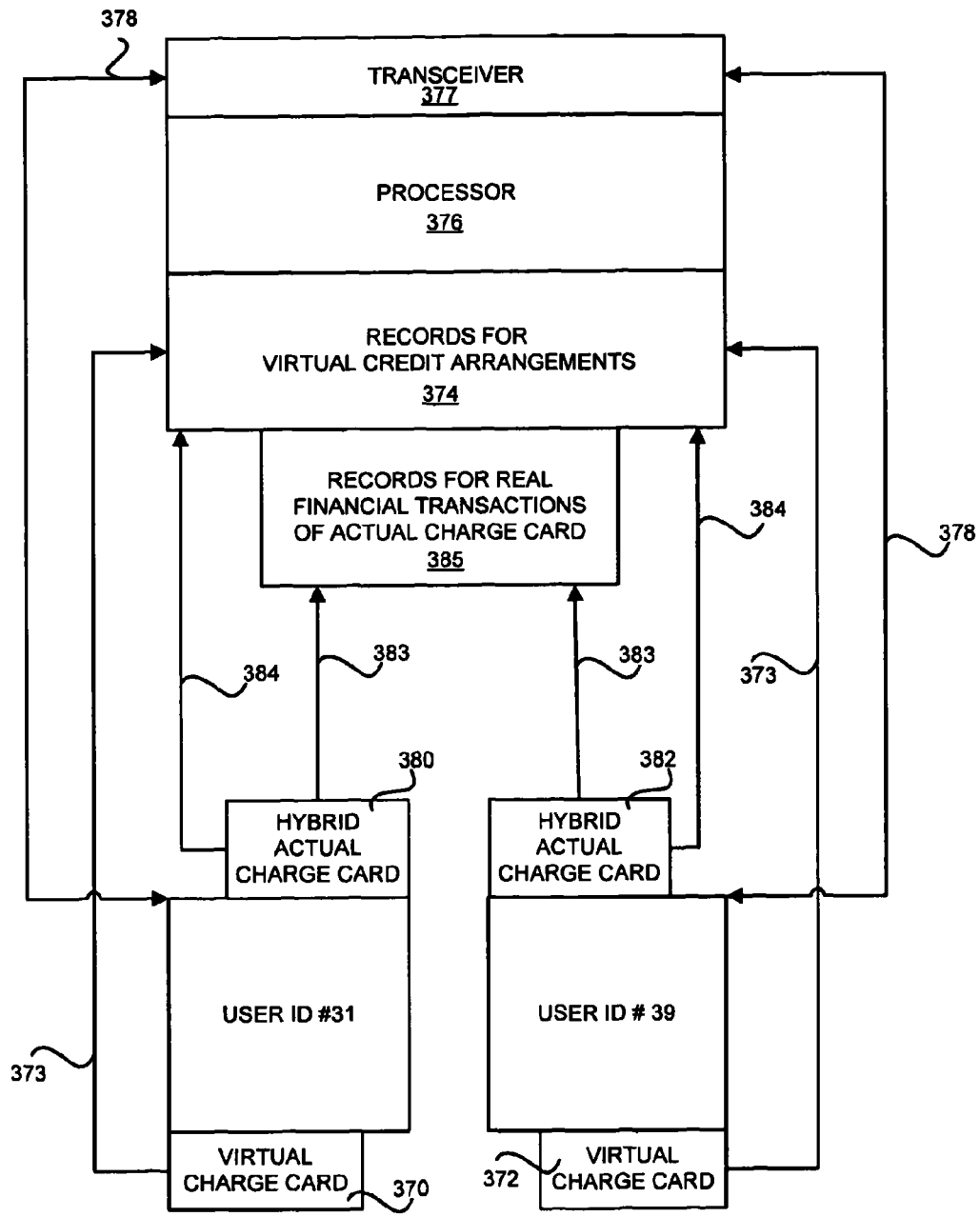
FIG. 9 is a schematic functional diagram for an exemplary system that embodies various features.

The schematic block diagram of FIG. 9 shows an exemplary embodiment wherein multiple users (e.g., user ID #31 through user ID #39) can use virtual accounts such as virtual charge cards 370, 372 in order to participate in virtual financial transactions. When the virtual charge card is used, a record of the transaction is transmitted as indicated by arrows 373 for storage in a memory device 374 that keeps records for virtual credit arrangements. A processor 376 is operatively coupled to the memory device 374 and also to a transceiver 377 for bi-directional communication regarding the virtual financial transaction through link 378 with the users #31 through #39.

These same users #31 through #39 also have access to hybrid actual charge cards 380, 382 in order to participate in actual real-world financial transactions. When the hybrid actual charge card is used, a record of the transaction is transmitted as indicated by arrows 383 for storage in a memory device 385 that keeps records for real financial transactions. Such real financial transactions may or may not be related to a virtual credit arrangement. However in some instances the hybrid actual charge card usage may be directly or indirectly related to a virtual credit arrangement, including but not limited to down payments, guarantees, compensation, renegotiation, resolution, transferability, etc. The details of such relationship will be communicated to the virtual credit arrangements storage memory device 374 as indicated by arrows 384. The bi-directional communication link 378 serves shared functional purposes for both the virtual charge card and the actual charge card, including but not limited to transmitting messages regarding credit terms associated with each different user ID account as well as feedback and status information for purchases, payments, negotiations, remuneration, and resolution involving the virtual credit arrangements.

It will be understood that the processor 376 and bi-directional link 378 are also operatively coupled with the memory device 385 in order to provide bi-directional communication regarding hybrid charge card transactions through link 378 with the users #31 through #39. Such communications may include the results or consequences of purchases and/or payments made regarding the actual charge card transactions. Such communications may also relate to terms of a credit transaction.

It will be further understood that all of the references herein to communication links with virtual account users and real-world account users may include interactive communications involving question/answer sequences, prompt/selection sequences, option/choice sequences, and the like.

It will also be understood by those skilled in the art that the various communication links can be separated into different communication channels or media as well as combined into an integrated broadband or narrowband link such as wired, wireless, cable, etc. It is further understood that integrated or separate modules can be provided for user interface functions and/or for feedback functions. The particular exemplary systems disclosed herein are provided only for illustration.

Figure 10:
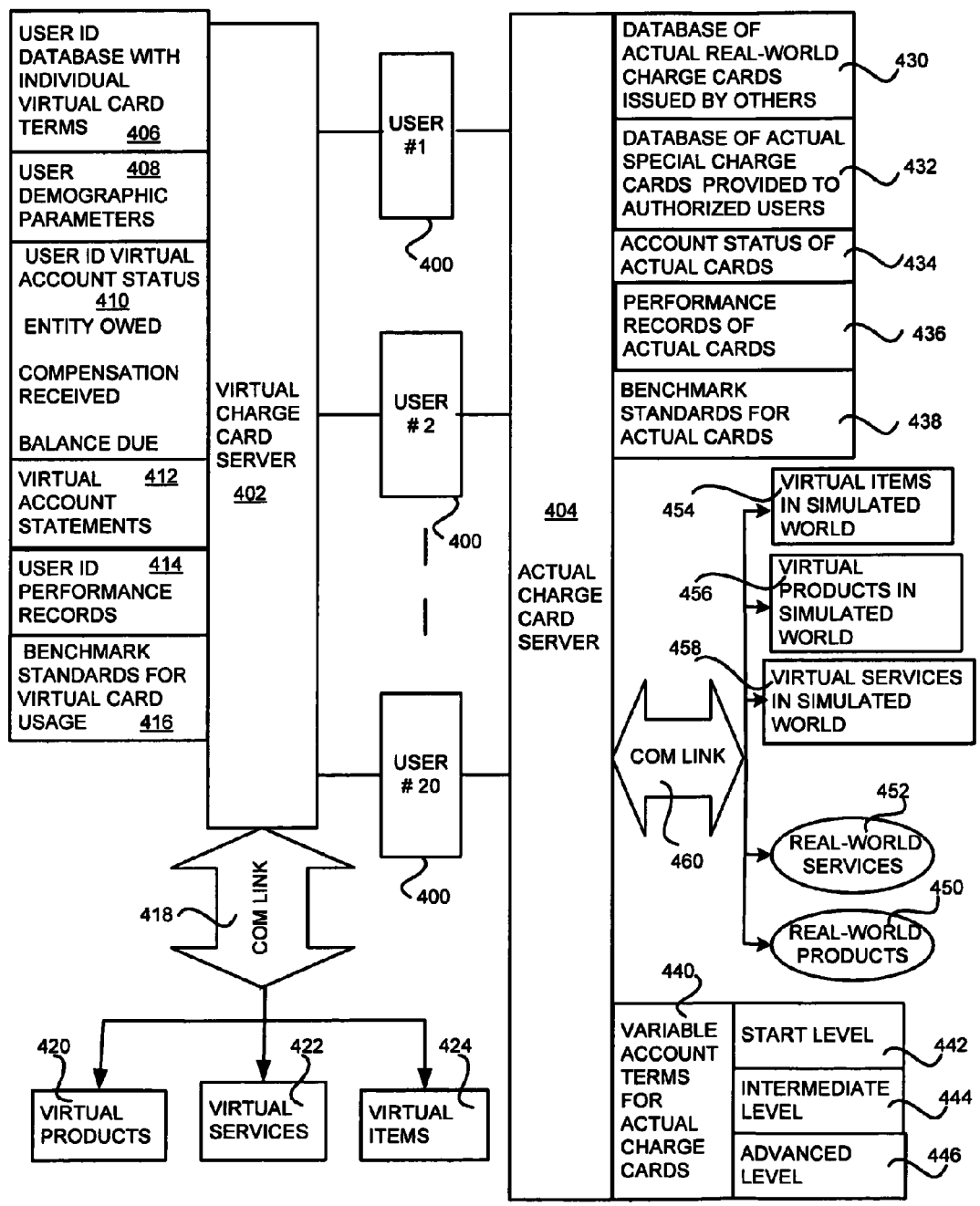
FIG. 10 is a more detailed schematic functional diagram for some embodiments that incorporate virtual charge cards and real-world charge cards.

Referring to the schematic block diagram of FIG. 10, a plurality of persons 400 (e.g., user #1, user #2 through user #20) have access to both a virtual charge card server 402 and an actual charge card server 404. The disclosed system provides for monitoring any action taken to make resolution or provide compensation that may be required by a virtual credit arrangement.

The embodiment of FIG. 10 provides a server apparatus including a memory and a processor for maintaining information regarding credit transactions involving purchases by a user of various virtual products and/or services and/or virtual items. A bi-directional user interface is provided for exchanging information messages between the user and the server apparatus regarding credit terms associated with the purchases. As described in more detail herein, the embodiment of FIG. 10 is an exemplary implementation of a system and method wherein credit transactions are capable of resolution by virtual-world compensation and by real world compensation.

The access shown for the multiple users in FIG. 10 is for purposes of illustration, and persons skilled in the art will understand that various types of communication links can be utilized to achieve the necessary functional data and message exchanges between the users and the computerized data processing and storage systems exemplified by the servers.

Also, various types of virtual credit arrangements and real-world financial accounts can be incorporated into the type of system as disclosed herein. In some instances, specific terms of a virtual credit arrangement or transaction may be based on one or more factors such as demographic information, financial account records, experience levels, completion of performance benchmarks, role play world activities, and user negotiations.

The virtual charge card server 402 includes various predetermined data records as well as other dynamically updated records that are used by the server to help provide virtual credit services based on different types of credit arrangements and accounts. Exemplary categories of records available to the virtual charge card server 402 include user ID data and related individual virtual card terms 406, user demographic parameters 408, user ID virtual account status data 410 (e.g., entity/person owed, compensation already received, and remaining balance due), virtual account statements 412, user ID performance records 414, and benchmark standards for virtual card usage 416.

A bi-directional communication link 418 enables the users 400 to have access for engaging in credit transactions involving virtual products 420, virtual services 422, and virtual items 424. When a credit transaction has been completed based on advertised or negotiated terms, the informational details are transmitted via communication link 418 to the server for appropriate processing and storage. This allows any balance due or obligation owed to be posted to the user's virtual credit account. When remuneration is made by one of the multiple users with something of real value against such balances due or obligations owed, such activity is also posted to the appropriate virtual credit account.

The actual charge card server 404 includes various predetermined data records as well as other dynamically updated records that are used by the server to help provide actual credit services based on different types of credit arrangements and accounts. Exemplary categories of records available to the actual charge card server 404 includes a database 430 of actual real-world charge cards issued to users by others such as third party issuers, a database 432 for actual special charge cards provided to authorized users, account status records 434 for actual charge cards, and performance records 436 for actual charge cards. These records help to identify actual real-world accounts selected by a user, including the actual special charge cards created for the user.

Other categories of records include benchmark standards 438 for actual charge cards, and variable account terms 440 for actual charge cards. These variable account terms 440 may be divided between exemplary levels such as start level accounts 442, intermediate level accounts 444, and advanced level accounts 446. The actual charge card server 404 may enable a user to have an option to move between different participation levels. In some instances completion of performance benchmarks may be required before allowing the user to move to a high participation level.

Many of the functional capabilities and possibilities attributable to virtual credit accounts may also be provided to actual hybrid charge card accounts. For example, the user may be enabled to vary one or more of the credit terms such as interest rate, due date, grace period, penalties, credit limit, service charge, transferability, weekly or monthly or annual fees, automatic repayment, payment of other obligations, monetary advance, re-negotiated debt, and exchange value.

Some of the actual charge cards are primarily suitable for use in purchasing real-world products 450 and real-world services 452. This may especially be true of actual charge cards issued by third parties. However, some actual financial accounts issued by third parties as well as some actual special cards such as hybrid cards described herein may also have capability to purchase or otherwise become involved in transactions related to simulated credit arrangements such as simulated purchases of virtual world items 454, virtual world products 456, and virtual world services 458. As indicated in the drawing, such virtual items, products and/or services may often be found in a simulated environment such as a role playing fictional world. A bi-directional communication link 460 enables the users to engage in the various credit transactions, and provide for transaction details to be processed by the actual charge card server 404 and stored or updated in the appropriate database.

It will be understood from the embodiments of FIGS. 9 and 10 that hybrid charge accounts can be associated with a plurality of users, respectively, for use with credit transactions involving purchases of various virtual products and/or virtual services and/or virtual items. Furthermore, an aspect of the disclosed methods and systems for hybrid charge accounts provides for their credit terms to be established or changed based at least partially on user selections, demographics, user performance, user experience, and/or benchmark parameters.

The embodiments of FIGS. 8, 9 and 10 further illustrate computer apparatus that provides virtual credit including storing and processing virtual credit transactions involving products or services or items that are available in a simulated environment. An interactive communication link with the computer apparatus enables a user to participate in the virtual credit transactions. A user interface is capable of operable connection to the interactive communication link in order for the user to transmit informational inputs and to make selections that help to provide a basis for credit terms of the virtual credit transactions.

The interactive communication link also enables the user to make remuneration of a debt or an obligation resulting from the virtual credit transactions. Such remuneration may be in the form of real-world money or fictional-world money.

Based on the foregoing descriptions and drawing disclosures of exemplary embodiments, many new and advantageous features provide benefit to the virtual credit account users, as well as benefits to the entities that provide financial account services, and benefits to entities that provide simulated role playing environments. In that regard, some embodiments enable multiple users to make remuneration with something of virtual value against balances due or obligations owed for virtual credit accounts. In some embodiments multiple users can make remuneration with something of real value as resolution of virtual debts or obligations.

Features disclosed herein also include billing simulated purchases to a virtual account that allows carry-over balances. Feedback is communicated to the user regarding results of carry-over balances such as non-payment, partial payment, and full payment of balances due. Feedback is also communicated to the user regarding consequences of related purchase and payment activity for virtual credit accounts. In some instances, the system and method provides monitoring of actions taken to make resolution or provide compensation required by a virtual credit account arrangement.

Other features include periodically changing various credit terms for a virtual credit arrangement, such as interest rates, due dates, grace periods, penalties, credit limits, service charges, transferability, weekly or monthly or annual fees, automatic repayment provisions, payment of other obligations, monetary advances, re-negotiation of the debt, and exchange value as compared to real-world or fictional money. In certain instances, the user may have the option to vary one or more of these virtual account terms.

Various types of virtual credit accounts as well as actual financial accounts can be incorporated into the disclosed methods, processes, systems and apparatus including accounts allowing carry-forward balance, accounts requiring full payment, debit cards, accounts with free benefits, accounts with extra-cost benefits, accounts providing discount promotions, cash advance accounts, accounts with beneficial links, insurance product accounts, accounts with value added benefits, business and financial institution charge cards, checking accounts, lines of credit, vouchers, and installment promissory notes accounts.

Performance benchmarks for virtual credit arrangements or accounts in accordance with certain aspects of the disclosure herein may be based on the credit record of virtual accounts; credit record of real financial accounts, test results, fictional role playing achievements, fictional role playing skills acquired, previous experience, endorsements, and group memberships in real world and role playing environments. Completion of such performance benchmarks may be required before allowing the transfer to a higher participation level, and also before facilitating transition of the user to an actual financial account. Such performance benchmarks may be based on activities of the user in a role playing environment.

It is to be understood that different categories of purchases may be available to be charged to a virtual credit account, such as travel reservations, auctions, food, clothing, merchandise, vehicles, insurance, appliances, furnishings, recreation, competitions, other items having virtual monetary value, installment purchases, entertainment, rentals, education, books, publications, games, other items having real monetary value, and fictional role playing items.

Some embodiments contemplate using a simulated billing period for virtual credit account that occurs in real time at various intervals, such as a month, a week, a day, an hour, or lesser periods. The simulated billing period may be based on various parameters such as the number of purchase transactions, average balance owed, highest balance owed, user's age, user's education, user's experience level, and user's benchmark performance.

Virtual account terms can be based on various informational data, such as demographic information, past performance records, user negotiations, and choices selected by users. The terms of usage of hybrid charge accounts capable of both virtual account activities and real-world financial transactions can be established or changed based at least partially on user selections, user demographics, as well as other factors that are also used for determining virtual credit account terms.

Although the virtual credit arrangements may primarily involve transactions involving real-world money and/or fictional world money, some embodiments clearly contemplate virtual credit arrangements and accounts that may require remuneration with a non-monetary real-world item or action, as well as remuneration with a non-monetary fictional world item or action.

In some preferred embodiments, computerized components and systems enable multiple users to make purchases or incur obligations associated with different virtual credit accounts. Also such computerized implementations enable multiple users to provide compensation against balances due or obligations owed for different virtual accounts.

The exemplary system and apparatus embodiments shown in FIGS. 6-10 along with other components, devices, know-how, skill and techniques that are known in the art have the capability of implementing and practicing the methods and processes shown in FIGS. 1-5. It is to be understood that the methods and processes can be incorporated in one or more computer program products with a carrier medium having program instructions thereon. However it is to be further understood that other systems, apparatus and technology may be used to implement and practice such methods and processes.

Figure 11:
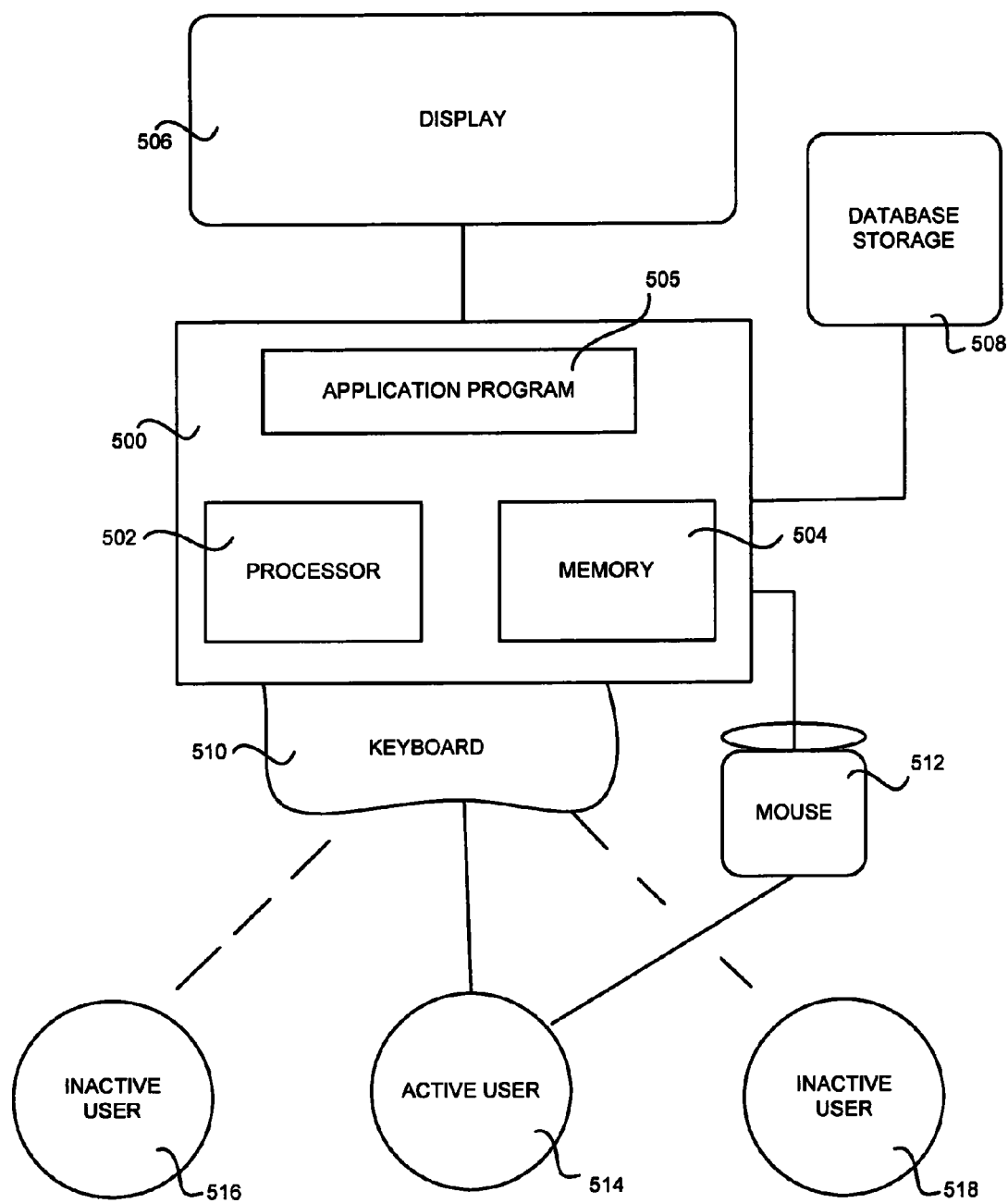
FIG. 11 is a schematic block diagram for certain embodiments implemented for one or more users sharing a computer system.

Referring to FIG. 11, a computerized implementation for the methods disclosed herein may include a computer system 500 having a processor 502 and memory 504 for running an application program 505. The application program 505 may be incorporated in one or more computer program products having a carrier medium with program instructions thereon. Peripheral components may include display 506 and database storage unit 508 as well as input devices such as keyboard 510 and mouse 512. An active user 514 may have access to features disclosed in the exemplary flowcharts of FIGS. 16-25 by running the application program 505. Inactive users 516, 518 may also periodically have access to the application program 505 including non-real time interaction through the program with each other and/or with active user 514 in order to participate in the benefits and advantages of the methods and processes disclosed herein.

Figure 12:
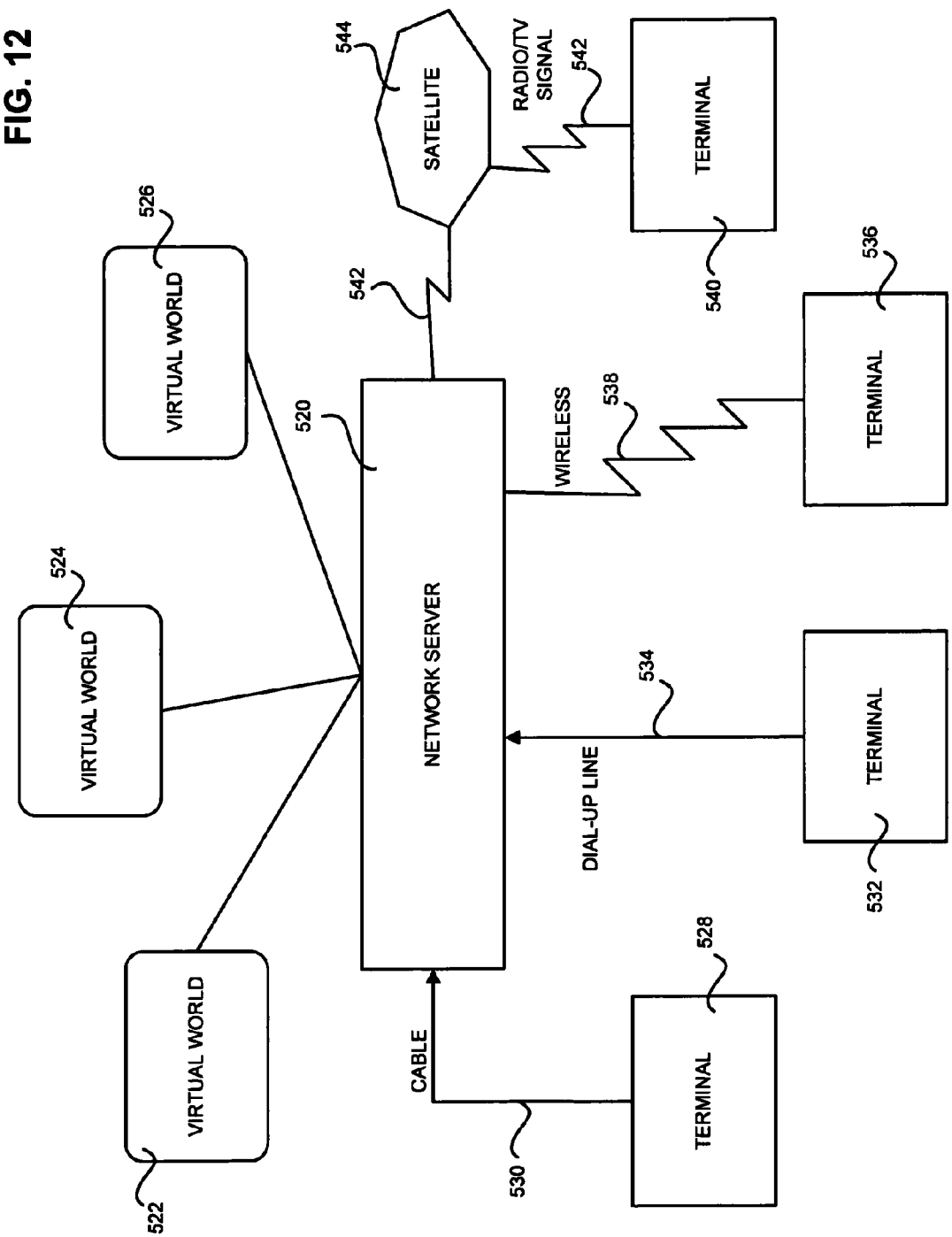
FIG. 12 is a schematic block diagram for possible implementations involving different virtual world environments accessed via exemplary types of communication links.

The schematic diagram of FIG. 12 illustrates the availability of the present methods and processes in a networking system having a network server 520 with communication links to different virtual world environments 522, 524, 526. In this exemplary version, terminal 528 has access through cable connection 530, terminal 532 has access through dial-up line 534, terminal 536 has access through wireless connection 538, and terminal 540 uses transmission signals 542 (e.g., radio or television signals) via satellite 544 for access to network server 520. As with the system of FIG. 11, players may be logged on to participate simultaneously in real-time virtual credit transactions in simulated world environments, or be respectively logged on during non-overlapping or partially overlapping time periods. Such participation may be directly with other parties or indirectly through intermediaries, depending on the circumstances involved.

Figure 13:
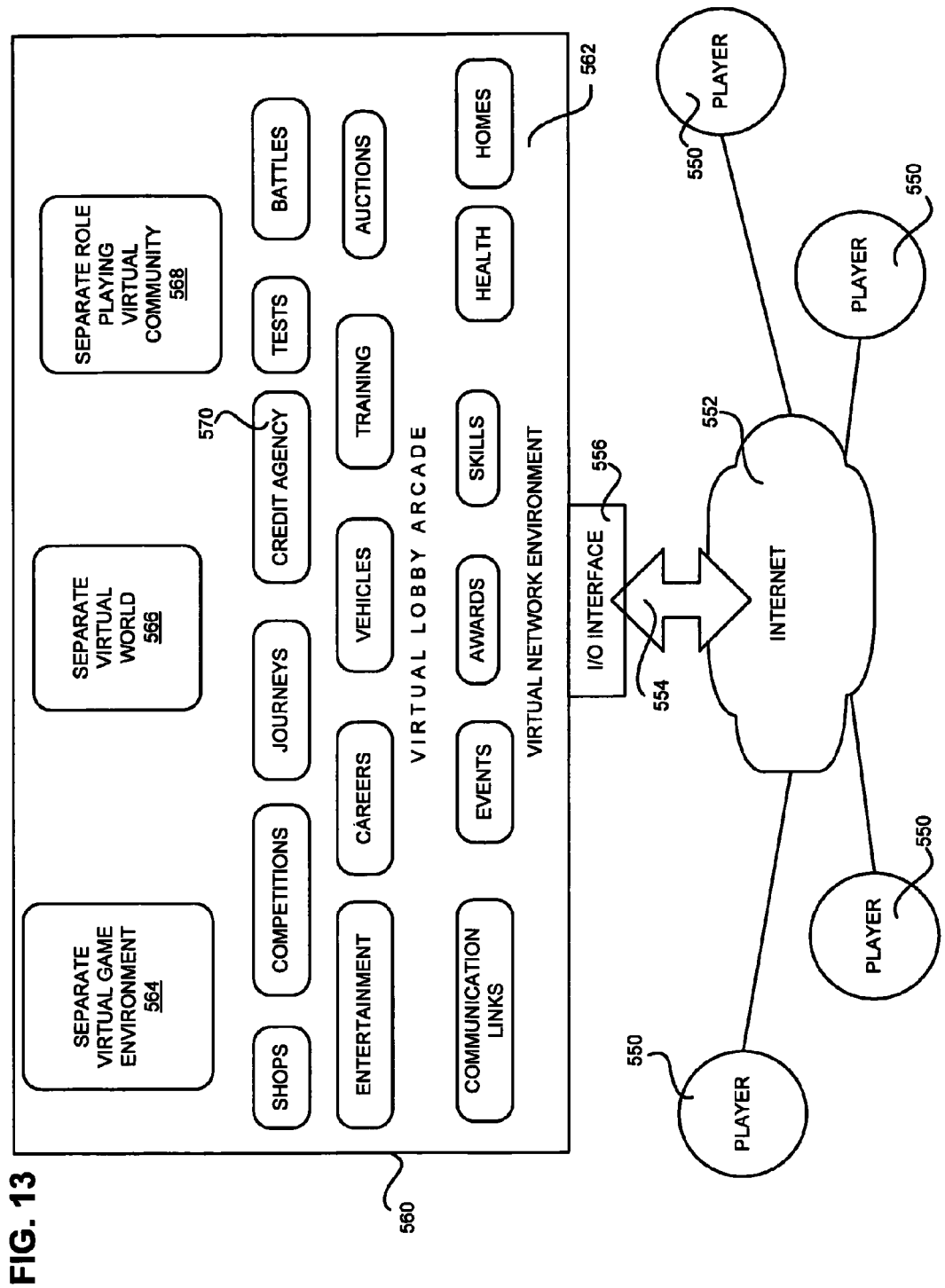
FIG. 13 is a schematic block diagram showing an embodiment providing player access via the Internet to a virtual network of separately operated virtual world environments.

Referring to the schematic diagram of FIG. 13, access to virtual network environment 560 may be accomplished for players 550 via Internet 552 having an interactive communication link 554 through I/O interface 556. Such a virtual network 560 may include a virtual lobby arcade 562 with various types of virtual opportunities. The categories for such virtual opportunities are almost unlimited, and may for example include shops, competitions, journeys, test, battles, entertainment, careers, vehicles, training, auctions, communication links, events, awards, skills, health and homes. A virtual credit agency office 570 operating, for example, as a storefront business may enable players to obtain information and issuance of virtual credit accounts usable in the virtual lobby arcade 562.

It will be understood that separately owned virtual environments may be included as part of the virtual network environment 560, including virtual game environment 564, virtual world 566, and role playing virtual community 568. The credit services of virtual credit agency office 570 may also be usable in these separate individual virtual environments based on appropriate agreements with their owners and/or operators.

Figure 14:
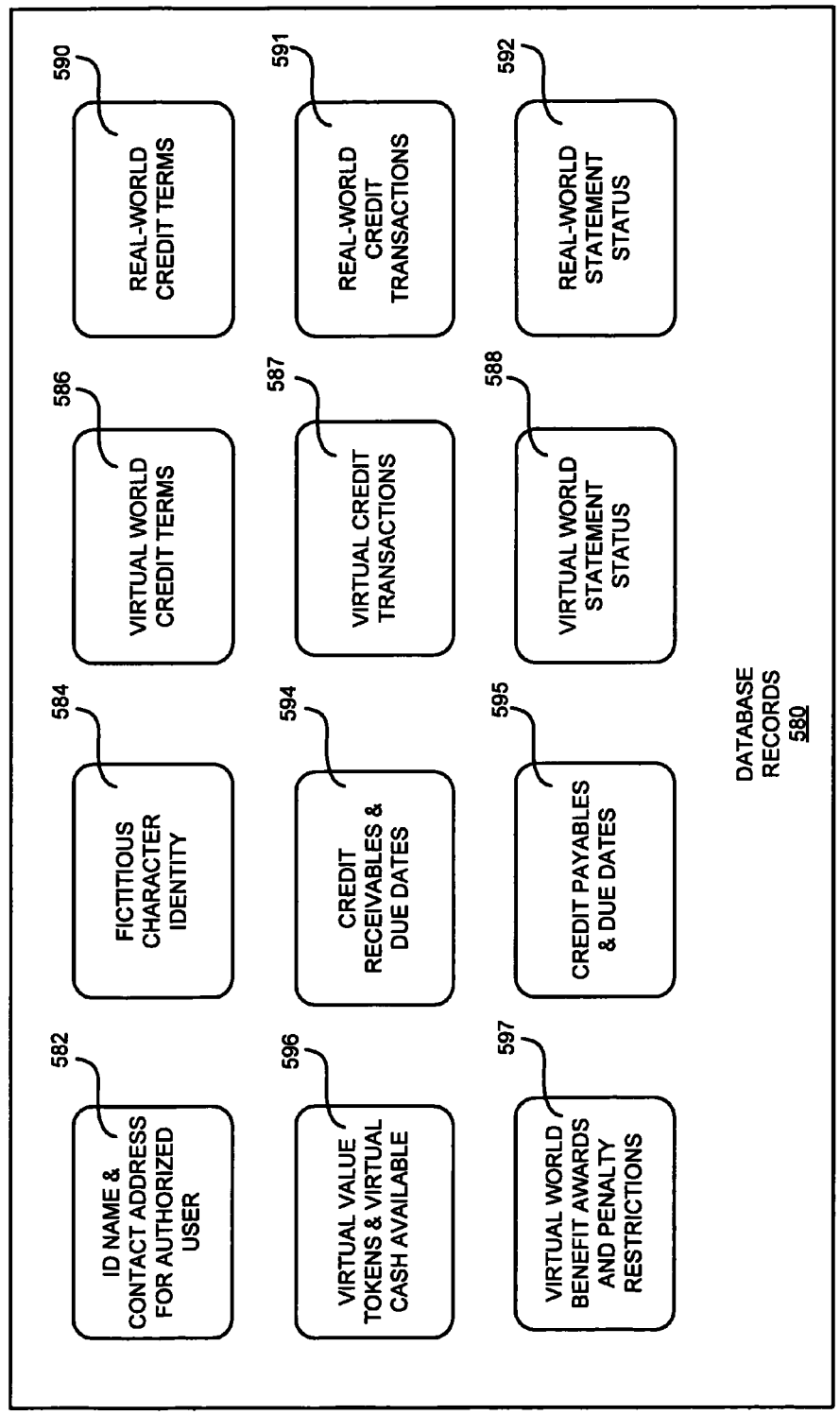
FIG. 14 shows exemplary types of database records related to real-world and virtual world credit transactions.

The schematic illustration of FIG. 14 shows exemplary database records 580 that may be used to practice the business and credit techniques disclosed herein. Various exemplary categories of records may include an ID name and contact address 582 for an authorized user, a fictitious character identity 584 for such user, virtual world credit terms 586 for a particular credit account, virtual credit transactions 587, and virtual world statement status 588. Where the credit account includes the optional features for real-world credit transactions, other exemplary categories of records may include real-world credit terms 590 for a particular credit account, real-world credit transactions 591, and real-world statement status 592.

Further exemplary categories of database records may include credit receivables and related due dates 594, credit payables and related due dates 595, virtual value tokens and virtual case available 596 for a particular player's account, and virtual world benefit awards and penalty restrictions 597 applicable to a particular player's account. It will be understood by those skilled in the art that these types of records are dynamically updated based on activity in the real-world as well as in virtual world environment. Such records are accessible as appropriate to players, credit account entities, third party business owners, virtual world environment operators and owners, and the like.

Figure 15A:
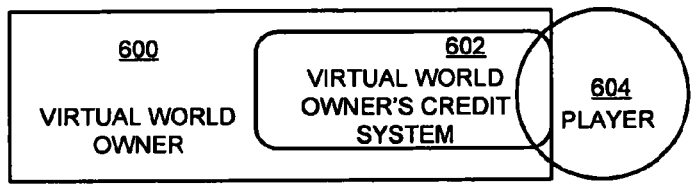
FIGS. 15A through 15E schematically illustrate some exemplary implementations of virtual credit arrangements in a simulated environment.

Various exemplary inter-relationships arising from the virtual credit transactions contemplated by the present methods and processes are illustrated in the schematic diagrams of FIGS. 15A-15E. For example, FIG. 15A depicts a virtual world publisher 600 operating a virtual world credit system 602 that extends credit to a player 604 based on the player's purchases and credit arrangements involving that particular virtual world.

Figure 15B:
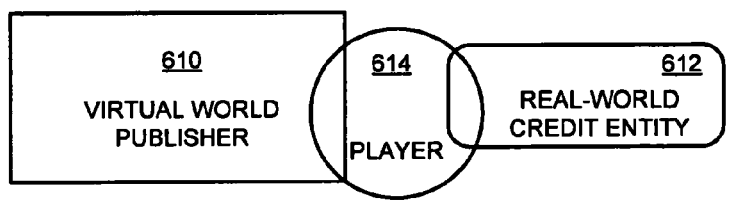

FIG. 15B shows an exemplary implementation wherein a virtual world publisher 610 engages another credit entity such as, for example, a real-world credit entity 612 for the purpose of offering virtual credit services to a player 614 who participates in that particular virtual world.

Figure 15C:
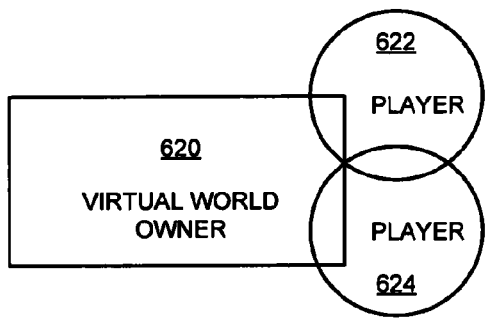

FIG. 15C shows an exemplary implementation wherein a virtual world publisher 620 enables multiple players such as 622, 624 to enter into virtual credit arrangements with each other.

Figure 15D:
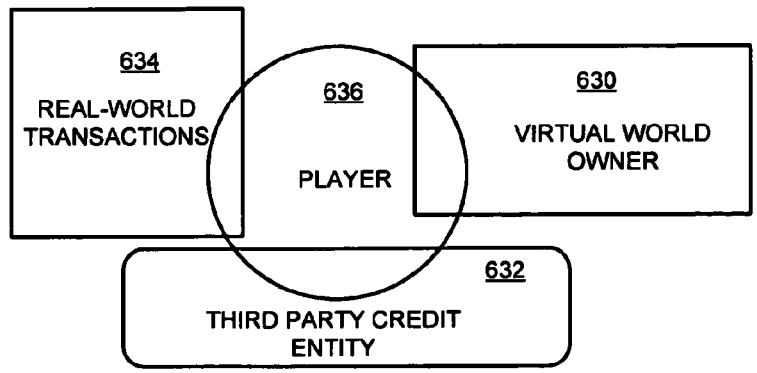

FIG. 15D shows an exemplary implementation wherein a virtual world owner 630 enables another credit entity 632 to offer either or both types of credit services: virtual world credit services to a virtual world participant or player 636, and real-world credit services involving real-world transactions 634.

Figure 15E:
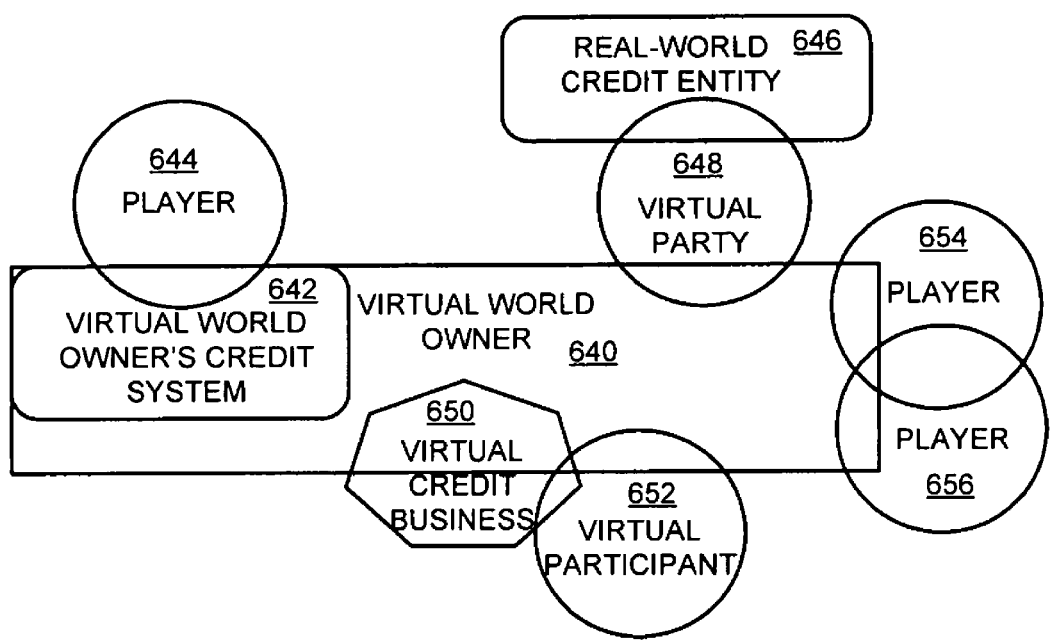

FIG. 15E shows an exemplary implementation wherein an entity or person owning virtual world rights 640 has its own virtual world credit system 642 that may involve one or more virtual participants such as player 644. A separate virtual credit business 650 operated by an authorized third party may offer its own credit account or arrangement to one or more virtual participants 652. A real-world credit entity 646 may provide virtual credit services to one or more virtual parties 648. As a final example occurring in this illustrated version of a virtual world embodiment, players 654, 656 may be enabled and allowed to arrange virtual credit transactions with each other.

It will be understood from the description and drawings herein that various embodiments of computer hardware and/or computer program products provide an opportunity for a selected credit entity to offer various types of virtual world credit services, including but not limited to virtual credit transactions between virtual world participants, virtual credit transactions between an owner or operator of the virtual world environment and one or more virtual world players, and virtual credit transactions between a third party virtual business entity and one or more virtual world players.

It will be further understood that different implementations in computer hardware and/or computer program products as disclosed herein enable a credit entity to use various forms of virtual world credit publicity and advertising including but not limited to sponsoring an event and/or an activity and/or a location in the virtual world, providing audio and/or visual and/or graphic and/or textual publicity in the virtual world, programming an activity or event in the virtual world that automatically comes to the attention of one or more virtual world players, and assuming a character role in the virtual world.

The exemplary embodiments of computer hardware and/or computer program products also enable a virtual credit card object that is issued by a credit entity to be capable of manipulation by a player in the virtual world. Such a credit entity may also have a capability of operating a real-world credit business. Such a credit entity may be controlled and/or operated by a party that also controls and/or operates the virtual world. Such a credit entity may also be involved with a credit transaction with one or more non-player third party entities in the virtual world. Such a credit entity may also be involved in a credit transaction with an owner or operator of the virtual world.

Some exemplary system embodiments disclosed herein include a processor linked to a database record and to an output device for providing a billing statement indicating payment obligations of the virtual credit account valuated in one or more of the following: fictional world money, real-world money, and non-monetary fictional world value tokens.

Some system implementations further provide a processor linked to a database record and to an output device for providing a billing statement indicating payment obligations of the virtual credit account based on one or more of the following: interest, penalties, due date, purchase activity price, real-world credit performance record, and fictional world credit performance record.

For embodiments involving special virtual credit accounts that provide both fictional world and real-world benefits, database records are capable of storing and updating advances of fictional world value given to an account user in exchange for future compensation. Such database records may be capable of storing and updating a repayment of the future compensation made one or more of the following: real-world money, fictional world money, non-monetary fictional world value tokens.

Some embodiments of the present system may include database records capable of storing and updating information relating to fictional world transactions charged to the virtual credit account. In some instances the virtual credit account may be used for real-world transactions.

One aspect of the system disclosed here includes database records that are capable of storing identity information for a real-world entity or person responsible for real-world obligations and/or fictional world obligations of the special virtual credit account. Such database records may also be capable of storing and updating information relating to real-world transactions charged to the virtual credit account.

In some instances, the virtual credit account business may provide fictional world benefits to a virtual credit account user based on performance information in the database records related to the real-world transactions charged to the special virtual credit account.

Some system embodiments may include a fictional world environment that allows purchase activity or virtual credit account business involving one or more of the following: fictional world owner, fictional world operator, third party virtual business entity, real-world credit entity, fictional world credit entity, fictional world player, fictional world participant, and fictional world character.

Figure 16:
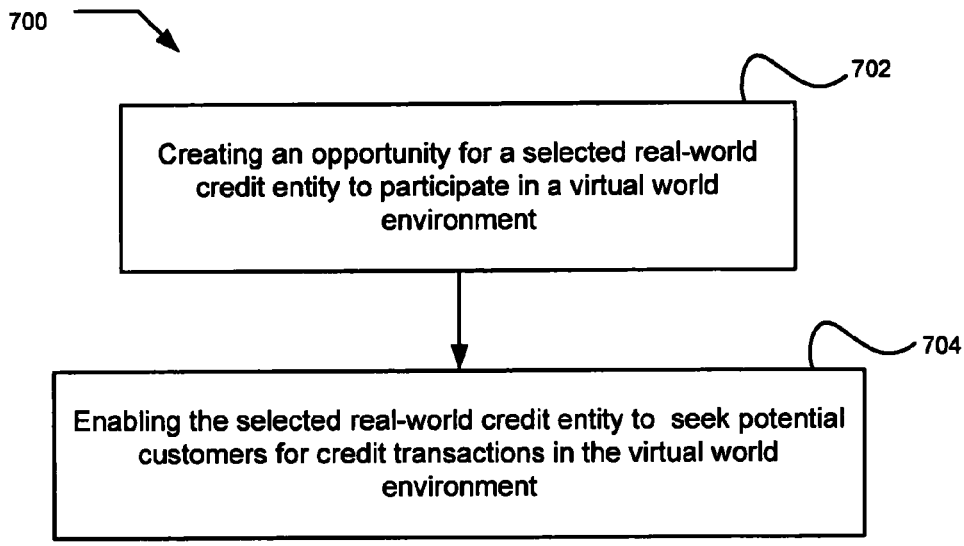
FIGS. 16 through 25 are flow charts illustrating different exemplary processes for implementing various embodiments of financial ventures involving virtual credit arrangements as disclosed herein.

Referring to the high level exemplary flow chart of FIG. 16, an exemplary process 700 creates an opportunity for a selected real-world credit entity to participate in a virtual world environment (block 702). A selected real-world credit entity is enabled to seek potential customers for credit transactions in the virtual world environment (block 704).

Figure 17:
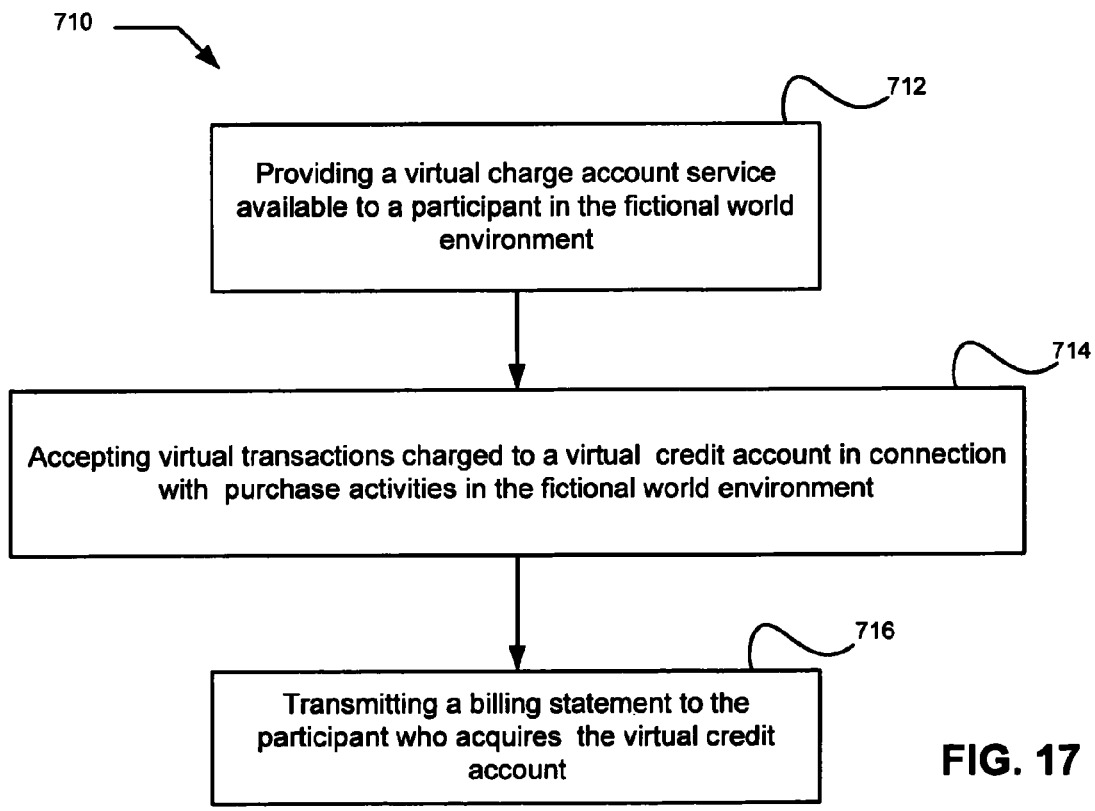

Another high level exemplary flow chart of FIG. 17 discloses a process 710 for providing a virtual charge account service available to a participant in the fictional world environment (block 712). In this implementation, the process accepts virtual transaction to be charged to a virtual credit account in connection with purchase activities in the fictional world environment (block 714). A billing statement is transmitted to the participant who acquired the virtual credit account (block 716).

Figure 18:
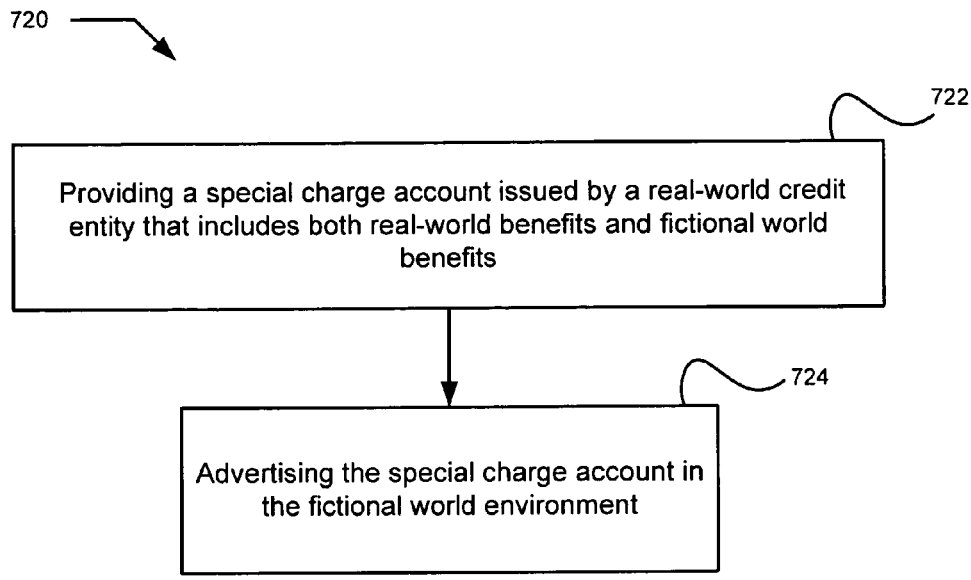

An additional process implementation 720 in the high level exemplary flow chart of FIG. 18 provides a special charge account issued by a selected credit entity that includes both real world benefits and fictional world benefits (block 722). The process further provides for advertising the special charge account in the fictional world environment (block 724).

Figure 19:
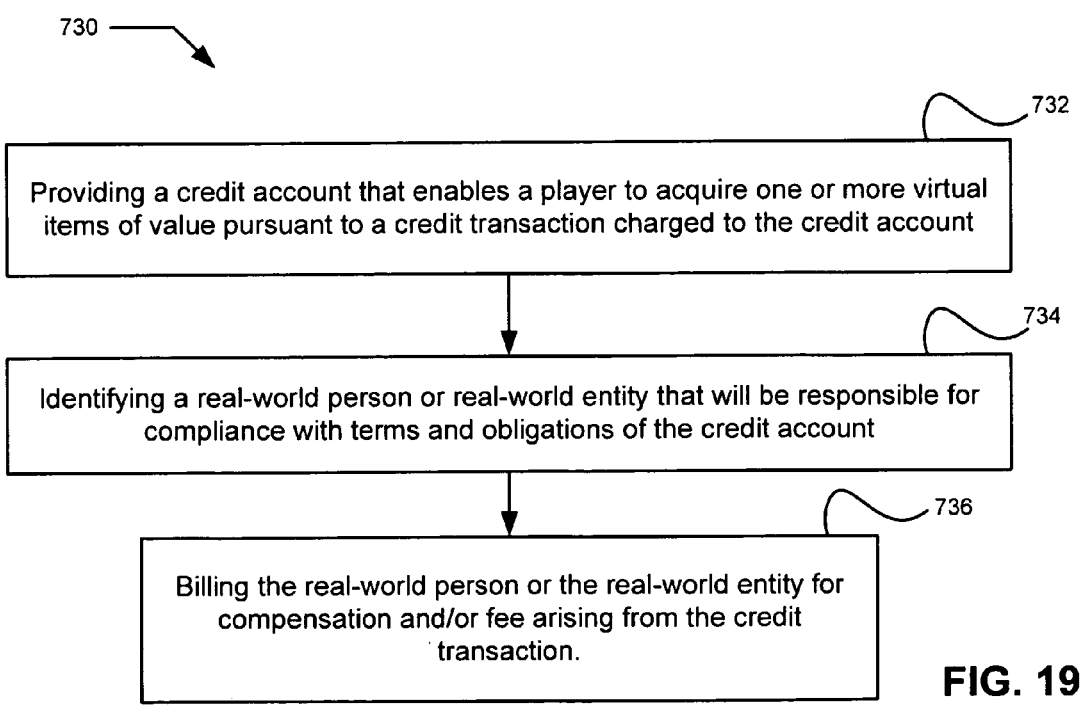

Yet another aspect of certain embodiments is disclosed in a high level exemplary process 730 of FIG. 19 that provides a credit account enabling a player to acquire one or more virtual items of value pursuant to a credit transaction charged to the credit account (block 732). A real-world person or real-world entity is identified that will be responsible for compliance with terms and obligations of the credit account (block 734). The process implements a billing to such responsible real-world person or real-world entity for compensation and/or fee arising from the credit transaction (block 736).

Figure 20:
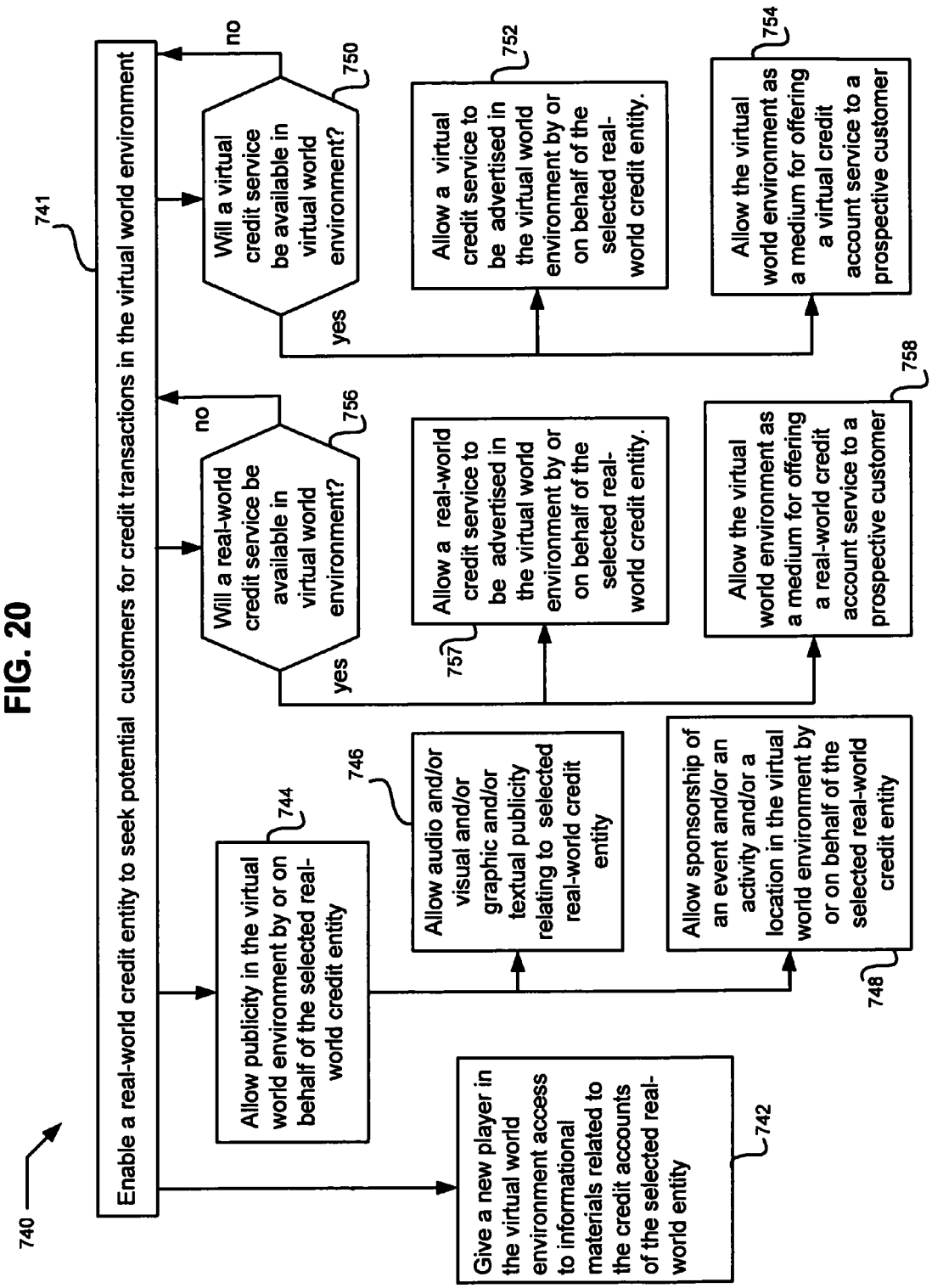

The exemplary flow chart of FIG. 20 illustrates a more detailed process 740 that enables a real-world credit entity to seek potential customers for credit transactions in the virtual world environment (block 741). One exemplary feature provides for giving a new player in the virtual world environment access to informational materials related to the credit accounts of the selected real-world entity (block 742).

Publicity is allowed in the virtual world environment by or on behalf of the selected real-world entity (block 744). Such publicity may include allowing audio and/or visual and/or graphic and/or textual publicity relating to the selected real-world entity (block 746). Other exemplary publicity may include allowing sponsorship of an event and/or an activity and/or a location in the virtual world environment by or on behalf of the selected real-world credit entity (block 748).

At some point in time a decision is made whether or not a virtual credit service will be made available in the virtual world environment (decision block 750). If not, then additional efforts seeking potential customers (block 741) may take place. If so, then the virtual credit service may be allowed to be advertised in the virtual world environment by or on behalf of the selected real-world credit entity (block 752). Also the virtual world environment may serve as a medium for actually offering the virtual credit account service to a prospective customer (block 754).

A decision is also made whether or not a real-world credit service will be made available in the virtual world environment (decision block 756). If not, then additional efforts seeking potential customers (block 741) may take place. If so, then the real-world credit service may be allowed to be advertised in the virtual world environment by or on behalf of the selected real-world credit entity (block 757). Also the virtual world environment may serve as a medium for actually offering the real-world credit account service to a prospective customer (block 758).

Figure 21:
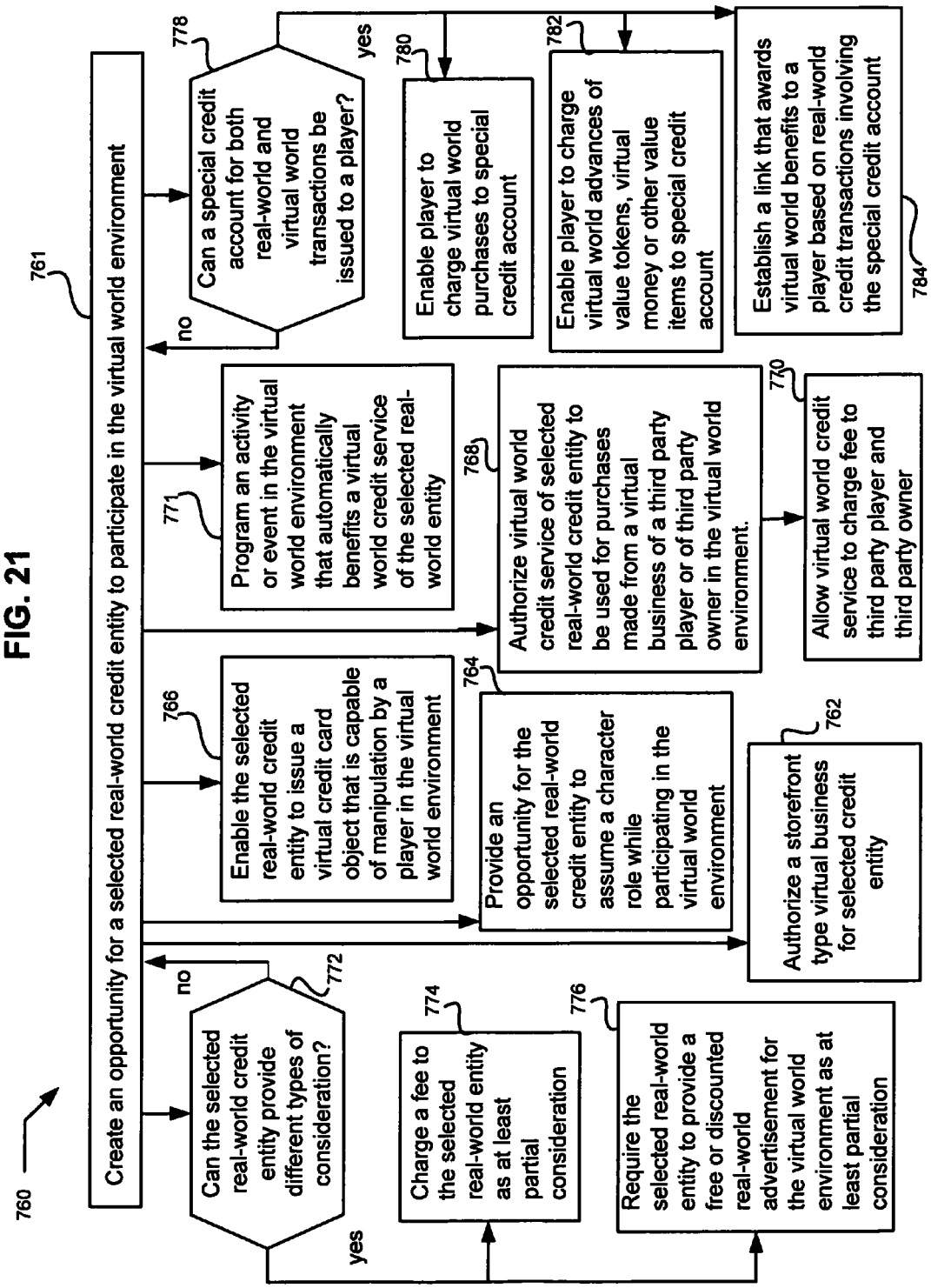

The exemplary flow chart of FIG. 21 illustrates a more detailed process 760 that creates an opportunity for a selected real-world credit entity to participate in the virtual world environment (block 761). Such an opportunity may include providing authorization for the selected credit entity to have a storefront type virtual business (block 762). Other possible opportunities for participation include the selected real-world credit entity assuming a character role while participating in the virtual world environment (block 764). Also the selected real-world credit entity may be enabled to issue a virtual credit card object that is capable of manipulation by a player in the virtual world environment (block 766).

Other types of participation may include authorizing a virtual world credit service of the selected real-world credit entity to be involved with purchases made from a virtual business of a third party player or third party owner in the virtual world environment (block 768). In some instances the virtual world credit service is allowed to charge a fee to the third party player and to the third party owner (block 770). A further type of participation may include programming an activity or event in the virtual world environment that automatically benefits a virtual world credit service of the selected real-world entity (block 771).

The participation of the selected real-world credit entity in the virtual world environment will probably require a decision about the different types of consideration to be provided by the selected real-world credit entity (decision block 772). If consideration is not considered to be necessary, then other types of participation can nevertheless proceed. When some consideration is deemed appropriate, it may be at least partially provided by charging a fee to the selected real-world credit entity (block 774). At least partial consideration may also be provided by requiring the selected real-world entity to provide a free or discounted real-world advertisement for the virtual world environment (block 776).

A choice may also involve whether a special credit account for both real-world transactions and virtual world transactions can be issued to a player (decision block 778). If the decision is negative or to be delayed, the other types of participation can still proceed. If the decision is affirmative, then various interactions involving are possible with the special credit account including but not limited to: enabling a player to charge virtual world purchases to the special credit account (block 780); and enabling a player to charge virtual world benefits received in advance such as value tokens, virtual money, or other value items to the special credit account (block 782); and establishing a link that awards virtual world benefits to a player based on real-world credit transactions involving the special credit account (block 784).

Figure 22:
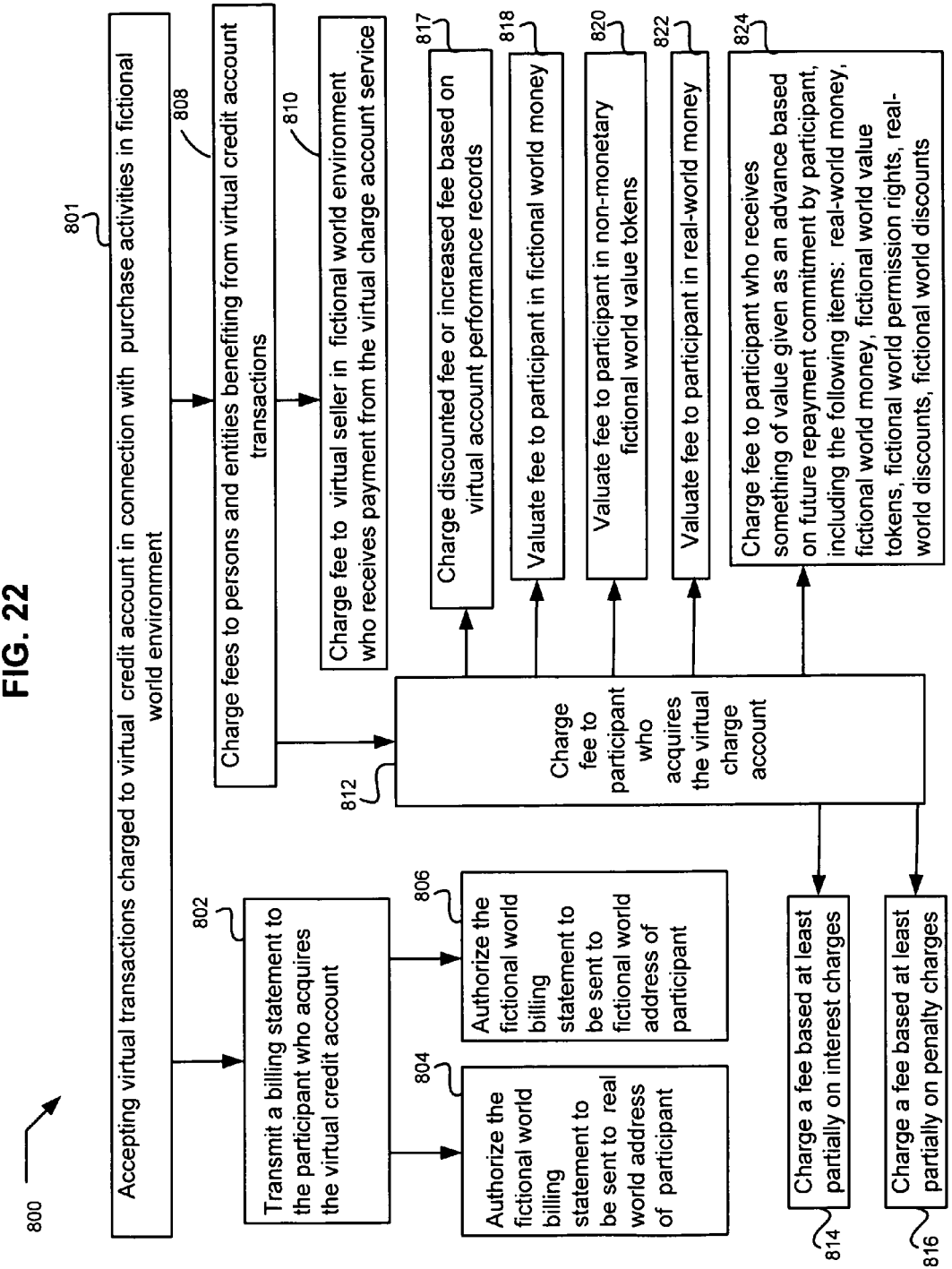

The exemplary flow chart of FIG. 22 discloses an implementation of the presently disclosed method 800 for accepting virtual transactions charged to a virtual credit account in connection with purchase activities in a fictional world environment (block 801). When such charges occur, a billing statement is transmitted to the participant who acquires the virtual credit account (block 802). Such fictional world billing statement may be authorized to be sent to a real world address of the participant account holder (block 804) or to a fictional world address of the participant account holder (block 806).

Revenue may be provided by charging fees to persons and entities benefiting from the virtual credit account transactions (block 808). Such fees may include but not be limited to the following: a fee charged to a virtual seller in the fictional world environment who receives payment from the virtual charge account services (block 810); and different types of fees charged to a participant who acquires the virtual credit account (block 812) as part of the virtual charge account service (block 812).

Examples shown for fees charged to a participant account holder may include a discounted fee or alternatively an increased fee based on the performance records for the virtual credit account (block 817). The various fees charged to a participant who owns or is responsible for the virtual credit account may be valuated in fictional world money (block 818), non-monetary fictional world value tokens (block 820), and real world money (block 822).

Another category of transactions involving the virtual credit account that may generate fees from a virtual world participant relates to advance benefits (i.e., something of value) given to the participant based on a future repayment commitment. Examples of such advance benefits funded by the virtual credit account include real-world money, fictional world money, fictional world value tokens, fictional world permission rights, real-world discounts, and fictional world discounts (block 824).

Figure 23:
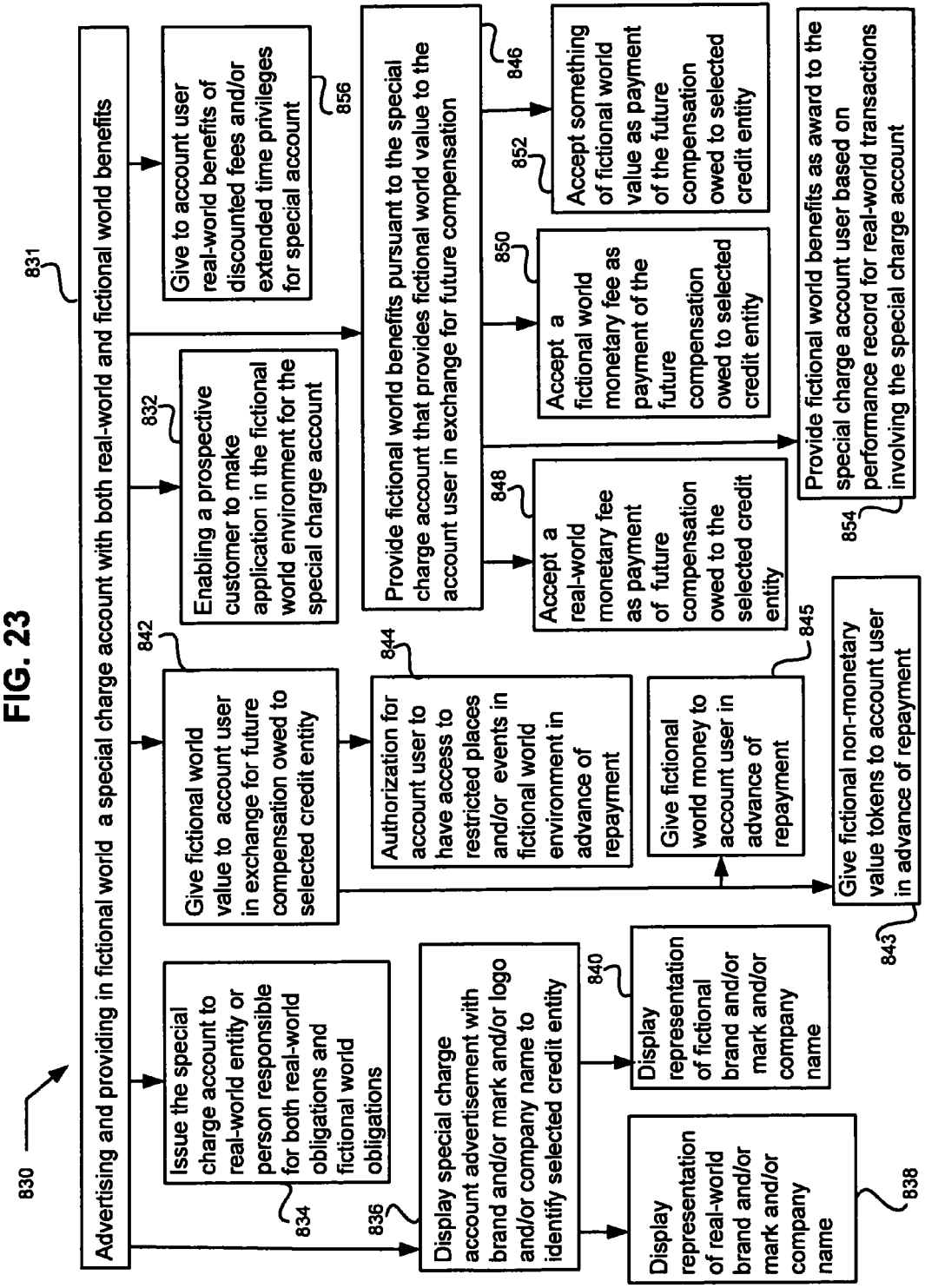

A further more detailed aspect of the method disclosed herein is shown in the process 830 of the exemplary flow chart of FIG. 23. This illustrated implementation enables a prospective customer to make application in the fictional world environment for the special charge account (block 832).

The implementation of FIG. 23 includes advertising and providing in a fictional world environment a special charge account having both real-world and fictional world benefits (block 831). Such advertising may be implemented in special charge account displays of a brand and/or mark and/or logo and/or company name identifying the real-world credit entity (block 836). Such displays may feature a real-world (block 838) as well as a fictional world (block 840) brand, mark, logo, and company name of the real-world credit entity.

Other types of special charge account activity may involve giving something of fictional world value to an account user in exchange for future compensation owed to the real-world credit entity (block 842). Such fictional world value items may include giving authorization for the account user to have access to restricted places and/or restricted events in the fictional world environment in advance of repayment (block 844). Other exemplary advance credits available with the special charge account may include giving an account user fictional non-monetary value tokens in advance of repayment (block 843). The special charge account may also give fictional world money to an account user in advance of repayment (block 845).

Some embodiments of the disclosed method provide other types of advance fictional world benefits pursuant to the special charge account services providing fictional world value to the account user in exchange for future compensation (block 846). These advance benefits may include, for example, accepting different types of future compensation for debts owed by a virtual credit account user including the accepting payment of real-world monetary fees (block 848), fictional world monetary fees (block 850), and something of fictional world value (block 852).

Fictional world award benefits may also be provided to the virtual credit account user based on the performance record for real-world transactions involving the special charge account (block 854). It is to be understood that in some embodiments such real world transactions can be directly or indirectly charged to the special charge account. Other real-world benefits may be given to special account users in the form of discounted access fees and/or extended time privileges in the fictional world environment.

Figure 24:
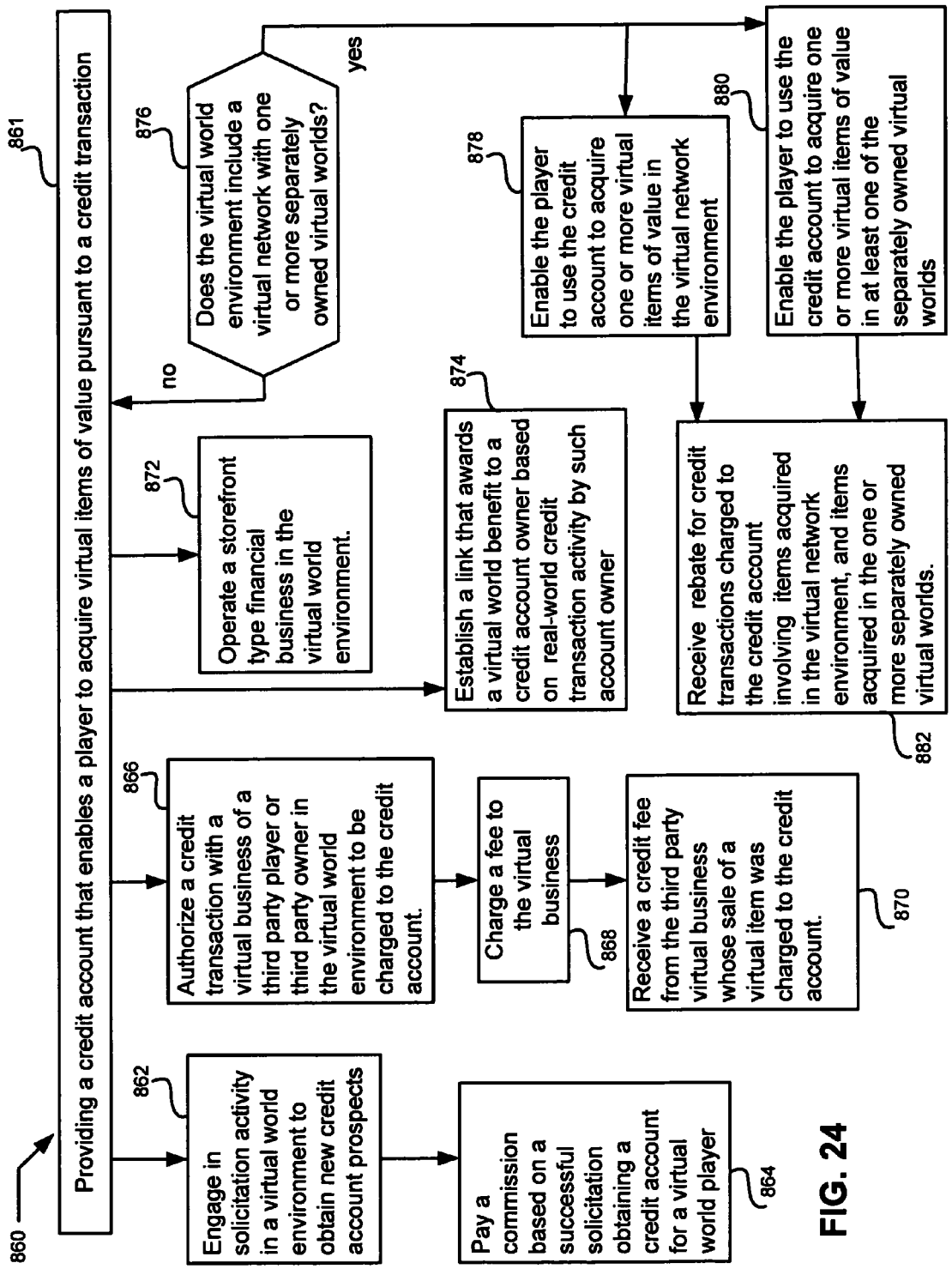

Another aspect of the presently disclosed method is illustrated in a process 860 shown in exemplary flow chart of FIG. 24 relating to providing a credit account that enables a player to acquire virtual items of value pursuant to a credit transaction (block 861). Initial activities may include engaging in solicitation activity in a virtual world environment to obtain new credit account prospects (block 862). A commission may be paid based on a successful solicitation that results in obtaining a credit account for a virtual world player (block 864).

The credit account services may include authorization of a credit transaction with a virtual business of a third party player or third party owner in the virtual world environment to be charged to the credit account (block 866). Such a credit transaction may include charging a fee to the virtual business (block 868), which may be received from the third party virtual business whose sale of a virtual item was charged to the credit account (block 870).

Other credit account activities may include operating a storefront type financial credit business in the virtual world environment (block 872). A link may be established that awards a virtual world benefit to a credit account owner based on real-world credit transaction activity by such account owner (block 874).

Some virtual world environments may be more complex, and an inquiry may determine whether the virtual world environment includes a virtual network with one or more separately owned virtual worlds (decision block 876). If not, then other activities may still be provided. If so, then it may be desirable to enable a player to use the credit account to acquire one or more virtual items of value in the virtual network environment (block 878). As a further possibility, it may be desirable to enable a player to use the credit account to acquire one or more items of value in at least one or perhaps more of the separately owned virtual worlds (block 880).

Other business relationships may be possible such as receiving a rebate for credit transactions charged to the credit account involving items acquired in the virtual network environment, as well as items acquired in the one or more separately owned virtual worlds (block 882).

Figure 25:
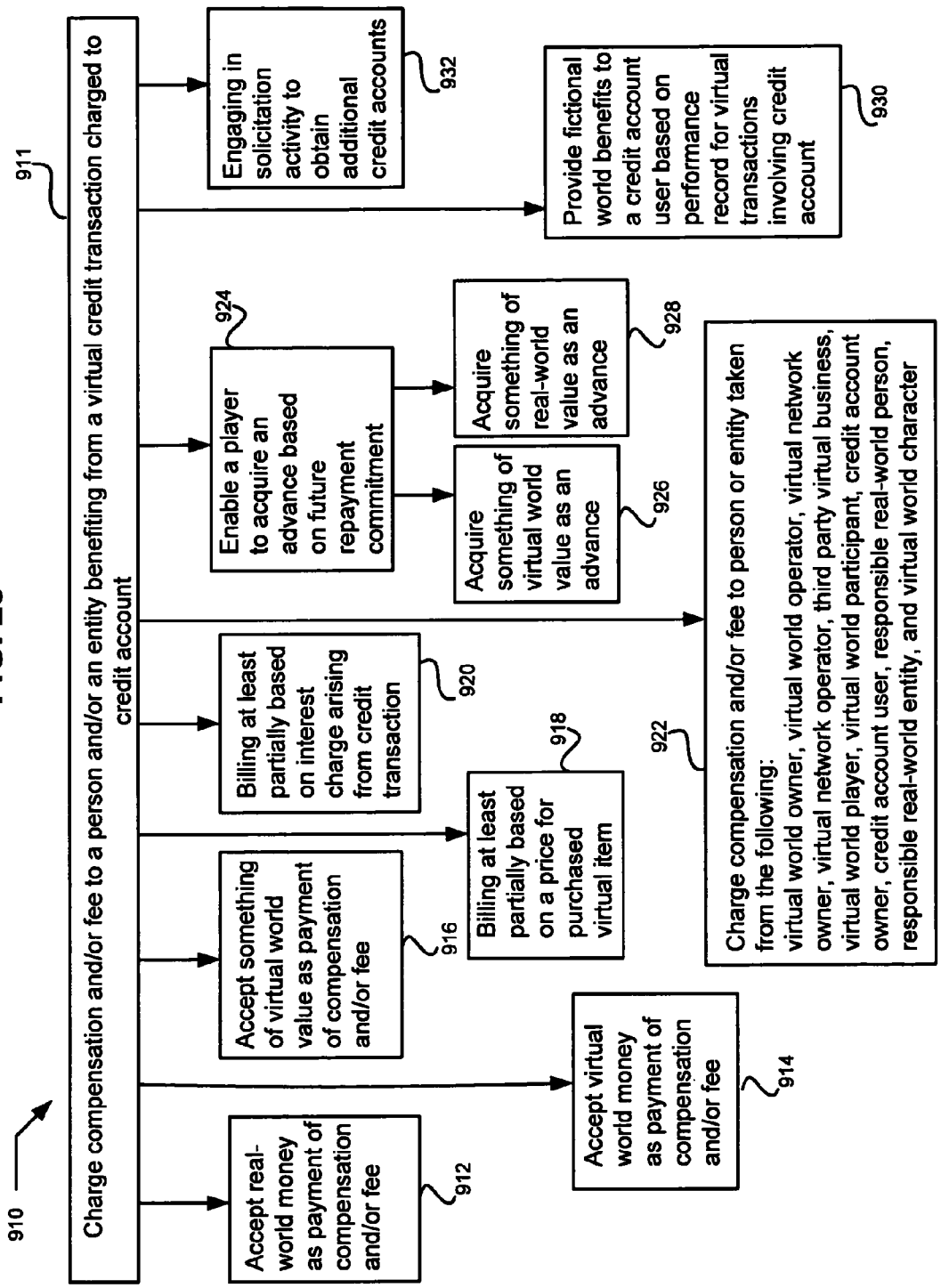

The exemplary flow chart of FIG. 25 disclosed another implementation of a method and process 910, including charging compensation and/or fee to a person and/or an entity benefiting from a virtual credit transaction charged to a credit account (block 911). Payment of the compensation and/or fee may be accepted in different forms, including but not limited to real-world money (block 912), virtual world money (block 914), and something of virtual world value (block 916). A billing such as by electronic or hardcopy statement may be at least partially based on a price for a purchased virtual item (block 918), and may also be at least partially based on an interest charge arising from the credit transaction (block 920).

It will be understood that although significant compensation and/or fees may be billed to a credit account owner or user, compensation and/or fees may be charged to one or more of the following persons or entities: virtual world owner, virtual world operator, virtual network owner, virtual network operator, third party virtual business, virtual world player, virtual world participant, credit account owner, credit account user, responsible real-world person, responsible real-world entity, and virtual world character (block 922).

Various types of credit transactions are contemplated, including enabling a player (or other interested party) to acquire an advance based on a future repayment commitment. The advance may include something or multiple things of virtual world value (block 926) as well as something or multiple things of real-world value (block 928), including combinations thereof. Of course some items that are advanced pursuant to terms of the credit account may have valuations measured or recognized in both virtual world and real-world environments.

Fictional world benefits may be provided to a credit account user based on a performance record for virtual transactions involving the credit account. It will be apparent from the present explanations that interested parties may continue to engage in solicitation activity in the virtual world environment in order to obtain additional credit accounts.

It will be understood by those skilled in the art that the various components and elements disclosed in the block diagrams herein as well as the various steps and sub-steps disclosed in the flow charts herein may be incorporated together in different claimed combinations in order to enhance possible benefits and advantages.

It will be further understood that that designations "real-world entity", "real-world third party", "real-world person", real-world enterprise", "customer", "clientele", "patron", "party", "participant", "user", "recipient", "donor", "agent", trustee, "claimant", "owner", "operator", "transferee", "third party", and the like as used herein are intended to include individuals, families, groups of people, clubs, organizations, partnerships, corporations, companies, etc. that are typically recognized as being identifiable in the real-world.

The exemplary system, apparatus, and computer program product embodiments shown in FIGS. 6-15E along with other components, devices, know-how, skill and techniques that are known in the art have the capability of implementing and practicing the methods and processes shown in FIGS. 1-5 and FIGS. 16-25. It is to be understood that the methods and processes can be incorporated in one or more different types of computer program products with a carrier medium having program instructions encoded thereon. However it is to be further understood by those skilled in the art that other systems, apparatus and technology may be used to implement and practice such methods and processes.

Those skilled in the art will also recognize that the various aspects of the embodiments for methods, processes, apparatus and systems as described herein can be implemented, individually and/or collectively, by a wide range of hardware, software, firmware, or any combination thereof.

One aspect of the present system and method enables a credit entity to participate in a virtual world environment with publicity and advertising in order to seek potential customers for credit transactions in the virtual world environment. In some implementations disclosed herein, a process for creating credit transactions in a fictional world environment includes making a virtual charge account service available to a participant in the fictional world environment. Virtual transactions are accepted and charged to a virtual credit account in connection with purchase activities in the fictional world environment, and a billing statement may be provided to the participant who acquires the virtual credit account.

Methods of operating a credit account business in a fictional world environment as disclosed herein may take different forms. For example, in some embodiments a special charge account may issued by a real-world credit entity that includes both real-world benefits and fictional world benefits, and advertisements for the special charge account are provided in the fictional world environment.

There are other exemplary methods and processes disclosed herein for operating a credit business in a virtual world environment. In some instances a credit account is provided that enables a player to acquire one or more virtual items of value pursuant to a credit transaction charged to the credit account. A real-world person or real-world entity may be identified that will be responsible for compliance with terms and obligations of the credit account, and be responsible for receiving a billing for compensation and/or fees arising from the credit transaction. Depending on the circumstances, a billing statement may be authorized to be sent to a real world address and/or a fictional world address of a credit account owner. One aspect provides a virtual charge account service available for use in a fictional world environment, wherein a billing statement charges various fees to a participant who acquires the virtual charge account. Such virtual charge account fees may be valuated in fictional world money, real-world money, or non-monetary fictional world value tokens.

The virtual credit billing system may include a database record for recording the virtual world credit transaction activities, and an output device may be coupled to the database record for communicating obligations arising from the credit transaction activities to a person or entity responsible for virtual credit account obligations.

Figure 26:
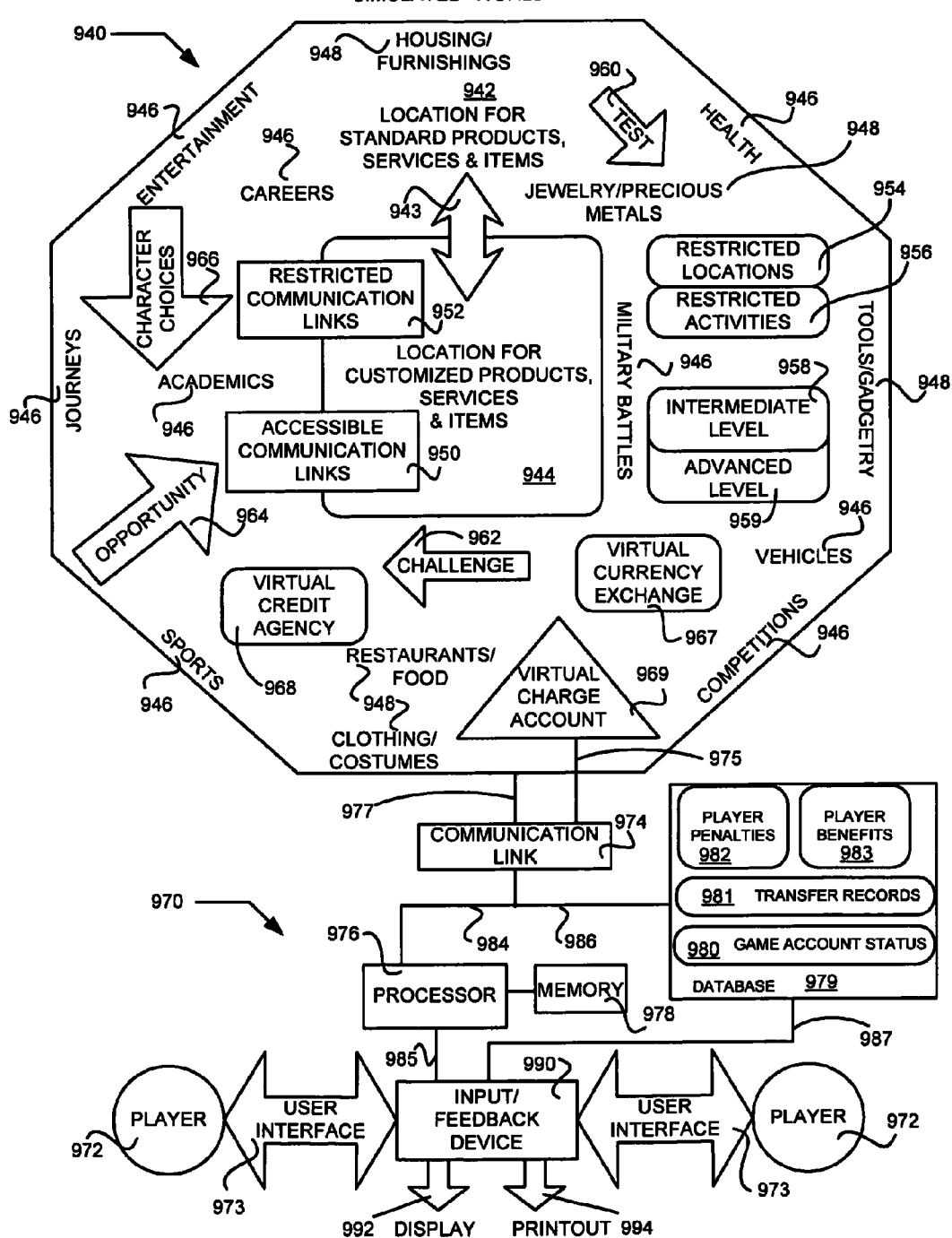
FIG. 26 is a schematic block diagram for an exemplary simulated world environment that includes an implementation of database records for player transactions.

An exemplary simulated world environment 940 is illustrated in the schematic block diagram of FIG. 26, and shows many features that may be available to one or more players 972 that participate in the simulated world environment 940. A location 942 may include standard products, services and/or items available to a player. A bi-directional access portal 943 may enable some players to visit another location 944 that includes customized products, services and/or items. Opportunities for a virtual credit transactions may be available in both locations 942, 944.

Typical exemplary activities, events and destinations may include various topics 946 such as sports, competitions, health, entertainment, journeys, vehicles, military battles, careers and academics. All of these topics are candidates for a possible virtual credit transaction. Additional combined topics 948 for activities, events and destinations involving virtual credit transactions may include clothing/costumes, restaurants/food, tools/gadgetry, jewelry/precious metals and housing/furnishings.

Further opportunities related to arranging, transferring, and/or resolving rights and obligations arising from a virtual credit transaction may be provided via accessible communication links 950, restricted communication links 952, restricted locations 954, and restricted activities 956. It will be understood by those skilled in the art that different levels of virtual credit activities may include an intermediate level 958 and an advanced level 959. A further description of such exemplary levels is provided herein with regard to FIGS. 28A and 28B.

In addition to more conventional virtual credit transactions involving products, services and potential value items, a virtual world may also include activities, events and destinations that involve other aspects of virtual credit based on participation with tests 960, challenges 962, opportunities 964, and character choices 966.

Many of the aspects related to arranging, transferring and/or resolving rights and obligations arising from a virtual credit arrangement or transaction will be facilitated by a virtual currency exchange 967, a virtual credit agency 968, and a virtual charge account 969. Of course other virtual and real world entities as well as individual players, groups of players, third parties, virtual world provides and game operators may also participate directly or indirectly in facilitating the use of virtual credit as a basis for acquiring something of possible value while logged on or otherwise participating in a virtual world environment or game.

An exemplary computerized access system 970 for the simulated world environment 940 is illustrated schematically in FIG. 26, and may include a communication link 974 operatively coupled to the virtual charge account via connection 975 and to the simulated world via connection 977. The communication link 974 is also operatively coupled via connection 984 to processor 976 and memory 978, as well as operatively coupled to database 979 via connection 986. Each player 972 may send and receive informational data and messages through user interface 973 and input/feedback device 990 via processor connection 985 and database connection 987. The input/feedback device 990 may also include a display function 992 and a printout function 994.

The database function may be implemented at various locations using many types of storage media, and may be accessed for updating and/or retrieval by many different components and signal transmissions techniques, all within the spirit and scope of the claims herein. The implementation and location shown and described are by way of example only, and may include game account status records 980, virtual credit transfer records 981, player penalty records 982 and player benefit records 983.

FIG. 27A is a schematic representation of the type of data that may be included in a player's exemplary game account status database records 980, including status date 1034, user ID 1035, virtual character ID 1036, game account number 1037, and performance rating 1038. An identification of a responsible real-world party 1030 as well as such player's real-world contact information 1032 may also be included.

Value categories 1000 for value symbols that may be involved in a virtual world credit transaction or arrangement include, by way of example, virtual currency 1002, discount coupons 1004, award points 1006, access tickets 1008, experience medals 1010, level permits 1012, bonus vouchers 1014, skill merits 1016, as well as other unlisted value symbols 1018. Exemplary data fields for each value symbol may include an owed payable amount 1020 and its related creditor(s) ID 1022, an expected receivable amount 1024 and its related debtor(s) ID 1026, and a listing of what is currently owned 1028. Other data fields may be included in addition to those disclosed herein, and in some instances some of the exemplary data fields may not be deemed desirable and therefore can be omitted.

FIG. 27B is a schematic representation of the type of data that may be included in an exemplary transfer status database record 981, including transaction date 907, original debtor 908, original creditor 909, due date 913, value(s) acquired 915 and original amount owed 917. Exemplary data fields may include transfer date 919, whether permission is required 921, IDs of both a new virtual debtor 923 and corresponding new responsible real-world debtor 925, IDs of both a new virtual creditor 927 and corresponding newly assigned real-world creditor 929, and a listing of the balance owed as of the transfer date 931. Other data fields may be included in addition to those disclosed herein, and in some instances some of the exemplary data fields may not be deemed desirable and therefore can be omitted.

Figure 27C:
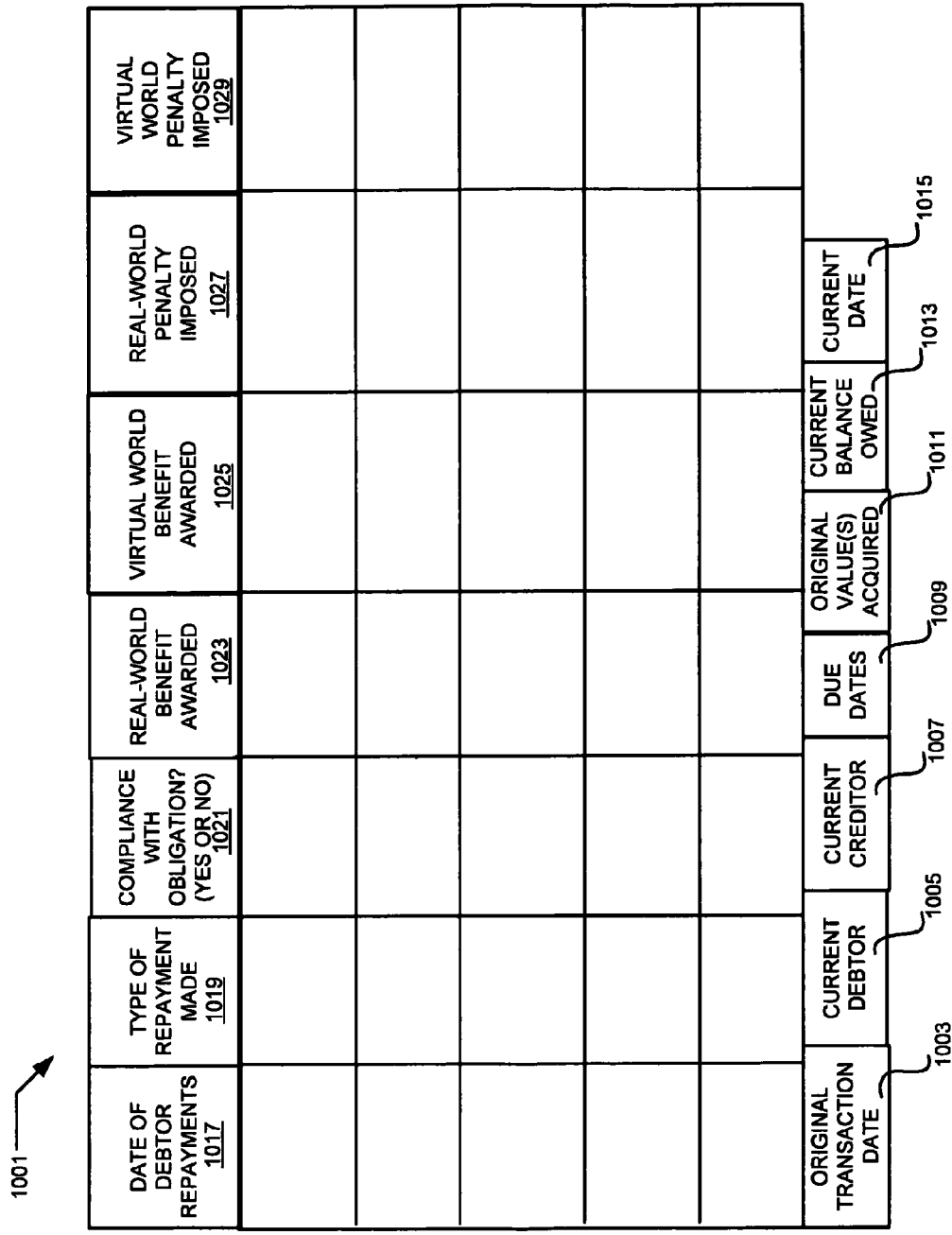
FIG. 27C illustrates exemplary database records for performance benefits and penalties associated with virtual credit transactions.

FIG. 27C is a schematic representation of the type of data that may be included in an exemplary database record 1001 that incorporates player penalties 982 and player benefits 983. Basic informational fields may include original transaction date 1003, current debtor 1005, current creditor 1007, due dates, 1009, original value(s) acquired 1011, current balance owed 1013 and current data 1015. Exemplary data fields may include date of debtor repayments 1017, type of repayment made 1019, whether there has been compliance with an obligation 1021, real-world benefit awarded 1023, virtual world benefit awarded 1025, real-world penalty imposed 1027, and virtual world penalty imposed 1029. Other data fields may be included in addition to those disclosed herein, and in some instances some of the exemplary data fields may not be deemed desirable and therefore can be omitted.

Figure 28A:
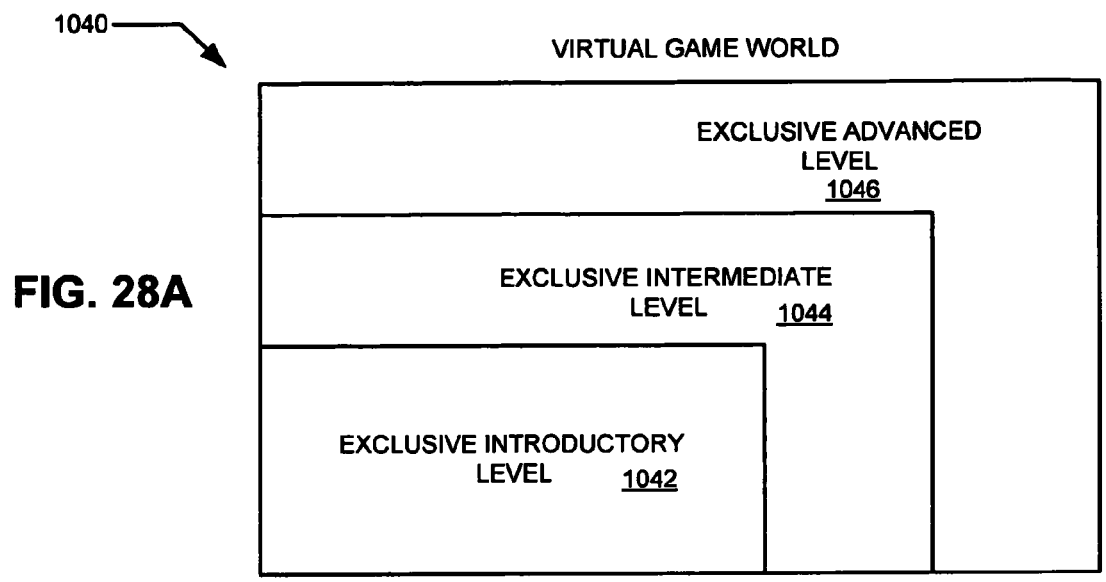
FIGS. 28A and 28B schematically illustrate different implementations of possible participation levels in an exemplary virtual game world.

In the schematic diagram of FIG. 28A, a virtual game world 1040 may include multiple participation levels based on selected admission criteria. In this exemplary implementation, an exclusive introductory level 1042 may be limited, for example, to less skilled virtual world participants. An exclusive intermediate level 1044 may be limited, for example, to more experienced virtual world participants. An exclusive advanced level 1046 may be limited, for example, to highly qualified virtual world participants. Other different level admission criteria may be selected in order to achieve different goals and perhaps different game objectives.

Figure 28B:
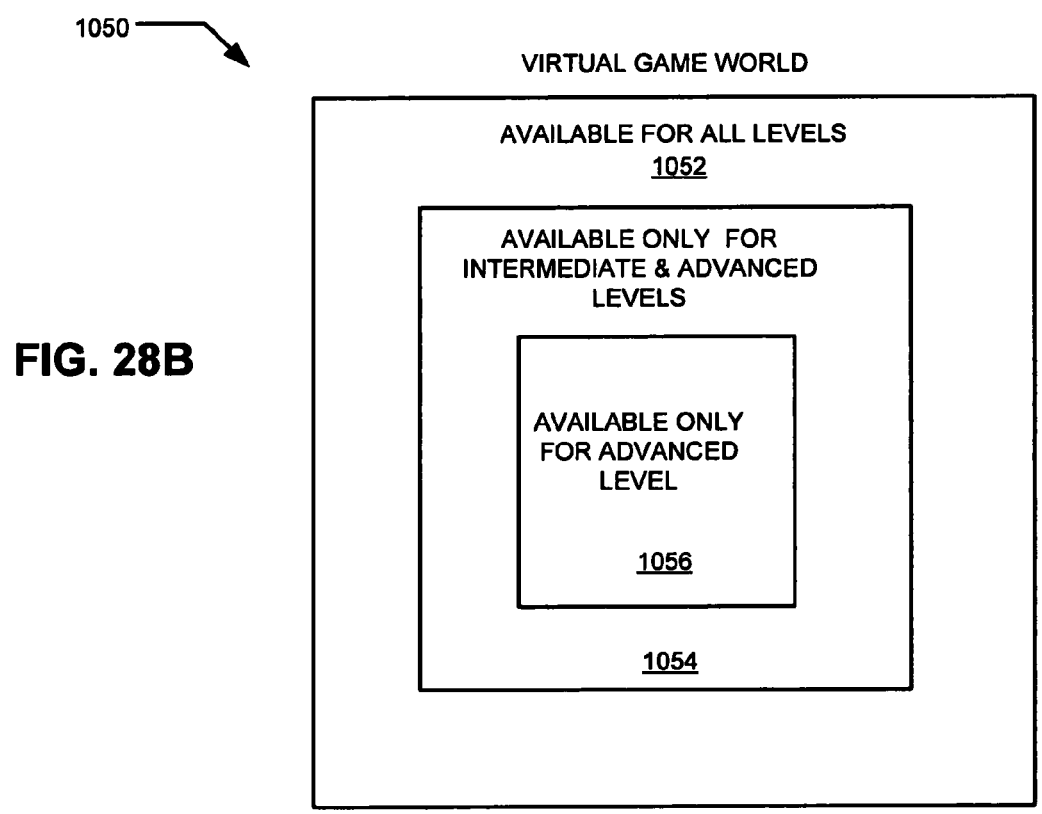

In the schematic diagram of FIG. 28B, a virtual game world 1050 may include multiple participation levels based on another scheme of selected admission criteria. In this exemplary implementation, one level 1052 may be available for all level participants. Another level 1054 may be available only for intermediate and advanced level participants. A further level 1056 may be available only for advanced level participants. This embodiment may, for example, allow more experienced or more qualified virtual world participants to continue to have access to lower level virtual world opportunities. Other different level admission criteria may be selected in order to achieve different goals and perhaps different game objectives.

Figure 29:
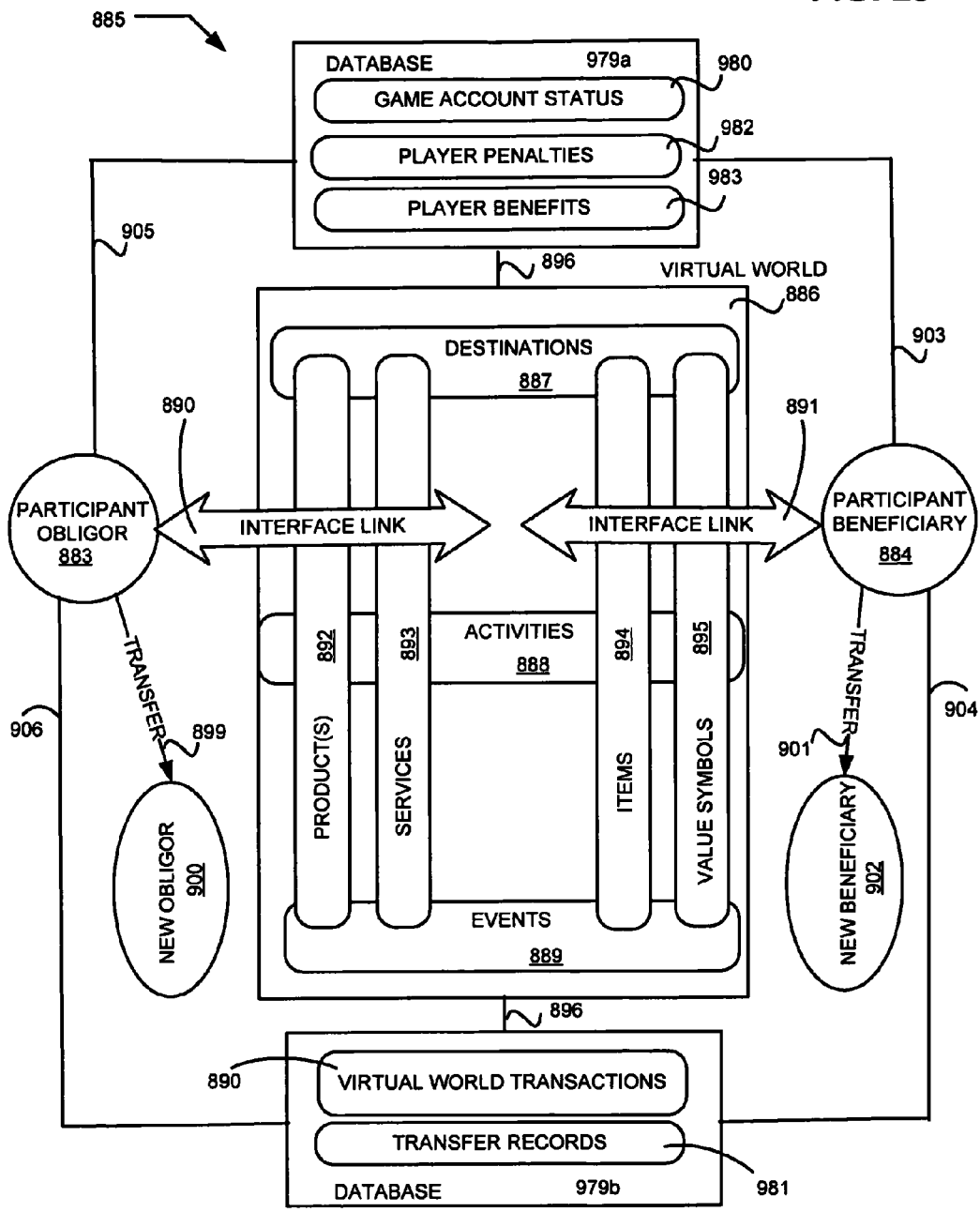
FIG. 29 is a schematic block diagram for an exemplary virtual world wherein a participant obligation and/or a participant right may be transferable to another party.

Another embodiment of an exemplary virtual transaction implementation 885 is shown in the schematic drawing of FIG. 29, including a virtual world environment 886 that includes various destinations 887, activities 888 and events 889 that can be selected by one or more players and participants. Interface links 890, 891 provide access to the virtual world environment 885, including access to product(s) 892, services and/or items of value that may be acquired pursuant to a virtual world transaction or arrangement. Such acquisition may be directly or indirectly involved with the destinations 887, activities 888 and events 889 or may be separately available to players and participants.

The embodiment of FIG. 29 schematically shows database records provided at two locations. A first database 979a includes game account status records 980, player penalty records 982 and player benefit records 983, and a second database 979b includes virtual world transaction records 890 and virtual world transfer records 981. Both database 979a and 979b are operatively coupled via connections 896 to the virtual world environment 886.

A transfer arrow 899 indicates that a player who is a participant obligor 883 has acquired something of value in a virtual world exchange transaction, and may be able to transfer their future obligation to a new obligor 900. Also a transfer arrow 901 indicates that a player who is a participant beneficiary expecting to receive something of value in a virtual world exchange transaction (e.g., credit transaction) may be able to transfer their beneficiary right to a new beneficiary 902. Such transfers may involve an updating of transfer records 981 in database 979b via connections 906 and 904, respectively. Also, such transfers may involve updating of game account status records 980 as well as player penalty and benefit records 982, 983 via connections 905 and 903, respectively. In some embodiments, a new obligor 900 or a new beneficiary 902 may also be a player in the virtual world environment 886. In some embodiments an obligation or right arising from a virtual world transaction may be transferable to a non-player party.

Figure 30:
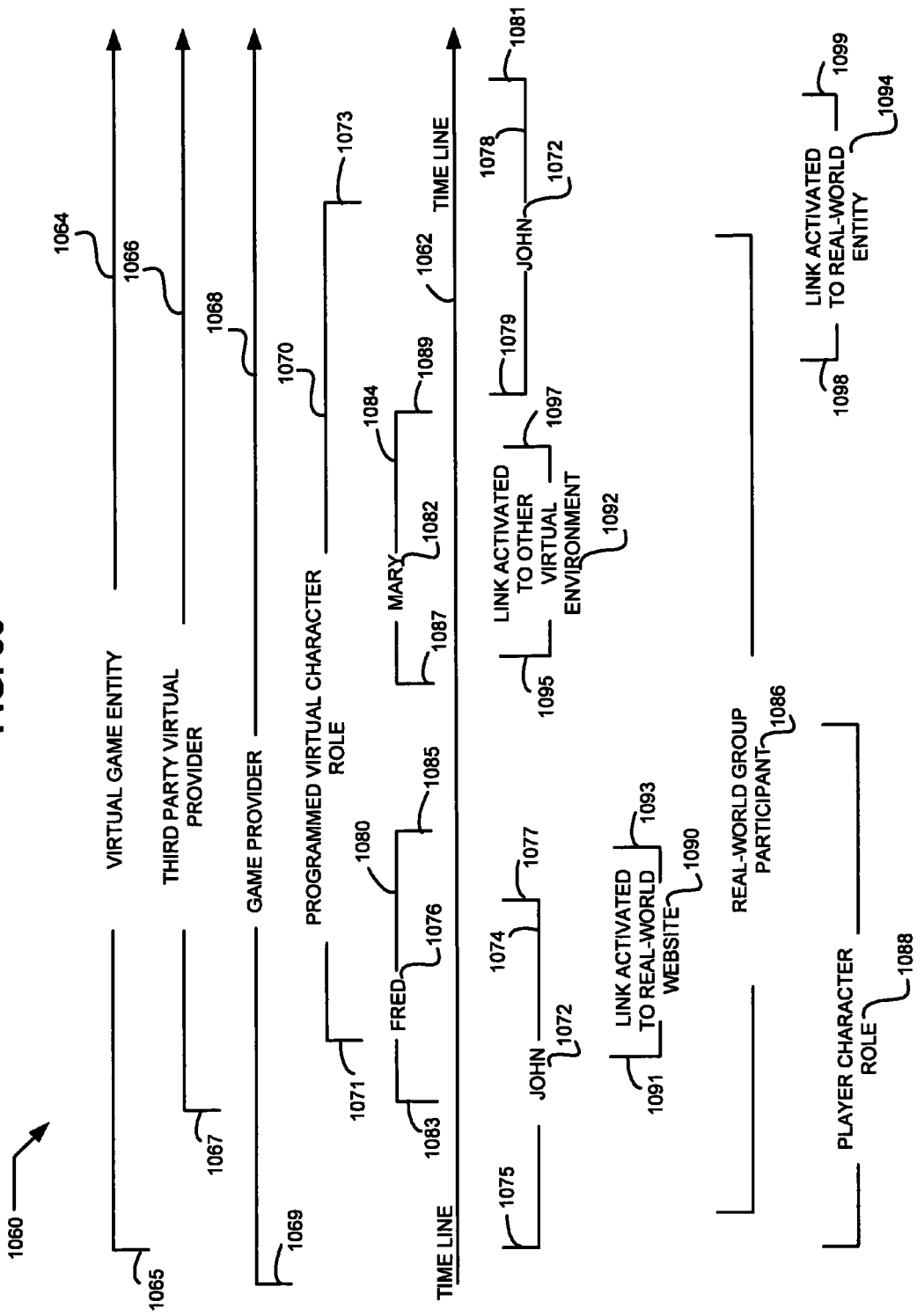
FIG. 30 is a schematic timing diagram illustrating possible opportunities for player interaction in a virtual world environment with other players and/or entities and/or links.

The schematic timing diagram 1060 of FIG. 30 illustrates exemplary types of virtual world opportunities that are possible in a virtual world environment among players and parties. A time line 1062 provides a reference for real time and delayed time accessibility for different virtual world and real-world entities, including a virtual game entity with an active time period 1064 commencing at 1065, a third party virtual provider with an active time period 1066 commencing at 1067, a game provider with an active time period 1068 commencing at a starting game time 1069, and a programmed virtual character role with an active time period 1070 commencing at time 1071 and terminating at time 1073. Because of the benefits of computerized technology, real time and delayed time interaction between entities are possible for purposes of practicing the methods and implementing the systems for virtual world opportunities as disclosed herein.

For example, as shown in FIG. 30, a player John 1072 having an actual logon time period 1074 commencing at time 1075 and terminating at time 1077 has the capability of having real time interaction during logon time period 1074 with player Fred 1076. It is noted that Fred's actual logon time period 1080 commencing at time 1083 and terminating at time 1085 partially overlaps with John's logon time period 1074, and similarly with active time 1066 of the third party virtual provider, as well as with an active time period of a real-world group participant 1086. It is further noted that John's logon time period 1074 completely overlaps with active period 1064 of the virtual game entity, and with the active period 1068 of the game provider, and further with an active period of a player character role 1088. This enables real time interaction between entities, including repeated dialogue communications if deemed appropriate, while virtual world transactions are being negotiated, arranged, implemented, transferred, resolved, and/or canceled. Of course, it is understood that time delays between real time interactive messages may also occur intentionally, or because of system limitations.

Even though John 1072 is logged off between his termination time 1077 and his re-commencement time 1079, other entities that are active or logged on during the interim period may respond to any of John's requests, actions or questions that have been appropriately stored in memory, or may pursue their own dialogue with respect to new, pending or existing virtual world arrangements. Such other entities may include Mary 1083 whose logon period 1084 commences at time 1087 and terminates at time 1089. Similarly, John can resume his virtual world transaction participation during his new logon time period 1078 until termination at time 1081. This new period may include responses to requests, action or question previously made by Mary 1084 whose logon period does not overlap either of John's logon time periods 1074, 1078.

Further real time interaction may be initiated or received by players or other entities in the virtual world environment through links in the virtual world environment as shown by a real-world website link 1090 activated to commence at time 1091 and terminate at time 1093, a virtual environment link 1092 activated to commence at time 1095 and terminate at time 1097, and a real-world entity link 1094 activated to commence at time 1098 and terminate at time 1099. It is therefore to be understood that both unidirectional and bi-directional links across a boundary between a virtual world environment and a real-world location or real-world entity may be used to effectuate, implement, resolve or perpetuate a virtual world transaction or arrangement.

As indicated in FIGS. 26 and 30, participation in a simulated or virtual world environment may include activities, events and transactions that are wholly within the simulated or virtual world environment as well as activities, events and transactions that are initiated or partly pursued in the simulated or virtual world environment. A virtual world player or participant taking a class, for example, could mean a virtual character taking a class in the virtual world to increase his virtual world skill level, as well as a player using his virtual character to interact with a real-world course (for example, to take an online class), or some combination of these.

This hybrid type of participation is illustrated in FIG. 26 where the accessible communication links 950 and the restricted communication links 952 might be links to either virtual world sites as well as real-world sites. Similarly in FIG. 30, the activated link to another virtual environment 1092 as well as activated link to a real-world web site 1090 and activated link to a real-world entity 1094 are available to players Fred 1076, Mary 1084 and John 1072.

The high level flow chart of FIG. 31 shows an exemplary process embodiment 1100 that provides an imaginary environment where a player is enabled to choose a different destination and/or activity and or event (block 1102). An opportunity is created in the imaginary environment for the player to participate in a credit transaction based on an obligation of future conduct, wherein the credit transaction involves a transferable creditor right and/or a transferable debtor obligation (block 1104). The exemplary process includes making a record of the credit transaction (block 1106). An implementation of the process of FIG. 31 may be incorporated in computer program embodiments as further disclosed herein.

The high level flow chart of FIG. 32 shows a further exemplary process embodiment 1101 that provides a virtual world environment wherein a player can acquire something of potential value pursuant to a credit transaction with another party (block 1103). The exemplary process enables a transfer of a right and/or obligation arising from the credit transaction (block 1105), and includes making a record of such a transfer (block 1107). The process of FIG. 32 may be incorporated in computer program product embodiments as further disclosed herein.

The high level flow chart of FIG. 33 shows an additional exemplary process embodiment 1110 that provides a virtual world environment with a capability for a player to acquire something of virtual value pursuant to a simulated credit transaction based on credit terms that include a future obligation (block 1112). A record is made of the credit transaction (block 1114), and a consequence is imposed on the player based on a performance record related to compliance with the player's obligation arising from the simulated credit transaction (block 1116). This process may be implemented in computer program product embodiments as further disclosed herein.

The high level flow chart of FIG. 34 shows another exemplary process embodiment 1111 that provides a virtual world environment accessible by one or more players (block 1113) that are enabled to choose a different destination and/or activity and/or event in the virtual world environment (block 1115). An opportunity is created for the player(s) to participate in a credit transaction with another player and/or a non player entity (block 1117). A record made of the credit transaction may include a performance record of compliance or non-compliance with terms of the credit transaction (block 1119). The process of FIG. 33 may be implemented in a computer program embodiment as further disclosed herein.

Figure 35:
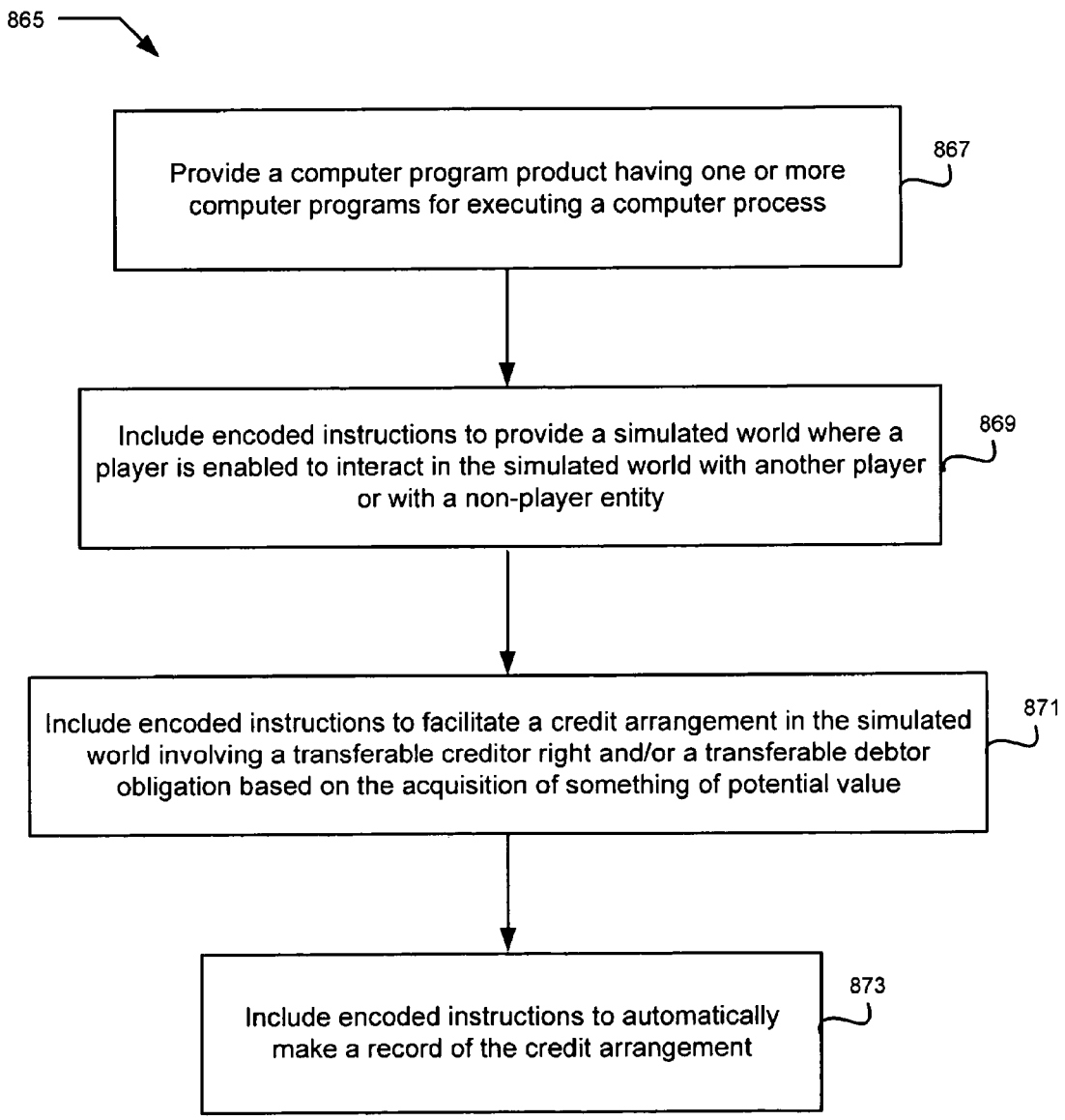
FIGS. 35-36 are high level flow charts showing exemplary processes incorporated in a computer program product.

Referring to the flow chart of FIG. 35, an embodiment 865 of a computer program product includes one or more computer programs for executing an exemplary computer process (block 867). Encoded instructions provide a simulated world where a player is enabled to interact in the simulated world with another player or with a non-player entity (block 869). Encoded instructions also facilitate a credit arrangement in the simulated world involving a transferable creditor right and/or a transferable debtor obligation based on the acquisition of something of potential value (block 871). Encoded instructions automatically cause a record to be made of the credit arrangement (block 873).

Figure 36:
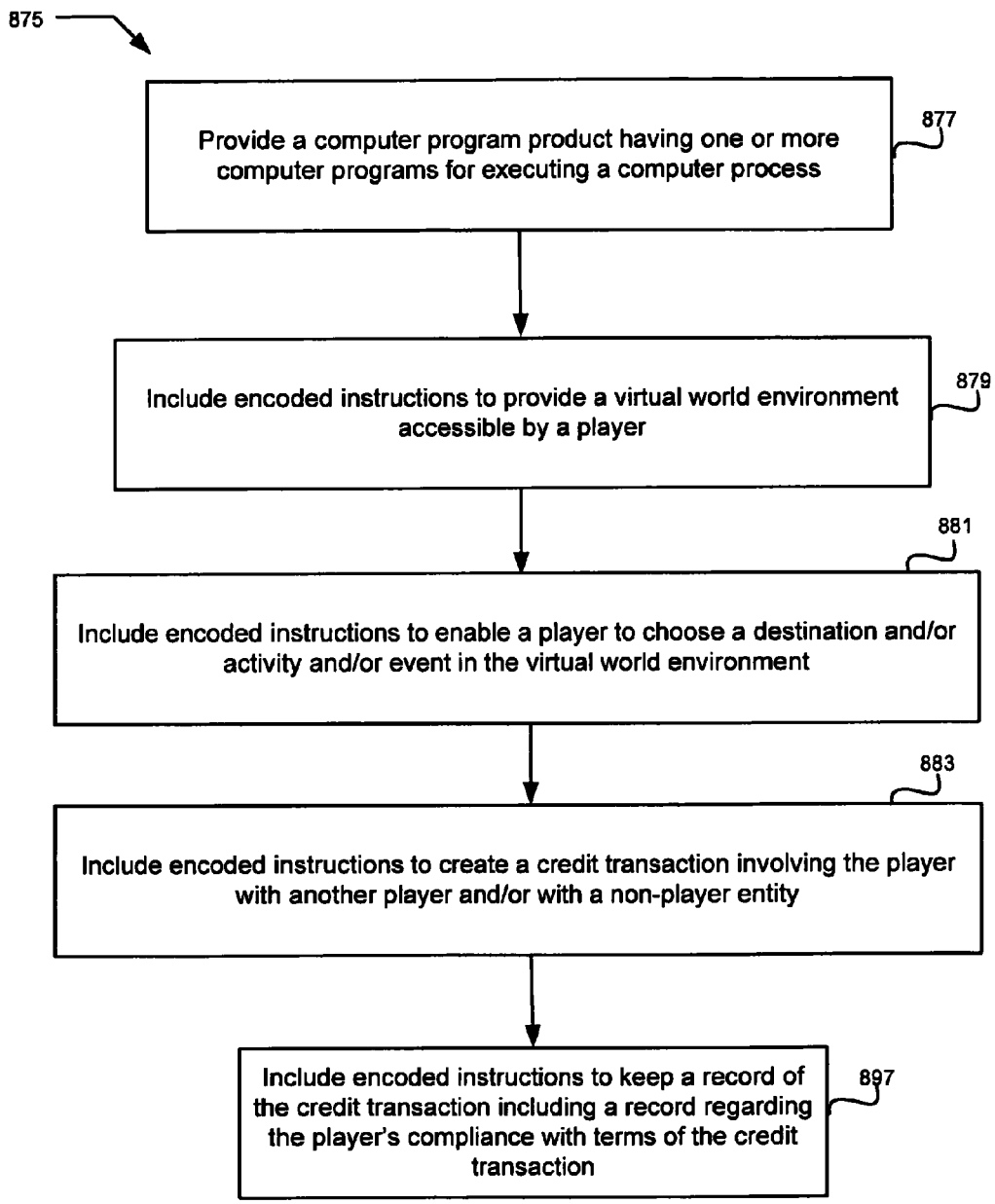

Referring to the flow chart of FIG. 36, another embodiment 875 of a computer program product includes one or more computer programs for executing an exemplary computer process (block 877). Encoded instructions provide a virtual world environment accessible by a player (block 879). Encoded instructions also enable a player to choose a destination and/or activity and/or event in the virtual world environment (block 881). Encoded instructions create a credit transaction involving the player with another player and/or with anon-player entity (block 883). Encoded instructions further cause a record to be kept of the credit transaction including a record regarding the player's compliance with terms of the credit transaction.

It will be understood by those skilled in the art that computer program embodiments disclosed herein may be encoded in various carrier media including but not limited to wave signals (e.g., optical, electrical, electro magnetic), memory systems (e.g., cartridge, tape, disk), as well as other communication and storage media.

Figure 37:
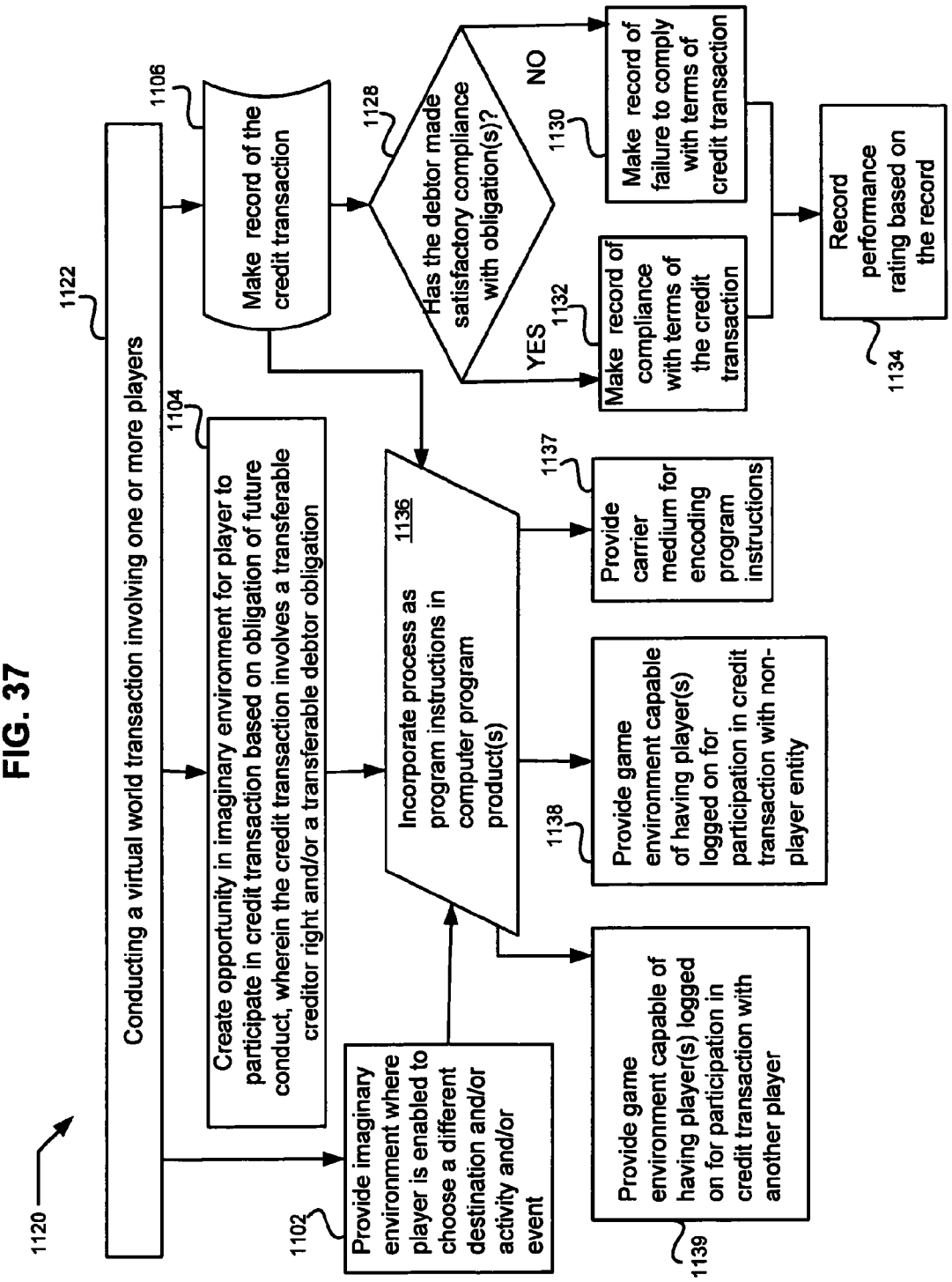
FIGS. 37-42 are more detailed flow charts showing additional exemplary processes for some embodiments.

A more detailed flow chart of FIG. 37 shows an exemplary method 1120 for conducting a virtual world transaction involving one or more players (block 1122). A record made of a virtual credit transaction (block 1106) may help determine whether a debtor has made satisfactory compliance with any of the virtual credit transaction obligations (block 1128), including a record of failure to comply (block 1130), and a record of compliance (block 1132). In some implementations a performance rating is recorded (block 1134) based on the compliance records.

FIG. 37 also illustrates an embodiment that incorporates the previously described process blocks 1102, 1104, 1106 (see FIG. 31) as program instructions in one or more computer program products (block 1136). Such a computer program product may provide a carrier medium for encoding program instructions (block 1137), and may also provide a game environment capable of having one or more players logged on for participation in a virtual world credit transaction with a non-player entity (block 1138), and may further provide a game environment capable of having one or more players logged on for participation in a virtual world credit transaction with another player (block 1139).

Figure 38:
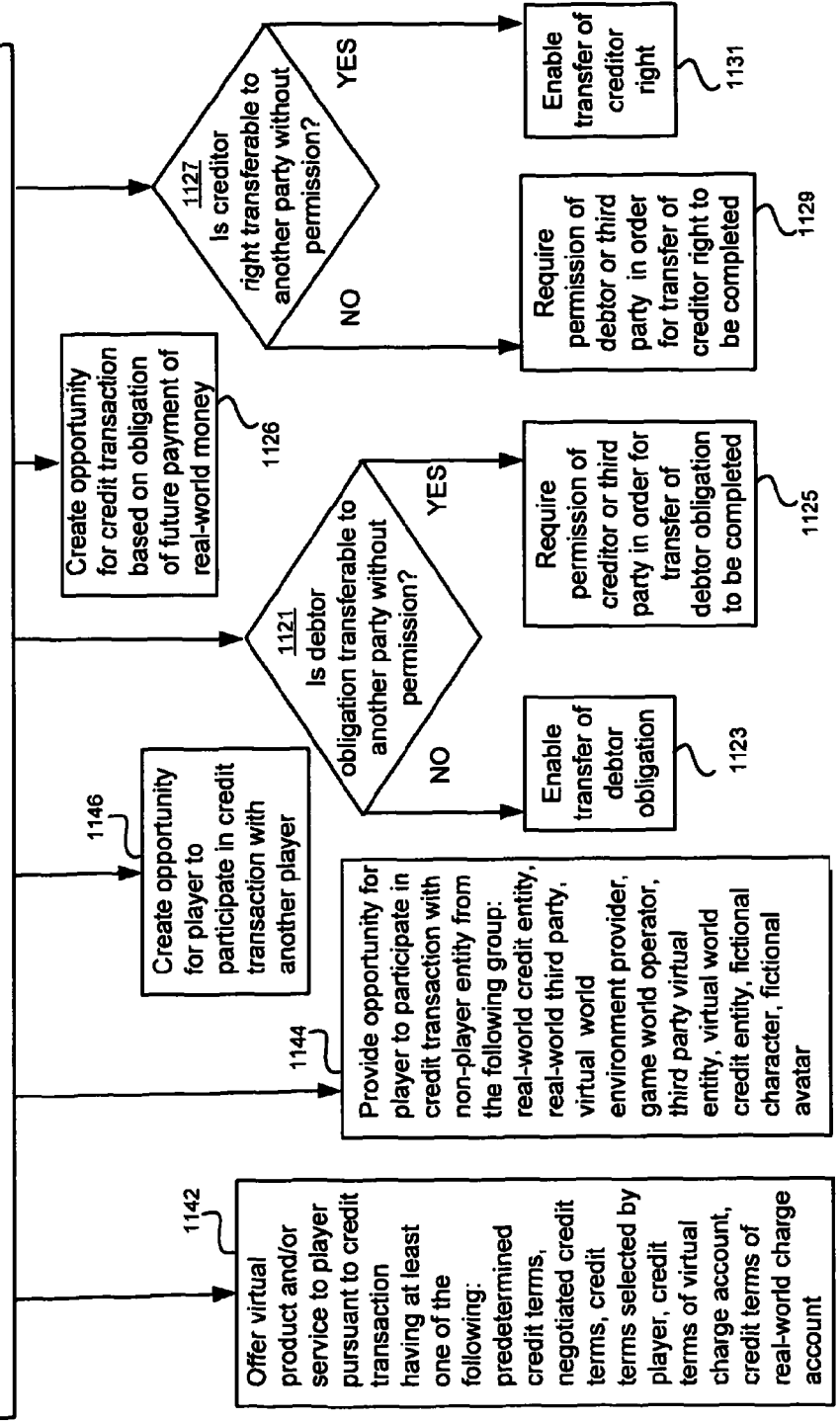

The detailed flow chart of FIG. 38 shows a further exemplary method 1140 that includes the opportunity in an imaginary environment (see process block 1104 in both FIG. 31 and FIG. 38) wherein a credit transaction involves a transferable creditor right and/or a transferable debtor obligation. Such a credit transaction may be based on an obligation of future payment of real-world money (block 1126), or other types of obligations as disclosed herein.

In some instances, the possibility of transferability may involve permission requirements. For example, can a particular debtor obligation be transferable to another party without permission (block 1121)? If no permission is required, then a transfer of the debtor obligation can be enabled (block 1123). Otherwise, permission may be required from another party such as a creditor entity or third party in order for a transfer of a debtor obligation to be completed (block 1125).

In another example, a question may arise whether a particular creditor right is transferable to another party without permission (block 1127)? If no permission is required, then a transfer of the creditor right can be enabled (block 1131). Otherwise, permission may be required from another party such as a debtor or third party in order for a transfer of a creditor right to be completed (block 1129).

The illustrated embodiment of FIG. 38 also indicates the possibility of transferability arising where an opportunity is created for a player to participate in a credit transaction with another player (block 1146). An issue of transferability may also arise where an opportunity is provided for a player to participate in a credit transaction with a non-player entity from the following group: real-world entity, real-world third party, virtual world environment provider, game world operator, third party virtual entity, virtual world credit entity, fictional character, and fictional avatar (block 1144). Another type of credit transaction may involve an offer of a virtual product and/or service to a player, wherein the credit transaction has at least one of the following: predetermined credit terms, negotiated credit terms, credit terms selected by a player, credit terms of a virtual charge account, and credit terms of a real-world charge account (block 1142).

Figure 39:
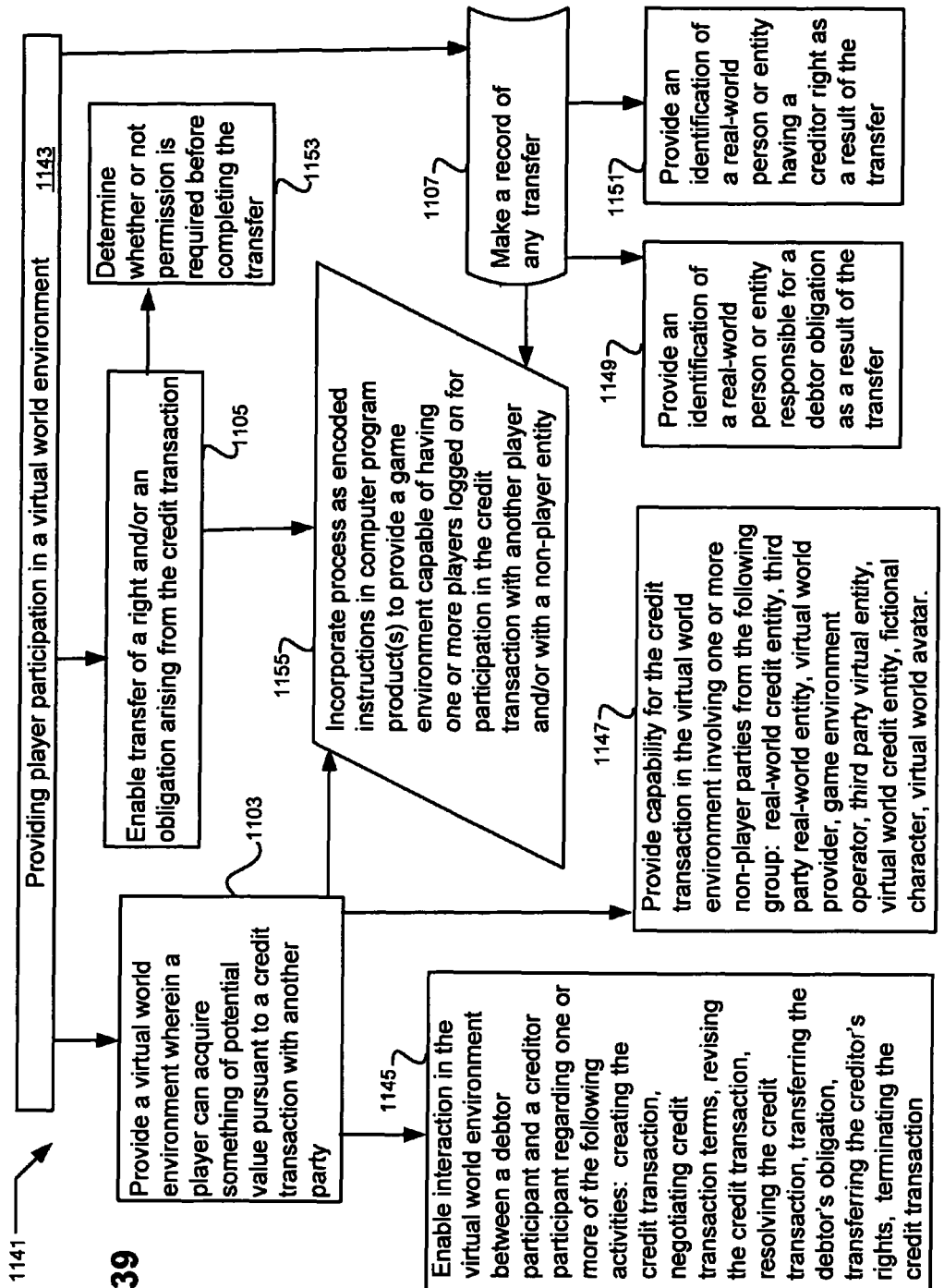

The exemplary flow chart of FIG. 39 shows a further exemplary method 1141 for providing player participation in a virtual world environment (block 1143). This embodiment includes the previously described process blocks 1103, 1105, 1107 (see FIG. 32) incorporated as encoded instructions in one or more computer program products which provide a game environment capable of having one or more players logged on for participation in a credit transaction with another player and/or with a non-player entity (block 1155).

The possibility of a player acquiring something of potential value pursuant to a credit transaction with another party (block 1103) may be based on enabled interaction in the virtual world environment between a debtor participant and a creditor participant regarding one or more of the following activities: creating the credit transaction, negotiating credit transaction terms, revising the credit transaction, resolving the credit transaction, transferring the debtor's obligation, transferring the creditor's rights, and terminating the credit transaction (block 1145). Capability may also be provided for a credit transaction in the virtual world environment involving one or more non-player entities from the following group: real-world credit entity, third party real-world entity, virtual world provider, game environment operator, third party virtual entity, virtual world credit entity, fictional character, and virtual world avatar (block 1147).

When any transfer occurs, a record is made (block 1107) which may include an identification of a real-world person or real-world entity responsible for a debtor obligation as a result of the transfer (block 1149). The record may also include an identification of a real-world person or real-world entity having a creditor right as a result of the transfer (block 1151). The possibility of enabling a transfer of a right and/or an obligation arising from a credit transaction (block 1105) in the virtual world environment may again raise an issue of permission. It may be a requirement to determine whether or not permission is required before completing such a transfer (block 1153).

Figure 40:
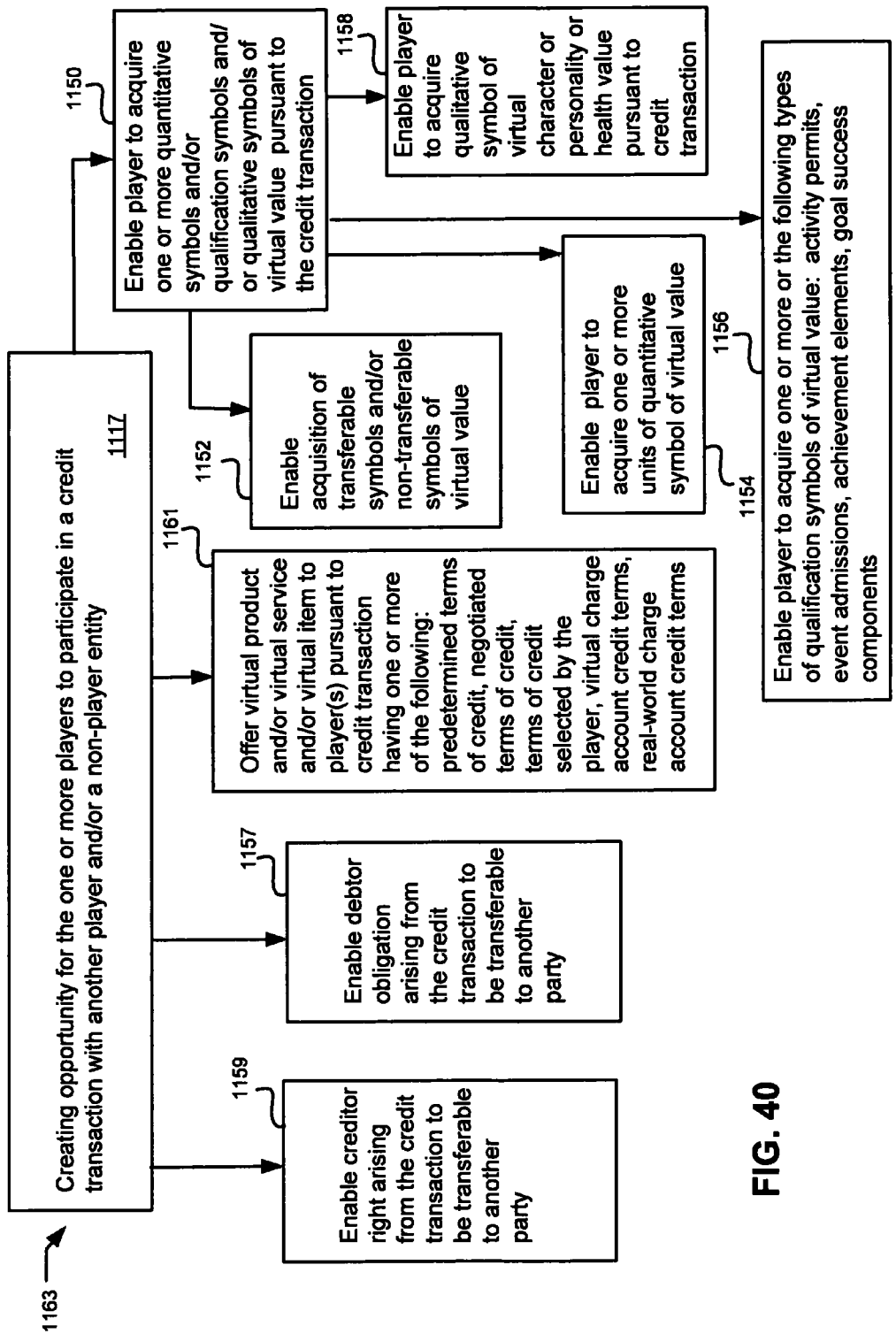

The detailed flow chart of FIG. 40 shows a further exemplary method 1163 that includes the opportunity in a virtual world environment (see process block 1117 in both FIG. 33 and FIG. 40) for one or more players to participate in a credit transaction with another player and/or non player entity, and wherein a performance record may be made (see process block 1119 in FIG. 34). The credit transaction may enable a player to acquire one or more quantitative symbols and/or qualification symbols, and/or qualitative symbols of virtual value (block 1150). Such quantitative symbols may include one or more units of something of virtual value (block 1154). Such qualification symbols may include one or more of the following types: activity permits, event admissions, achievement elements, and goal success components (block 1156). Such qualitative symbols may include a symbol of virtual character or personality or health value (block 1158). Any symbols of virtual value that can be acquired may include transferable symbols and/or non-transferable symbols (block 1152).

In some instances, the process blocks 1113, 1115, 1117, 1119 of FIG. 34 may also include implementations involving transferability such as enabling a debtor obligation to be transferable to another party (block 1157), as well as in some instances enabling a creditor right to be transferable to another party (block 1159). Another possible feature to be included is offering a virtual product and/or virtual service and/or virtual item to player(s) pursuant to a credit transaction having one or more of the following: predetermined terms of credit, negotiated terms of credit, terms of credit selected by the player, virtual charge account credit terms, and real-world charge account credit terms (block 1161).

Figure 41:
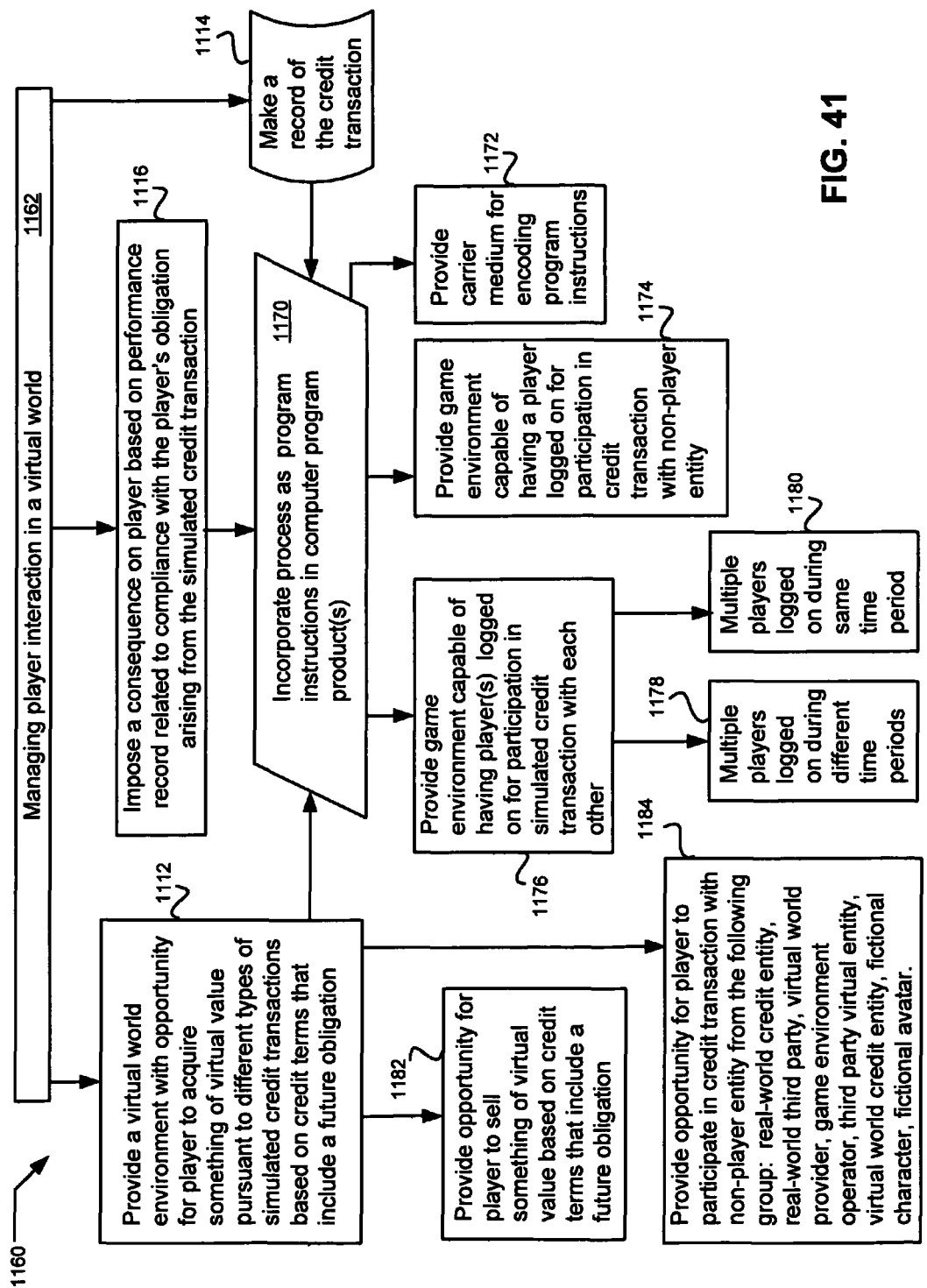

FIG. 41 shows a further exemplary method 1190 for managing player interaction in a virtual world (block 1162). This embodiment includes the previously described process blocks 1112, 1114, 1116 (see FIG. 33) as program instructions in one or more computer program products (block 1170). Such a computer program product may provide a carrier medium for encoding program instructions (block 1172), and may also provide a game environment capable of having one or more players logged on for participation in a virtual world credit transaction with a non-player entity (block 1174), and may further provide a game environment capable of having one or more players logged on for participation in a virtual world credit transaction with each other (block 1176). Multiple players may be individually logged on during different time periods (block 1178), as well as individually logged on during a same time period (block 1180).

Additional process components included in the exemplary embodiment illustrated in FIG. 41 include providing an opportunity for a player to sell something of virtual value based on credit terms (block 1182), and also providing an opportunity for a player to participate in a credit transaction with a non-player entity from the following group: real-world credit entity, real-world third party, virtual world provider, game environment operator, third party virtual entity, virtual world credit entity, fictional character, and fictional avatar (block 1184).

Figure 42:
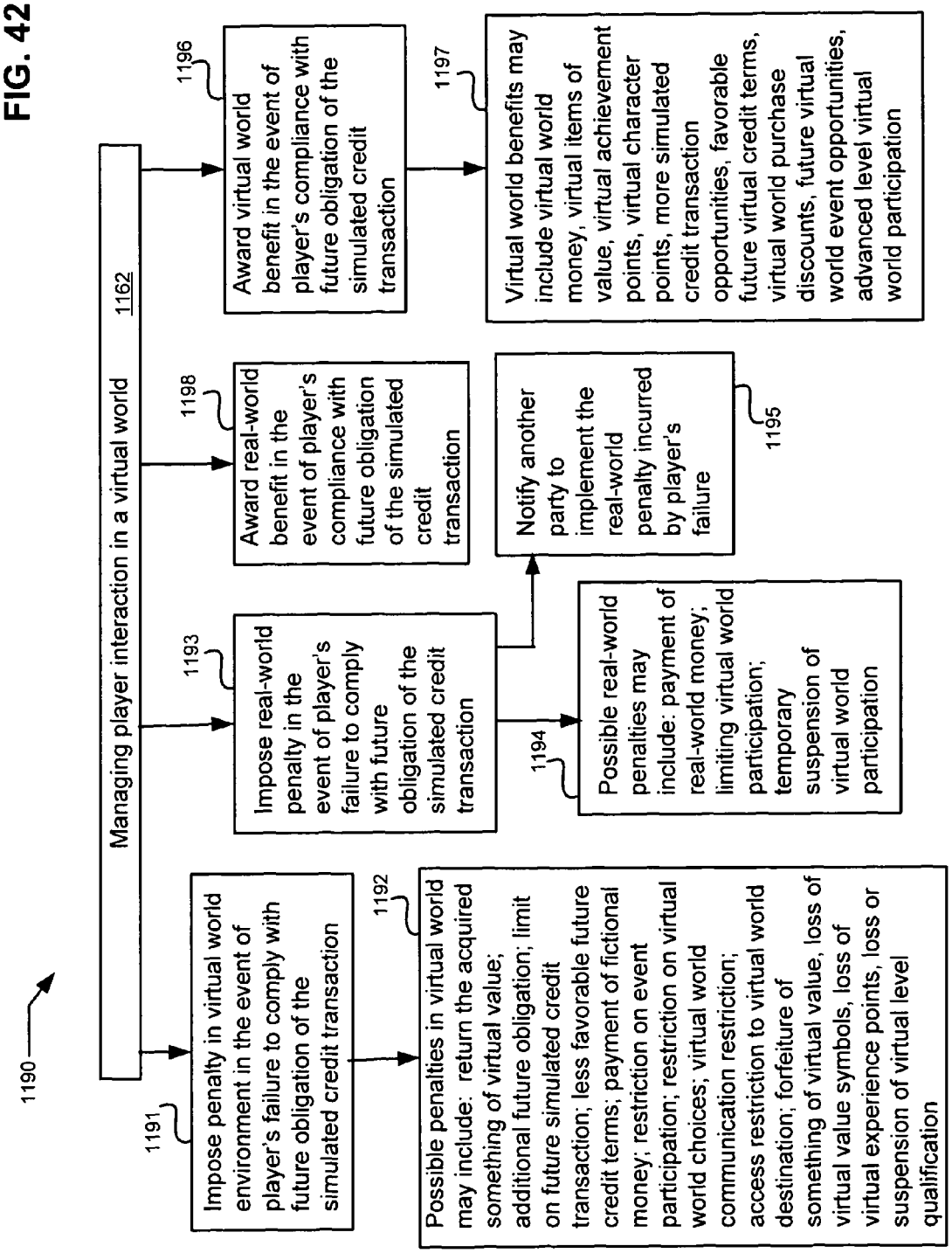

The detailed flow chart of FIG. 42 shows an exemplary method 1190 for managing player interaction in a virtual world (block 1162). Exemplary process components may include imposing a penalty in the virtual world environment in the event of a player's failure to comply with a future obligation of a simulated credit transaction (block 1191). Possible penalties in the virtual world environment may include one or more of the following: return the acquired something of virtual value; additional future obligation; limit on future simulated credit transaction; less favorable future credit terms for simulated credit transaction; payment of fictional money; restriction on virtual world event participation; restriction on virtual world choices; virtual world communication restriction; restriction on access to virtual world destination; forfeiture of something of virtual value; loss of virtual value symbols; loss of virtual world experience points; loss or suspension of virtual level qualification (block 1192).

Other exemplary process components include imposing a real-world penalty in the event of a player's failure to comply with a future obligation of the simulated credit transaction (block 1193). Possible real-world penalties may include one or more of the following: payment of real-world money, limiting virtual world participation, and temporary suspension of virtual world participation (block 1194). In some instances, notification is made to another party to implement the real-world penalty incurred by a player's failure to comply the future obligation (block 1195).

Additional exemplary process components relate to awarding benefits in the event of a player compliance with a future obligation of the simulated credit transaction. Such benefits may include an award of a real-world benefit (block 1198), as well as an award of a virtual world benefit (block 1196). Possible virtual world benefits may include one or more of the following: virtual world money, virtual items of value, virtual achievement points, virtual character points, more simulated credit transaction opportunities, favorable future virtual credit terms, virtual world purchase discounts, future virtual world event opportunities, and advanced level virtual world participation (block 1197).

The exemplary system, apparatus, and computer program product embodiments shown in FIGS. 6-15E and FIGS. 26-30 and FIGS. 43-47 and FIGS. 64-67 and FIGS. 86-89 and FIG. 107 and FIG. 114 along with other components, devices, know-how, skill and techniques that are known in the art have the capability of implementing and practicing the methods and processes shown in FIGS. 108-113. It is to be understood that the methods and processes can be incorporated in one or more different types of computer program products with a carrier medium having program instructions encoded thereon. However it is to be further understood by those skilled in the art that other systems, apparatus and technology may be used to implement and practice such methods and processes.

Figure 43:
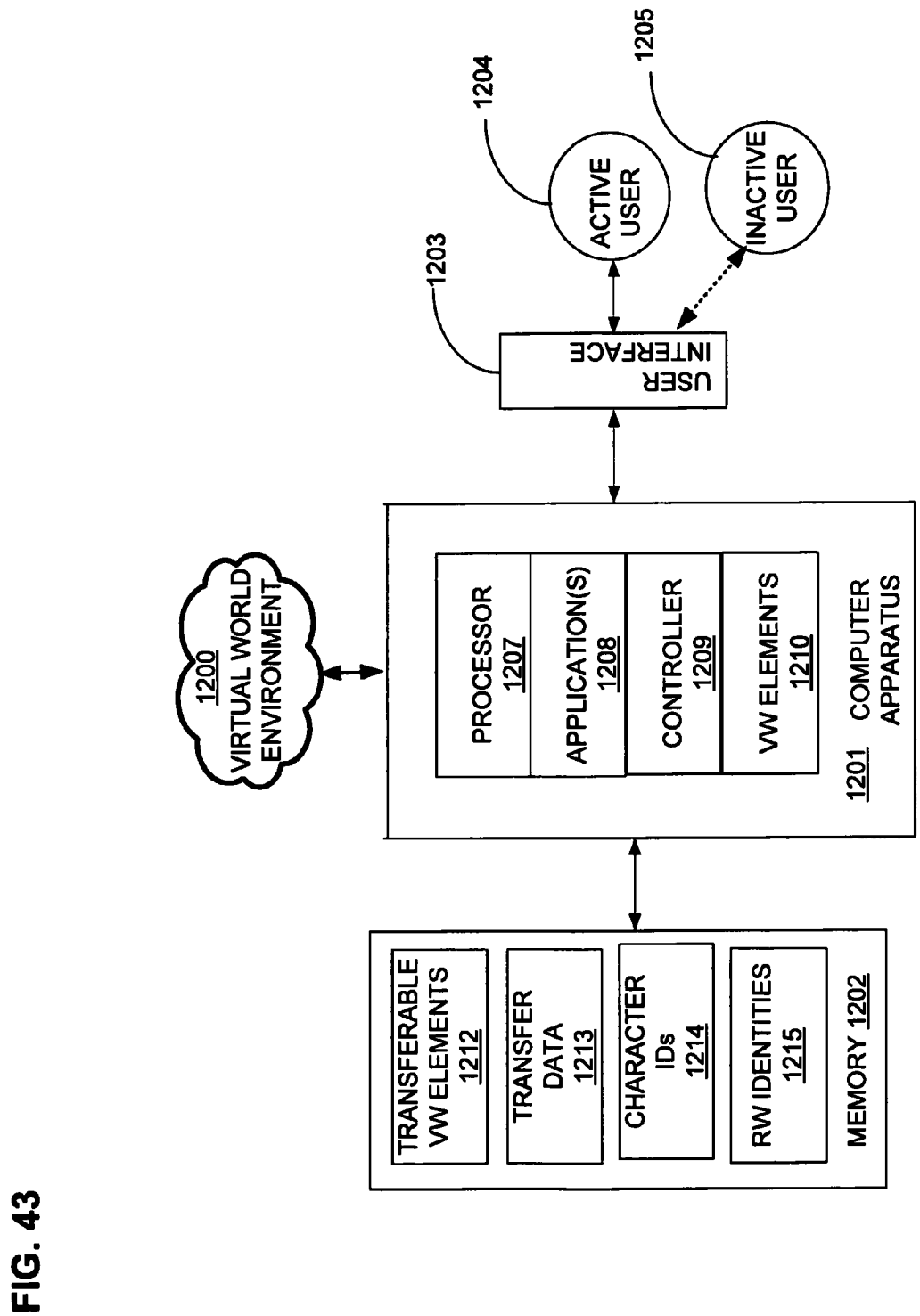
FIG. 43 is a schematic block diagram showing a computerized embodiment.

Referring to FIG. 43, an exemplary embodiment includes computer apparatus 1201 operably coupled with memory 1202 and user interface 1203 to provide access to virtual world environment 1200. In this embodiment active user 1204 and inactive user 1205 can each periodically logon to the virtual world environment 1200 in order to participate as virtual characters or other third party entities. It will be understood that some embodiments may provide for one or more users at different locations to participate in the virtual world environment by logon to an application program running in a localized computer apparatus and/or running on a computer server accessible via a network connection such as the Internet.

Computer apparatus 1201 may include processor 1207, one or more applications 1208, controller 1209, and virtual world elements 1210. Memory 1202 may include various records necessary to accomplish the sophisticated functional aspects and attributes of the virtual world environment 1200 as well as the actions, behavior and activity of virtual characters, avatars, and the like. Exemplary records related to transferability features disclosed herein include a listing of transferable VW elements 1212 (i.e., VW elements that may in some circumstances be subject to transfer), transfer data records 1213, virtual character identification records 1214, and real-world identity records 1215 for real-world patron entities involved directly or indirectly with the virtual world environment 1200.

Figure 44:
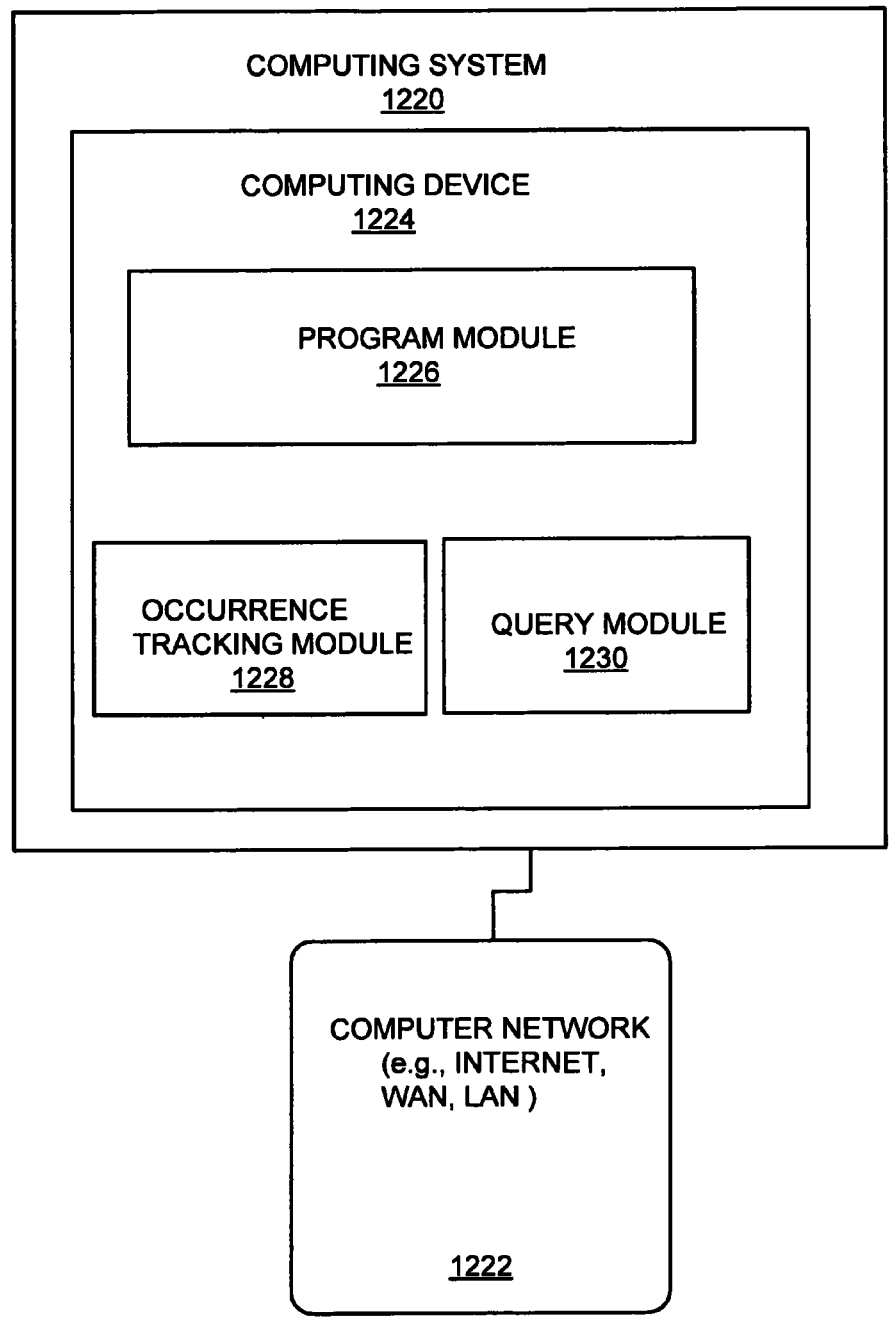
FIG. 44 is another schematic block diagram for an exemplary computerized implementation.

FIG. 44 illustrates schematically a computing system 1220 that may be interconnected with various types of networks 1222 including but not limited to local area networks (LAN), wide area networks (WAN), and the Internet. An exemplary embodiment of the transferability features disclosed herein includes a computing device 1224, program module 1226, occurrence tracking module 1228, and query module 1230.

Figure 45:
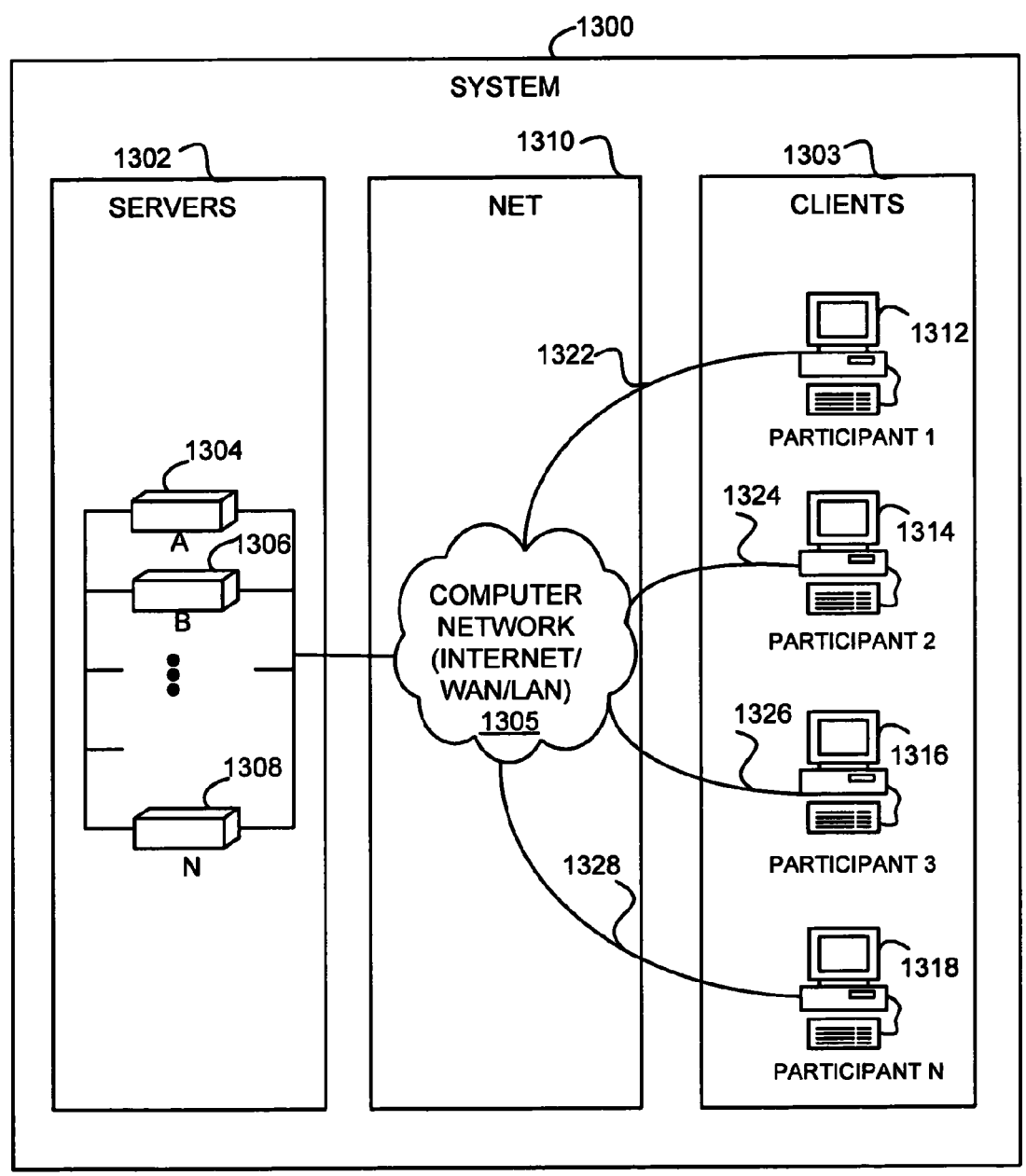
FIG. 45 shows a schematic illustration for a network embodiment.

FIG. 45 shows an exemplary implementation of system 1300 that enables multiple users at different locations to participate in a virtual world environment. For example, client computer devices 1303 have access via a communication net 1310 (e.g., computer networks 1305) to servers 1302 that run programs and process data as may be required for operation of the virtual world environment. It will be understood that multiple servers (e.g., servers 1304, 1306, 1308) may in some implementations be part of a larger grouping. More particularly, individual users identified as participants 1 through N can use their respective terminals 1312, 1314, 1316, 1318 connected through communication links 1322, 1324, 1326, 328 to various computer networks 1305 in order to obtain access to the virtual world environment.

Figure 46:
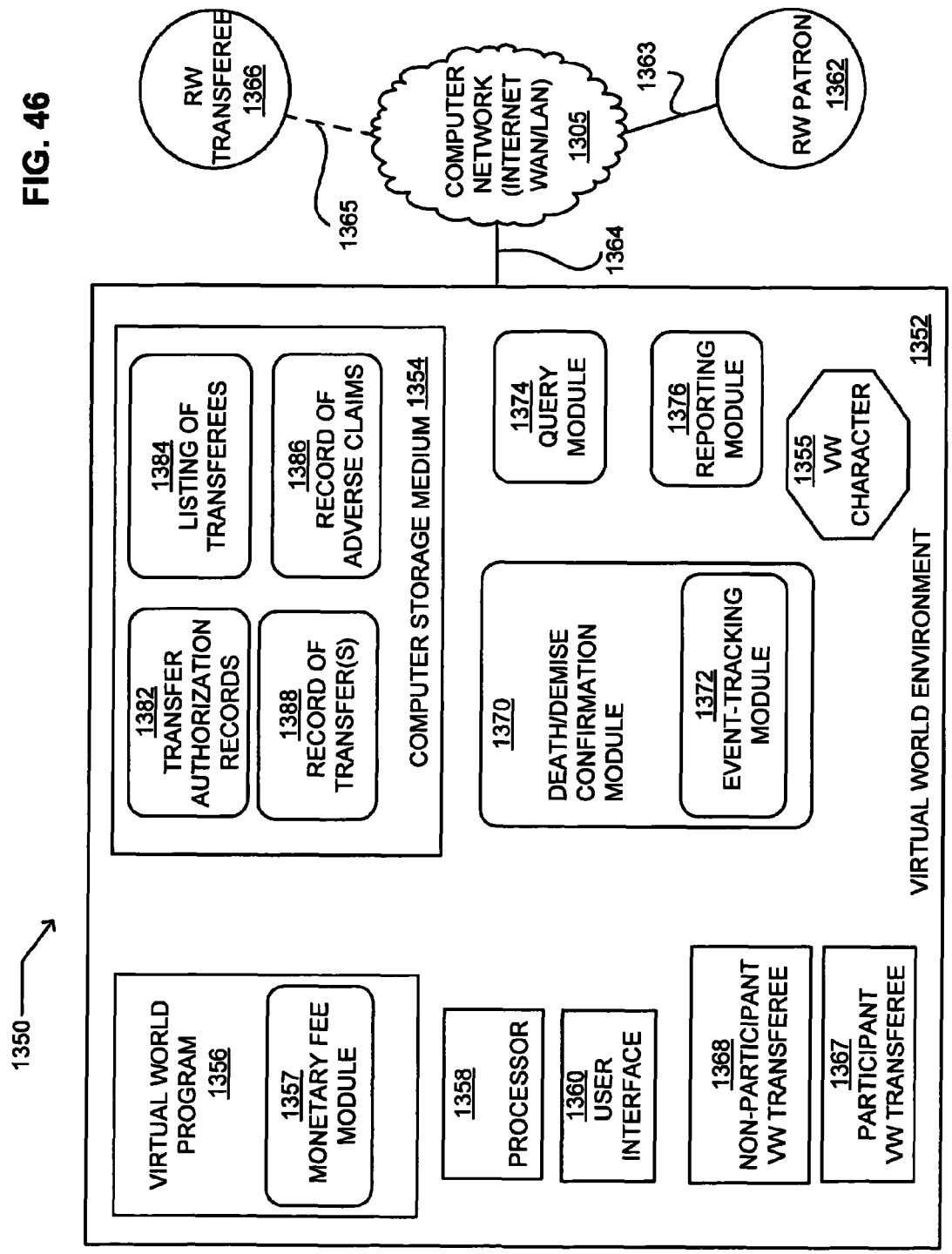
FIG. 46 shows a schematic block diagram for a network embodiment.

FIG. 46 is a schematic representation of a computerized system 1350 that provides various communication and data processing services related to a virtual world environment to a RW patron 1362 via one or more networks 1305. A communication path may include one or more links 1363 to networks 1305 and ultimately via link 1364 to computerized components supporting a VW environment 1352. A potential RW transferee 1366 of virtual rights and/or property also may have a possible communication link 1365 through networks 1305 to some aspects of the VW environment 1352.

Exemplary components of computerized system 1350 include processor 1358, user interface 1360, VW program 1356, monetary fee module 1357, as well as computer storage medium 1354. With respect to transferability features as disclosed herein, the computer storage medium 1354 may include transfer authorization records 1382, listing of transferees 1384, record of adverse claims 1386, and record of any transfers 1388. Additional modules may include query module 1374 providing data record access, and reporting module 1376. A death/demise confirmation module 1370 may include an event-tracking module 1372. These exemplary system components implement various procedures regarding authorization for a possible transfer of a virtual world property right to a designated successor party. Such procedures may be conditioned upon a death of a real-world patron 1362 of the virtual world environment 1352. Such procedures may also be conditioned upon a demise (e.g., figurative or de-facto death) of a virtual world character 1355 in the VW environment 1352.

Figure 47:
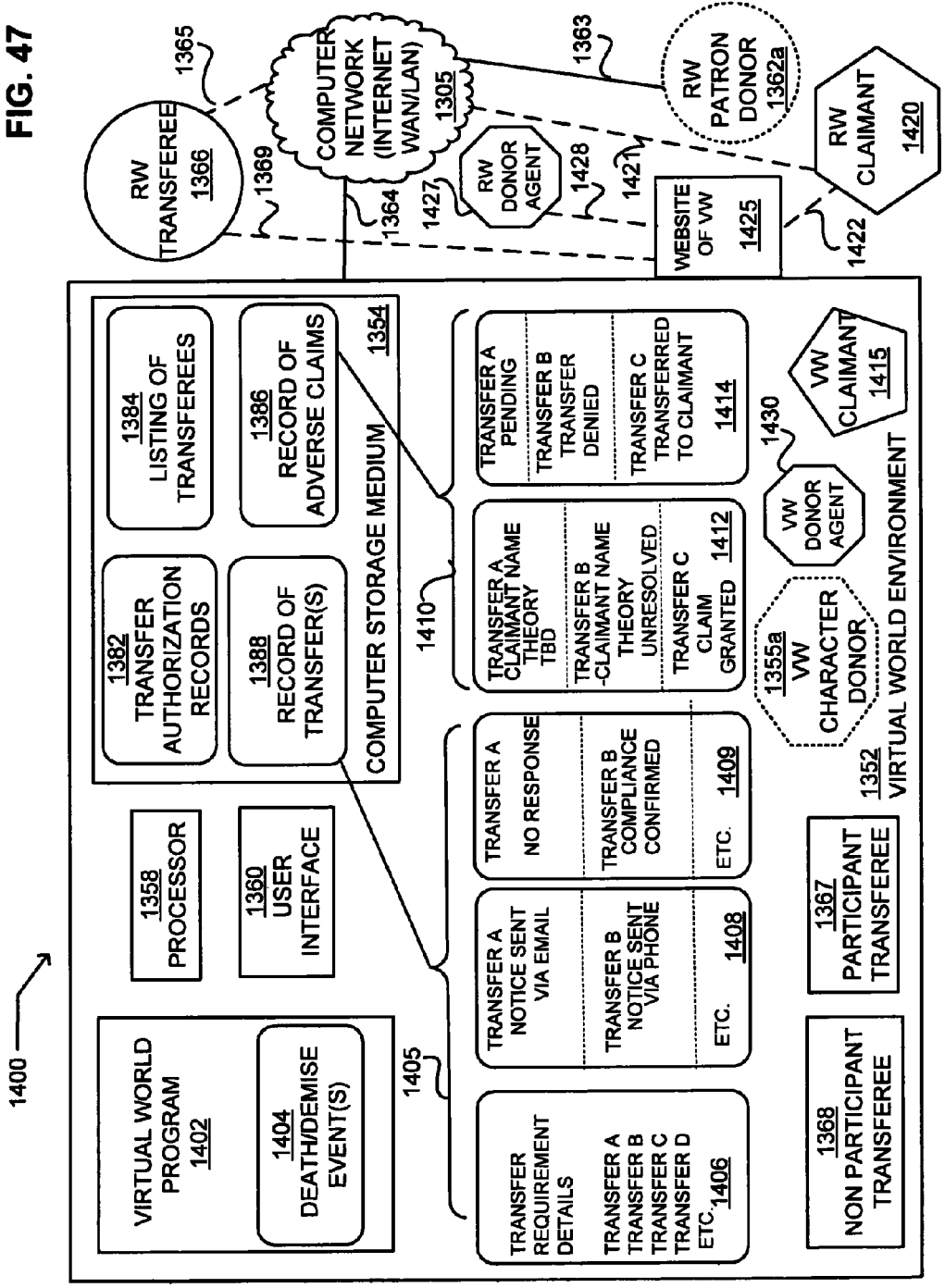
FIG. 47 shows another possible aspect of the embodiment of FIG. 46.

FIG. 47 shows additional details that may be included in the system embodiment 1400 of FIG. 46, including a virtual world program 1402 that processes death/demise events 1404 insofar as they might relate to an authorized transfer of virtual rights or property. It will be understood that possible recipient parties may include but are not limited to a participant VW transferee 1367, a non-participant VW transferee 1368, and a RW transferee 1366. An authorization for transfer may have been initiated by or on behalf of a RW patron donor 1362a. An authorization for transfer may also have been initiated by or on behalf of a VW character donor 1355a.

In accordance with an exemplary procedure for helping to provide reasonable predictability for transfers that do not violate any conflicting rights, rules or claims, a transfer procedure may include an evaluation of possible adverse claims from a VW claimant 1415 and/or a RW claimant 1420. Resolution of any conflicting claims may require a RW claimant to have access to the VW environment via a possible link 1421, and also to have access to website 1425 via link 1422. Similarly RW transferee 1366 may obtain possible access (see 1365) to the VW environment via networks 1305, and may also have access to website 1425 via link 1369.

In the event of a real-world death of RW patron donor 1362a or a demise of a VW character donor 1355a, some implementations may provide for communications with an agent of the donor. Such communications may involve a RW donor agent 1427 and/or a VW donor agent 1430. In some instances it may be desirable to assure that communication links are provided. For example some embodiments may provide a link 1428 to the website 1425 for RW donor agent 1427. Such communication links with a donor agent may be helpful to accomplish an intention of a donor in transferring a virtual property right.

Additional data to facilitate resolution of conflicting claims may be maintained and updated in detailed data files 1405 related to 1388, including exemplary file records 1406, 1408, 1409. Additional data may also be maintained and updated in detailed data files 1410 related to 1386, including exemplary file records 1412, 1414. Typical data entries showing status of transfers A-D are shown in the drawings. It will be noted in the exemplary data entries of file records 1408, 1409, 1412, 1414 that "transfer A" is shown still pending, "transfer B" was denied due to an unresolved conflict with an adverse claimant, and "transfer C" was denied, based on granting an adverse claim that resulted in approving a transfer to the claimant instead of the originally designed successor party. Of course, a variety of rules may be developed and relied upon in order to seek a resolution of conflicting claims.

Figure 48:
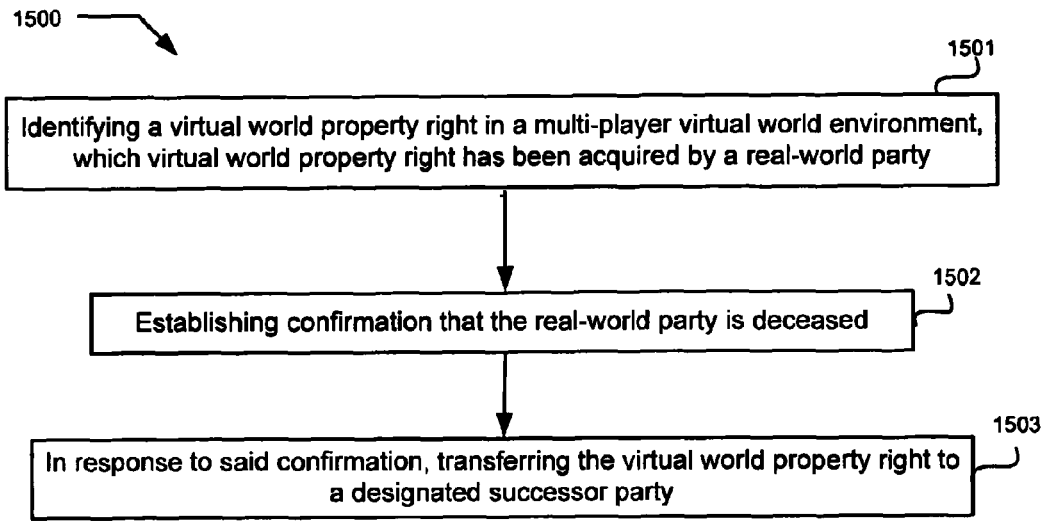
FIGS. 48-49 are high level flow charts for exemplary process embodiments.

Referring to the high level flow chart of FIG. 48, an exemplary process embodiment 1500 provides a method of resolving virtual world property ownership, including identifying a virtual world property right in a multi-player virtual world environment, which virtual world property right has been acquired by a real-world party (block 1501); establishing confirmation that the real-world party is deceased (block 1502); and in response to said confirmation, transferring the virtual world property right to a designated successor party (block 1503).

Figure 49:
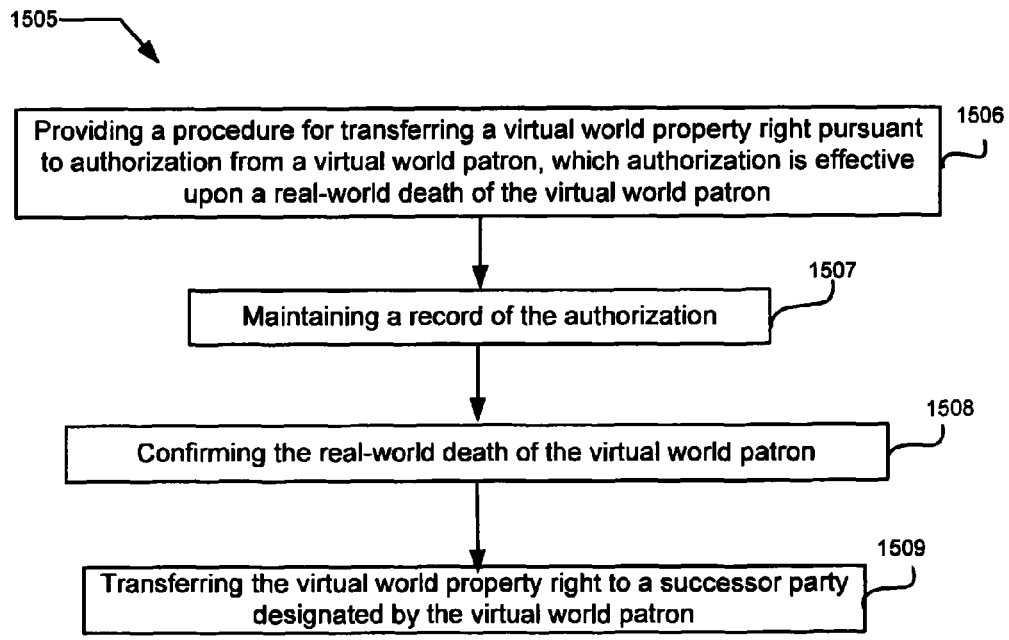

Another exemplary process embodiment 1505 illustrated in FIG. 49 provides a method of enabling transfer of a virtual world property right, including providing a procedure for transferring a virtual world property right pursuant to authorization from a virtual world patron, which authorization is effective upon a real-world death of the virtual world patron (block 1506). Additional process features include maintaining a record of the authorization (1507), confirming the real-world death of the virtual world patron (block 1508), and transferring the virtual world property right to a successor party designated by the virtual world patron (block 1509).

Figure 50:
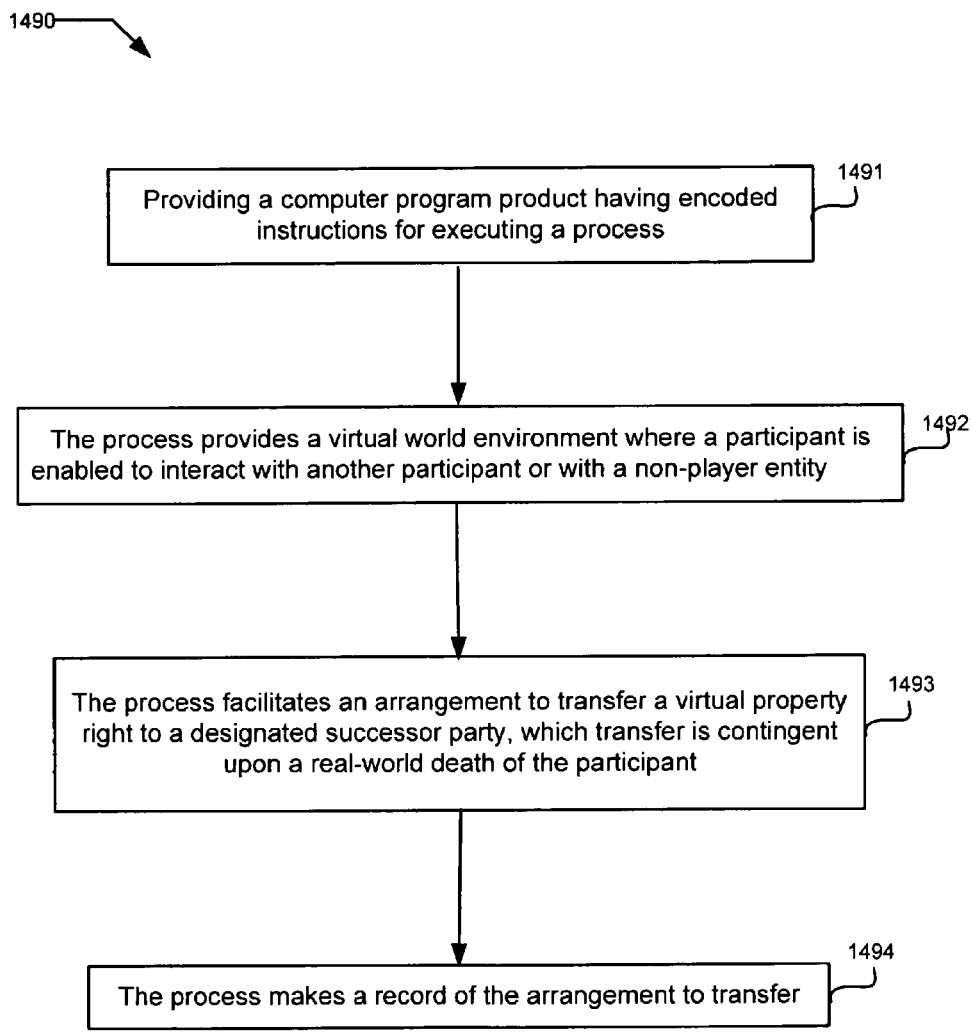
FIG. 50 is a flow chart for a computer program product embodiment.

The high level flow chart embodiment 1490 of FIG. 50 illustrates a computer program product having encoded instructions for executing a process (block 1491) that provides a virtual world environment where a participant is enabled to interact with another participant or with a non-player entity (block 1492). The exemplary process further facilitates an arrangement to transfer a virtual property right to a designated successor party, which transfer is contingent upon a real-world death of the participant (block 1493); and also includes making a record of the arrangement to transfer (1494).

Figure 51:
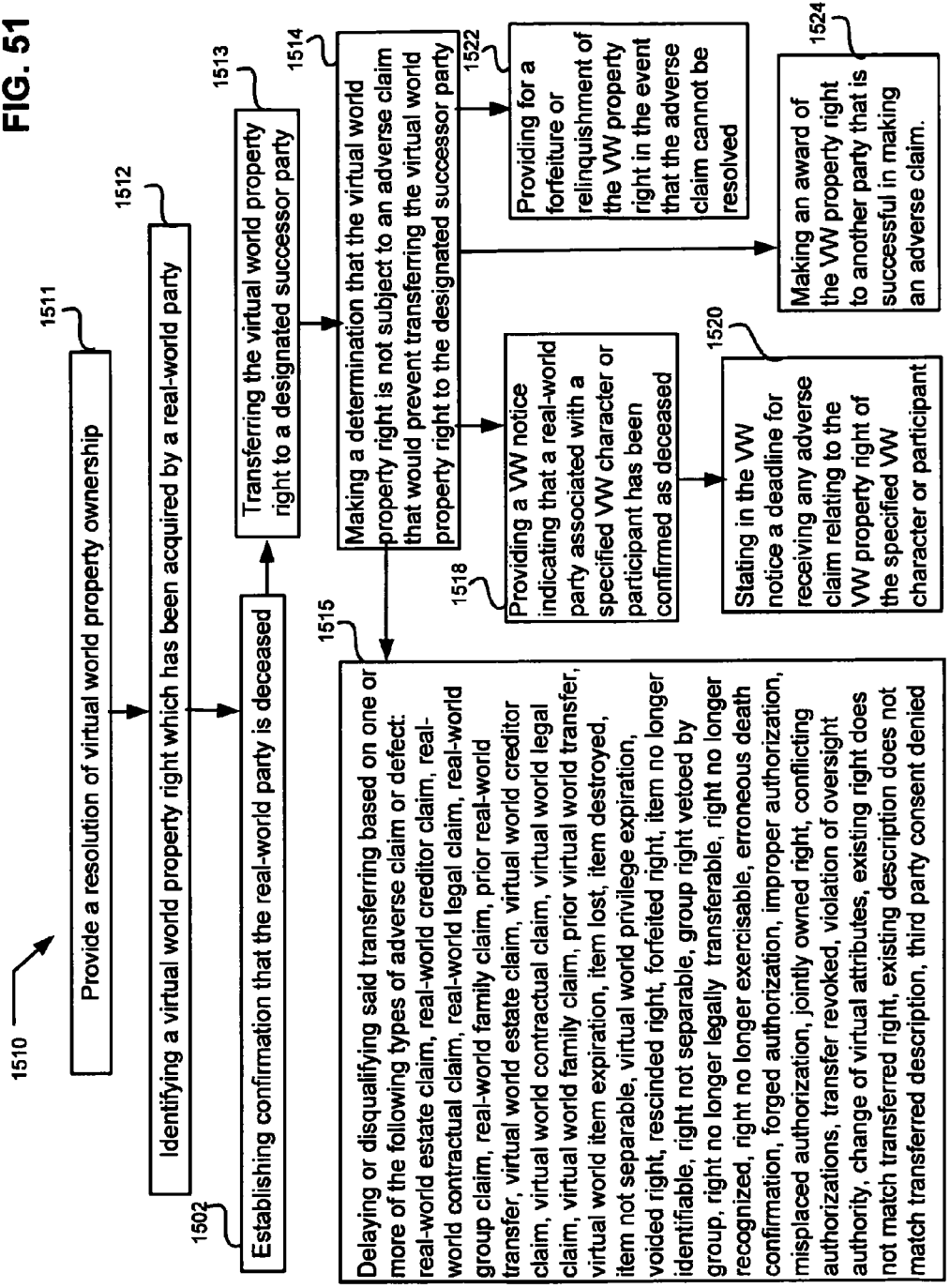
FIGS. 51-57 are more detailed flow charts for various exemplary process embodiments.

Referring to the more detailed process aspects 1510 illustrated in FIG. 51, an exemplary process embodiment provides a resolution of virtual world property ownership (block 1511). Such an embodiment may include identifying a virtual world property right which has been acquired by a real-world party (block 1512), establishing confirmation that the real-world party is deceased (block 1502), and transferring the virtual world property right to a designated successor party (block 1513). An additional process feature includes making a determination that the virtual world property right is not subject to an adverse claim that would prevent transferring the virtual world property right to the designated successor party (block 1514).

Another aspect includes delaying or disqualifying said transferring based on one or more of the following types of adverse claim or defect: real-world estate claim, real-world creditor claim, real-world contractual claim, real-world legal claim, real-world group claim, real-world family claim, prior real-world transfer, virtual world estate claim, virtual world creditor claim, virtual world contractual claim, virtual world legal claim, virtual world family claim, prior virtual world transfer, virtual world item expiration, item lost, item destroyed, item not separable, virtual world privilege expiration, voided right, rescinded right, forfeited right, item no longer identifiable, right not separable, group right vetoed by group, right no longer legally transferable, right no longer recognized, right no longer exercisable, erroneous death confirmation, forged authorization, improper authorization, misplaced authorization, jointly owned right, conflicting authorizations, transfer revoked, violation of oversight authority, change of virtual attributes, existing right does not match transferred right, existing description does not match transferred description, and third party consent denied (block 1515). It is to be understood that some adverse claim may be disallowed without need of investigation, others may be summarily granted, while certain conflicting claims may not be resolvable.

Additional possible features shown in FIG. 51 include providing a virtual world notice indicating that the real-world party associated with a specified virtual world character or participant has been confirmed as deceased (block 1518), and stating in the virtual world notice a deadline for receiving any adverse claim relating to the virtual world property right of the specified virtual world character or participant (block 1520).

Some implementations may provide for a forfeiture or relinquishment of the virtual world property right in the event that the adverse claim cannot be resolved (block 1522), and may also include making an award of the virtual world property right to another party that is successful in making an adverse claim (block 1524).

Figure 52:
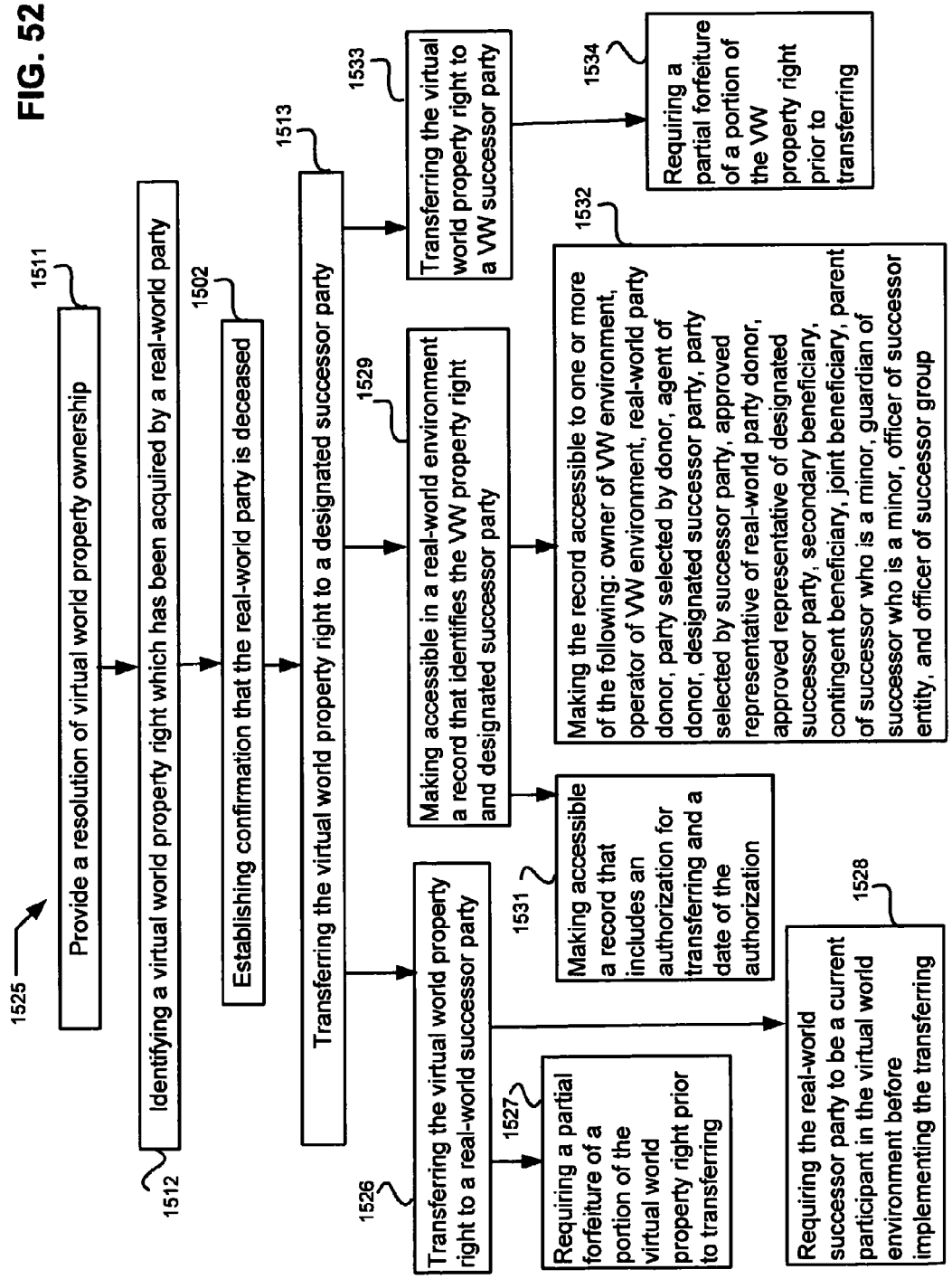

Referring to the embodiments 1525 shown in FIG. 52, exemplary aspects include previously described component features 1511, 1512, 1502, 1513. Other possible features shown include transferring the virtual world property right to a virtual world successor party (block 1533), and requiring a partial forfeiture by the VW successor party of a portion of the virtual world property right prior to said transferring (block 1534). Another exemplary feature includes making accessible in a real-world environment a record that identifies the virtual world property right and the designated successor party (block 1529). A related possible feature includes making accessible a record that includes an authorization for transferring and a date of the authorization (block 1531).

Some implementations may make the record accessible to one or more of the following: owner of virtual-world environment, operator of virtual-world environment, real-world party donor, party selected by donor, agent of donor, designated successor party, party selected by successor party, approved representative of real-world party donor, approved representative of designated successor party, secondary beneficiary, contingent beneficiary, joint beneficiary, parent of successor who is a minor, guardian of successor who is a minor, officer of successor entity, and officer of successor group (block 1532). Of course it may be appropriate and desirable in some circumstances to make the various data records accessible to additional parties or entities. The listing is provided by way of example only.

Further exemplary process features shown in FIG. 52 may include transferring the virtual world property right to a real-world successor party (block 1526), requiring a partial forfeiture by the RW successor party of a portion of the virtual world property right prior to the transferring (block 1527), and requiring the real-world successor party to be a current participant in the virtual world environment before implementing the transferring (block 1528).

Figure 53:
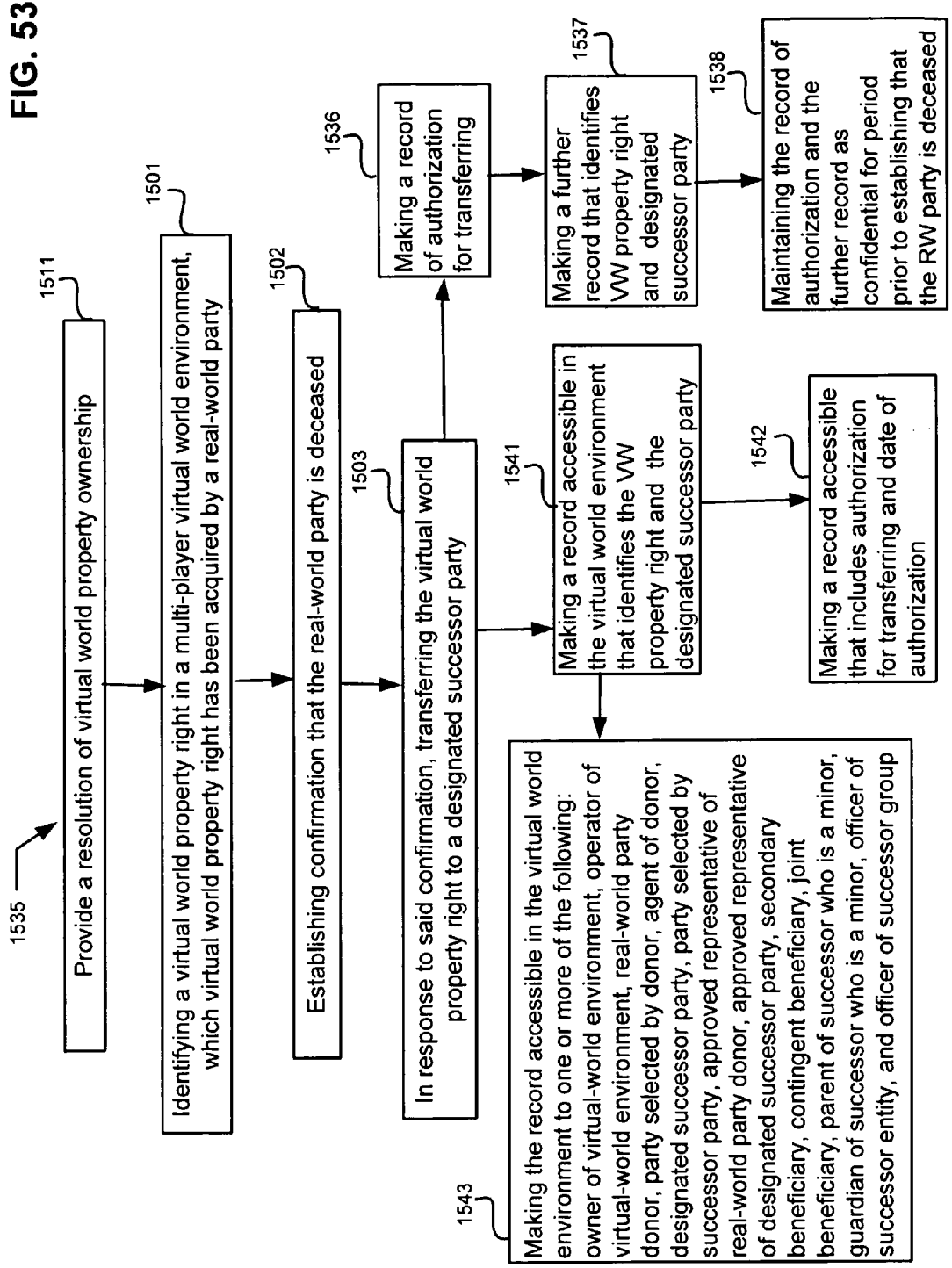

The detailed flow chart of FIG. 53 shows embodiments 1535 that include previously described process features 1511, 1501, 1502, 1503 as well as various additional aspects relating to informational data records. Such aspects include making a record of authorization for transferring (block 1536). A related feature provides for making a further record that identifies the virtual world property right and the designated successor party (block 1537), and maintaining the record of the authorization and the further record as confidential for a period prior to said establishing that the real-world party is deceased (block 1538).

Other data record features may include making accessible in the virtual world environment a record that identifies the virtual world property right and the designated successor party (block 1541), and making a record accessible that includes an authorization for transferring and a date of authorization (block 1542).

Another possible data record feature includes making the record accessible in the virtual world environment to one or more of the following: owner of virtual-world environment, operator of virtual-world environment, real-world party donor, party selected by donor, agent of donor, designated successor party, party selected by successor party, approved representative of real-world party donor, approved representative of designated successor party, secondary beneficiary, contingent beneficiary, joint beneficiary, parent of successor who is a minor, guardian of successor who is a minor, officer of successor entity, and officer of successor group (block 1543). The extent of accessibility may be expanded or limited depending on the circumstances.

Figure 54:
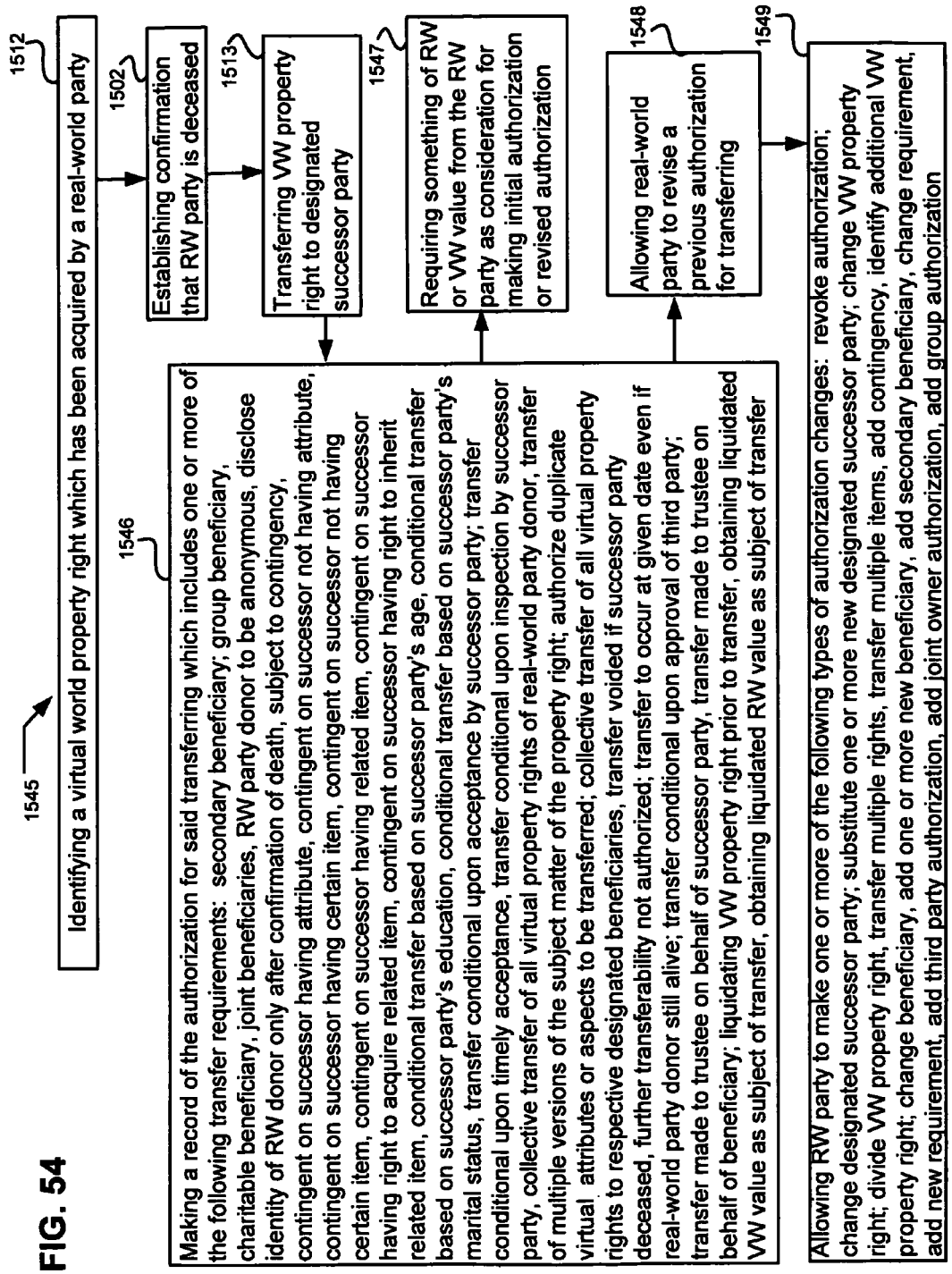

Referring to FIG. 54, a flow chart illustrating embodiments 1545 includes previously identified process features 1512, 1502, 1513. A further possible feature includes making a record of the authorization for said transferring, which record of the authorization includes one or more of the following transfer requirements: secondary beneficiary; group beneficiary, charitable beneficiary, joint beneficiaries, real-world party donor to be anonymous, disclose identity of real-world donor only after confirmation of death, subject to contingency, contingent on successor having attribute, contingent on successor not having attribute, contingent on successor having certain item, contingent on successor not having certain item, contingent on successor having related item, contingent on successor having right to acquire related item, contingent on successor having right to inherit related item, conditional transfer based on successor party's age, conditional transfer based on successor party's education, conditional transfer based on successor party's marital status, transfer conditional upon acceptance by successor party; transfer conditional upon timely acceptance, transfer conditional upon inspection by successor party, collective transfer of all virtual property rights of real-world party donor, transfer of multiple versions of the subject matter of the property right; authorize duplicate virtual attributes or aspects to be transferred; collective transfer of all virtual property rights to respective designated beneficiaries, transfer voided if successor party deceased, further transferability not authorized; transfer to occur at given date even if real-world party donor still alive; transfer conditional upon approval of third party; transfer made to trustee on behalf of successor party, transfer made to trustee on behalf of beneficiary; liquidating virtual world property right prior to transfer, obtaining liquidated virtual world value as subject of transfer, and obtaining liquidated real-world value as subject of transfer (block 1546). Other types of transfer requirements may be incorporated in a particular virtual world environment, and the listings herein are by way of example only.

Additional possible features include requiring something of real-world value or virtual world value from the real-world party as consideration for making an initial authorization or making a revised authorization (block 1547), and allowing the real-world party to revise a previous authorization for the transferring (block 1548).

With respect to a possible revision of a transfer authorization, a further process feature may allow the real-world party to make one or more of the following types of authorization changes: revoke the authorization; change the designated successor party; substitute one or more new designated successor parties; change the virtual world property right; divide the virtual world property right; transfer multiple rights; transfer multiple items; add contingency; identify one or more additional virtual world property rights; change a beneficiary; add one or more new beneficiaries; add secondary beneficiary; change a requirement; add one or more new requirements; add third party authorization; add joint owner authorization; and add group authorization (block 1549). Further types of revisions may also be included depending on the applicable rules and guidelines for a particular virtual world game or virtual world environment.

Figure 55:
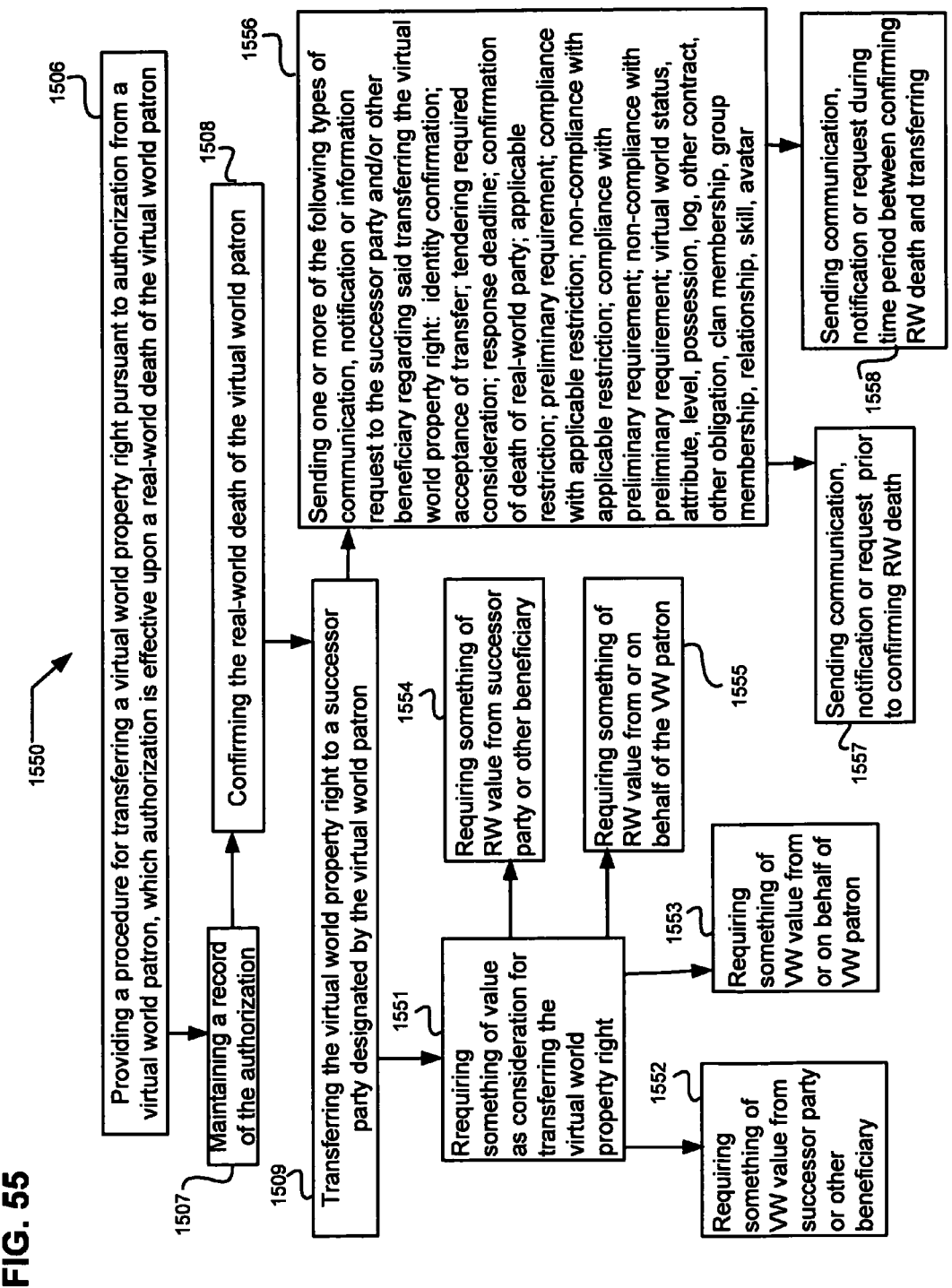

Additional exemplary embodiments 1550 as shown in the diagrams of FIG. 55 include previously described process features 1506, 1507, 1508, 1509. Other possible process features include requiring something of value as consideration for said transferring the virtual world property right (block 1551). Other exemplary features related to such consideration (e.g., fee, value token, vested right, etc.) include requiring something of real-world value from or on behalf of the virtual world patron (block 1555), requiring something of virtual world value from or on behalf of the virtual world patron (block 1553), requiring something of real-world value from the successor party or other beneficiary (block 1554), and requiring something of virtual world value from the successor party or other beneficiary (block 1552).

Further possible features include sending one or more of the following types of communication, notification or information request to the successor party and/or other beneficiary regarding said transferring the virtual world property right: identity confirmation; acceptance of transfer; tendering required consideration; response deadline; confirmation of death of real-world party; applicable restriction; preliminary requirement; compliance with applicable restriction; non-compliance with applicable restriction; compliance with preliminary requirement; non-compliance with preliminary requirement; virtual world status, attribute, level, possession, log, other contract, other obligation, clan membership, group membership, relationship, skill, and avatar (block 1556).

Other related features may include sending such communication, notification or request prior to said confirming the real-world death (block 1557), or during a time period between said confirming the real-world death and the transferring (block 1558).

Figure 56:
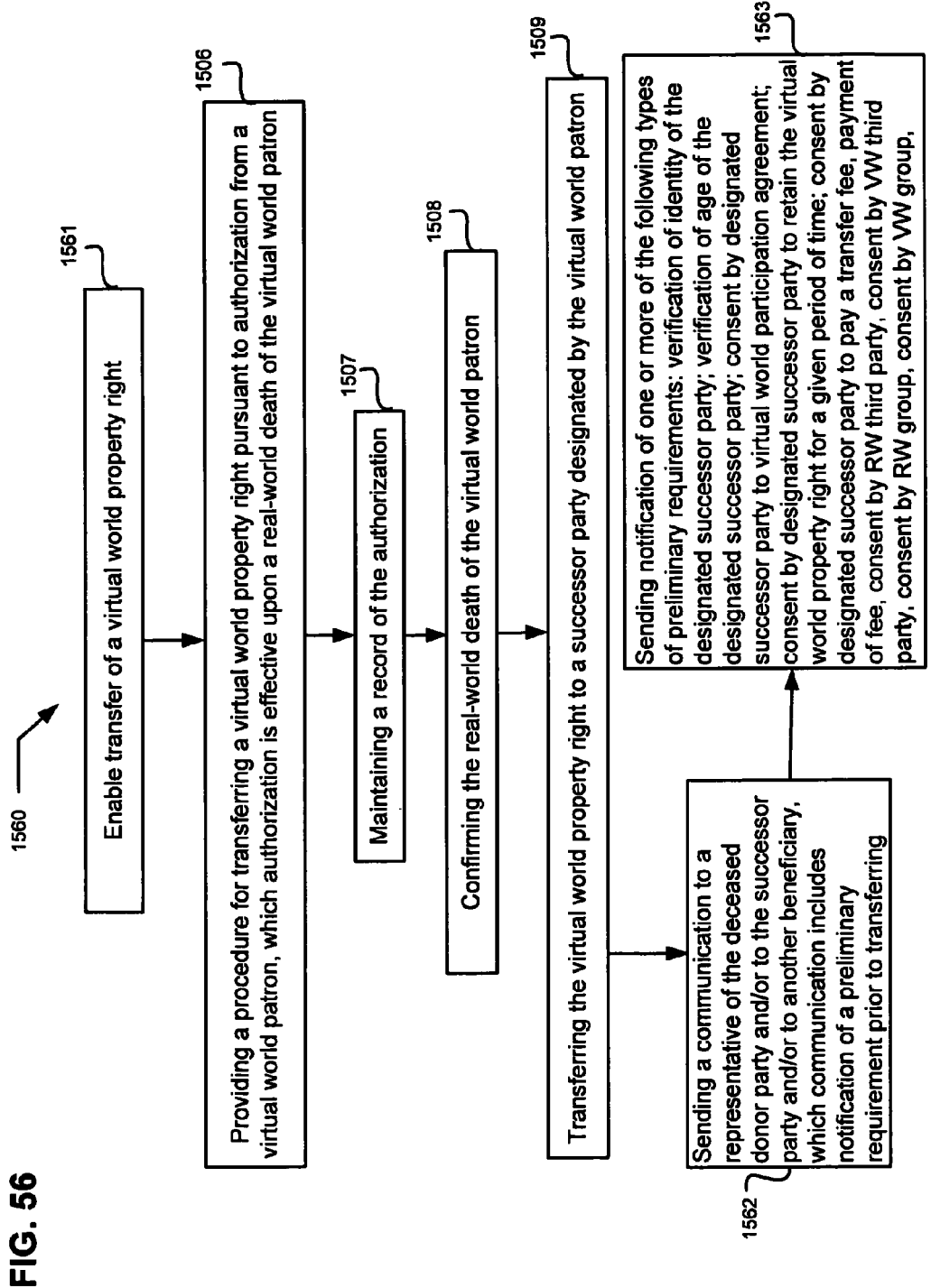

Referring to the flow chart diagram of FIG. 56, an exemplary implementation 1560 is shown for enabling transfer of a virtual world property right (block 1561). In addition to previously described features 1506, 1507, 1508, 1509, a further possible aspect includes sending a communication to a representative of the deceased donor party and/or to the successor party and/or to another beneficiary, which communication includes notification of a preliminary requirement prior to said transferring (block 1562).

Another exemplary process features includes sending notification of one or more of the following types of preliminary requirements: verification of identity of the designated successor party; verification of age of the designated successor party; consent by designated successor party to virtual world participation agreement; consent by designated successor party to retain the virtual world property right for a given period of time; and consent by designated successor party to pay a transfer fee, payment of fee, consent by real-world third party, consent by virtual world third party, consent by real-world group, and consent by virtual world group (block 1563).

Figure 57:
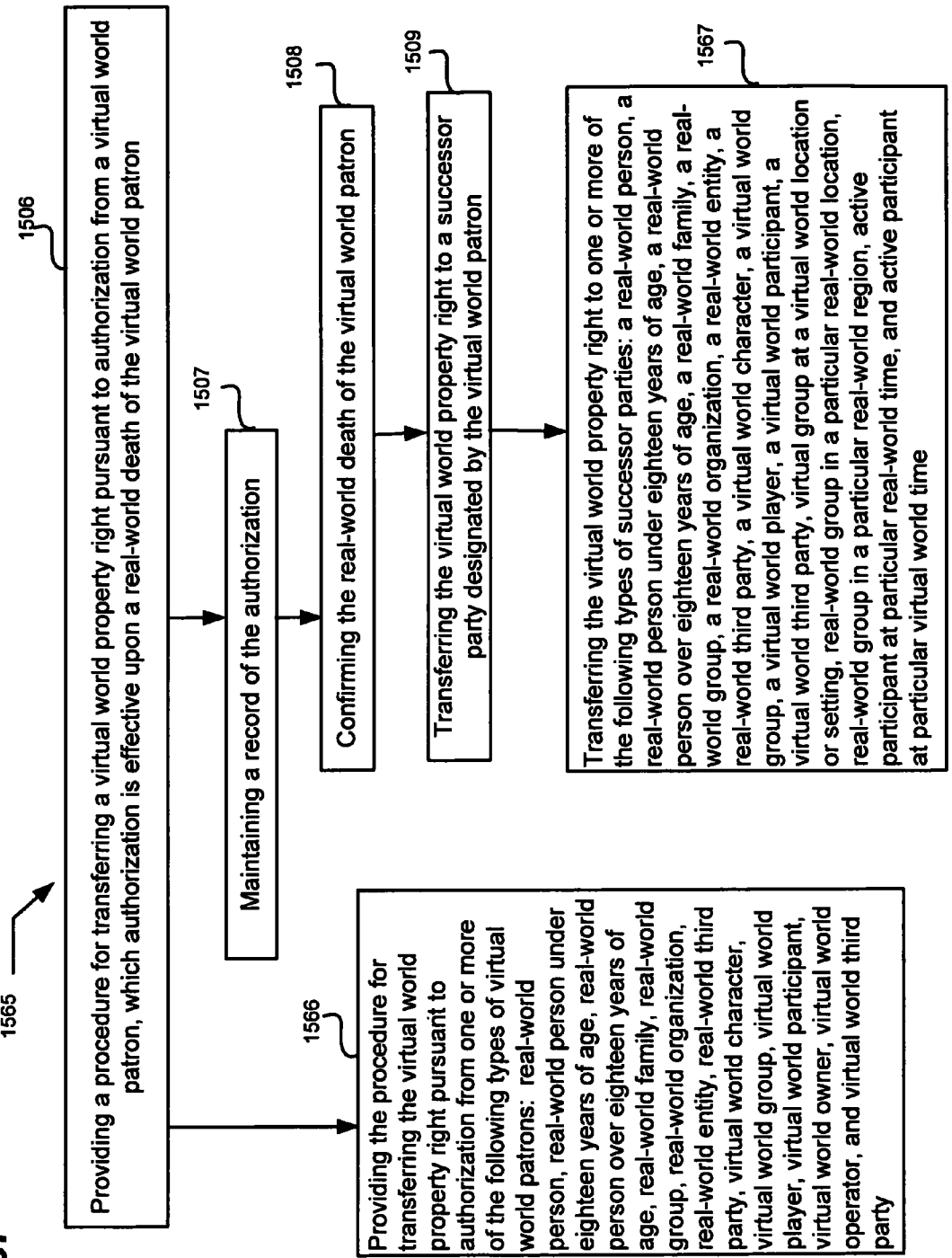

An additional embodiment 1565 shown in FIG. 57 includes previously described process features 1506, 1507, 1508, 1509. Another exemplary feature provides a procedure for transferring the virtual world property right pursuant to authorization from one or more of the following types of virtual world patrons: real-world person, real-world person under eighteen years of age, real-world person over eighteen years of age, real-world family, real-world group, real-world organization, real-world entity, real-world third party, virtual world character, virtual world group, virtual world player, virtual world participant, virtual world owner, virtual world operator, and virtual world third party (block 1566). Other types of donor parties may also make such a transfer, and the listing is not intended to be exhaustive.

A further possible process feature includes transferring the virtual world property right to one or more of the following types of successor parties: a real-world person, a real-world person under eighteen years of age, a real-world person over eighteen years of age, a real-world family, a real-world group, a real-world organization, a real-world entity, a real-world third party, a virtual world character, a virtual world group, a virtual world player, a virtual world participant, a virtual world third party, virtual group at a virtual world location or setting, real-world group in a particular real-world location, real-world group in a particular real-world region, active participant at particular real-world time, and active participant at particular virtual world time (block 1567). Of course other types of successor parties may be selected, depending upon the desires of the donor entity and the applicability of any transferability rules or guidelines.

Figure 58:
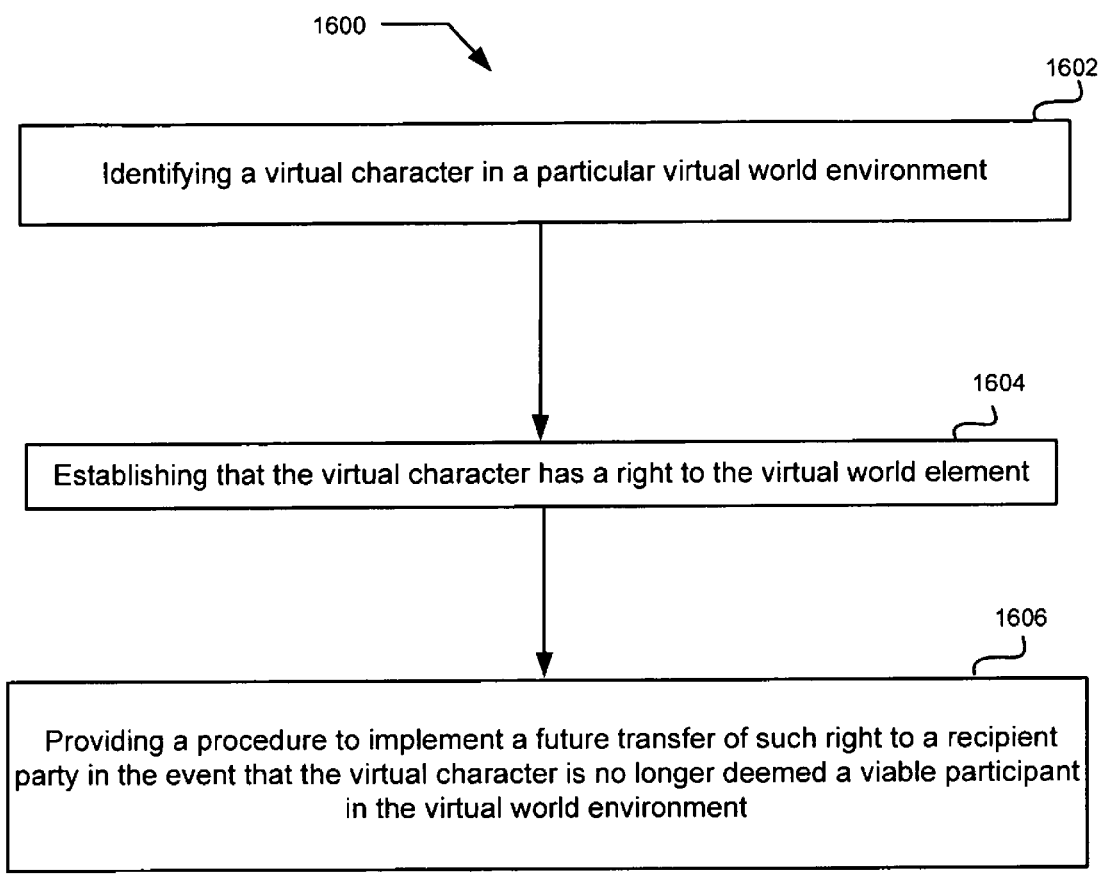
FIGS. 58-63 are additional detailed flow charts for other exemplary process embodiments.

FIG. 58 shows an exemplary high level implementation 1600 for a process embodiment that includes identifying a virtual character in a particular virtual world environment (block 1602), establishing that the virtual character has a right to the virtual world element (block 1604), and providing a procedure to implement a future transfer of such right to a recipient party in the event that the virtual character is no longer deemed a viable participant in the virtual world environment (block 1606).

Figure 59:
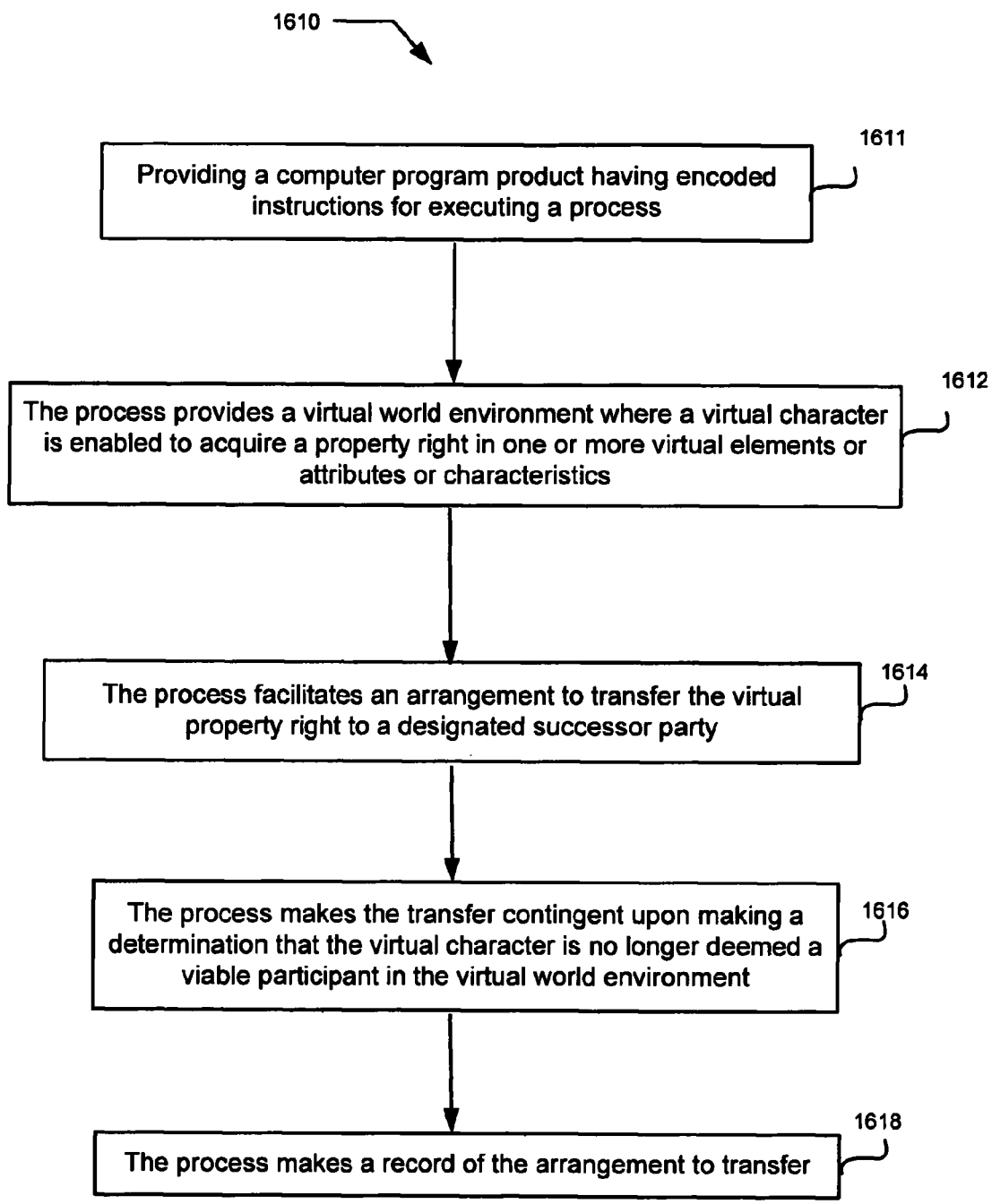

FIG. 59 shows an exemplary computer program product implementation 1610 that provides encoded instructions for executing a process. Such a process may include providing a virtual world environment where a virtual character is enabled to acquire a property right in one or more virtual elements or attributes or characteristics (block 1612), and facilitating an arrangement to transfer the virtual property right to a designated successor party (block 1614). The process may also include providing a transfer which is contingent upon making a determination that the virtual character is no longer deemed a viable participant in the virtual world environment (block 1616), and making a record of the arrangement to transfer (block 1618).

Figure 60:
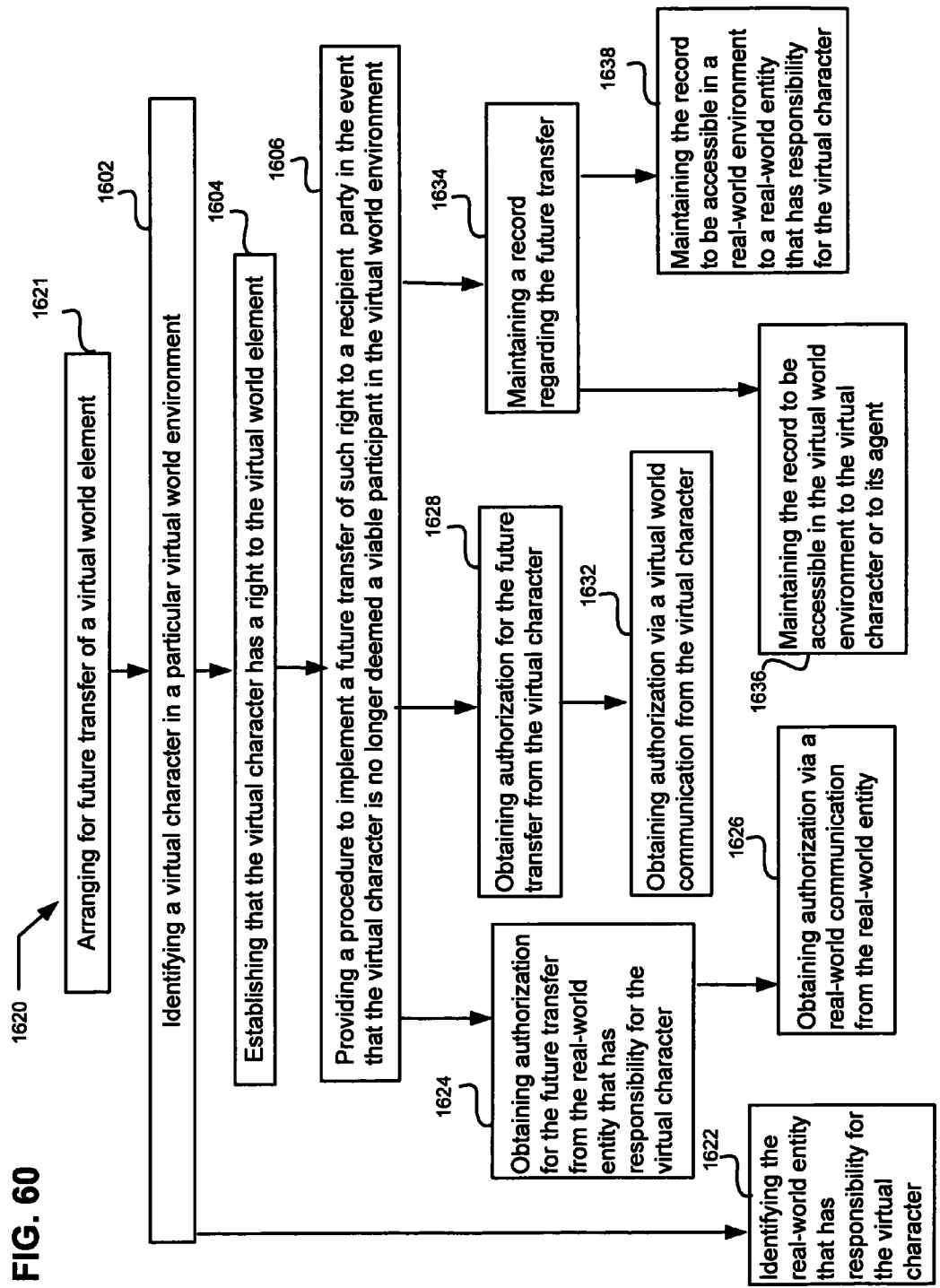

Referring to the detailed flow chart of FIG. 60, exemplary process embodiments 1620 are shown that arrange for future transfer of a virtual world element (block 1621). Process components may include previously described features 1602, 1604, 1606. Various possible features relating to authorization for the future transfer include obtaining authorization for the future transfer from the real-world entity that has responsibility for the virtual character (block 1624), obtaining authorization via a real-world communication from the real-world entity (block 1626), obtaining authorization for the future transfer from the virtual character (block 1628), and obtaining authorization via a virtual world communication from the virtual character (block 1632).

A further exemplary process feature identifies the real-world entity that has responsibility for the virtual character (block 1622).

Other exemplary features shown in FIG. 60 relating to data records include maintaining a record regarding the future transfer (block 1634), maintaining the record to be accessible in the virtual world environment to the virtual character or to its agent (block 1636), and maintaining the record to be accessible in a real-world environment to a real-world entity that has responsibility for the virtual character (block 1638).

Figure 61:
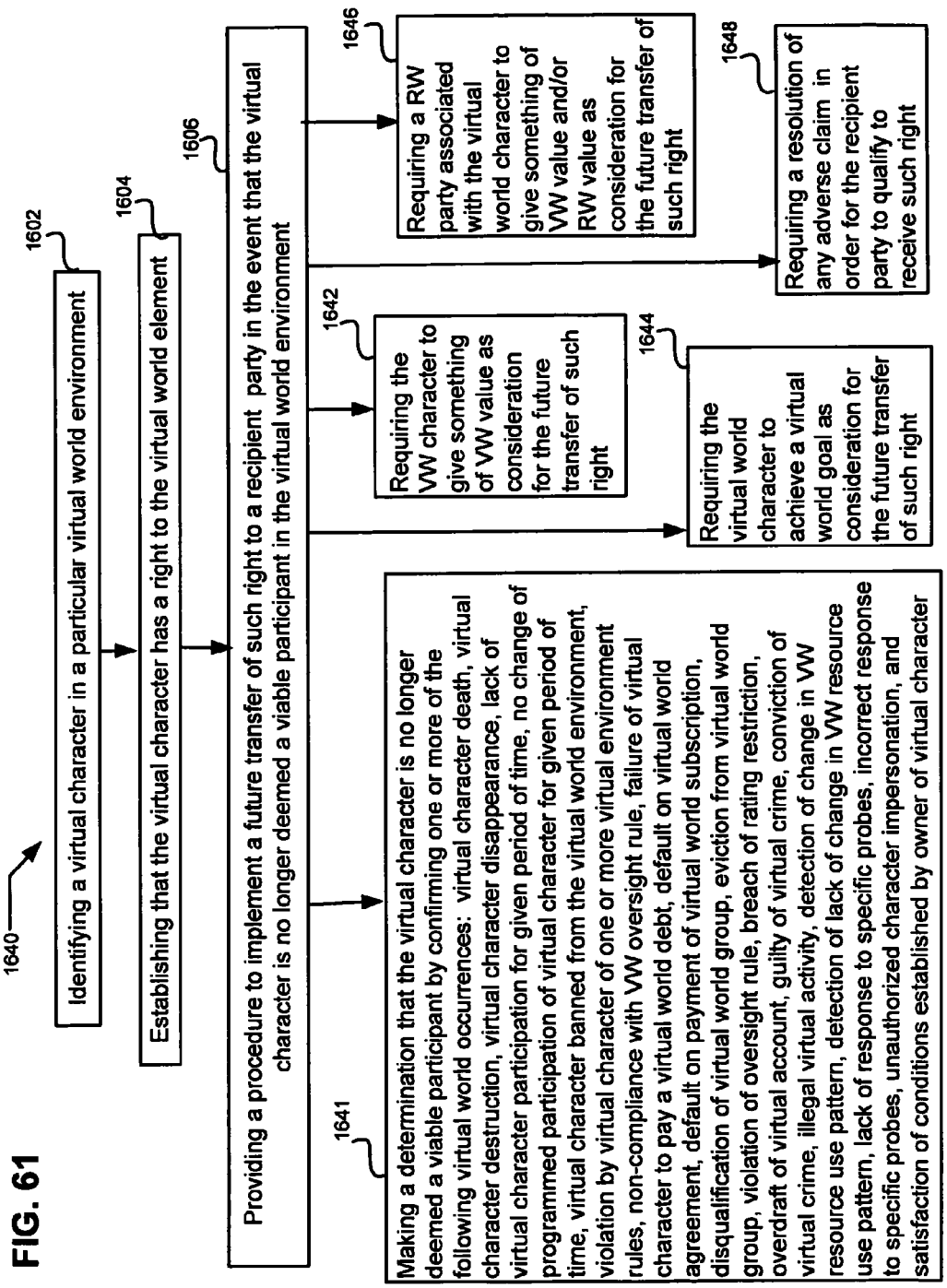

The exemplary embodiments 1640 illustrated in FIG. 61 include previously described process features 1602, 1604, 1606 as well as various possible requirements related to the future transfer of a right to a virtual world element. Such requirements may include requiring the virtual world character to give something of virtual world value as consideration for the future transfer of such right (block 1642), requiring the virtual world character to achieve a virtual world goal as consideration for the future transfer of such right (block 1644), and requiring a real-world party associated with the virtual world character to give something of virtual world value and/or real-world value as consideration for the future transfer of such right (block 1646).

A further possible related feature includes requiring a resolution of any adverse claim in order for the recipient party to qualify to receive such right (block 1648).

A further possible feature included in the exemplary embodiments 1640 of FIG. 61 includes making a determination that the virtual character is no longer deemed a viable participant by confirming one or more of the following virtual world occurrences: virtual character death, virtual character destruction, virtual character disappearance, lack of virtual character participation for given period of time, no change of programmed participation of virtual character for given period of time, virtual character banned from the virtual world environment, violation by virtual character of one or more virtual environment rules, non-compliance with VW oversight rule, failure of virtual character to pay a virtual world debt, default on virtual world agreement, default on payment of virtual world subscription, disqualification of virtual world group, eviction from virtual world group, violation of oversight rule, breach of rating restriction, overdraft of virtual account, guilty of virtual crime, conviction of virtual crime, illegal virtual activity, detection of change in VW resource use pattern, detection of lack of change in VW resource use pattern, lack of response to specific probes, incorrect response to specific probes, unauthorized character impersonation, and satisfaction of conditions established by owner of virtual character (block 1641). It is not possible to list all types of such occurrences in a virtual world environment. Accordingly it will be understood that occurrences listed are by way of example only.

Figure 62:
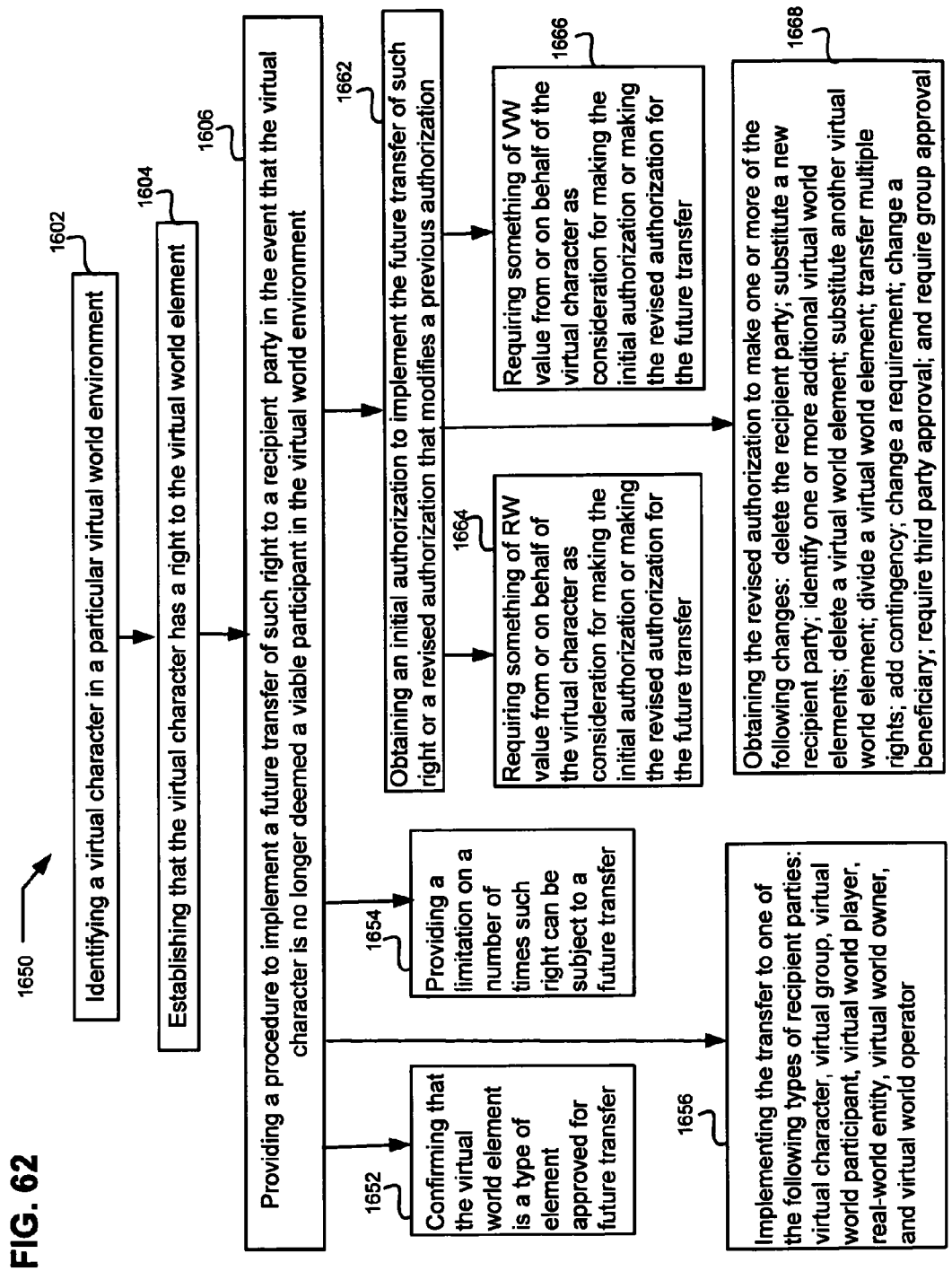

Referring to the detailed flow chart diagram of FIG. 62, various exemplary embodiments 1650 are shown that include previously described process features 1602, 1604, 1606. Other possible process components include confirming that the virtual world element is a type of element approved for future transfer (block 1652) and providing a limitation on a number of times such right can be subject to a future transfer (block 1654).

Another possible aspect includes implementing the transfer to one of the following types of recipient parties: virtual character, virtual group, virtual world participant, virtual world player, real-world entity, virtual world owner, and virtual world operator (block 1656).

Further possible process features may include obtaining an initial authorization to implement the future transfer of such right or a revised authorization that modifies a previous authorization (block 1662). Other possible aspects relating to such authorizations include requiring something of real-world value (block 1664) as well as requiring something of virtual world value (block 1666) from or on behalf of the virtual character as consideration for making the initial authorization or making the revised authorization for the future transfer.

Another exemplary process feature includes obtaining the revised authorization to make one or more of the following changes: delete the recipient party; substitute a new recipient party; identify one or more additional virtual world elements; delete a virtual world element; substitute another virtual world element; divide a virtual world element, transfer multiple rights; add contingency; change a requirement; change a beneficiary; require third party approval; and require group approval (block 1668).

Figure 63:
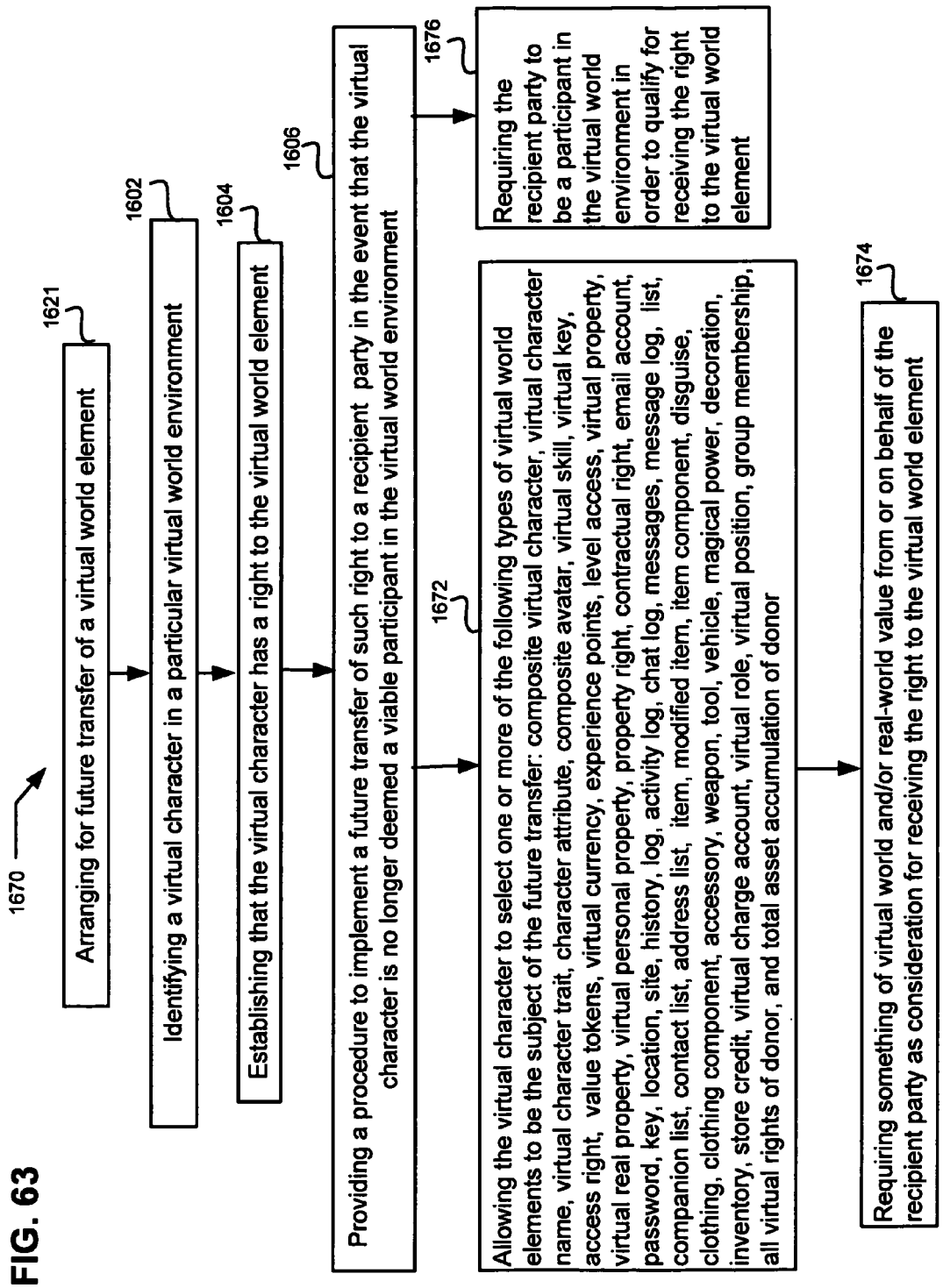

Referring to FIG. 63, additional process embodiments 1670 may include previously described process features 1621, 1602, 1604, 1606. An additional possible feature includes allowing the virtual character to select one or more of the following types of virtual world elements to be the subject of the future transfer: composite virtual character, virtual character name, virtual character trait, character attribute, composite avatar, virtual skill, virtual key, access right, value tokens, virtual currency, experience points, level access, virtual property, virtual real property, virtual personal property, property right, contractual right, email account, password, key, location, site, history, log, activity log, chat log, messages, message log, list, companion list, contact list, address list, item, modified item, item component, disguise, clothing, clothing component, accessory, weapon, tool, vehicle, magical power, decoration, inventory, store credit, virtual charge account, virtual role, virtual position, group membership, all virtual rights of donor, and total asset accumulation of donor (block 1672). Of course other individual or collective types of VW elements may be the subject matter of a future transfer.

Further exemplary aspects may include requiring something of virtual world and/or real-world value from or on behalf of the recipient party as consideration for receiving the right to the virtual world element (block 1674), and requiring the recipient party to be a participant in the virtual world environment in order to qualify for receiving the right to the virtual world element (block 1676). The value ascribed to such consideration may be based on a somewhat objective (e.g., RW or VW currency) or a somewhat subjective standard (e.g., entry level key, personality trait, value token, etc.).

Figure 64:
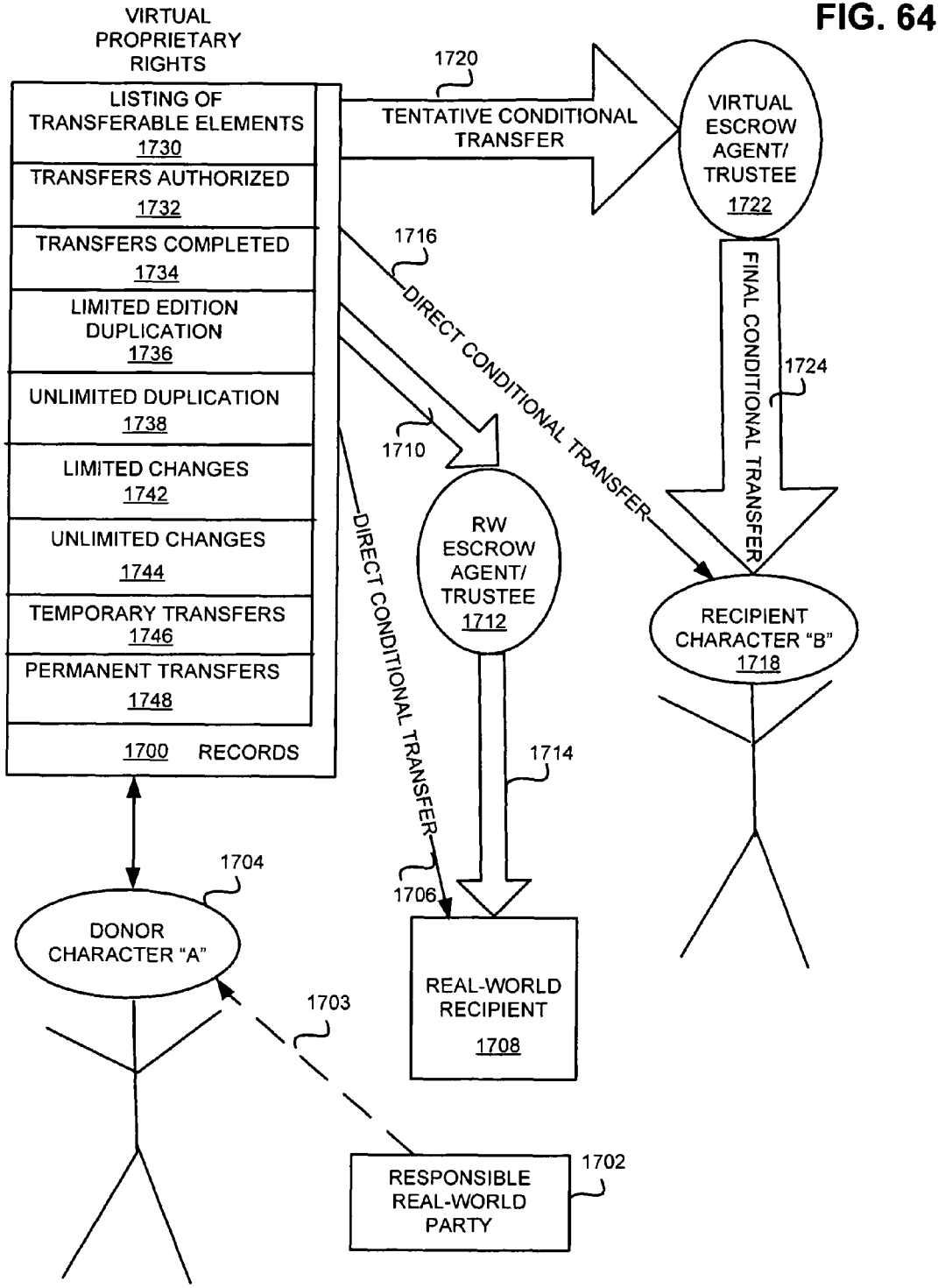
FIG. 64 is a schematic block diagram showing exemplary embodiments for conditional transfer of virtual proprietary rights.

Referring to embodiments shown in FIG. 64, an implementation of exemplary data records 1700 regarding virtual proprietary rights may include exemplary records such as a listing of transferable elements 1730, transfers authorized 1732, transfers completed 1734, limited edition duplications 1736, unlimited duplications 1738, limited changes 1742, unlimited changes 1744, temporary transfers 1746, and permanent transfers 1748. Of course some record categories may be optional, and other additional record categories may be added depending on the circumstances.

As shown in FIG. 64, an authorization may be initiated by a responsible real-world party 1702 that is acting through (see dashed arrow 1703) an associated donor character "A" 1704. Based on the information included in the authorization, a direct conditional transfer 1706 may by implemented to a real-world recipient 1708 of the transferred virtual right. However in some instances a tentative conditional transfer 1710 may be made to a real-world escrow agent/trustee 1712 along with conditional escrow instructions regarding required terms and/or conditions for completing a delivery 1714 to the real-world recipient 1708.

As further shown in FIG. 64, an authorization may be initiated by a donor character "A" 1704, which authorization may in some instances not be corroborated by any real-time confirmation or authentication from the responsible real-world party 1702. Such virtual authorization may cause a direct conditional transfer 1716 to a virtual recipient character "B" 1718. However in some instances a tentative conditional transfer 1720 may be made to a virtual escrow agent/trustee 1722 along with conditional escrow instructions regarding required terms and/or conditions for completing a delivery 1724 to the recipient virtual character "B" 1718.

It will be understood that a follow-up confirmation technique may provided to assure that an authorization has actually come from a responsible real-world party that has authority to request such a conditional transfer.

Figure 65:
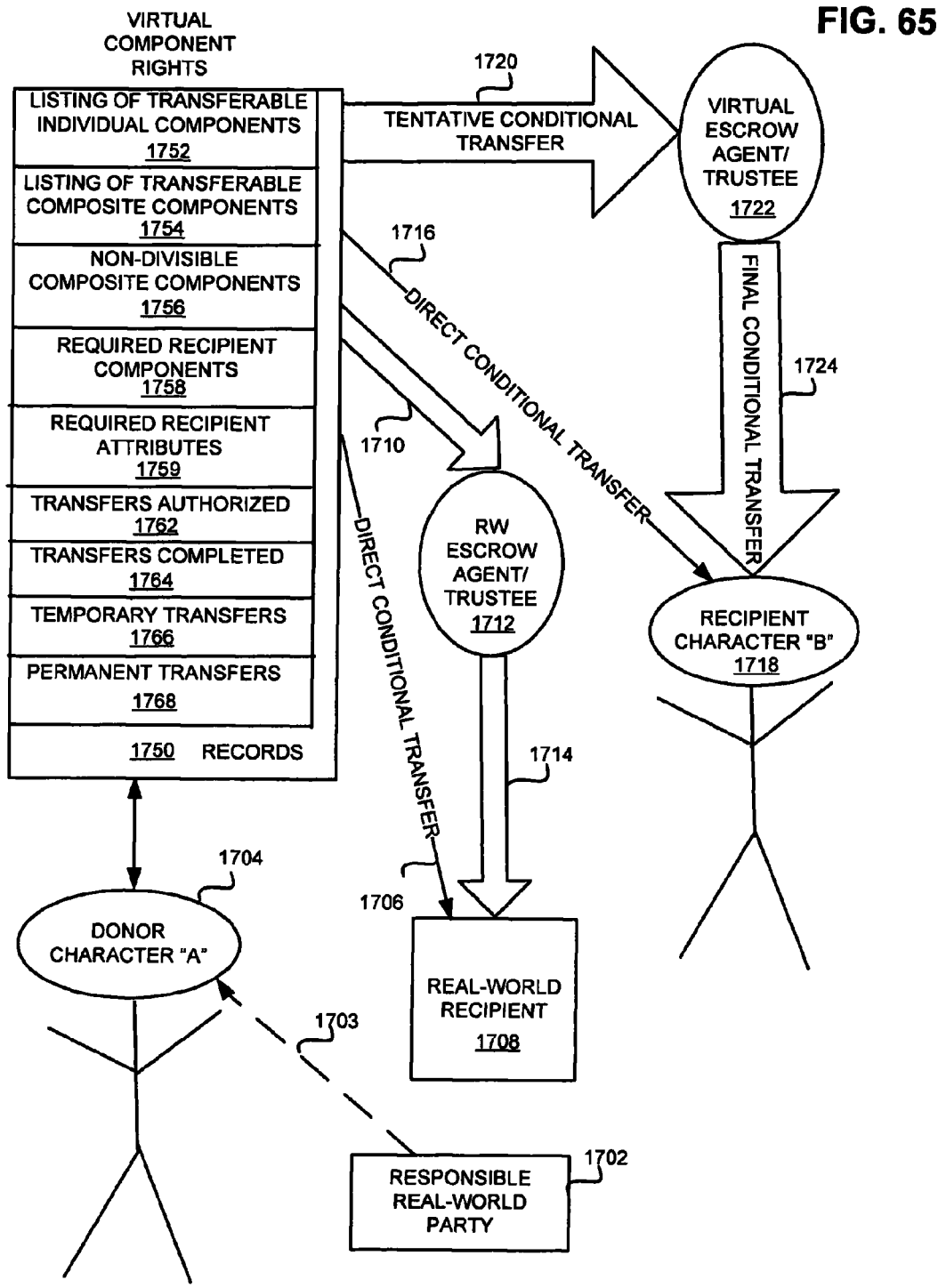
FIG. 65 is another schematic block diagram showing additional exemplary embodiments for conditional transfer of virtual component rights.

Referring to embodiments shown in FIG. 65, an implementation of exemplary data records 1750 regarding virtual component rights may include exemplary records such as a listing of transferable individual components 1752, listing of transferable composite components 1754, non-divisible composite components 1756, required recipient components 1758 (e.g., virtual aspects, elements, etc.), required recipient attributes 1759. Other records may include transfers authorized 1762, transfers completed 1764, temporary transfers 1766, and permanent transfers 1768. Of course some record categories may be optional, and other additional record categories may be added depending on the circumstances.

The illustrated conditional transfer techniques involve direct conditional transfers 1707, 1716 as well as tentative conditional transfers 1710, 1720 based on transactional interaction between various parties and virtual characters 1702, 1704, 1708, 1712, 1722, 1718. The previous related detailed description for FIG. 64 is also applicable with respect to FIG. 65 implementations.

Figure 66:
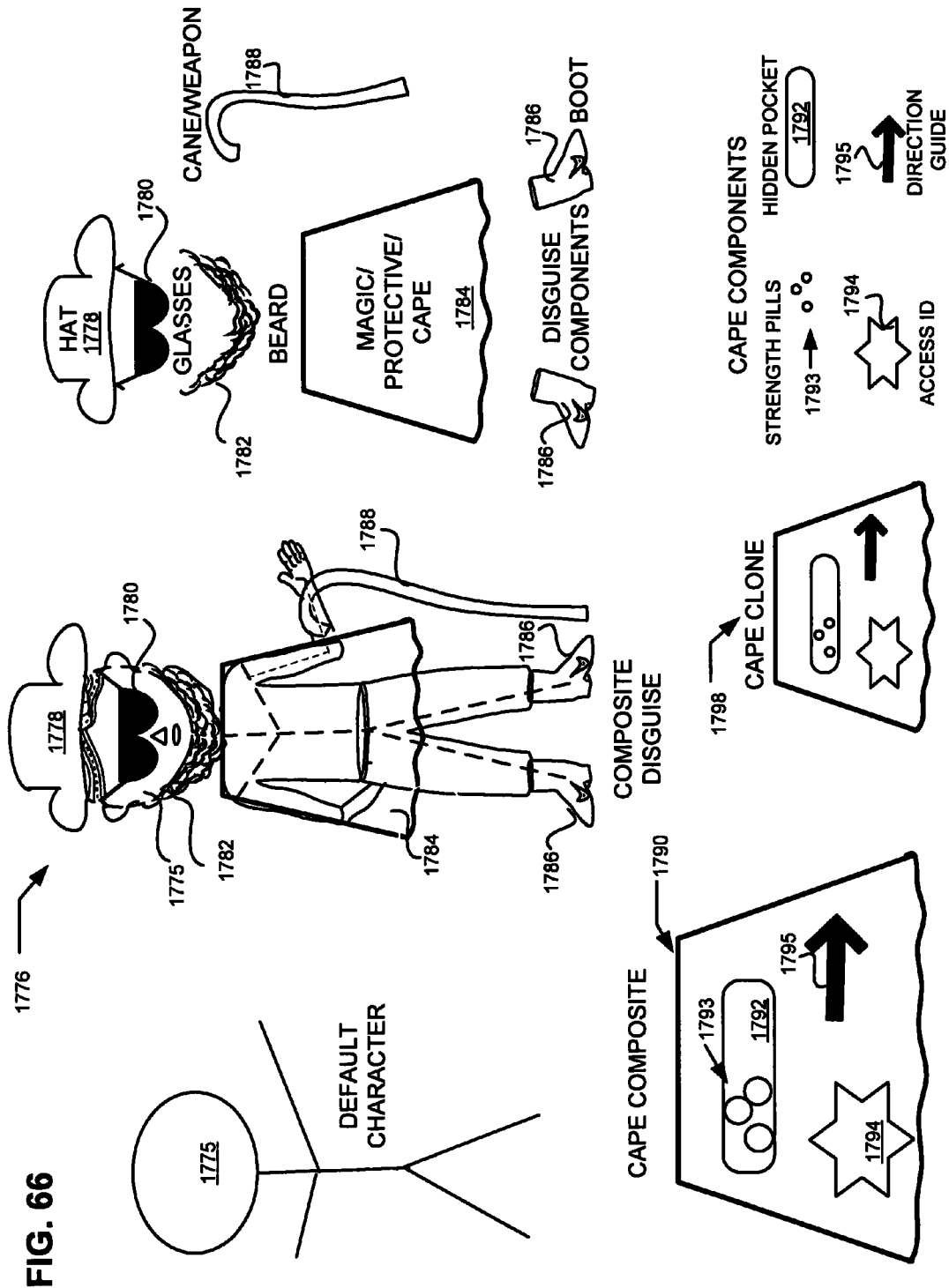
FIG. 66 schematically illustrates exemplary types of virtual objects that may be transferable to a recipient.

Schematic diagram illustrations for embodiments 1776 shown in FIG. 66 relate to default character 1775 which may function as a donor party as well as a recipient party. An active alter ego character 1775 may posses a composite disguise including hat 1778, glasses 1780, beard 1782, magical protective cape 1784, boots 1786 and multiple use cane/weapon 1788. Some of these components may have unit parts that are indivisible (e.g., cane/weapon 1788). Others may be capable of independent existence and/or composite existence (e.g., cape composite 1790). A composite non-divisible property right may include a virtual right to make one or more composite copies 1798 including but not limited to an identical "clone" copy and/or modified copies.

In some instances individual elements/units of the cape composite may be divisible, such as hidden pocket 1792, strength pills 1793, access ID 1794, direction guide 1795. Such divisible/non-divisible characteristics may be determined by a game owner or operator. In some instances a donor party and/or a recipient party may be enabled to make such a determination in a particular virtual world environment setting.

Figure 67:
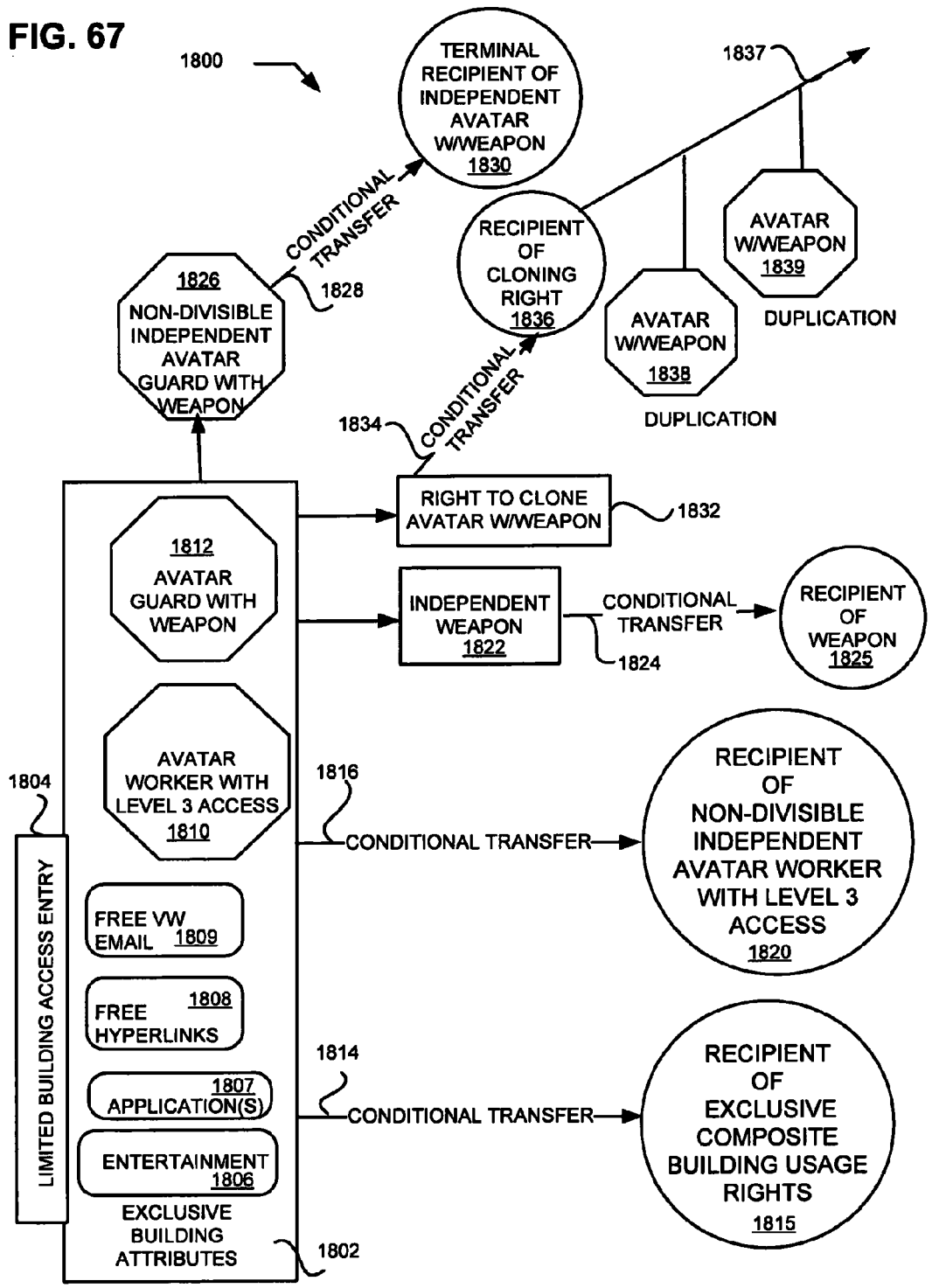
FIG. 67 is a schematic block diagram showing various aspects that may be included in exemplary implementations for conditional transfer of a virtual property right.

The embodiments 1800 of FIG. 67 show different possible types of transferable virtual rights. As shown such rights may include exclusive building attributes 1802 related to entertainment 1806, one or more applications 1807, one or more free hyperlinks 1808, and free VW email 1809 as well as a limited building access entry 1804. For example, a conditional transfer 1814 may provide a recipient with exclusive composite building usage rights 1815.

Other possible virtual objects that may be subject to transferable rights include an avatar worker with level 3 access 1810. For example, a conditional transfer 1816 may provide a recipient with usage of a non-divisible independent avatar worker with level 3 access 1820.

Another possible virtual object that may be subject to transferable rights includes an avatar guard with weapon 1812. For example, an independent weapon component 1822 may be subject to a conditional transferable right 1824 authorized for delivery to a weapon recipient 1825. In contrast, a very different virtual cloning right 1836 regarding the composite avatar/weapon 1832 may be subject to a conditional transfer 1834 to a recipient 1836. Such recipient may thereafter be able to make authorized duplications 1837 of a composite avatar w/weapon 1838, 1839.

As another possibility, a non-divisible independent avatar guard with weapon 1826 may be the subject of a conditional transfer 1828 to a terminal recipient 1830 (e.g., no more transfers are authorized).

It will be understood that various other divisible and/or non-divisible/and or combinations thereof may be incorporated as part of an exemplary embodiment regarding transferable virtual objects and components (e.g., aspects, attributes, elements, units, etc.).

Figure 68:
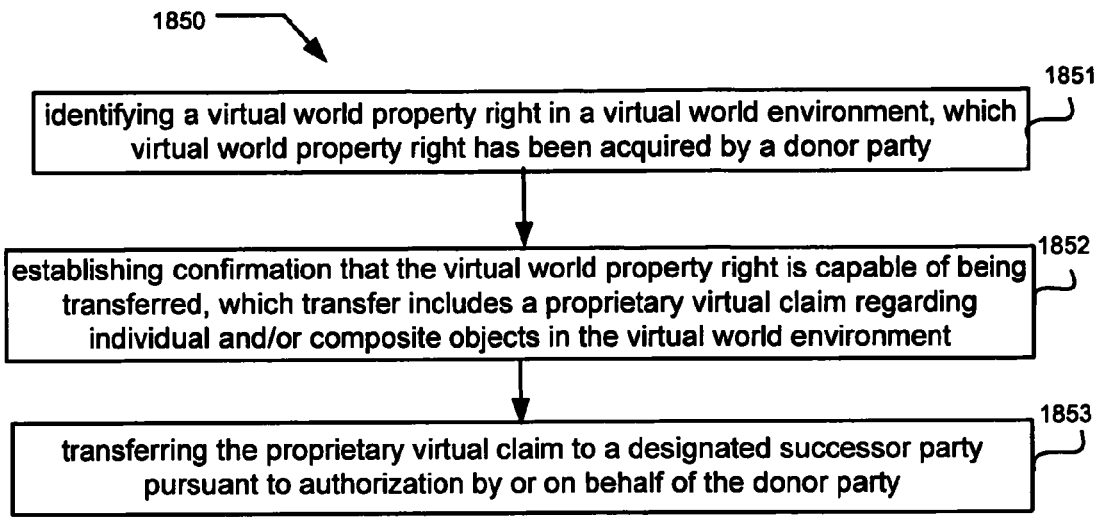
FIGS. 68-69 are high level flow charts for exemplary process embodiments.

Referring to an exemplary embodiment 1850 of the flow chart of FIG. 68, a process implementation provides a method of resolving virtual world property ownership, including identifying a virtual world property right in a virtual world environment, which virtual world property right has been acquired by a donor party (block 1851); establishing confirmation that the virtual world property right is capable of being transferred, which transfer includes a proprietary virtual claim regarding individual and/or composite objects in the virtual world environment (block 1852); and pursuant to authorization by or on behalf of the donor party, transferring the proprietary virtual claim to a designated successor party (block 1853).

Figure 69:
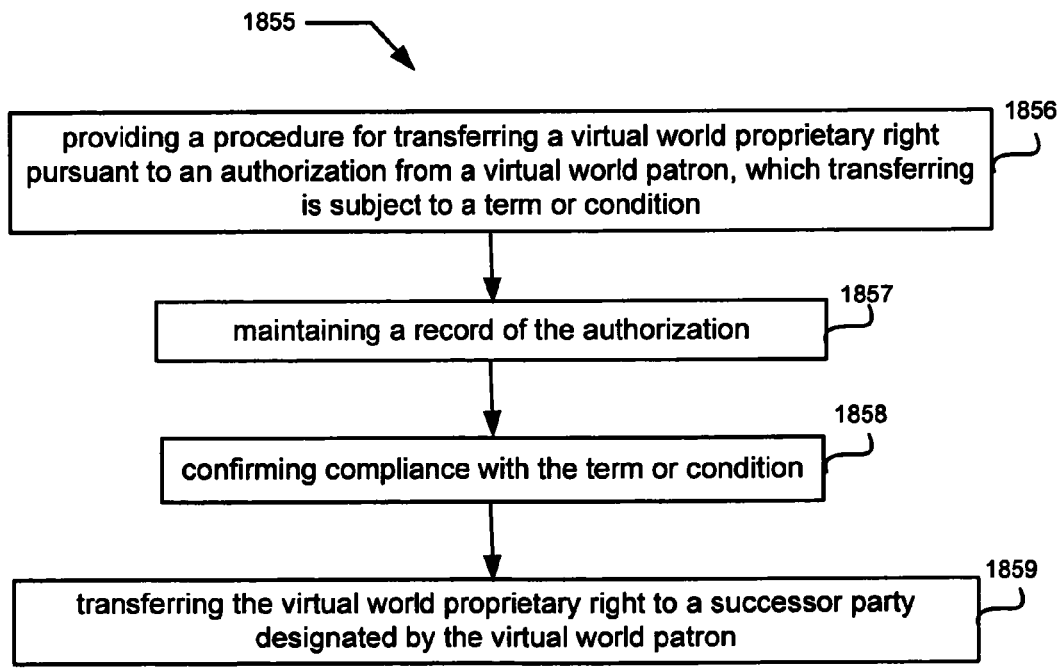

Another exemplary embodiment 1855 shown in FIG. 69 includes providing a procedure for transferring a virtual world proprietary right pursuant to an authorization from a virtual world patron, which transferring is subject to a term or condition (block 1856), and maintaining a record of the authorization (block 1857). Additional process features may include confirming compliance with the term or condition (block 1858), and transferring the virtual world proprietary right to a successor party designated by the virtual world patron (block 1859).

Figure 70:
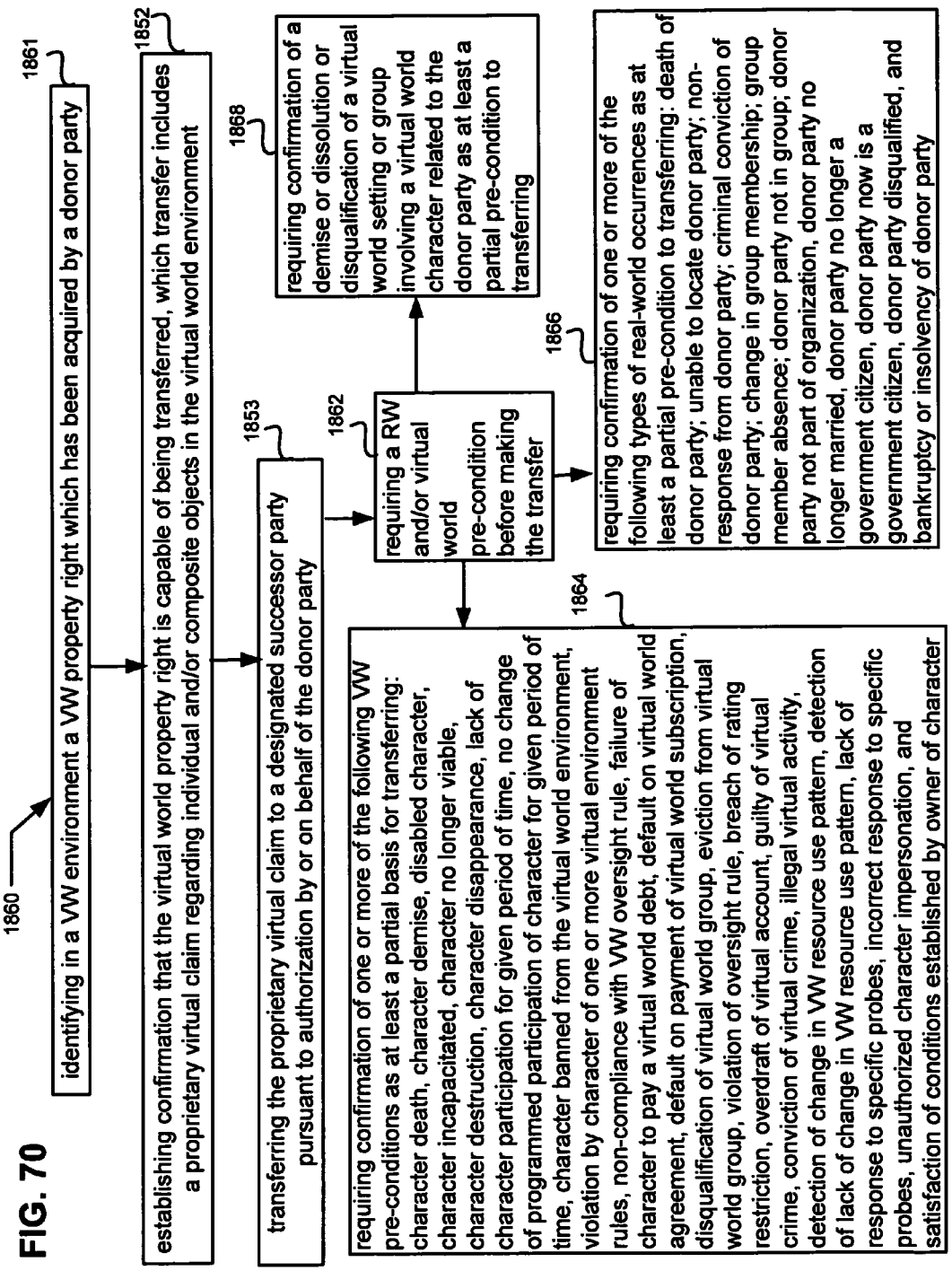
FIGS. 70-77 are more detailed flow charts for additional exemplary embodiments.

Additional detailed implementations 1860 shown in FIG. 70 include identifying in a VW environment a VW property right which as been acquired by a donor party (block 1861). Also included are previously described process features 1852, 1853. Other possible aspects include requiring a real-world and/or virtual world pre-condition before making the transfer (block 1862).

Further aspects may include requiring confirmation of one or more of the following types of real-world occurrences as at least a partial pre-condition to the transferring: death of donor party; unable to locate donor party; non-response from donor party; criminal conviction of donor party; change in group membership; group member absence; donor party not in group; donor party not part of organization, donor party no longer married, donor party no longer a government citizen, donor party now is a government citizen, donor party disqualified, and bankruptcy or insolvency of donor party (block 1866).

Another possible aspect requires confirmation of one or more of the following virtual world pre-conditions as at least a partial basis for the transferring: character death, character demise, disabled character, character incapacitated, character no longer viable, character destruction, character disappearance, lack of character participation for given period of time, no change of programmed participation of character for given period of time, character banned from the virtual world environment, violation by character of one or more virtual environment rules, non-compliance with VW oversight rule, failure of character to pay a virtual world debt, default on virtual world agreement, default on payment of virtual world subscription, disqualification of virtual world group, eviction from virtual world group, violation of oversight rule, breach of rating restriction, overdraft of virtual account, guilty of virtual crime, conviction of virtual crime, illegal virtual activity, detection of change in VW resource use pattern, detection of lack of change in VW resource use pattern, lack of response to specific probes, incorrect response to specific probes, unauthorized character impersonation, and satisfaction of conditions established by owner of character (block 1864).

A further process feature may require confirmation of a demise or dissolution or disqualification of a virtual world setting or group involving a virtual world character related to the donor party as at least a partial pre-condition to the transferring (block 1868).

Figure 71:
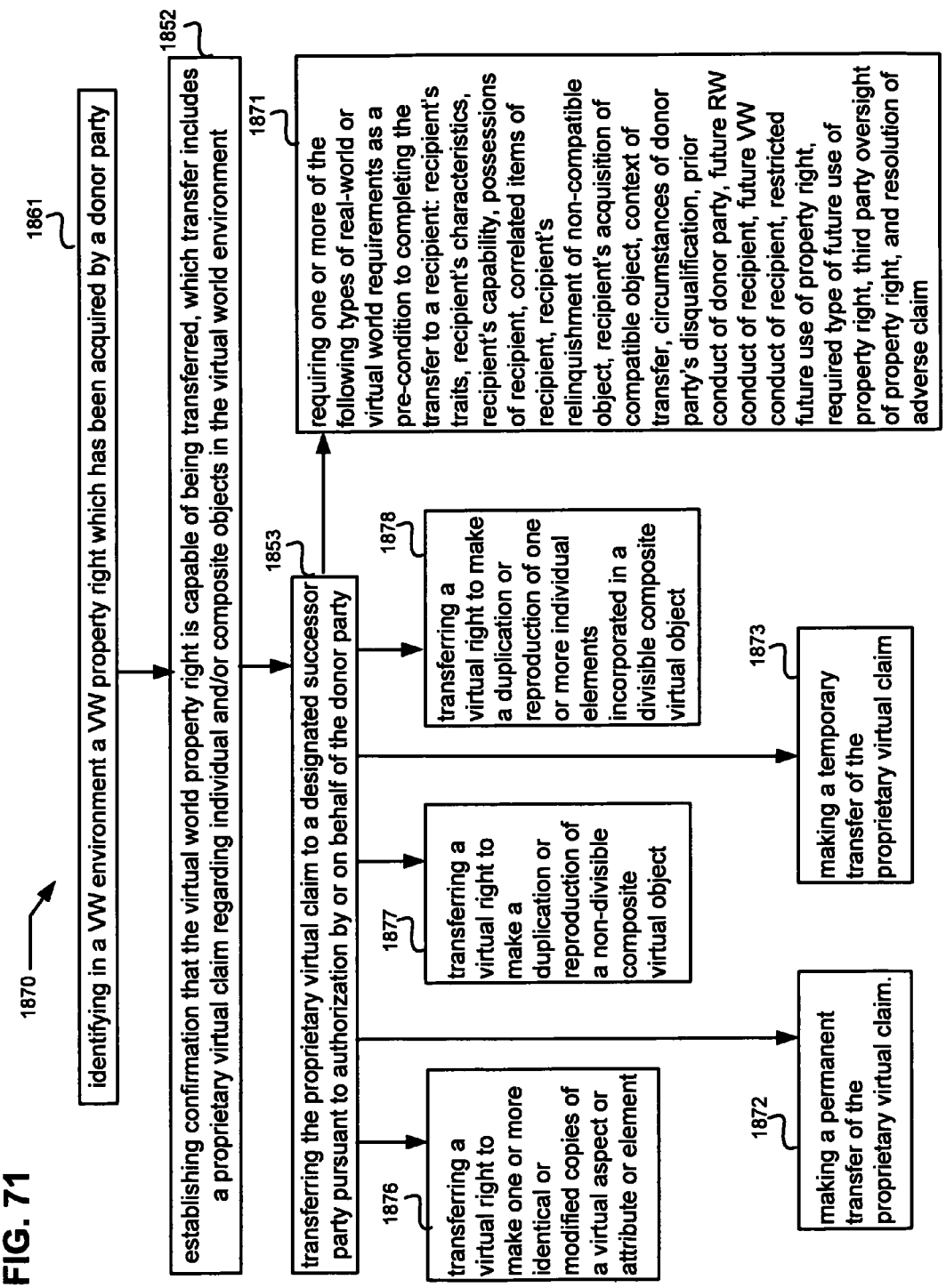

Referring to embodiments 1870 shown in FIG. 71, an exemplary process includes previously described process features 1861, 1852, 1853. Another possible feature includes transferring a virtual right to make one or more identical or modified copies of a virtual aspect or attribute or element (block 1876). Additional aspects may include transferring a virtual right to make a duplication or reproduction of a non-divisible composite virtual object (block 1877), and transferring a virtual right to make a duplication or reproduction of one or more individual elements incorporated in a divisible composite virtual object (block 1878).

Other exemplary features include requiring one or more of the following types of real-world or virtual world requirements as a pre-condition to completing the transfer to a recipient: recipient's traits, recipient's characteristics, recipient's capability, possessions of recipient, correlated items of recipient, recipient's relinquishment of non-compatible object, recipient's acquisition of compatible object, context of transfer, circumstances of donor party's disqualification, prior conduct of donor party, future RW conduct of recipient, future VW conduct of recipient, restricted future use of property right, required type of future use of property right, third party oversight of property right, and resolution of adverse claim (block 1871).

The embodiments of FIG. 71 may also include making a permanent transfer of the proprietary virtual claim (block 1872), and making a temporary transfer of the proprietary virtual claim (block 1873).

Figure 72:
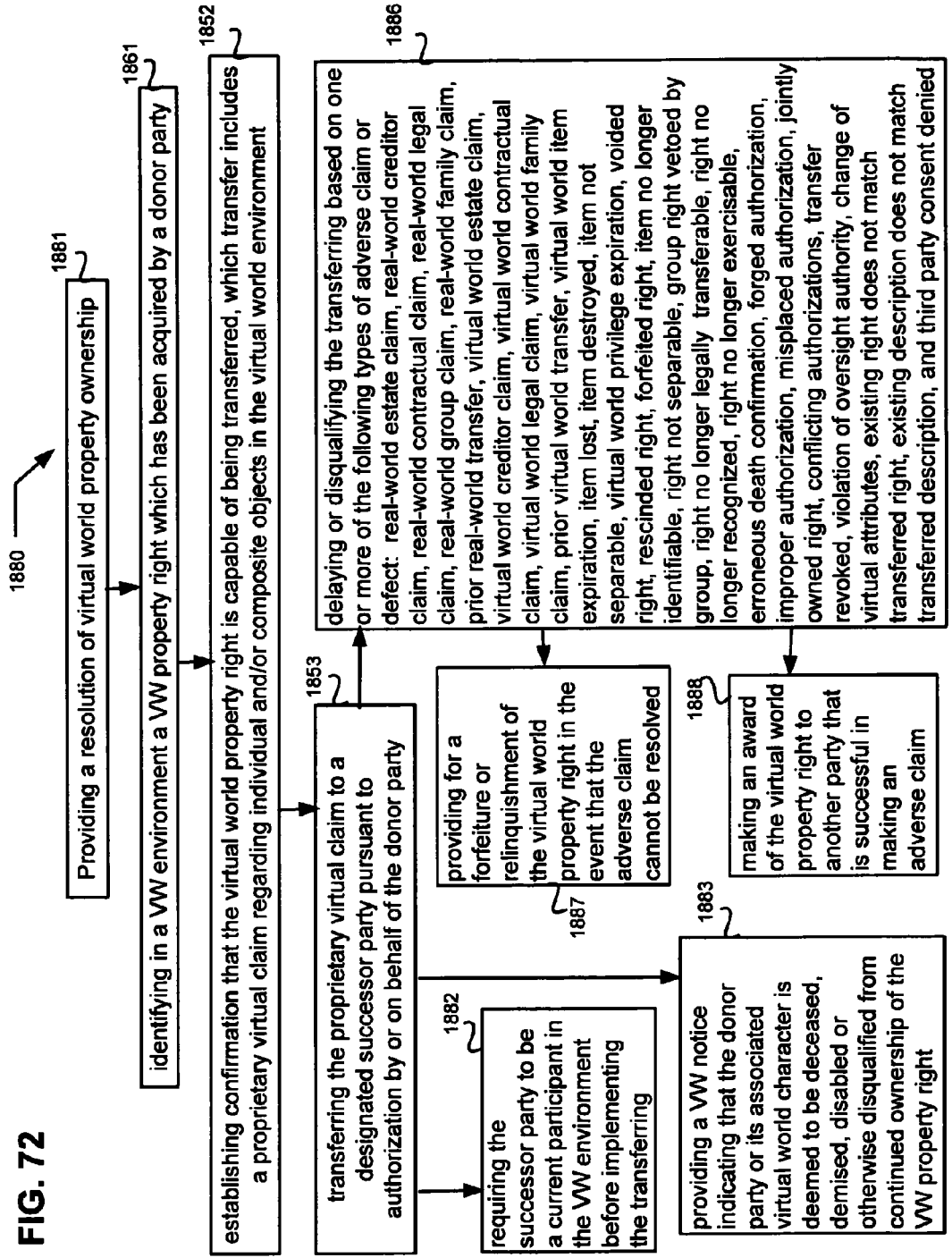

The process embodiments 1880 of FIG. 72 relate to providing a resolution of virtual world property ownership, including previously described process features 1861, 1852, 1853. Other aspects may include delaying or disqualifying the transferring based on one or more of the following types of adverse claim or defect: real-world estate claim, real-world creditor claim, real-world contractual claim, real-world legal claim, real-world group claim, real-world family claim, prior real-world transfer, virtual world estate claim, virtual world creditor claim, virtual world contractual claim, virtual world legal claim, virtual world family claim, prior virtual world transfer, virtual world item expiration, item lost, item destroyed, item not separable, virtual world privilege expiration, voided right, rescinded right, forfeited right, item no longer identifiable, right not separable, group right vetoed by group, right no longer legally transferable, right no longer recognized, right no longer exercisable, erroneous death confirmation, forged authorization, improper authorization, misplaced authorization, jointly owned right, conflicting authorizations, transfer revoked, violation of oversight authority, change of virtual attributes, existing right does not match transferred right, existing description does not match transferred description, and third party consent denied (block 1886).

Further exemplary features shown include providing for a forfeiture or relinquishment of the virtual world property right in the event that the adverse claim cannot be resolved (block 1887), and making an award of the virtual world property right to another party that is successful in making an adverse claim (block 1888).

Other possible features shown in FIG. 72 includes providing a virtual world notice indicating that the donor party or its associated virtual world character is deemed to be deceased, demised, disabled or otherwise disqualified from continued ownership of the VW property right (block 1883), and requiring the successor party to be a current participant in the virtual world environment before implementing the transferring (block 1882).

Figure 73:
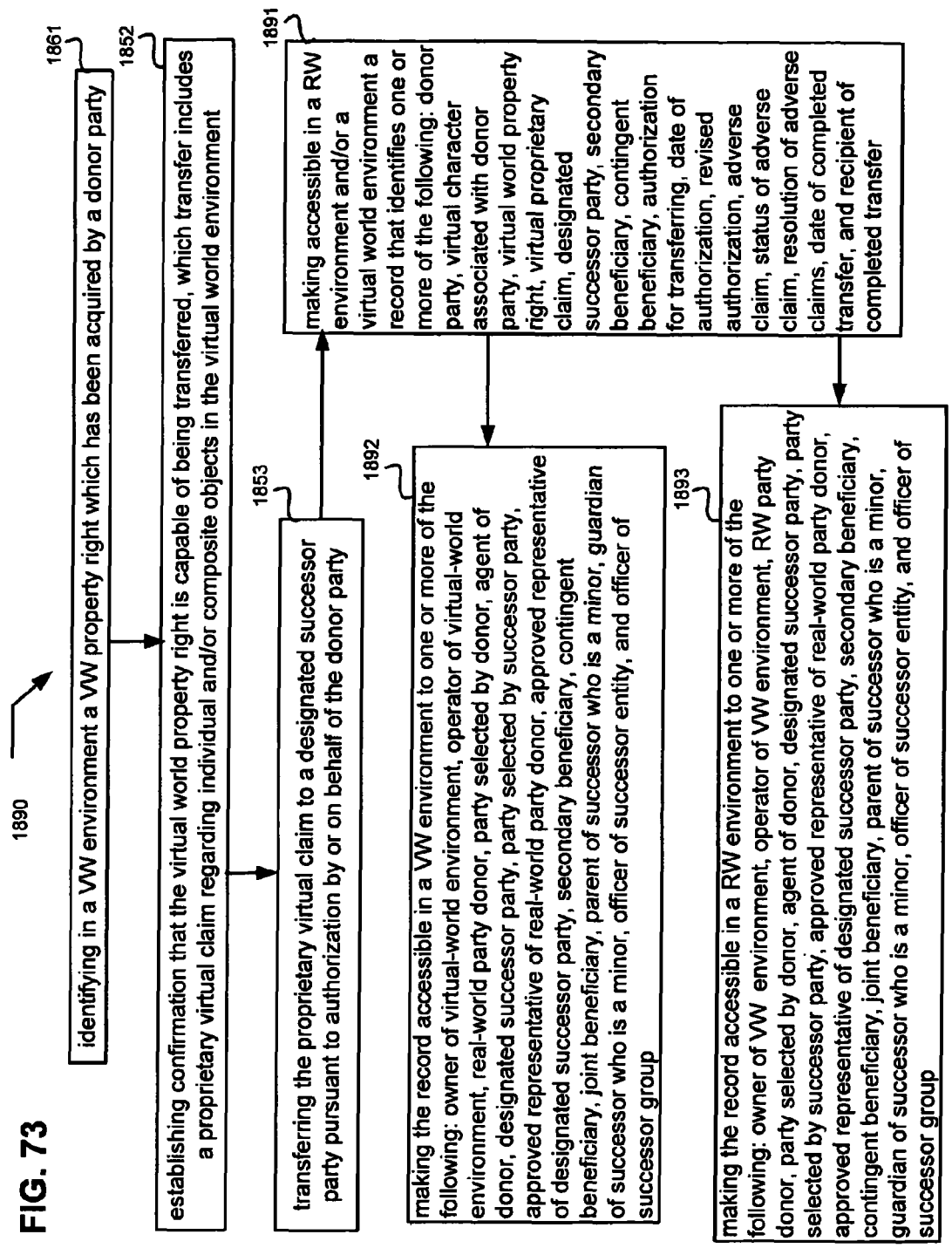

The flow chart of FIG. 73 discloses embodiments 1890 that may include previously described features 1861, 1852, 1853, and may further include making accessible in a real-world environment and/or a virtual world environment a record that identifies one or more of the following: donor party, virtual character associated with donor party, virtual world property right, virtual proprietary claim, designated successor party, secondary beneficiary, contingent beneficiary, authorization for transferring, date of authorization, revised authorization, adverse claim, status of adverse claim, resolution of adverse claims, date of completed transfer, and recipient of completed transfer (block 1891).

Other aspects may include making the record accessible in a VW environment (block 1892) or in a real-world environment (block 1893) to one or more of the following: owner of virtual-world environment, operator of virtual-world environment, real-world party donor, party selected by donor, agent of donor, designated successor party, party selected by successor party, approved representative of real-world party donor, approved representative of designated successor party, secondary beneficiary, contingent beneficiary, joint beneficiary, parent of successor who is a minor, guardian of successor who is a minor, officer of successor entity, and officer of successor group.

Figure 74:
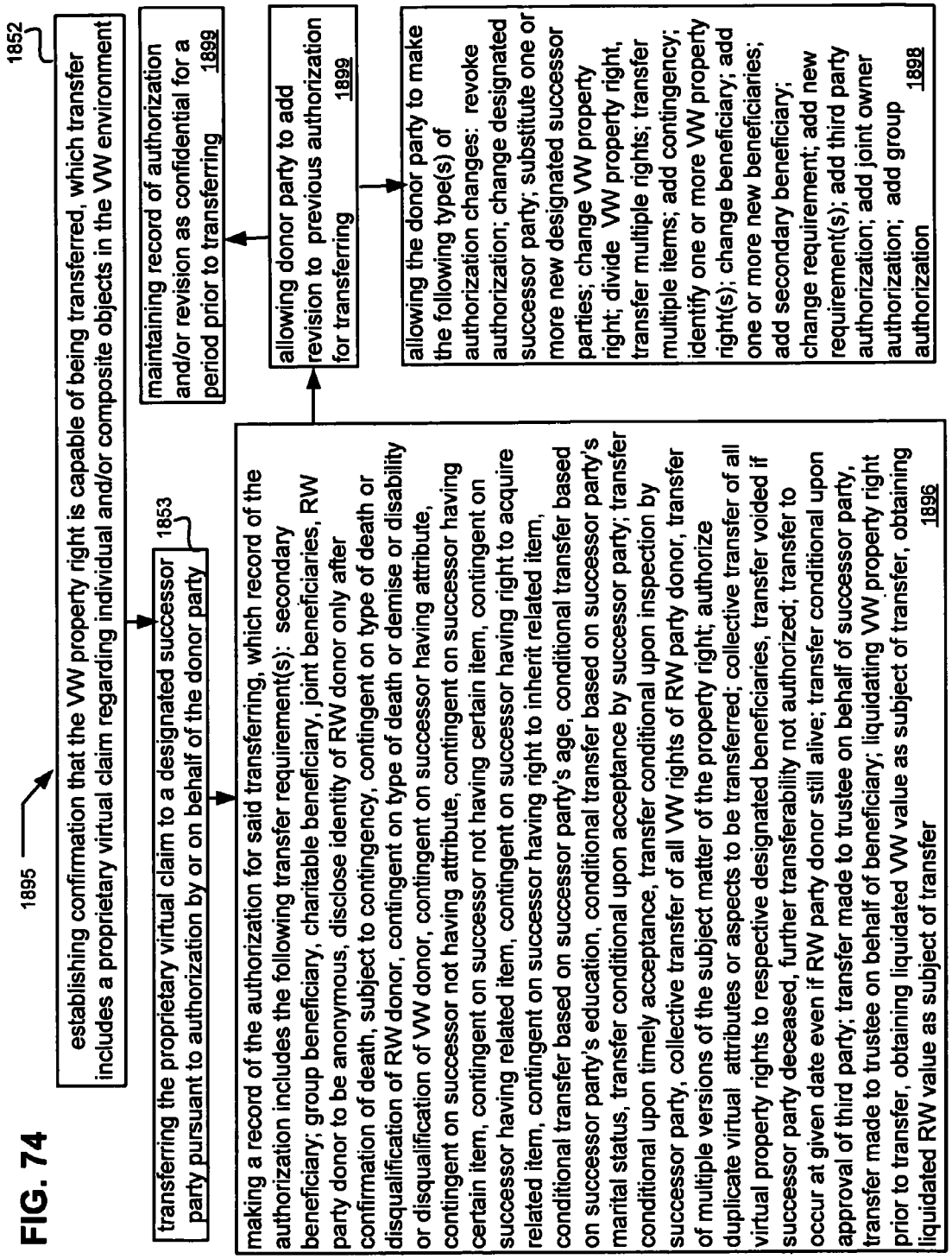

Referring to the embodiments 1895 of FIG. 74, previously described features 1852, 1853 are shown along with additional possible aspects including making a record of the authorization for said transferring, which record of the authorization includes one or more of the following transfer requirements: secondary beneficiary, group beneficiary, charitable beneficiary, joint beneficiaries, real-world party donor to be anonymous, disclose identity of real-world donor only after confirmation of death, subject to contingency, contingent on type of death or disqualification of real-world donor, contingent on type of death or demise or disability or disqualification of virtual world donor, contingent on successor having attribute, contingent on successor not having attribute, contingent on successor having certain item, contingent on successor not having certain item, contingent on successor having related item, contingent on successor having right to acquire related item, contingent on successor having right to inherit related item, conditional transfer based on successor party's age, conditional transfer based on successor party's education, conditional transfer based on successor party's marital status, transfer conditional upon acceptance by successor party, transfer conditional upon timely acceptance, transfer conditional upon inspection by successor party, collective transfer of all virtual property rights of real-world party donor, transfer of multiple versions of the subject matter of the property right, authorize duplicate virtual attributes or aspects to be transferred, collective transfer of all virtual property rights to respective designated beneficiaries, transfer voided if successor party deceased, further transferability not authorized, transfer to occur at given date even if real-world party donor still alive, transfer conditional upon approval of third party, transfer made to trustee on behalf of successor party, transfer made to trustee on behalf of beneficiary, liquidating virtual world property right prior to transfer, obtaining liquidated virtual world value as subject of transfer, and obtaining liquidated real-world value as subject of transfer (block 1896).

Another possible feature includes allowing the donor party to add a revision to a previous authorization for the transferring (block 1897). Yet a further aspect provides maintaining the record of the authorization and/or the revision as confidential for a period prior to the transferring (block 1899). A related aspect includes allowing the donor party to make one or more of the following types of authorization changes: revoke the authorization; change the designated successor party; substitute one or more new designated successor parties; change the virtual world property right; divide the virtual world property right, transfer multiple rights; transfer multiple items; add contingency; identify one or more additional virtual world property rights; change a beneficiary; add one or more new beneficiaries; add secondary beneficiary; change a requirement; add one or more new requirements; add third party authorization; add joint owner authorization; and add group authorization (block 1898).

Figure 75:
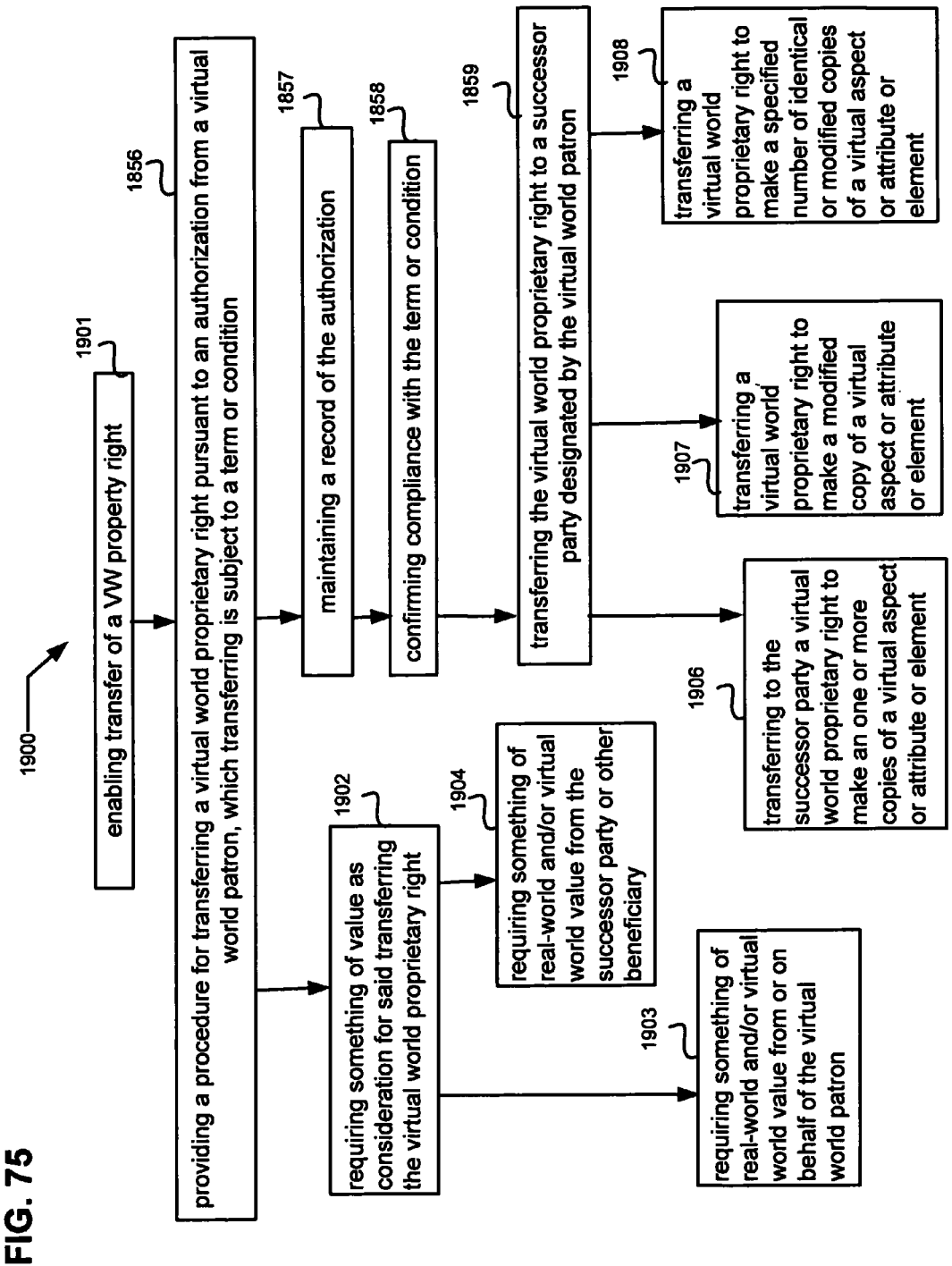

Referring to the embodiments 1900 of FIG. 75 that relate to enabling transfer of a VW proprietary right (block 1901), previously described features 1856, 1857, 1858, 1859 may be included. Other aspects may include transferring to the successor party a virtual world proprietary right to make one or more copies of a virtual aspect or attribute or element (block 1906), and transferring a virtual world proprietary right to make a modified copy of a virtual aspect or attribute or element (block 1907). An additional related feature may include transferring a virtual world proprietary right to make a specified number of identical or modified copies of a virtual aspect or attribute or element (block 1908).

Other exemplary features shown in FIG. 75 include requiring something of value as consideration for transferring the virtual world proprietary right (block 1902). Related aspects may include requiring something of real-world and/or virtual world value from or on behalf of the virtual world patron (block 1903), as well as from the successor party or other beneficiary (block 1904).

Figure 76:
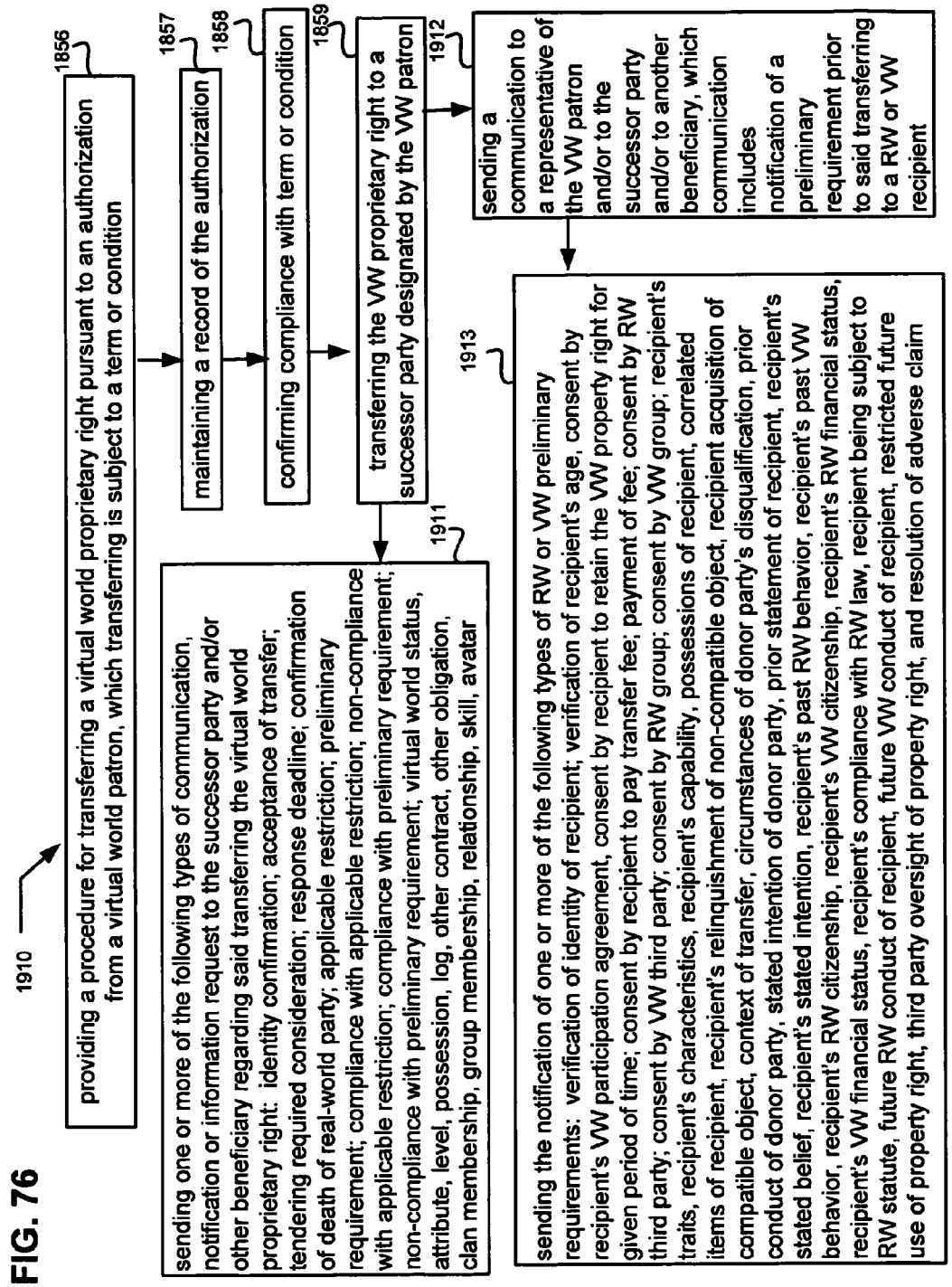

The exemplary embodiments 1910 of FIG. 76 include previously described process features 1856, 1857, 1858, 1859. Other aspects may include sending one or more of the following types of communication, notification or information request to the successor party and/or other beneficiary regarding said transferring the virtual world proprietary right: identity confirmation; acceptance of transfer; tendering required consideration; response deadline; confirmation of death of real-world party; applicable restriction; preliminary requirement; compliance with applicable restriction; non-compliance with applicable restriction; compliance with preliminary requirement; non-compliance with preliminary requirement; virtual world status; attribute; level; possession; log; other contract; other obligation; clan membership; group membership; relationship; skill; and avatar (block 1911).

FIG. 76 also shows exemplary implementations that include sending a communication to a representative of the virtual world patron and/or to the successor party and/or to another beneficiary, which communication includes notification of a preliminary requirement prior to said transferring to a real-world or virtual world recipient (block 1912). Further possible aspects include sending a notification of one or more of the following types of real-world or virtual world preliminary requirements: verification of identity of recipient, verification of recipient's age, consent by recipient virtual world participation agreement, consent by recipient to retain the virtual world property right for given period of time, consent by recipient to pay transfer fee, payment of fee, consent by real-world third party, consent by virtual world third party, consent by real-world group, consent by virtual world group, recipient's traits, recipient's characteristics, recipient's capability, possessions of recipient, correlated items of recipient, recipient's relinquishment of non-compatible object, recipient acquisition of compatible object, context of transfer, circumstances of donor party's disqualification, prior conduct of donor party, stated intention of donor party, prior statement of recipient, recipient's stated belief, recipient's stated intention, recipient's past RW behavior, recipient's past VW behavior, recipient's RW citizenship, recipient's VW citizenship, recipient's RW financial status, recipient's VW financial status, recipient's compliance with RW law, recipient being subject to RW statute, future RW conduct of recipient, future VW conduct of recipient, restricted future use of property right, third party oversight of property right, and resolution of adverse claim (block 1913).

Figure 77:
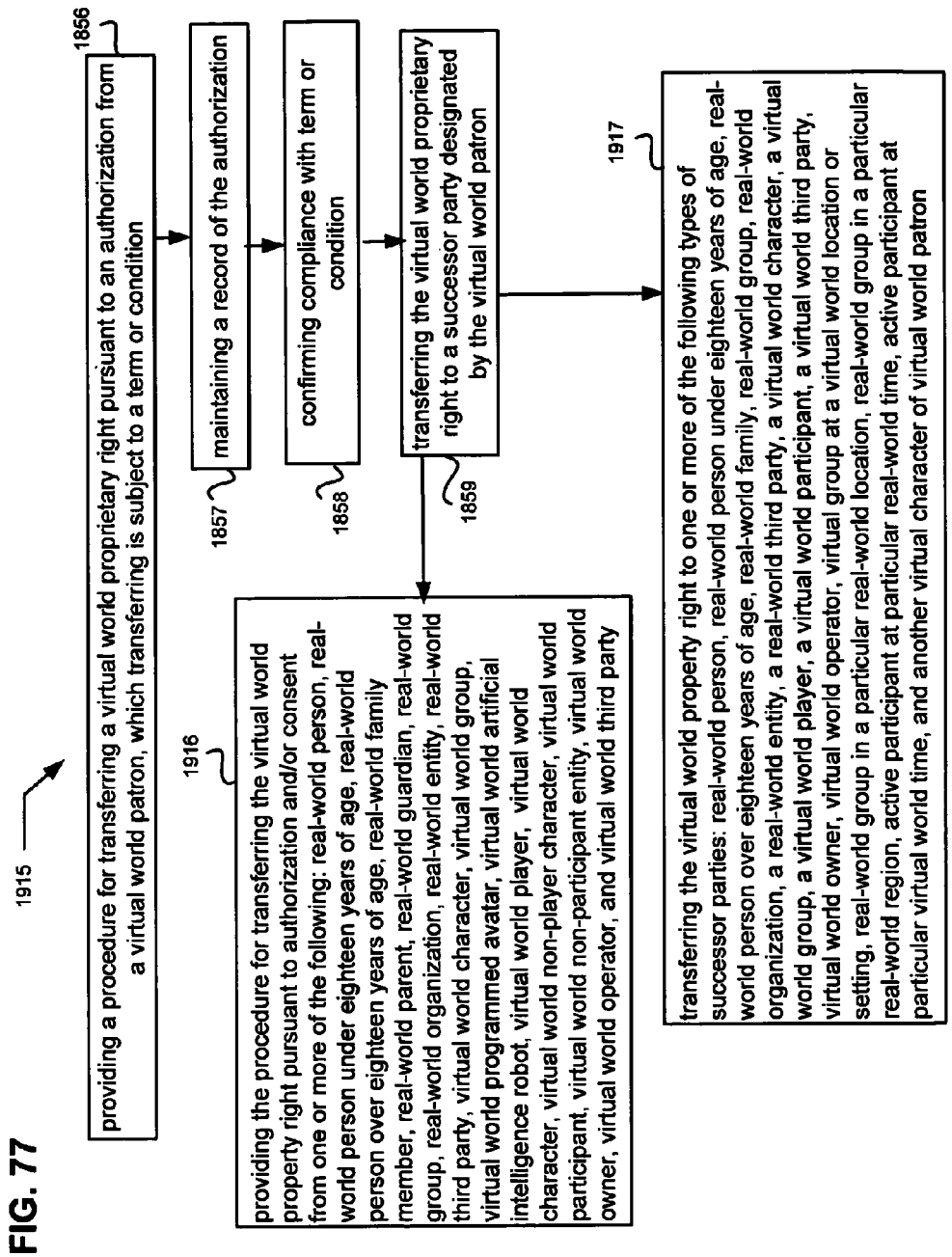

The detailed flow chart illustrations of FIG. 77 disclose embodiments 1915 that include previously described process features 1856, 1857, 1858, 1859. Other possible features include providing the procedure for transferring the virtual world property right pursuant to authorization and/or consent from one or more of the following: real-world person, real-world person under eighteen years of age, real-world person over eighteen years of age, real-world family member, real-world parent, real-world guardian, real-world group, real-world organization, real-world entity, real-world third party, virtual world character, virtual world group, virtual world programmed avatar, virtual world artificial intelligence robot, virtual world player, virtual world character, virtual world non-player character, virtual world participant, virtual world non-participant entity, virtual world owner, virtual world operator, and virtual world third party (block 1916).

Another aspect may include transferring the virtual world property right to one or more of the following types of successor parties: real-world person, real-world person under eighteen years of age, real-world person over eighteen years of age, real-world family, real-world group, real-world organization, a real-world entity, a real-world third party, a virtual world character, a virtual world group, a virtual world player, a virtual world participant, a virtual world third party, virtual world owner, virtual world operator, virtual group at a virtual world location or setting, real-world group in a particular real-world location, real-world group in a particular real-world region, active participant at particular real-world time, active participant at particular virtual world time, and another virtual character of virtual world patron (block 1917).

Figure 78:
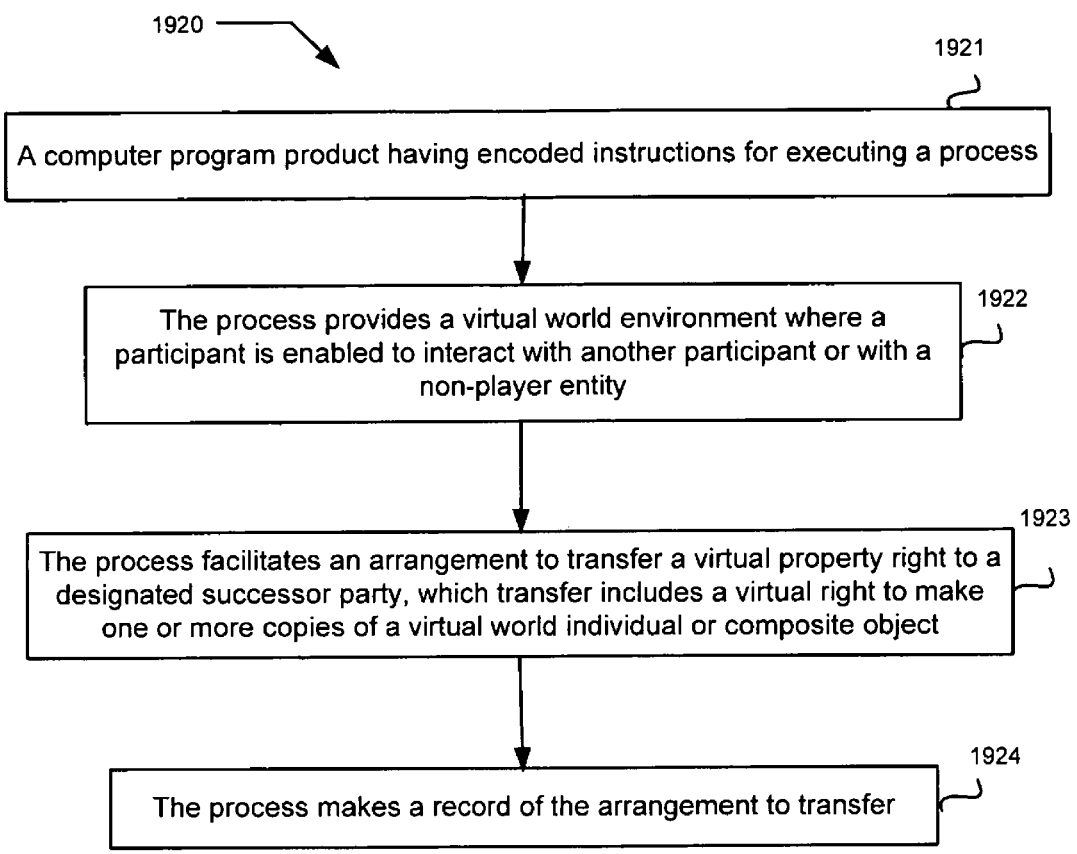
FIG. 78 is an exemplary computer program product implementation.

The high level flow chart embodiment 1920 of FIG. 78 discloses a computer program product having encoded instructions for executing a process (block 1921), wherein an exemplary process implementation may include providing a virtual world environment where a participant is enabled to interact with another participant or with a non-player entity (block 1922); and facilitating an arrangement to transfer a virtual property right to a designated successor party, which transfer includes a virtual right to make one or more copies of a virtual world individual or composite object (block 1923). An additional feature may include making a record of the arrangement to transfer (block 1924).

Figure 79:
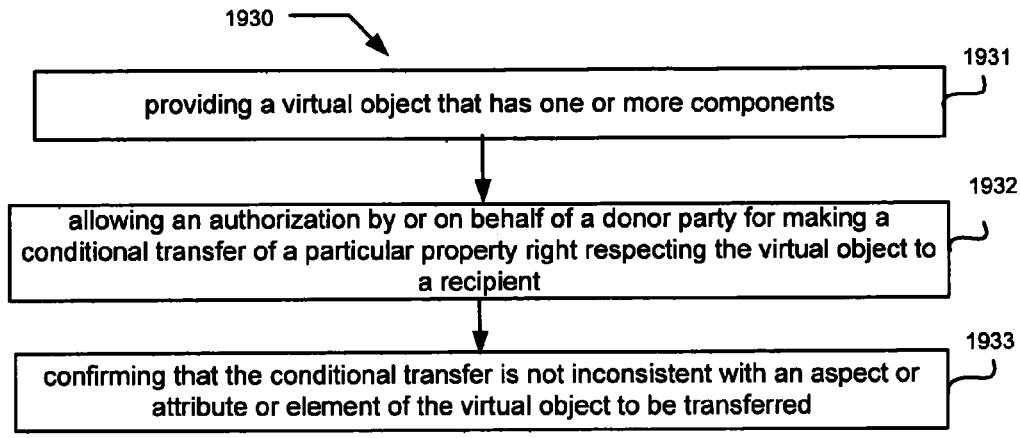
FIG. 79 is a high level flow chart for another exemplary process embodiment.

Referring to the high level embodiment 1930 of FIG. 79, an exemplary process for arranging a possible transfer of one or more virtual world objects includes providing a virtual object that has one or more components (block 1931), allowing an authorization by or on behalf of a donor party for making a conditional transfer of a particular property right respecting the virtual object to a recipient (block 1932), and confirming that the conditional transfer is not inconsistent with an aspect or attribute or element of the virtual object to be transferred (block 1933).

Figure 80:
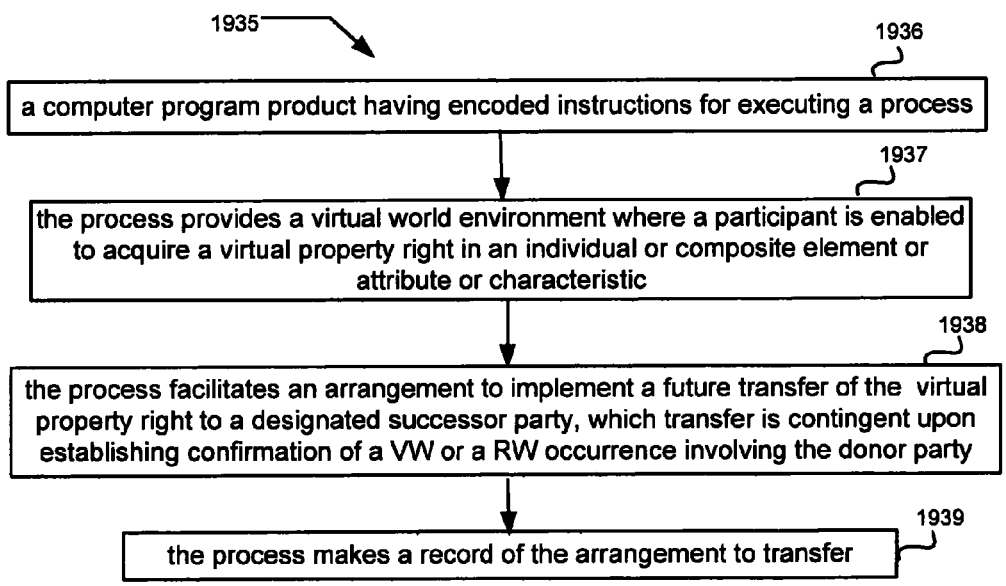
FIG. 80 is another exemplary computer program product implementation.

FIG. 80 illustrates an embodiment 1935 that includes a computer program product having encoded instructions for executing a process (block 1936). Exemplary process components may include providing a virtual world environment where a virtual character is enabled to acquire a virtual property right in an individual or composite element or attribute or characteristic (block 1937). Additional features may include facilitating an arrangement to implement a future transfer of the virtual property right from a donor party to a designated successor party, which transfer is contingent upon establishing confirmation of a virtual world occurrence or a real-world occurrence involving the donor party (block 1938); and making a record of the arrangement to transfer (block 1939).

Figure 81:
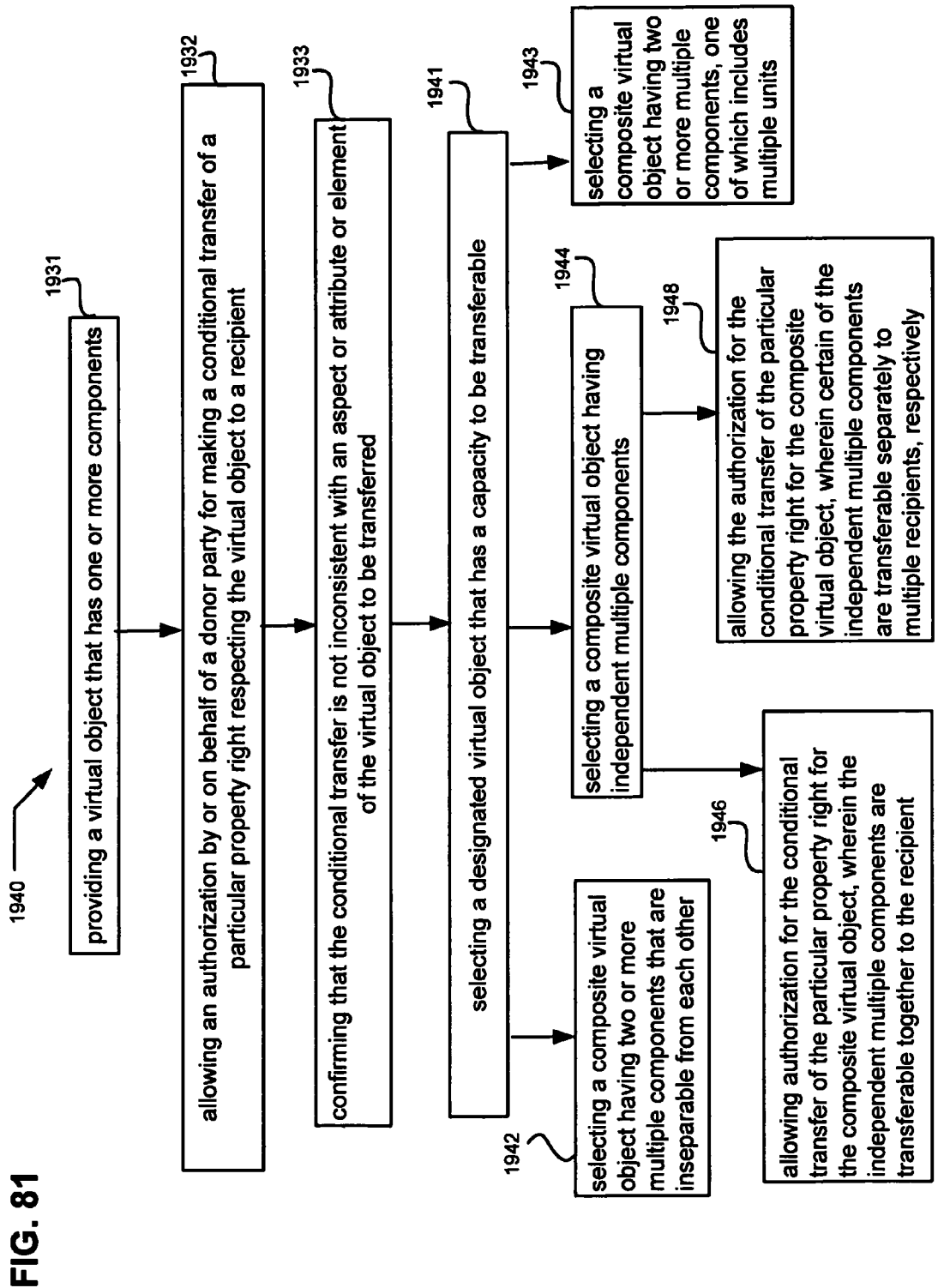
FIGS. 81-85 are more detailed flow charts for other exemplary embodiments.

Additional aspects are shown in the embodiments 1940 of FIG. 81, including previously described process components 1931, 1932, 1933, and a further enhancement of selecting a designated virtual object that has a capacity to be transferable (block 1941). The selection of virtual objects may also include selecting a composite virtual object having two or more multiple components that are inseparable from each other (block 1942), and selecting a composite virtual object having independent multiple components (block 1944).

Other related features may include allowing the authorization for the conditional transfer of the particular property right for the composite virtual object, wherein the independent multiple components are transferable together to the recipient (block 1946). Another possible feature allows the authorization for the conditional transfer of the particular property right for the composite virtual object, wherein certain of the independent multiple components are transferable separately to multiple recipients, respectively (block 1948).

The selection of a virtual object may include selecting a composite virtual object having two or more multiple components, one of which includes multiple units (block 1943).

Figure 82:
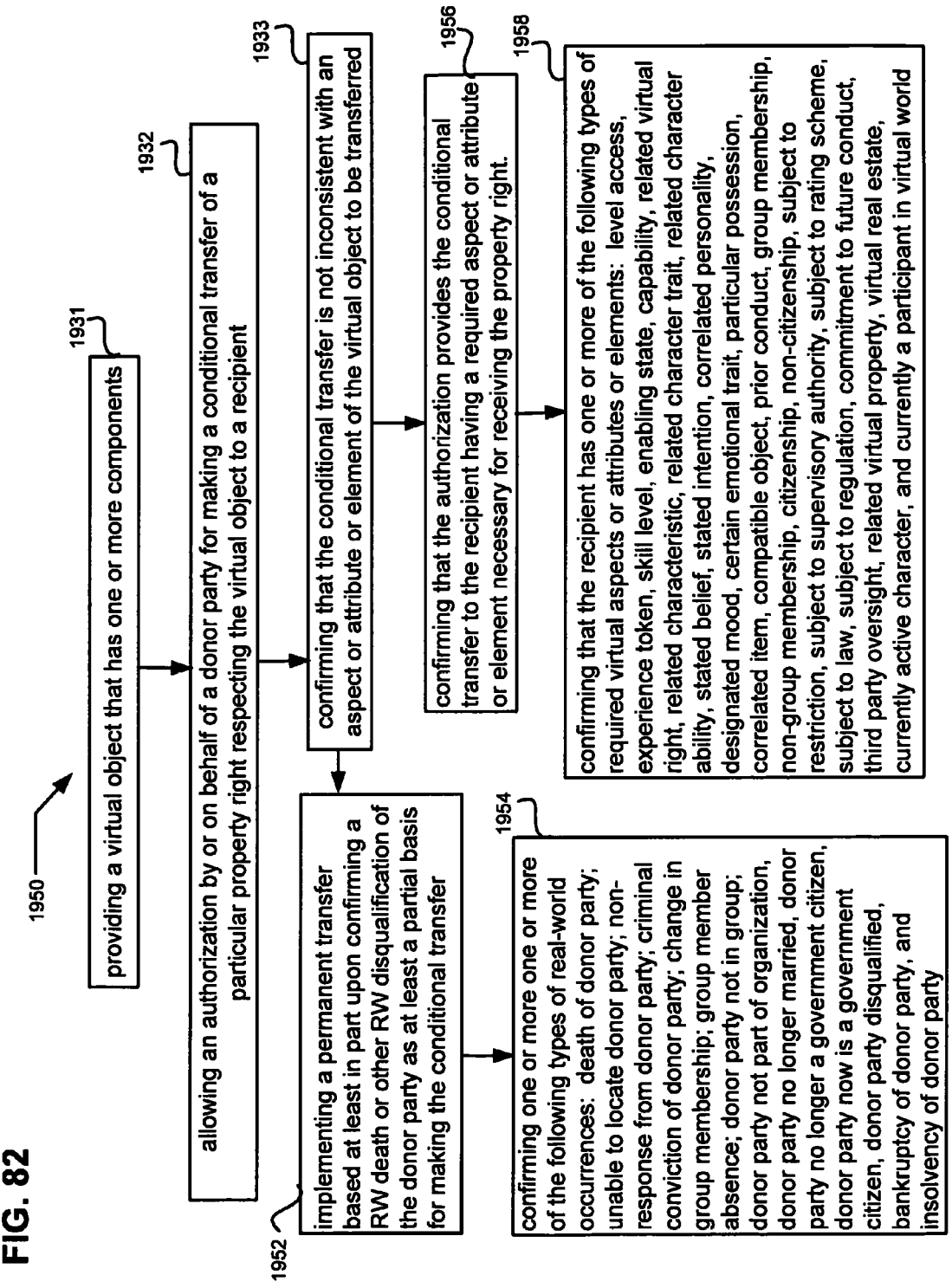

The embodiments 1950 of FIG. 82 provide a virtual object that has one or more components (block 1931). Previously described features 1932, 1933 may be included, along with a further aspect of implementing a permanent transfer based at least in part upon confirming a real-world death or other real-world disqualification of the donor party as at least a partial basis for making the conditional transfer (block 1952). A related possible feature includes confirming one or more one or more of the following types of real-world occurrences: death of donor party; unable to locate donor party; non-response from donor party; criminal conviction of donor party; change in group membership; group member absence; donor party not in group; donor party not part of organization; donor party no longer married; donor party no longer a government citizen; donor party now is a government citizen; donor party disqualified; bankruptcy of donor party; and insolvency of donor party (block 1954).

Other aspects shown in FIG. 82 may include confirming that the authorization provides the conditional transfer to the recipient having a required aspect or attribute or element necessary for receiving the property right (block 1956). Further features may include confirming that the recipient has one or more of the following types of required virtual aspects or attributes or elements: level access, experience token, skill level, enabling state, capability, related virtual right, related characteristic, related character trait, related character ability, stated belief, stated intention, correlated personality, designated mood, certain emotional trait, particular possession, correlated item, compatible object, prior conduct, group membership, non-group membership, citizenship, non-citizenship, subject to restriction, subject to supervisory authority, subject to rating scheme, subject to law, subject to regulation, commitment to future conduct, third party oversight, related virtual property, virtual real estate, currently active character, and currently a participant in virtual world (block 1958).

Figure 83:
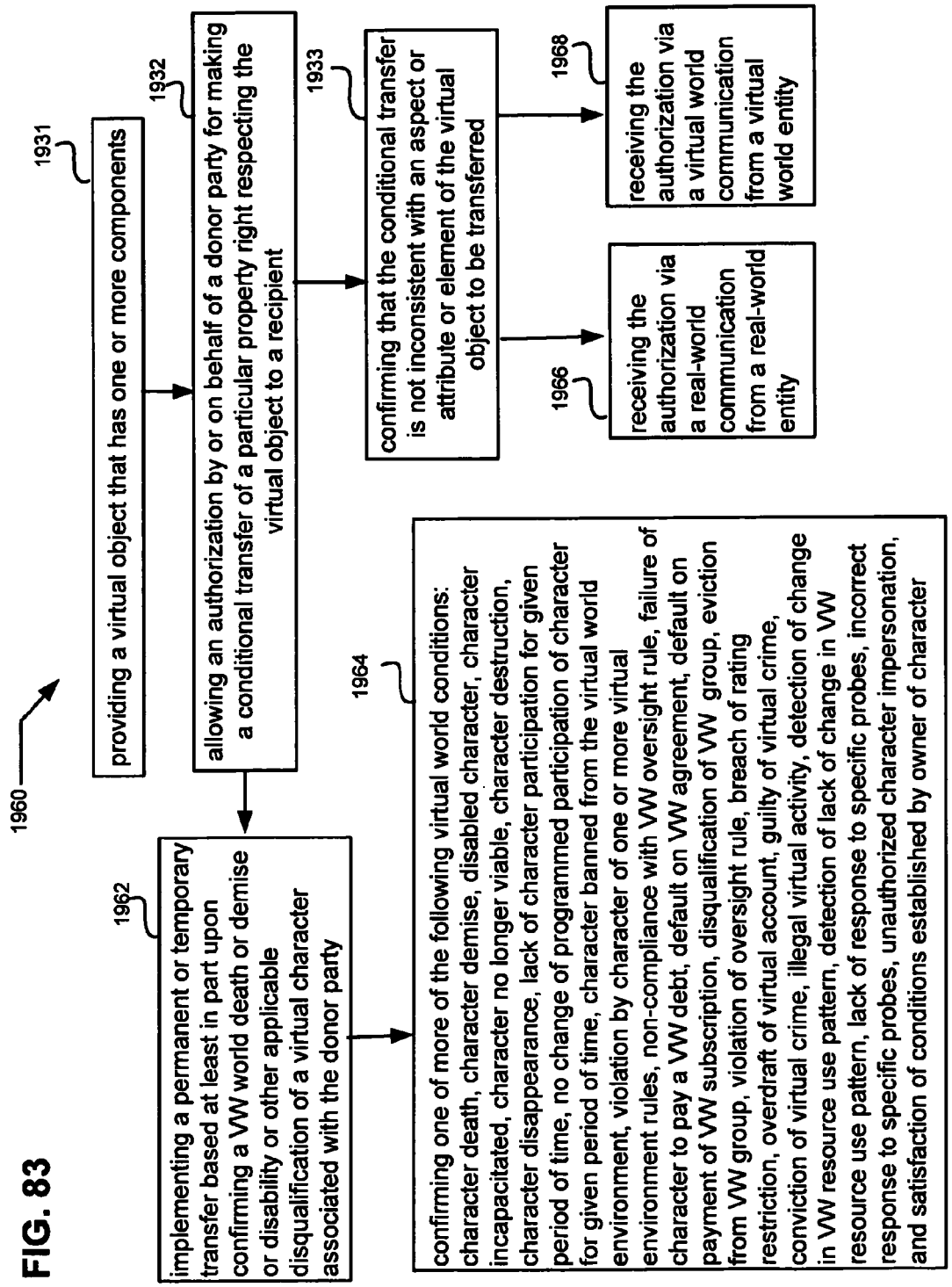

The illustrated embodiments 1960 shown in FIG. 83 include previously described process features 1931, 1932, 1933 as well as other aspects relating to exemplary conditional transfers, including implementing a permanent or temporary transfer based at least in part upon confirming a virtual world death or demise or disability or other applicable disqualification of a virtual character associated with the donor party (block 1962). A related aspect may include confirming one or more one or more of the following virtual world conditions: character death, character demise, disabled character, character incapacitated, character no longer viable, character destruction, character disappearance, lack of character participation for given period of time, no change of programmed participation of character for given period of time, character banned from the virtual world environment, violation by character of one or more virtual environment rules, non-compliance with VW oversight rule, failure of character to pay a virtual world debt, default on virtual world agreement, default on payment of virtual world subscription, disqualification of virtual world group, eviction from virtual world group, violation of oversight rule, breach of rating restriction, overdraft of virtual account, guilty of virtual crime, conviction of virtual crime, illegal virtual activity, detection of change in VW resource use pattern, detection of lack of change in VW resource use pattern, lack of response to specific probe, incorrect response to specific probe, unauthorized character impersonation, and satisfaction of conditions established by owner of character (block 1964).

Other component features relating to a possible conditional transfer may include receiving the authorization via a real-world communication from a real-world entity (block 1966), and receiving the authorization via a virtual world communication from a virtual world entity (block 1968).

Figure 84:
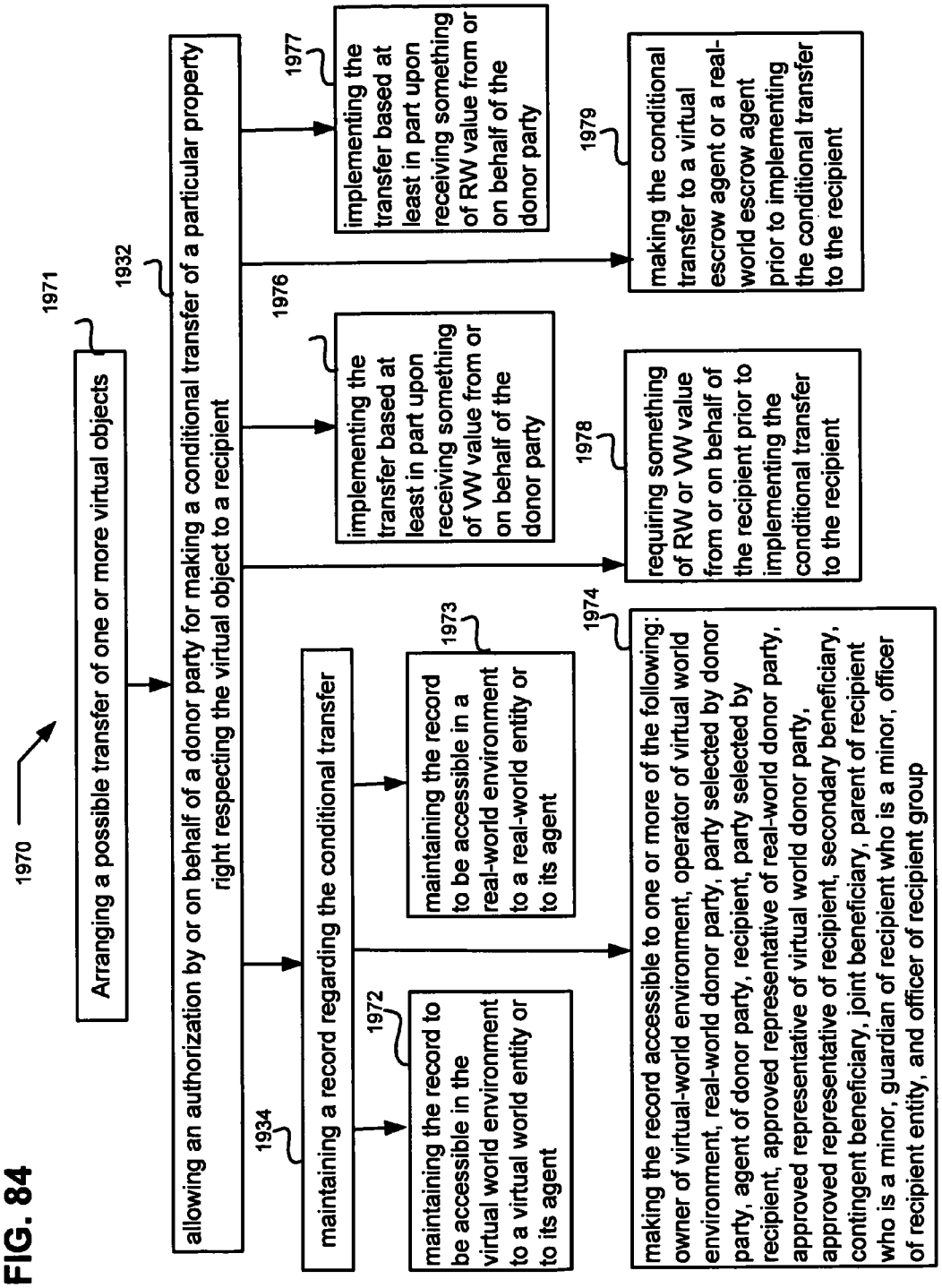

Referring to the detailed flow chart of FIG. 84, disclosed embodiment features 1970 include arranging a possible transfer of one or more virtual objects (block 1971). The previously described authorization component feature 1932 may be included, along with maintaining a record regarding the conditional transfer (block 1972). Related aspects involving such a record may include maintaining the record to be accessible in the virtual world environment to a virtual world entity or to its agent (block 1972), and maintaining the record to be accessible in a real-world environment to a real-world entity or to its agent (block 1973).

Another possible implementation feature includes making the record accessible to one or more of the following: owner of virtual-world environment, operator of virtual world environment, real-world donor party, party selected by donor party, agent of donor party, recipient, party selected by recipient, approved representative of real-world donor party, approved representative of virtual world donor party, approved representative of recipient, secondary beneficiary, contingent beneficiary, joint beneficiary, parent of recipient who is a minor, guardian of recipient who is a minor, officer of recipient entity, and officer of recipient group (block 1974).

Additional exemplary features shown in FIG. 84 include implementing the transfer based at least in part upon receiving something of virtual world value (block 1976) or real-world value (block 1977) from or on behalf of the donor party. Other possible implementations may include requiring something of real-world or virtual world value from or on behalf of the recipient prior to implementing the conditional transfer to the recipient (block 1978). A further possible aspect involves making the conditional transfer to a virtual escrow agent or a real-world escrow agent prior to implementing the conditional transfer to the recipient (block 1979).

Figure 85:
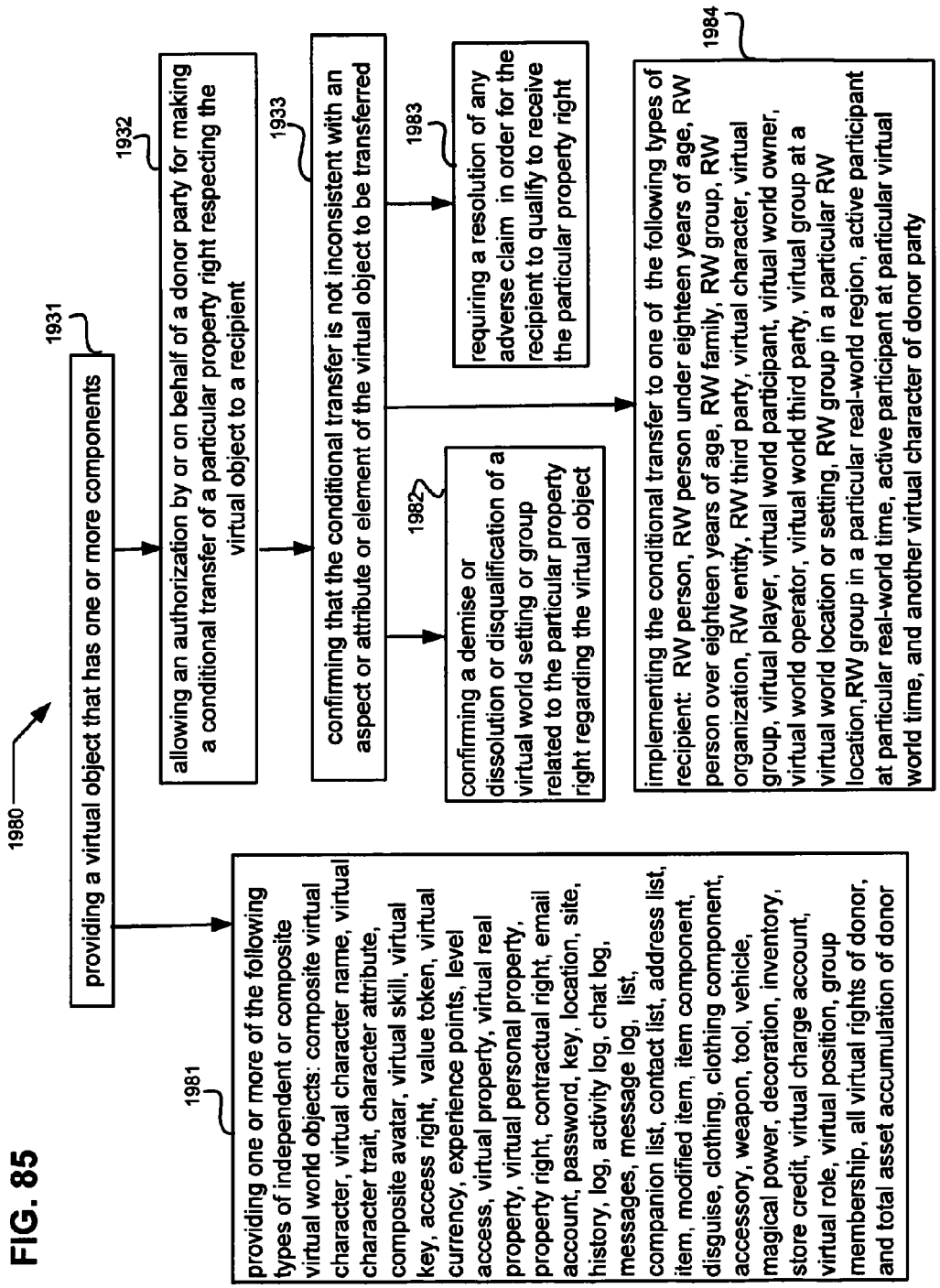

The detailed flow chart of FIG. 85 illustrates additional embodiments 1980 that may include previously described process features 1931, 1932, 1933. Other possible process features may include providing one or more of the following types of independent or composite virtual world objects: composite virtual character, virtual character name, virtual character trait, character attribute, composite avatar, virtual skill, virtual key, access right, value token, virtual currency, experience points, level access, virtual property, virtual real property, virtual personal property, property right, contractual right, email account, password, key, location, site, history, log, activity log, chat log, messages, message log, list, companion list, contact list, address list, item, modified item, item component, disguise, clothing, clothing component, accessory, weapon, tool, vehicle, magical power, decoration, inventory, store credit, virtual charge account, virtual role, virtual position, group membership, all virtual rights of donor, and total asset accumulation of donor (block 1981).

Other aspects may include confirming a demise or dissolution or disqualification of a virtual world setting or group related to the particular property right regarding the virtual object (block 1982), and requiring a resolution of any adverse claim in order for the recipient to qualify to receive the particular property right (block 1983).

A further aspect disclosed in the embodiments 1980 of FIG. 85 includes implementing the conditional transfer to one of the following types of recipient: real-world person, real-world person under eighteen years of age, real-world person over eighteen years of age, real-world family, real-world group, real-world organization, real-world entity, real-world third party, virtual character, virtual group, virtual player, virtual world participant, virtual world owner, virtual world operator, virtual world third party, virtual group at a virtual world location or setting, real-world group in a particular real-world location, real-world group in a particular real-world region, active participant at particular real-world time, active participant at particular virtual world time, and another virtual character of donor party (block 1984).

It will be understood that many of the disclosed aspects and features regarding a conditional virtual world transfer of virtual property and virtual property rights may be applicable to system embodiments enabling a future transfer of a virtual object or right from a donor party to a recipient, which future transfer may be subject to revocation (e.g., cancellation, forfeiture, etc.).

Figure 86:
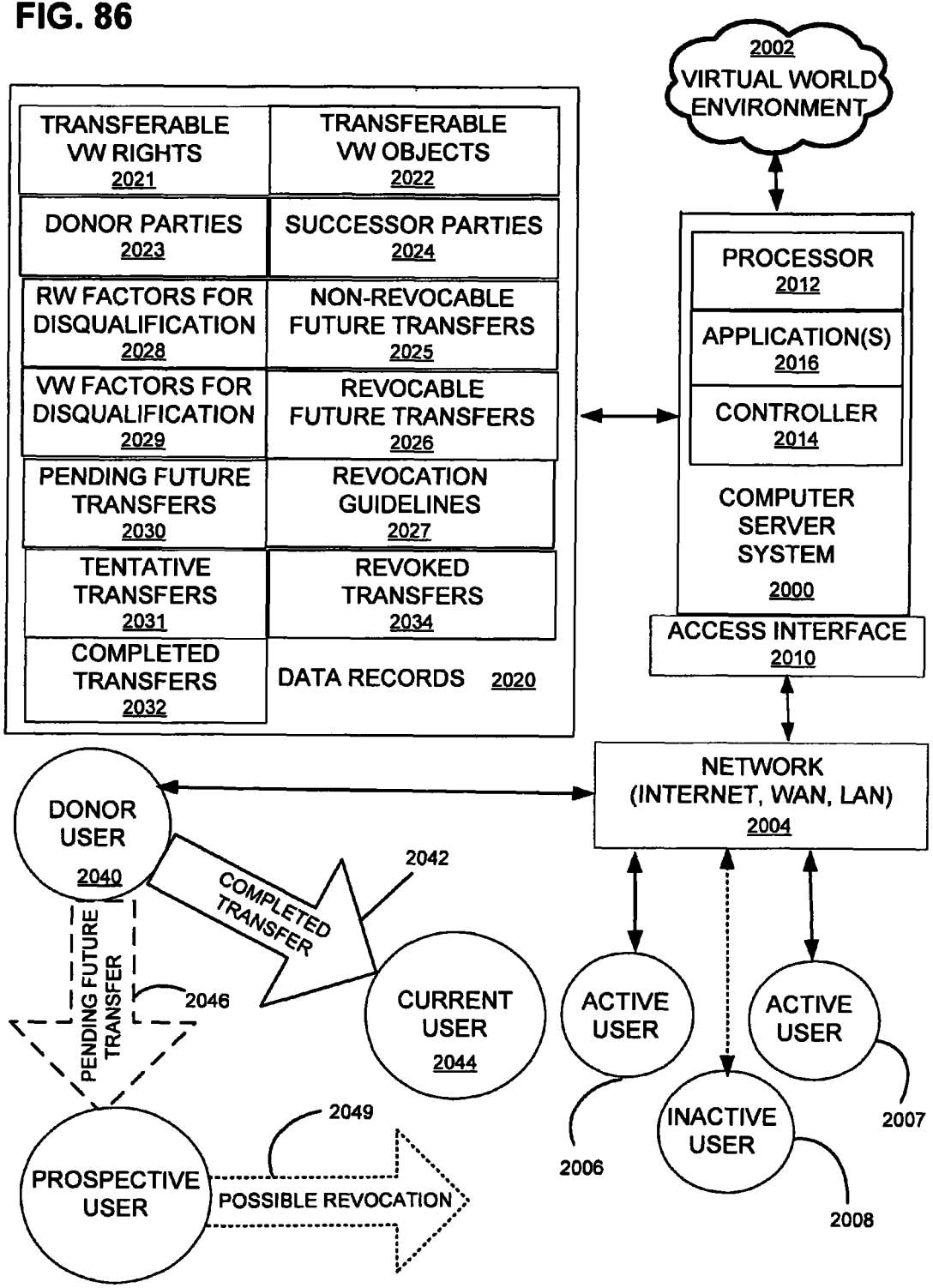
FIG. 86 is a schematic block diagram showing embodiments involving possible reversion rights arising from an arrangement or agreement for a virtual world future transfer.

The schematic block diagram of FIG. 86 shows exemplary embodiment features that include a computer server system 2000 for a virtual world environment 2002 that is accessible via one or more networks 2004 such as the Internet, or a wide area network (WAN) or a local area network (LAN). Participants in the virtual world environment 2002 may include active users 2006, 2007 and inactive users 2008.

The illustrated computer server system 2000 includes an access interface 2010, processor 2012, controller 2014, and one or more program applications 2016. Various data processing procedures may include reading/writing to various types of data records 2020. Exemplary data records that may be helpful include informational data regarding transferable VW rights 2021, transferable VW objects 2022, donor parties 2023, and successor parties 2024.

Some records relating to possible future transfers of VW objects and rights may include informational data regarding non-revocable future transfers 2025, revocable future transfers 2026, revocation guidelines 2027, real-world (RW) factors for disqualification 2028, and VW factors for disqualification 2029. Additional data files may include pending future transfers 2030, tentative transfers 2031, completed transfers 2032, and revoked transfers 2034.

Schematic representations illustrated in FIG. 86 include a donor user 2040 participating in a completed transfer 2042 to current user 2044. The donor user 2040 also may be involved in a pending future transfer 2046 to prospective user 2048. In some instances an agreement or arrangement for a future transfer of a virtual object or virtual right may include provisions for a possible revocation 2049.

Figure 87:
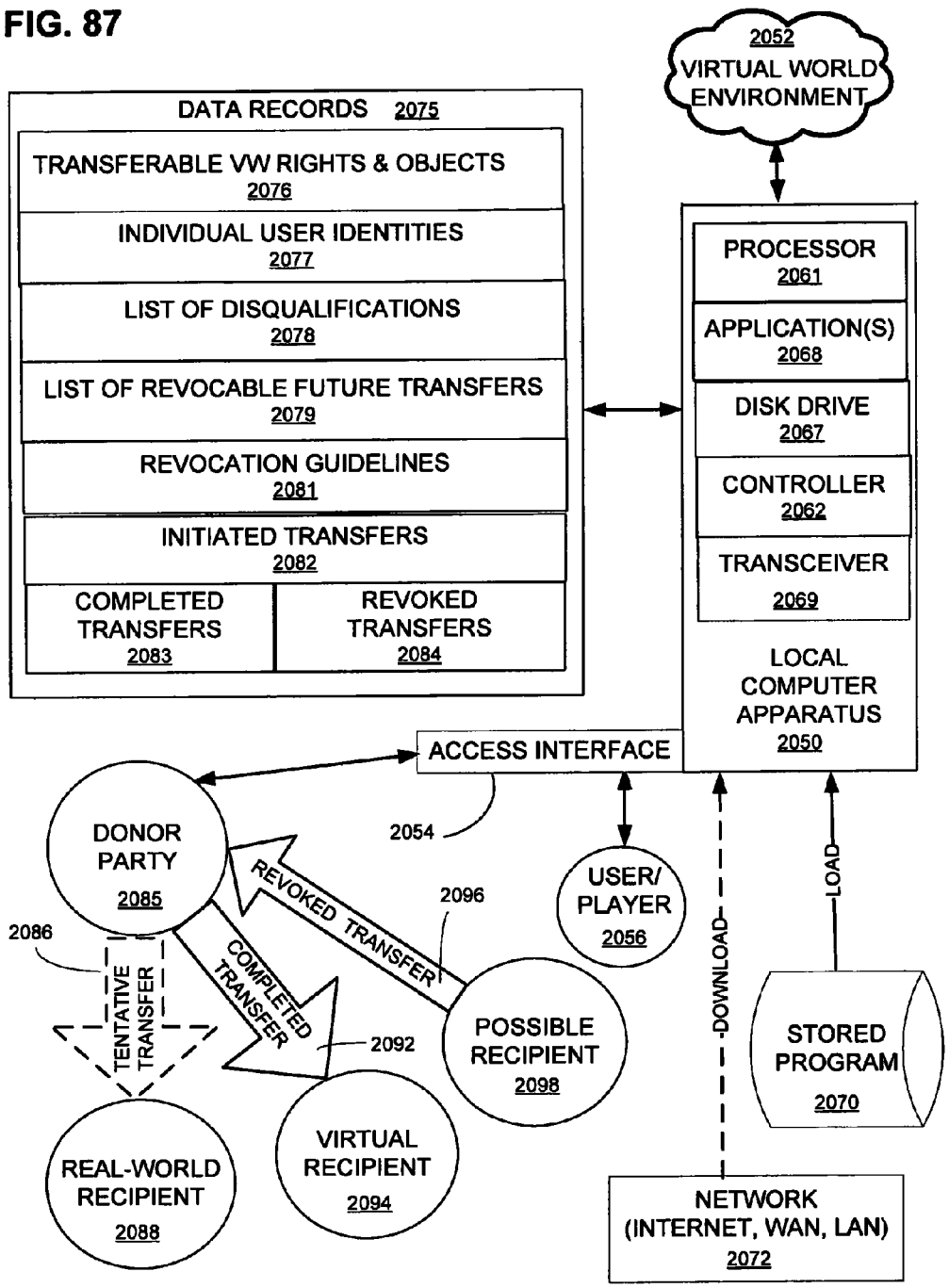
FIG. 87 is another schematic block diagram illustrating other aspects of a virtual world future transfer.

Referring to the schematic diagram of FIG. 87, additional exemplary embodiment features may include a local computer apparatus 2050 for a virtual world environment 2052 that is accessible to an individual user/player 2056 via access interface 2054. The individual user/player may use the local computer apparatus 2050 to run one or more stored application programs 2070 related to the virtual world environment 2052 as well as other related application programs downloaded through a network 2072 (e.g., Internet, WAN, LAN).

The illustrated local computer apparatus 2050 also includes processor 2061, controller 2062, disk drive 2067, one or more program applications 2068, and transceiver 2069. It will be understood that stored program 2070 can be loaded into disk drive 2067, and remote programs/applications can be downloaded through transceiver 2069.

Various data processing procedures may include reading/writing to various types of data records 2075. Exemplary data records that may be helpful include informational data regarding transferable VW rights and objects 2076, and individual user identities 2077.

Some records relating to possible future transfers of VW objects and rights may include a list of disqualifications 2078 that may trigger a future transfer, a list of revocable future transfers 2079, and revocation guidelines 2081. Additional data files may include initiated transfer 2082, completed transfers 2083, and revoked transfers 2084.

Schematic representations illustrated in FIG. 87 include a donor party 2085 participating in a completed transfer 2092 to a virtual recipient 2094. The donor party 2085 also may be involved in a tentative transfer 2086 to a real-world recipient 2088. In some instances an agreement or arrangement for a future transfer of a virtual object or virtual right may include criteria that result in a revoked transfer 2096 involving a possible recipient 2098.

Figure 88:
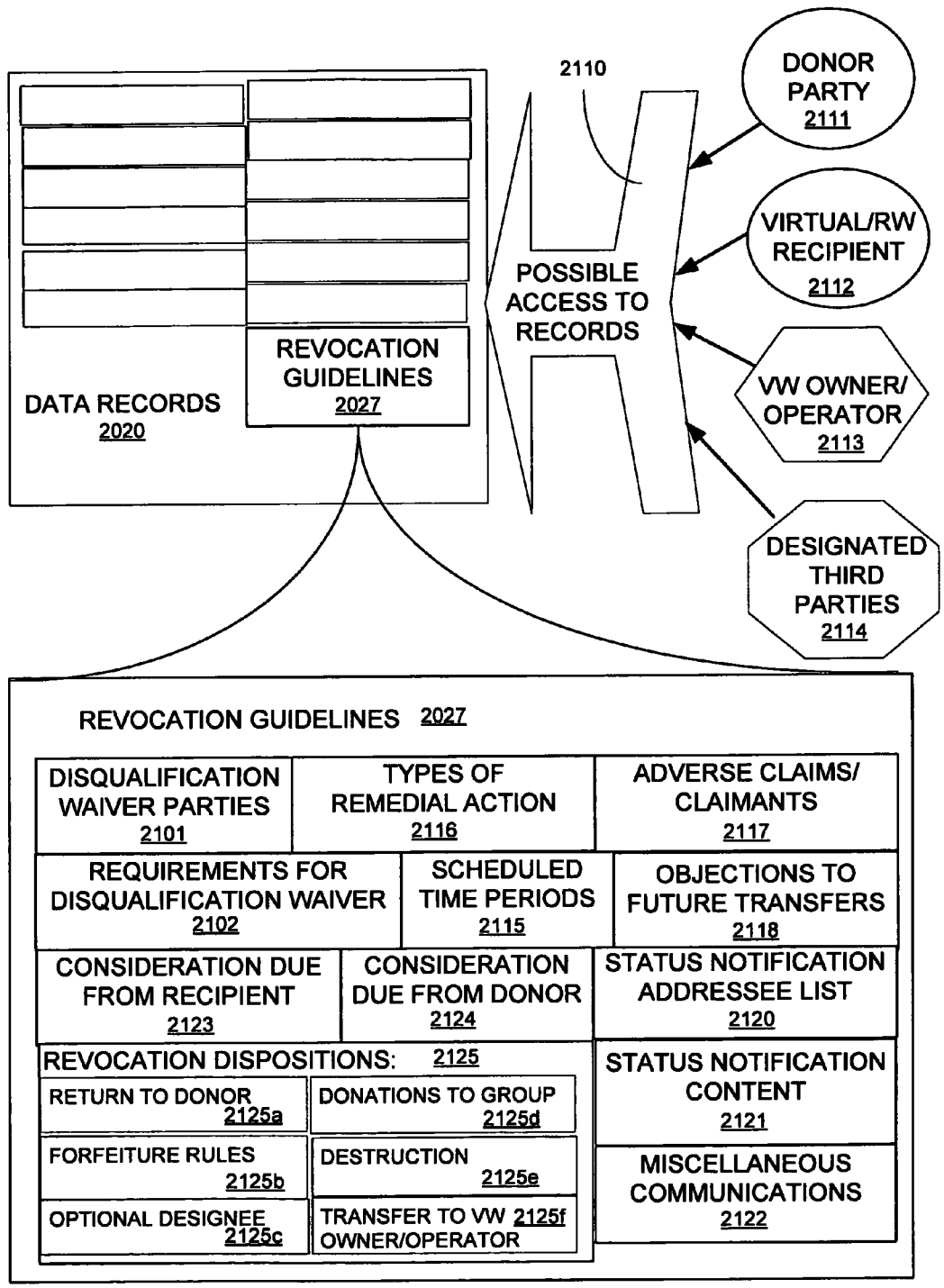
FIG. 88 is a schematic illustration of exemplary data records regarding a virtual world future transfer.

The schematic block diagram of FIG. 88 illustrates further exemplary features with respect to data records 2020. In some instances possible access 2110 to such records may be provided to a donor party 2111, a virtual or real-world recipient 2112, a VW owner or operator 2113, or designated third parties 2114.

The revocation guidelines 2027 may incorporate various types of informational data records. Exemplary data files may include but are not limited to disqualification waiver parties 2101, requirements for disqualification waiver 2102, and scheduled time periods 2115 involving a possible future transfer or revocation. Other possible data files include informational data regarding types of remedial action 2116, adverse claims and claimants 2117, objections to future transfers 2118, status notification addressee list 2120, status notification content 2121, and miscellaneous communications 2122.

Further data files may relate to consideration due from a recipient 2123, and consideration due from a donor 2124. Records regarding revocation dispositions 2125 may in some implementations be categorized as follows: return to donor 2125*a*, forfeiture rules 2125*b*, optional designee 2125*c*, donations to group 2125*d*, destruction 2125*e* of virtual object or right, and transfers to a VW owner or operator 2125*f*.

It will be understood that access to such data records disclosed herein, whether stored locally in connection with a local computer device or stored remotely, may be controlled in accordance with applicable rules and agreements in order to assure data integrity, privacy and confidentiality.

Figure 89:
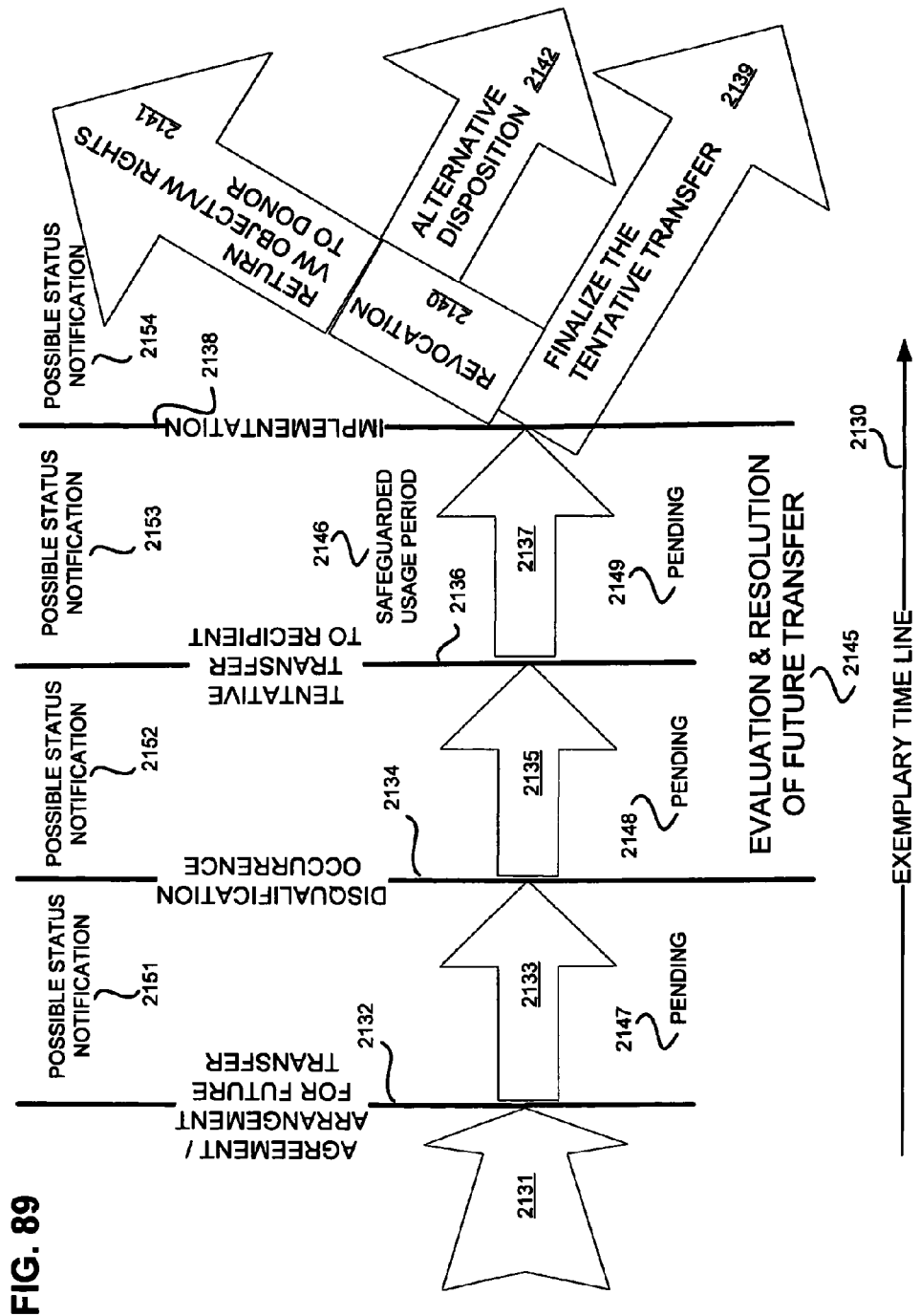
FIG. 89 is a schematic timing diagram showing an exemplary progression of events that may occur with respect to a virtual world future transfer.

The schematic timing diagram of FIG. 89 illustrates exemplary time periods that may be involved in connection with a possible future transfer or revocation of a virtual object or right. As indicated by exemplary time line 2130, various aspects involving a transactional history may start with preliminary preparations 2131 leading up to an agreement/arrangement for a future transfer 2132, and a follow-on period 2133 leading up to a disqualification occurrence 2134.

Another follow-on period 2135 may lead up to a possible authorization for a tentative transfer or in some instances an actual implementation of a tentative transfer to a recipient 2136. A subsequent follow-on period 2137 may include a safeguarded usage period 2146 during which certain limitations or restrictions may apply to a recipient's interim use of a virtual object or virtual right. Also, in some instances the two follow-on periods 2135, 2137 may individually or collectively be used for purposes of evaluation and resolution 2145 of a pending future transfer.

Ultimately an implementation 2138 of a transfer/revocation decision may result in finalizing the tentative transfer 2139 or revocation 2140 of the future transfer (including revocation of any implemented tentative transfer). A resulting consequence of the revocation may include a return to the donor 2141 of the VW object(s) or VW right(s), or an alternative disposition 2142 of such virtual object or right.

It will be understood from the schematic illustration of FIG. 89 that a future transfer of a virtual object or virtual right may be deemed to be "vested", or "modifiable" or "revoked" during any of the various pending periods such as 2147, 2148, 2149 between a creation of an agreement/arrangement for future transfer 2132 and an ultimate final implementation 2138.

It will be further understood that different up-to-date status notifications 2151, 2152, 2153, 2154 regarding the possible future transfer/revocation may occur periodically as determined by the particular circumstances as well as the desires of the entities involved.

In view of the various embodiments, exemplary features, possible aspects, and implementations as disclosed herein, many system and computer program product components may be incorporated in different combinations to achieve enhanced benefits. For example, a first data record may include an identification of a virtual object or virtual right that is subject to the future transfer. The data record may further include an identification of a future transfer that is contingent upon a real-world disqualification occurrence or a virtual world disqualification involving the donor party.

In some instances a first data record may also include first data record includes an identification of a future transfer that includes a requirement for consideration due from recipient as at least a partial basis for allowing the future transfer to be completed. A further possible feature may provide the first data record that includes an identification of a future transfer that includes a requirement for something of value due from the recipient party or a third party to be rendered to one or more of the following: donor party, donor's representative, donor's designee, charitable entity, group, and designated third party.

In some exemplary embodiments, a second data record may include revocation guidelines for returning the virtual object or virtual right to the donor party as a result of implementing the revocation. Such a second data record may also include revocation guidelines for implementing one or more of the following consequences regarding the virtual object or virtual right: forfeiture, destruction, donation to charitable entity, transfer to designated third party, transfer to designated group, transfer to heir of donor party, and transfer to family member of donor party Some implementations may include a second data record that includes revocation guidelines for implementing the revocation based on applicable information indicating that the disqualification has been corrected or eliminated or waived or remedied.

The reference to multiple individualized data files, records or databases (e.g., first data records, second data records, and the like) as disclosed herein is for purposes of illustration only. It will be understood by those skilled in the art that the various informational data collections can be integrated and/or sub-divided (and if necessary duplicated for accessibility, backup, etc.) at various locations using diverse types of storage media.

Figure 90:
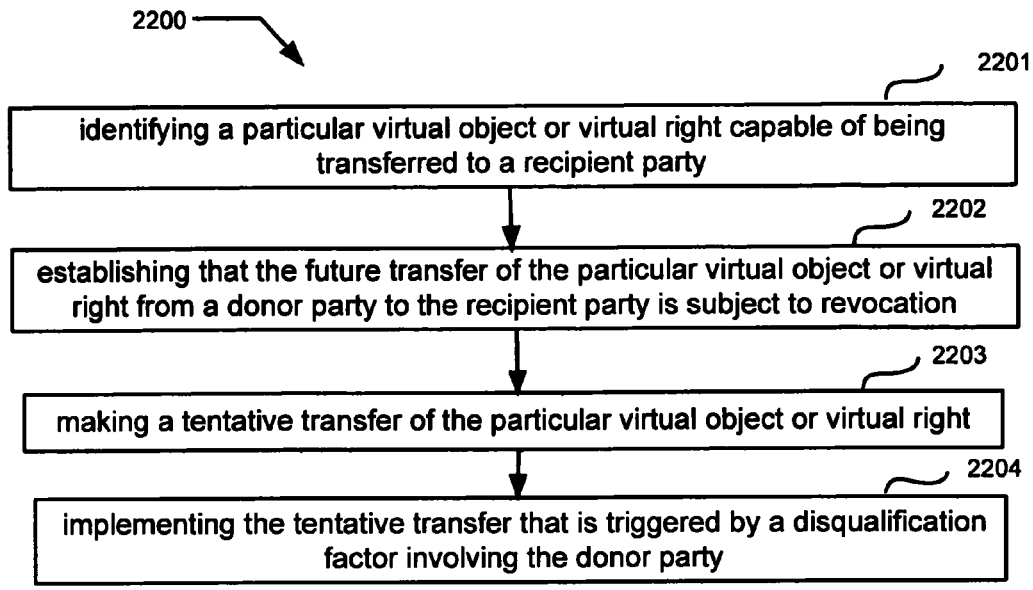
FIGS. 90-91 are high level flow charts for additional process embodiments.

The high level flow chart of FIG. 90 discloses a process embodiment 2200 that includes identifying a particular virtual object or virtual right capable of being transferred to a recipient party (block 2201), establishing that the future transfer of the particular virtual object or virtual right from a donor party to the recipient party is subject to revocation (block 2202), and making a tentative transfer of the particular virtual object or virtual right (block 2203). A further exemplary process feature includes implementing the tentative transfer that is triggered by a disqualification factor involving the donor party (block 2204).

Figure 91:
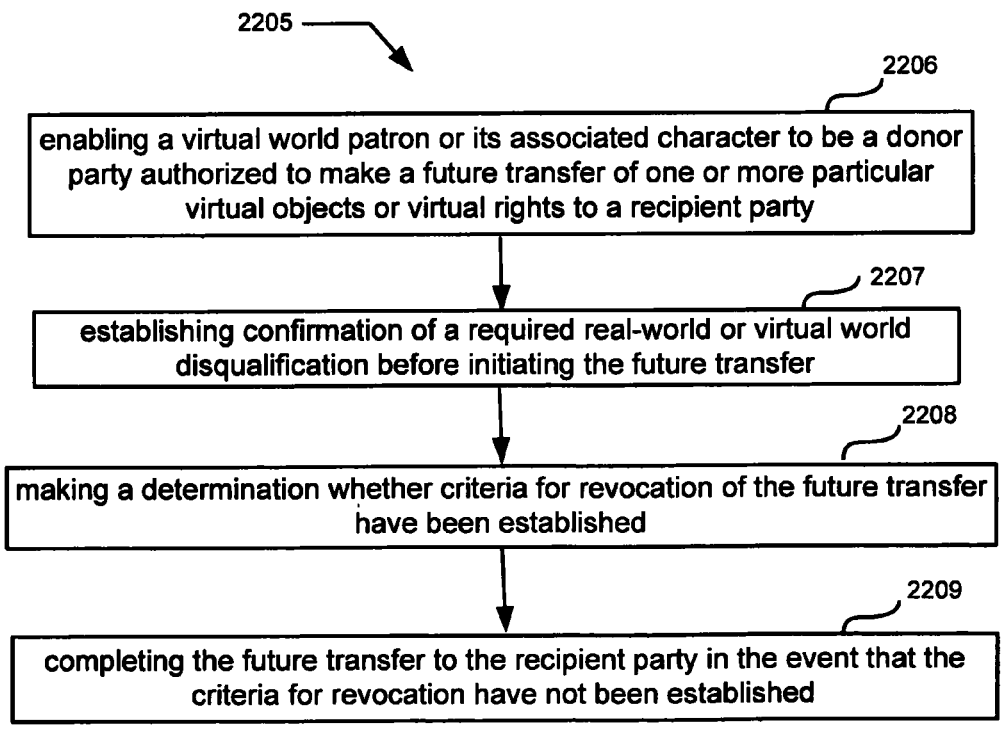

Referring to FIG. 91, another process embodiment 2205 for cancelling a possible transfer in a virtual world includes enabling a virtual world patron or its associated character to be a donor party authorized to make a future transfer of one or more particular virtual objects or virtual rights to a recipient party (block 2206), establishing confirmation of a required real-world or virtual world disqualification before initiating the future transfer (block 2207), making a determination whether criteria for revocation of the future transfer have been established (block 2208), and completing the future transfer to the recipient party in the event that the criteria for revocation have not been established (block 2209).

Figure 92:
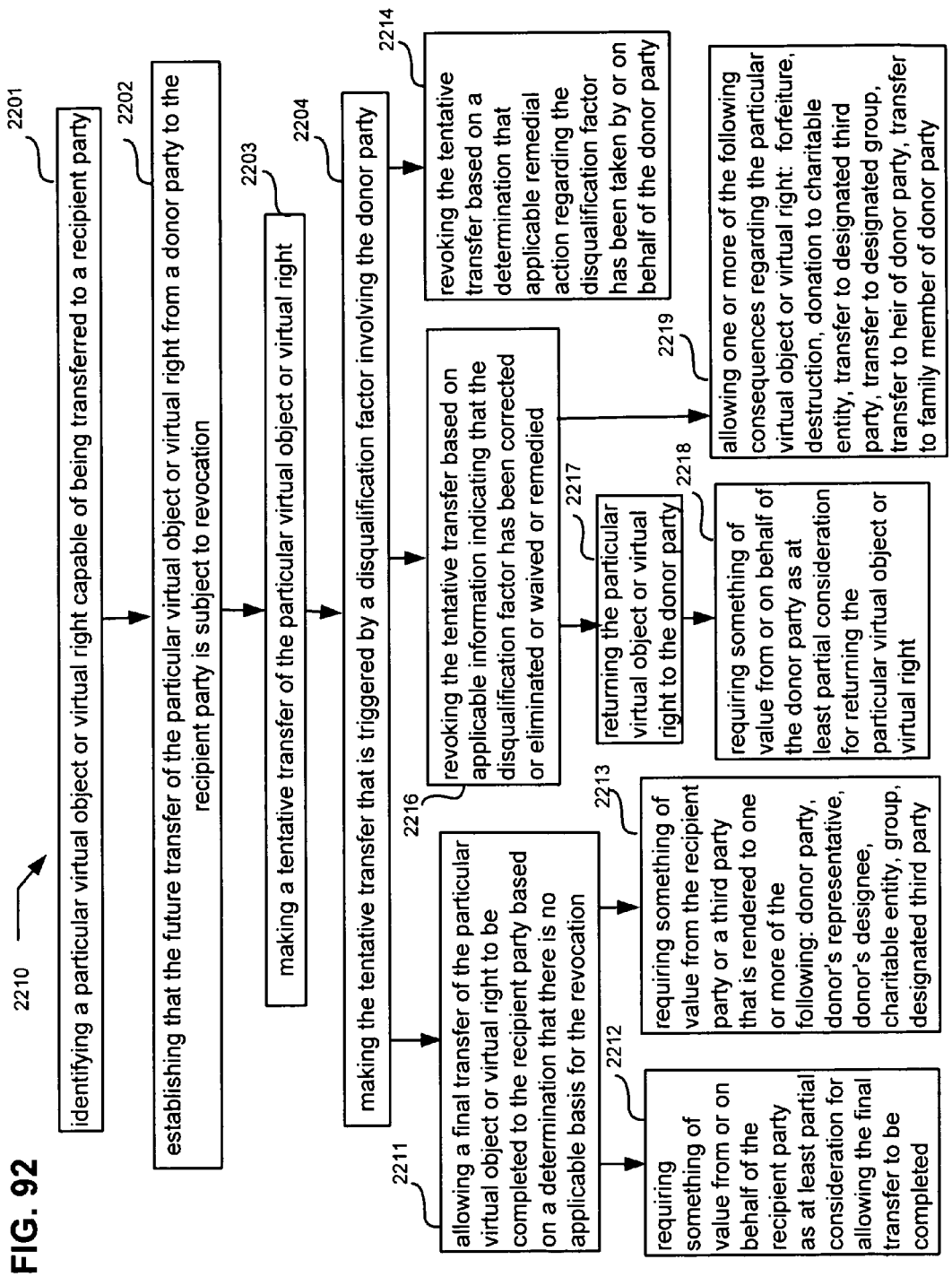
FIGS. 92-98 are more detailed flow charts for further exemplary embodiments.

Other embodiments 2210 are disclosed in FIG. 92 for implementing a future transfer in a virtual world. In addition to the previously described process components 2201, 2202, 2203, 2204, additional possible features include allowing a final transfer of the particular virtual object or virtual right to be completed to the recipient party based on a determination that there is no applicable basis for the revocation (block 2211). A related aspect includes requiring something of value from or on behalf of the recipient party as at least partial consideration for allowing the final transfer to be completed (block 2212).

A further aspect includes requiring something of value from the recipient party or a third party that is rendered to one or more of the following: donor party, donor's representative, donor's designee, charitable entity, group, and designated third party (block 2213) An additional exemplary process feature may include revoking the tentative transfer based on a determination that applicable remedial action regarding the disqualification factor has been taken by or on behalf of the donor party (block 2214).

Some implementations may include revoking the tentative transfer based on applicable information indicating that the disqualification factor has been corrected or eliminated or waived or remedied (block 2216). Possible related features may include returning the particular virtual object or virtual right to the donor party (block 2217), and requiring something of value from or on behalf of the donor party as at least partial consideration for returning the particular virtual object or virtual right (block 2218).

Another possible aspect may include allowing one or more of the following consequences regarding the particular virtual object or virtual right: forfeiture, destruction, donation to charitable entity, transfer to designated third party, transfer to designated group, transfer to heir of donor party, and transfer to family member of donor party (block 2219). The flow chart of FIG. 93 includes further embodiments 2220 that may include previously described process features 2201, 2202 as well as making a tentative transfer of the particular virtual object or virtual right, which tentative transfer is triggered by a disqualification factor involving the donor party (block 2221). In some instances the tentative transfer may be triggered by a disqualification factor selected by the donor party (block 2222). In other instances the tentative transfer may be triggered by a disqualification factor selected by a virtual world environment owner or operator (block 2223). A further possible feature includes implementing the tentative transfer that is triggered by a disqualification factor selected by a real-world third party or a virtual world third party (block 2224).

Figure 93:
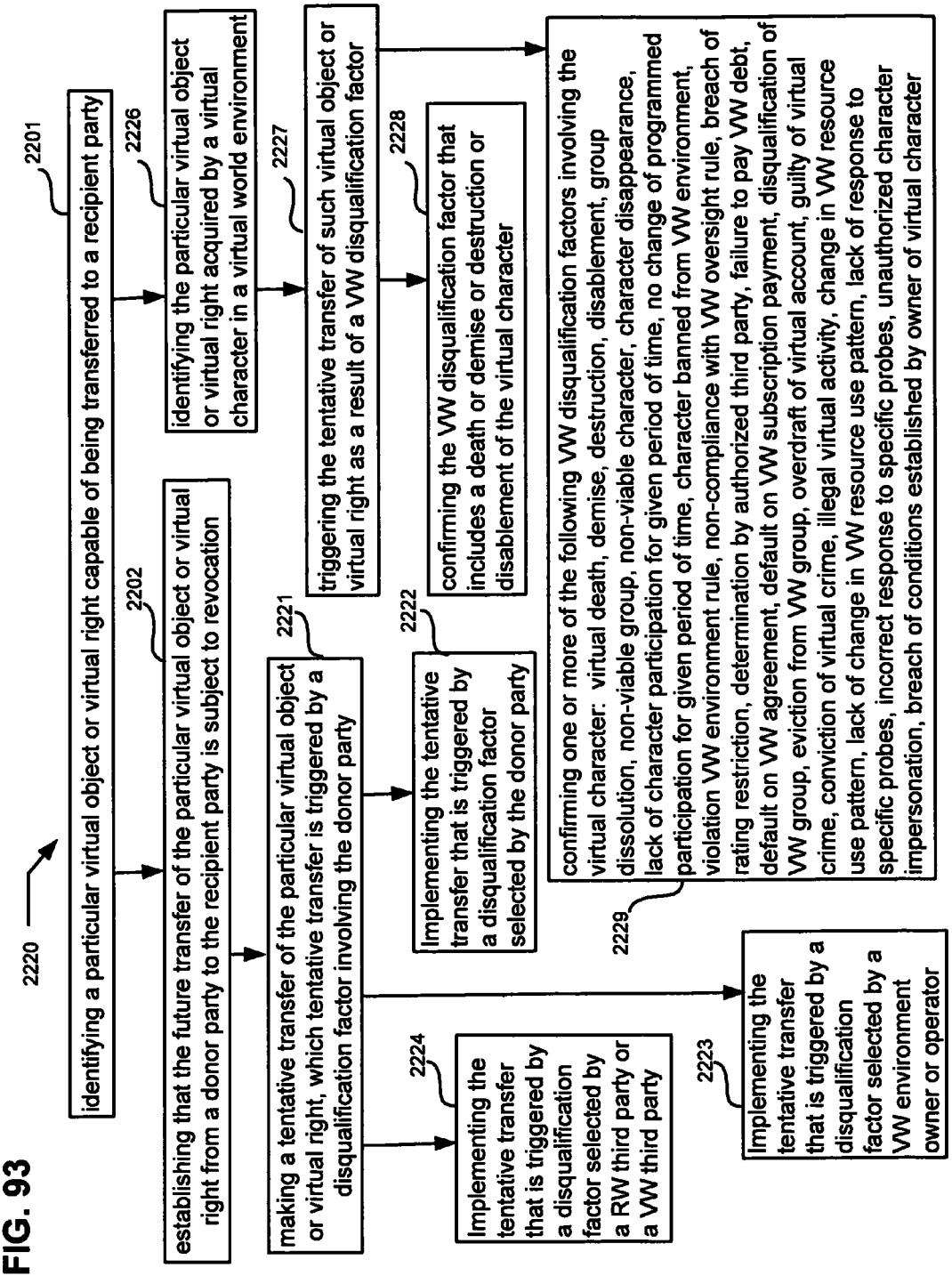

Other possible aspects disclosed in FIG. 93 include identifying the particular virtual object or virtual right acquired by a virtual character in a virtual world environment (block 2226), and triggering the tentative transfer of the particular virtual object or virtual right as a result of a VW disqualification factor (block 2227).

Related possible aspects involving the VW disqualification factor include confirming the virtual world disqualification factor that includes a death or demise or destruction or disablement of the virtual character (block 2228). A further possible aspect includes confirming one or more of the following virtual world disqualification factors involving the virtual character: virtual death, demise, destruction, disablement, group dissolution, non-viable group, non-viable character, character disappearance, lack of character participation for given period of time, no change of programmed participation for given period of time, character banned from virtual world environment, violation virtual world environment rule, non-compliance with VW oversight rule, breach of rating restriction, determination by authorized third party, failure to pay virtual world debt, default on virtual world agreement, default on virtual world subscription payment, disqualification of virtual world group, eviction from virtual world group, overdraft of virtual account, guilty of virtual crime, conviction of virtual crime, illegal virtual activity, change in VW resource use pattern, lack of change in VW resource use pattern, lack of response to specific probes, incorrect response to specific probes, unauthorized character impersonation, and breach of conditions established by owner of virtual character (block 2229).

Figure 94:
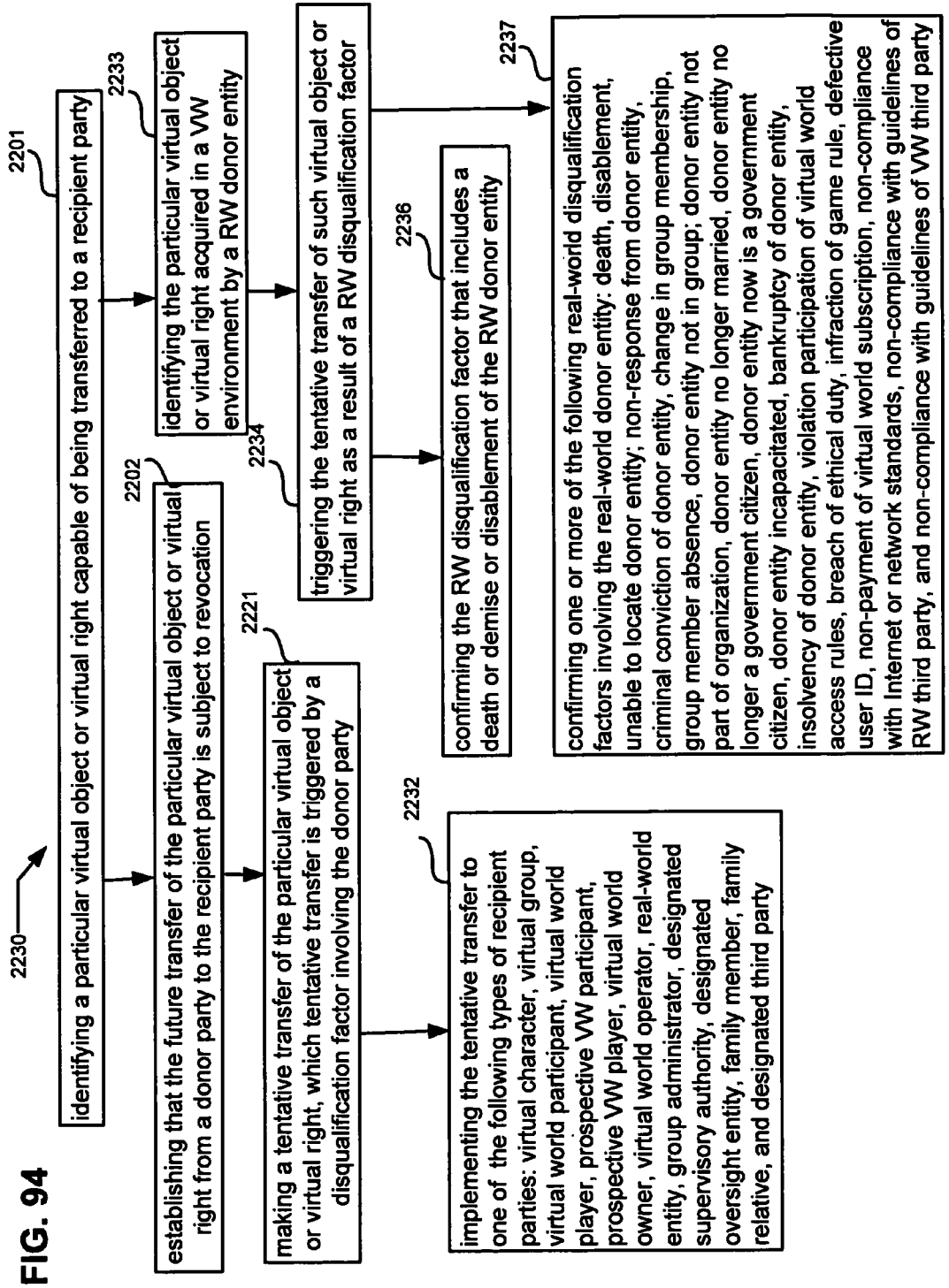

FIG. 94 discloses additional exemplary embodiments 2230 that include previously described process features 2201, 2202, 2221 as well as a further aspect of implementing the tentative transfer to one of the following types of recipient parties: virtual character, virtual group, virtual world participant, virtual world player, prospective VW participant, prospective VW player, virtual world owner, virtual world operator, real-world entity, group administrator, designated supervisory authority, designated oversight entity, family member, family relative, and designated third party (block 2232).

Other possible aspects disclosed in FIG. 94 include identifying the particular virtual object or virtual right acquired in a virtual world environment by a RW donor entity (block 2233), and triggering the tentative transfer of the particular virtual object or virtual right as a result of a real-world disqualification factor (block 2234).

Further exemplary features may include confirming the real-world disqualification factor that includes a death or demise or disablement of the RW donor entity (block 2236). Other possible related features include confirming one or more of the following real-world disqualification factors involving the RW donor entity: death, disablement, unable to locate donor entity; non-response from donor entity, criminal conviction of donor entity, change in group membership, group member absence, donor entity not in group; donor entity not part of organization, donor entity no longer married, donor entity no longer a government citizen, donor entity now is a government citizen, donor entity incapacitated, bankruptcy of donor entity, insolvency of donor entity, violation participation of virtual world access rules, breach of ethical duty, infraction of game rule, defective user ID, non-payment of virtual world subscription, non-compliance with Internet or network standards, non-compliance with guidelines of RW third party, and non-compliance with guidelines of VW third party (block 2237).

Figure 95:
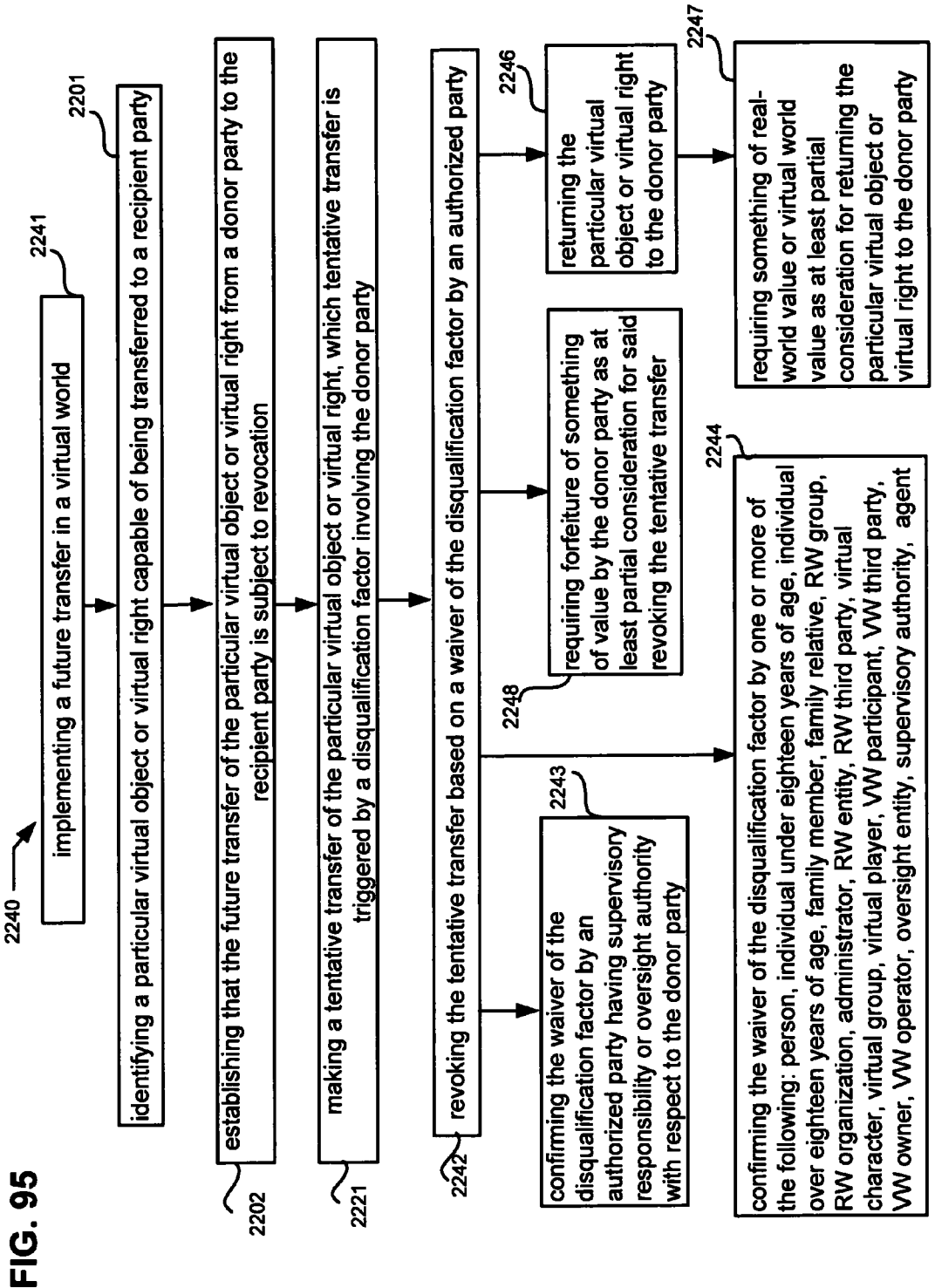

Referring to FIG. 95, the detailed embodiments 2240 disclose implementing a future transfer in a virtual world (block 2241) along with previously disclosed process components 2201, 2202, 2221. Additional aspects may include revoking the tentative transfer based on a waiver of the disqualification factor by an authorized party (block 2242), and confirming the waiver of the disqualification factor by an authorized party having supervisory responsibility or oversight authority with respect to the donor party (block 2243).

Another possible aspect includes confirming the waiver of the disqualification factor by one or more of the following: person, individual under eighteen years of age, individual over eighteen years of age, family member, family relative, real-world group, real-world organization, administrator, real-world entity, real-world third party, virtual character, virtual group, virtual player, virtual world participant, virtual world third party, virtual world owner, virtual world operator, oversight entity, supervisory authority, and agent (block 2244).

FIG. 95 further discloses a possible feature requiring forfeiture of something of value by the donor party as at least partial consideration for said revoking the tentative transfer (block 2248). Other possible process features include returning the particular virtual object or virtual right to the donor party (block 2246), and requiring something of real-world value or virtual world value as at least partial consideration for said returning the particular virtual object or virtual right to the donor party (block 2247).

Figure 96:
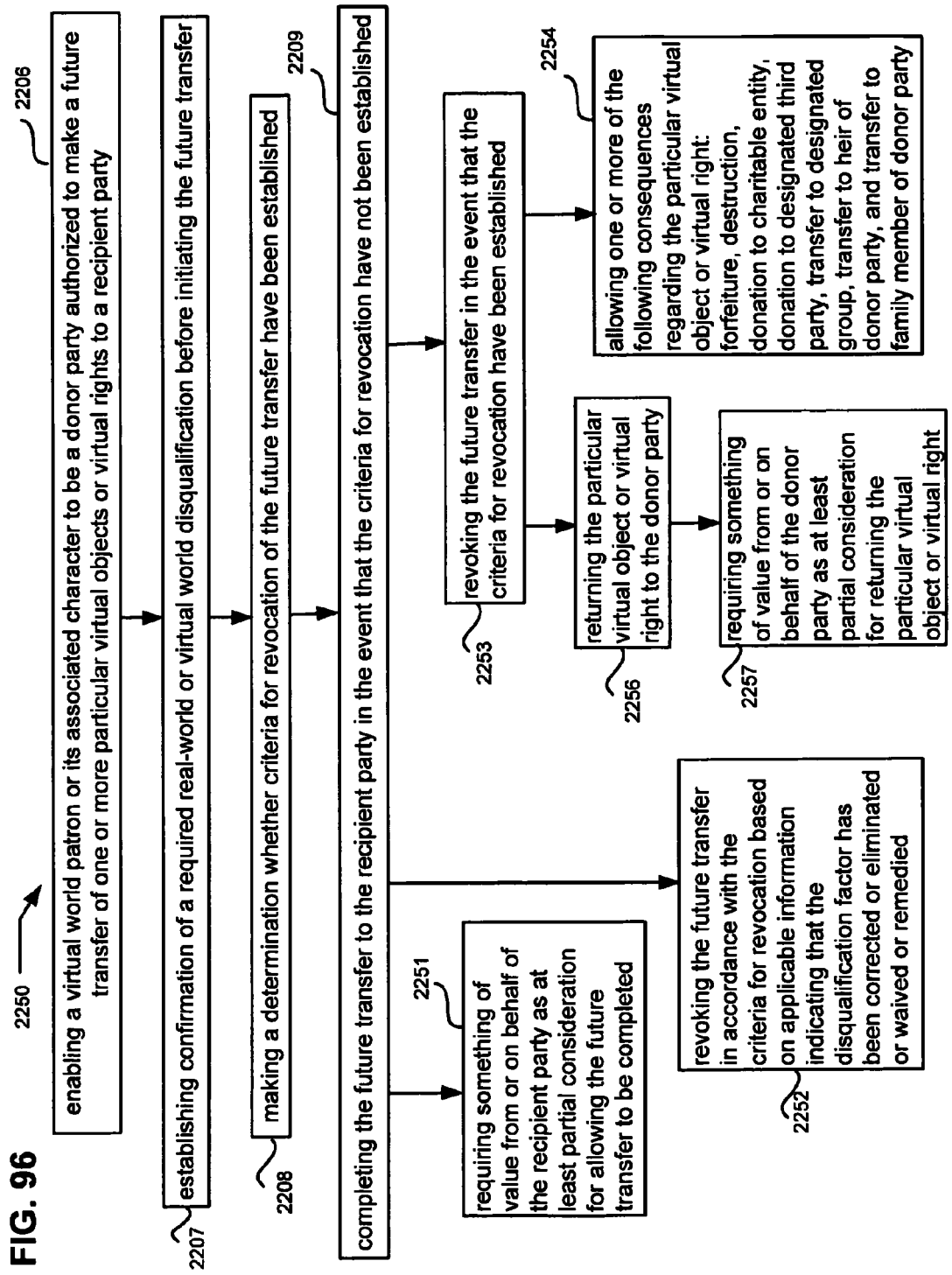

Other possible implementation features 2250 are disclosed in FIG. 96, including previously described process components 2206, 2207, 2208, 2209 along with a further possible feature requiring something of value from or on behalf of the recipient party as at least partial consideration for allowing the future transfer to be completed (block 2251). Another aspect may include revoking the future transfer in accordance with the criteria for revocation based on applicable information indicating that the disqualification factor has been corrected or eliminated or waived or remedied (block 2252).

Additional exemplary features may include revoking the future transfer in the event that the criteria for revocation have been established (block 2253), returning the particular virtual object or virtual right to the donor party (block 2256), and requiring something of value from or on behalf of the donor party as at least partial consideration for returning the particular virtual object or virtual right (block 2257).

A related possible feature includes allowing one or more of the following consequences regarding the particular virtual object or virtual right: forfeiture, destruction, donation to charitable entity, transfer to designated third party, transfer to designated group, transfer to heir of donor party, and transfer to family member of donor party (block 2254).

Figure 97:
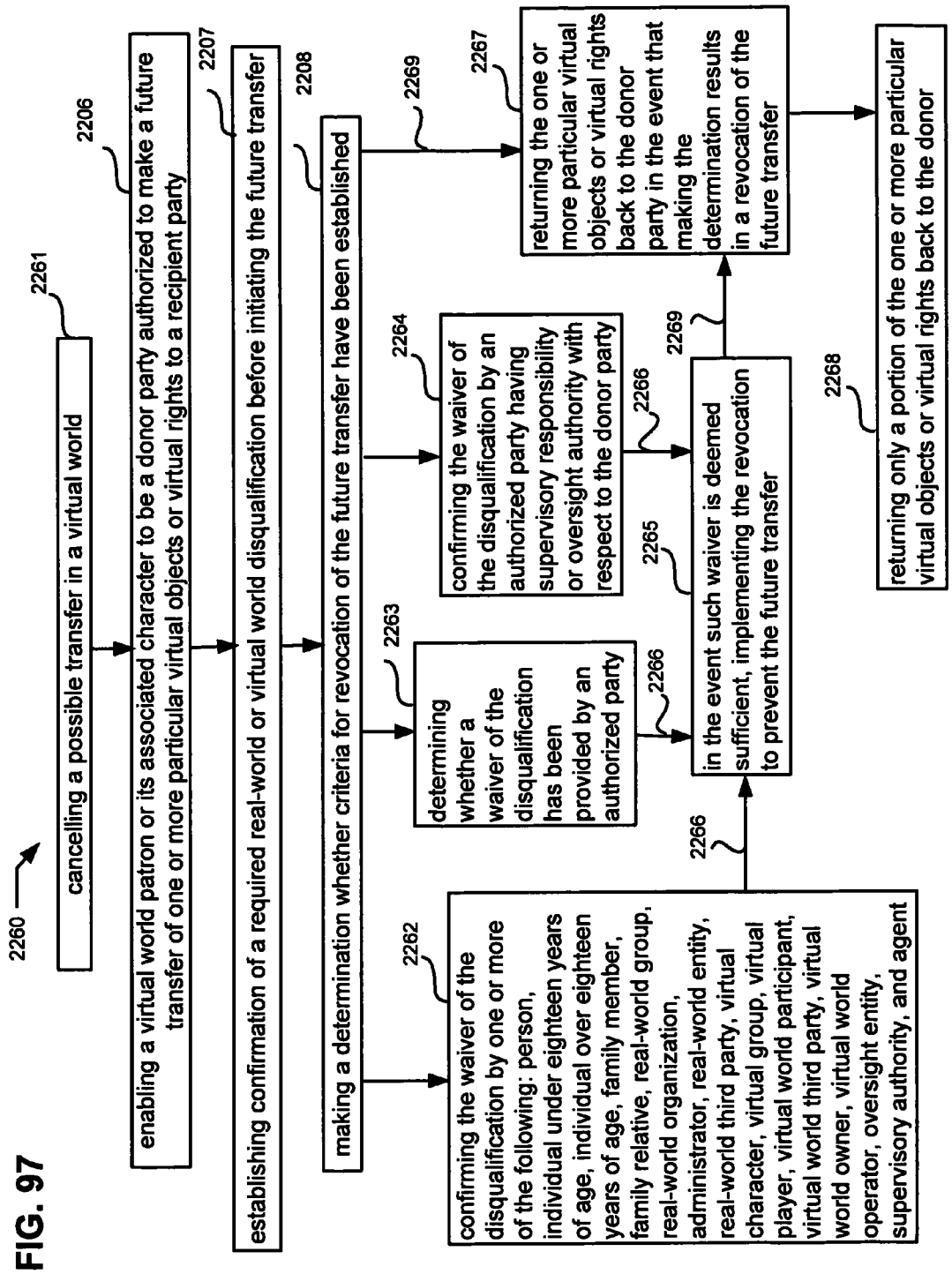

FIG. 97 illustrates further exemplary embodiments 2260 that provide for cancelling a possible transfer in a virtual world (block 2261), and may include previously described process components 2206, 2207, 2208. Other possible aspects include confirming the waiver of the disqualification factor by one or more of the following: person, individual under eighteen years of age, individual over eighteen years of age, family member, family relative, real-world group, real-world organization, administrator, real-world entity, real-world third party, virtual character, virtual group, virtual player, virtual world participant, virtual world third party, virtual world owner, virtual world operator, oversight entity, supervisory authority, and agent (block 2262).

Additional possible waiver features may include determining whether a waiver of the disqualification has been provided by an authorized party (block 2263). A further possible waiver feature includes confirming the waiver of the disqualification factor by an authorized party having supervisory responsibility or oversight authority with respect to the donor party (block 2264).

A further aspect provides that in the event any such disqualification waiver is deemed sufficient, the process implements the revocation to prevent the future transfer (block 2265). It will be understood that the revocation to prevent the future transfer (block 2265) may result from many different types of disqualification waivers (see arrows 2266). Additional exemplary features may include returning the one or more particular virtual objects or virtual rights back to the donor party in the event that said making the determination results in a revocation of the future transfer (block 2267). It will be understood that such reversion of virtual objects or virtual rights back to the donor party may be a consequence of various determinations that override a disqualification (see arrows 2269).

In some instances where a revocation of the future transfer occurs, a possible aspect may in some implementations include returning only a portion of the one or more particular virtual objects or virtual rights back to the donor (block 2268).

Figure 98:
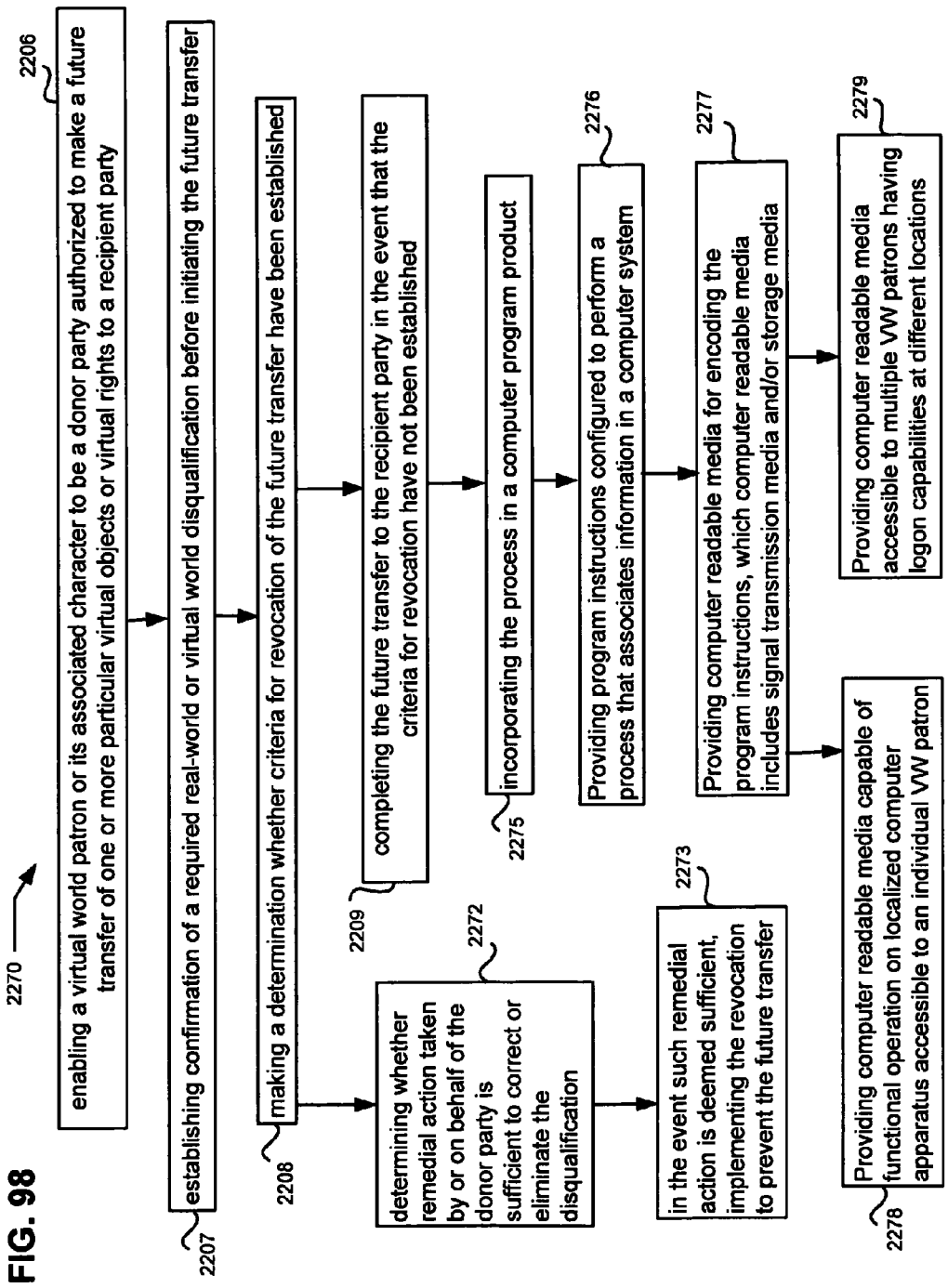

Referring to the embodiments 2270 of FIG. 98, previously described process components 2206, 2207, 2208, 2209 are shown along with further disqualification waiver features including determining whether remedial action taken by or on behalf of the donor party is sufficient to correct or eliminate the disqualification (block 2272). Some implementations may provide that in the event such remedial action is deemed sufficient, the process implements the revocation to prevent the future transfer (block 2273).

FIG. 98 includes other possible aspects related to incorporating the exemplary process in a computer program product (block 2275). For example, an exemplary process may provide program instructions configured to perform a process that associates information in a computer system (block 2276). Also computer readable media may be provided for encoding the program instructions, which computer readable media may include signal transmission media and/or storage media (block 2277).

Further component features may include computer readable media capable of functional operation on localized computer apparatus accessible to an individual virtual world patron (block 2278), and computer readable media accessible to multiple virtual world patrons having logon capabilities at different locations (block 2279).

Figure 99:
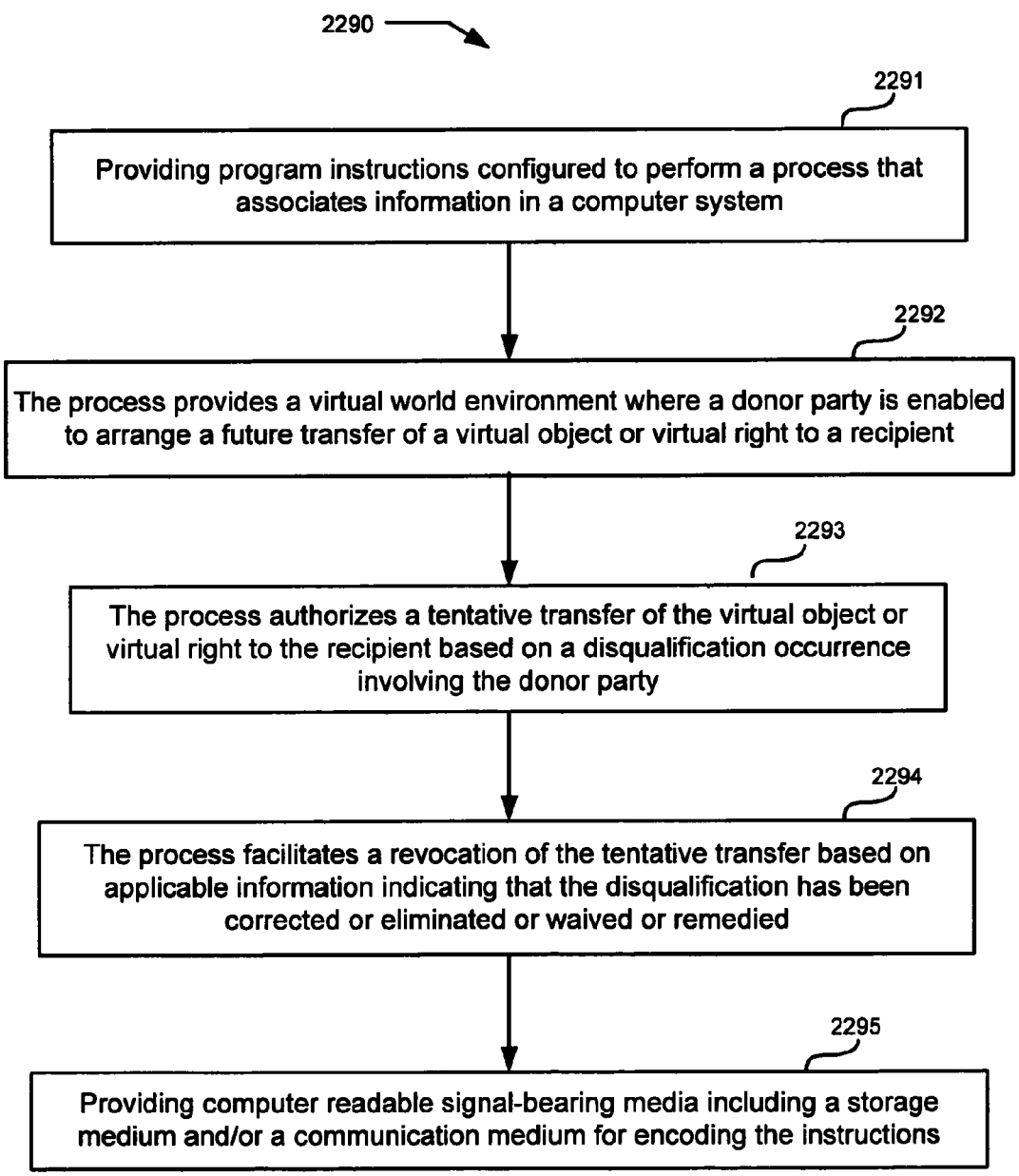
FIG. 99 is an additional exemplary computer program product implementation.

The flow chart of FIG. 99 discloses a process implementation 2290 in a computer program product, including providing program instructions configured to perform a process that associates information in a computer system (block 2291). The exemplary process may provide a virtual world environment where a donor party is enabled to arrange a future transfer of a virtual object or virtual right to a recipient (block 2292), and may further authorize a tentative transfer of the virtual object or virtual right to the recipient based on a disqualification occurrence involving the donor party (block 2293).

Further possible process features may include facilitating a revocation of the tentative transfer based on applicable information indicating that the disqualification has been corrected or eliminated or waived or remedied (block 2294). In addition some implementation may provide computer readable signal-bearing media including a storage medium and/or a communication medium for encoding the instructions (block 2295).

Many of the different process and system components disclosed herein can be implemented in one or more computer program products. In that regard the particular exemplary computer program product implementations are for purposes of illustration only, and are not intended to be limiting.

Some exemplary computer program product embodiments may incorporate a process component that authorizes a tentative transfer of a virtual object or right, which tentative transfer is based on a virtual world disqualification occurrence that includes a death or demise or destruction or disablement of a virtual character associated with the donor party. Another process component may include authorizing the tentative transfer based on a real-world disqualification occurrence that includes a death or disablement of a real-world entity associated with the donor party.

Further computer program product embodiments may include other exemplary process components such as revoking any tentative or future transfer to the recipient, and in some instances implementing a revocation guideline for returning the virtual object or virtual right to the donor party.

Another possible computer program product aspect may include revoking any tentative or future transfer to the recipient, and in some instances implementing a revocation guideline that provides one or more of the following consequences regarding the virtual object or virtual right: forfeiture, destruction, donation to charitable entity, transfer to designated third party, transfer to designated group, transfer to heir of donor party, and transfer to family member of donor party.

It is to be understood that the various itemized listings herein as set forth in the flow chart diagrams and related detailed descriptions are not intended to be exhaustive, but are provided only by way of example. In some implementations certain specific listings and/or types of listings may not be applicable. In other instances a particular implementation may include additional real-world and/or virtual world aspects, attributes, characteristics, parties, entities, contingencies, pre-conditions, qualifications, etc., depending on the circumstances.

As disclosed herein, exemplary process instructions relating to a future transfer of a virtual property right from a donor party to a designated successor party may be incorporated in a computer program product. Such instructions may facilitate an arrangement for such a future transfer of the virtual property right to a real-world recipient or to a virtual world recipient.

Other exemplary process instructions may relate to confirming one or more of the following types of real-world or virtual world requirements as a pre-condition to completing the transfer to the successor party or recipient: recipient's traits, recipient's characteristics, recipient's capability, possessions of recipient, correlated items of recipient, recipient's relinquishment of non-compatible object, recipient's acquisition of compatible object, context of transfer, circumstances of donor party's disqualification, prior conduct of donor party, future RW conduct of recipient, future VW conduct of recipient, restricted future use of property right, required type of future use of property right, third party oversight of property right, and resolution of adverse claim.

In some computer program product implementations, a future transfer of the virtual property right may be contingent upon establishing confirmation of a virtual world occurrence or a real-world occurrence involving the donor party.

A related contingency aspect of an exemplary computer program embodiment may provide encoded instructions for executing a process that includes confirming one or more of the following real-world occurrences: death of donor party; unable to locate donor party; non-response from donor party; criminal conviction of donor party; change in group membership; group member absence; donor party not in group; donor party not part of organization; donor party no longer married; donor party no longer a government citizen; donor party now is a government citizen; donor party disqualified; bankruptcy of donor party; and insolvency of donor party.

Another related contingency aspect of an exemplary computer program embodiment may provide encoded instructions for executing a process that includes confirming one or more of the following virtual world occurrences: virtual character death, virtual character destruction, virtual character disappearance, lack of virtual character participation for given period of time, no change of programmed participation of virtual character for given period of time, virtual character banned from the virtual world environment, violation by virtual character of one or more virtual environment rules, non-compliance with VW oversight rule, failure of virtual character to pay a virtual world debt, default on virtual world agreement, default on payment of virtual world subscription, disqualification of virtual world group, eviction from virtual world group, violation of oversight rule, breach of rating restriction, overdraft of virtual account, guilty of virtual crime, conviction of virtual crime, illegal virtual activity, detection of change in VW resource use pattern; detection of lack of change in VW resource use pattern, lack of response to specific probe, incorrect response to specific probe, unauthorized character impersonation, and satisfaction of condition established by owner of virtual character.

Some computer program embodiments may provide encoded instructions for executing a process that includes making a record of one or more of the following types of informational data: authorization for transferring, date of authorization, identity of designated successor party, identity of virtual property right to be transferred, secondary beneficiary, transfer requirements, transfer fee, and required third party approval.

It will be understood that some computer program product embodiments may include process instructions for facilitating the arrangement to transfer a virtual right to make one or more copies of separable elements incorporated in the composite object. Other process instructions may facilitate an arrangement to transfer a virtual right to make one or more copies of a composite object having inseparable elements.

Yet other process instructions may facilitate an arrangement to transfer a virtual right regarding one or more of the following types of virtual world individual or composite objects: composite virtual character, virtual character name, virtual character trait, character attribute, composite avatar, virtual skill, virtual key, access right, value tokens, virtual currency, experience points, level access, virtual property, virtual real property, virtual personal property, property right, contractual right, email account, password, key, location, site, history, log, activity log, chat log, messages, message log, list, companion list, contact list, address list, item, modified item, item component, disguise, clothing, clothing component, accessory, weapon, tool, vehicle, magical power, decoration, inventory, store credit, virtual charge account, virtual role, virtual position, group membership, all virtual rights of donor, and total asset accumulation of donor.

Additional exemplary process instructions may facilitate an arrangement to transfer a virtual right to make one or more identical or modified copies of a virtual aspect or attribute or element. Other aspects may involve instructions for allowing a transfer to a virtual world successor party as well as to a real-world successor party.

It will be understood that computer implemented systems may include various features such as a module component to facilitate disposition to the designated successor party of the proprietary virtual right regarding a virtual aspect or attribute or element of the virtual world. Another exemplary implementation may provide a module component to facilitate disposition to the designated successor party of the proprietary virtual right regarding a composite virtual object of the virtual world. Another module component may facilitate disposition to the designated successor party of the proprietary virtual right regarding one or more individual elements of a composite virtual object of the virtual world.

Addition computerized system implementations may include a module component to facilitate making a conditional transfer of the proprietary virtual right to a virtual escrow agent or a real-world escrow agent prior to implementing the disposition to the designated successor party. Other implementations may provide a module component to facilitate making a conditional transfer of the proprietary virtual right based on confirming that the successor party or beneficiary has one or more of the following types of required virtual aspects or attributes or elements: level access, experience token, skill level, enabling state, capability, related virtual right, related characteristic, related character trait, related character ability, stated belief, stated intention, correlated personality, designated mood, certain emotional trait, particular possession, correlated item, compatible object, prior conduct, group membership, non-group membership, citizenship, non-citizenship, subject to restriction, subject to supervisory authority, subject to rating scheme, subject to law, subject to regulation, commitment to future conduct, third party oversight, related virtual property, virtual real estate, currently active character, and currently a participant in virtual world.

Exemplary system embodiments may provide a record that includes a transfer-related tag or flag associated with one or more of the following: patron, transferable right, proprietary virtual right, virtual right to make identical copy, virtual right to make modified copy, designated successor party, designated virtual world successor party, designated real-world successor party, applicable transfer term, and applicable transfer condition. Other record keeping features may include one or more of the following requirements: read-only access to patron, read/write access to patron, read-only access to designated successor party, read/write access to virtual world owner, read/write access to virtual world operator.

Some computerized system implementations relating to conditional transferable rights in a virtual world environment may include database records for identifying a transferable composite virtual world object having two or more multiple components inseparable from each other. A related aspect may include a module that facilitates the disposition of such inseparable multiple components together to a designated successor party.

In some instances the database records may identify a transferable virtual world object having two or more independent multiple components. A related aspect may include a module that facilitates the disposition of such independent multiple components to multiple designated successor parties, respectively.

Other aspects of a computerized system may include a module that facilitates a temporary or permanent transfer of a virtual right or object based on confirmation of a real-world death or other real-world disqualification of the donor party.

Another computerized system aspect may include a module that facilitates a permanent or temporary transfer of a virtual right or object based on confirmation of a virtual world death or demise or disability or other applicable disqualification of a virtual character associated with the donor party.

Some computerized system database components may include a record of one or more adverse claims made in response to a virtual world notification of a pending disposition of the conditional transferable right to the designated successor party. In some embodiments the record may include one or more of the following types of adverse claims or defects: real-world estate claim, real-world creditor claim, real-world contractual claim, real-world legal claim, real-world group claim, real-world family claim, prior real-world transfer, virtual world estate claim, virtual world creditor claim, virtual world contractual claim, virtual world legal claim, virtual world family claim, prior virtual world transfer, virtual world item expiration, item lost, item destroyed, item not separable, virtual world privilege expiration, voided right, rescinded right, forfeited right, item no longer identifiable, right not separable, group right vetoed by group, right no longer legally transferable, right no longer recognized, right no longer exercisable, erroneous death confirmation, forged authorization, improper authorization, misplaced authorization, jointly owned right, conflicting authorizations, transfer revoked, violation of oversight authority, change of virtual attributes, existing right does not match transferred right, existing description does not match transferred description, and third party consent denied.

Some system database embodiments may includes one or more of the following types of conditional future transfer requirements: secondary beneficiary, group beneficiary, charitable beneficiary, joint beneficiaries, real-world party donor to be anonymous, disclose identity of real-world donor only after confirmation of death, subject to contingency, contingent on type of death or disqualification of real-world donor, contingent on type of death or demise or disability or disqualification of virtual world donor, contingent on successor having attribute, contingent on successor not having attribute, contingent on successor having certain item, contingent on successor not having certain item, contingent on successor having related item, contingent on successor having right to acquire related item, contingent on successor having right to inherit related item, conditional transfer based on successor party's age, conditional transfer based on successor party's education, conditional transfer based on successor party's marital status, transfer conditional upon acceptance by successor party, transfer conditional upon timely acceptance, transfer conditional upon inspection by successor party, collective transfer of all virtual property rights of real-world party donor, transfer of multiple versions of the subject matter of the property right, authorize duplicate virtual attributes or aspects to be transferred, collective transfer of all virtual property rights to respective designated beneficiaries, transfer voided if successor party deceased, further transferability not authorized; transfer to occur at given date even if real-world party donor still alive, transfer conditional upon approval of third party, transfer made to trustee on behalf of successor party, transfer made to trustee on behalf of beneficiary, liquidating virtual world property right prior to transfer, obtaining liquidated virtual world value as subject of transfer, and obtaining liquidated real-world value as subject of transfer.

It will be understood for the disclosure herein that an exemplary system database regarding conditional future transfers of a virtual right or object may include a record of one or more of the following types of informational data relating to a conditional future transfer: authorization for transferring, date of authorization, identity of designated successor party, identity of property right to be transferred, secondary beneficiary, transfer requirements, transfer fee, and required third party approval.

Another aspect of an exemplary system database record related to conditional transferable virtual world rights may include providing database accessibility to one or more of the following: owner of virtual-world environment, operator of virtual-world environment, real-world party donor, party selected by donor, agent of donor, designated successor party, party selected by successor party, approved representative of real-world party donor, approved representative of designated successor party, secondary beneficiary, contingent beneficiary, joint beneficiary, parent of successor who is a minor, guardian of successor who is a minor, officer of successor entity, and officer of successor group. In some instances such database records are configured to be accessible in a real-world environment; in other instances such accessibility may be provided in a virtual world environment.

As disclosed herein, system database records implementations may relate to an authorized conditional transfer of a property right regarding one or more of the following types of independent or composite virtual aspects or attributes or elements: virtual character, virtual character name, virtual character trait, character attribute, composite avatar, virtual skill, virtual key, access right, value tokens, virtual currency, experience points, level access, virtual property, virtual real property, virtual personal property, property right, contractual right, email account, password, key, location, site, history, log, activity log, chat log, activity log, messages, message log, list, companion list, contact list, address list, item, modified item, item component, disguise, clothing, clothing component, accessory, weapon, tool, vehicle, magical power, decoration, inventory, store credit, virtual charge account, virtual role, virtual position, group membership, all virtual rights of donor, and total asset accumulation of donor.

It is to be understood that the various references herein to specific types or categories of informational data that may be maintained in database records or other memory devices are not intended to be exhaustive. In some implementations certain data entries may not be deemed necessary or desirable. Other implementations may provide for retention of additional or more comprehensive data files depending on the circumstances.

The value ascribed to a virtual world object that is the subject of a future transfer may be calculated by objective or subjective standards. Some virtual objects may be determined to be of trivial value and not worthy of perpetuation through transferability; others may be considered to have irreplaceable value in which case transferability may be a high priority for a prospective donor.

It will be understood that virtual world elements that may be subject to transferability include numerous rights to VW personality attributes, characteristics, skills, things, etc. as well as many different types of rights acquired through diverse VW transactions, arrangements, achievements, experiences, etc. Accordingly the examples of such rights as disclosed in the method, system, apparatus and computer product embodiments herein are not intended to be exhaustive or limiting.

Figure 100:
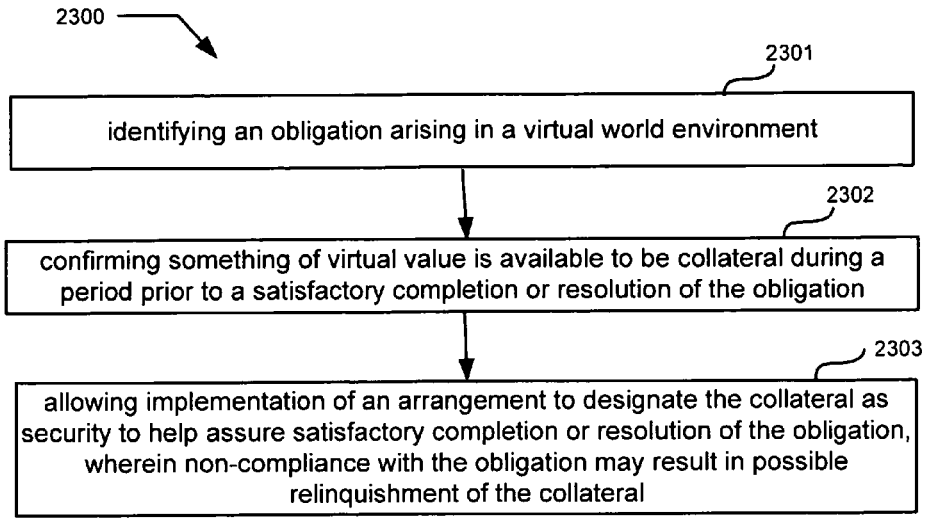
FIGS. 100-101 are high level flow charts for additional exemplary embodiments.

The use of virtual collateral as security for a virtual world obligation (e.g., debt, promise, ongoing obligation, future obligation, etc.) can be incorporated in various embodiments. For example, a possible process embodiment implementation 2300 shown in the high level flow chart of FIG. 100 includes identifying an obligation arising in a virtual world environment (block 2301), and confirming something of virtual value is available to be collateral during a period prior to a satisfactory completion or resolution of the obligation (block 2302). A further possible process feature includes allowing implementation of an arrangement to designate the collateral as security to help assure satisfactory completion or resolution of the obligation, wherein non-compliance with the obligation may result in possible relinquishment of the collateral (block 2303).

Figure 101:
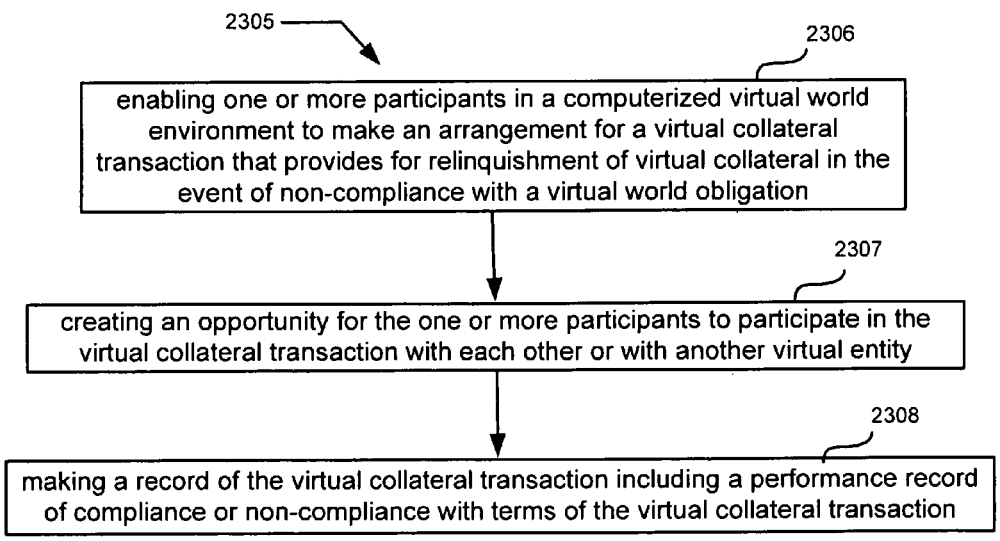

Another possible process embodiment implementation 2305 involving participation in a virtual world environment is illustrated in the high level flow chart of FIG. 101. Exemplary aspects include enabling one or more participants in a computerized virtual world environment to make an arrangement for a virtual collateral transaction that provides for relinquishment of virtual collateral in the event of non-compliance with a virtual world obligation (block 2306), creating an opportunity for the one or more participants to participate in the virtual collateral transaction with each other or with another virtual entity (block 2307), and making a record of the virtual collateral transaction including a performance record of compliance or non-compliance with terms of the virtual collateral transaction (block 2308).

Figure 102:
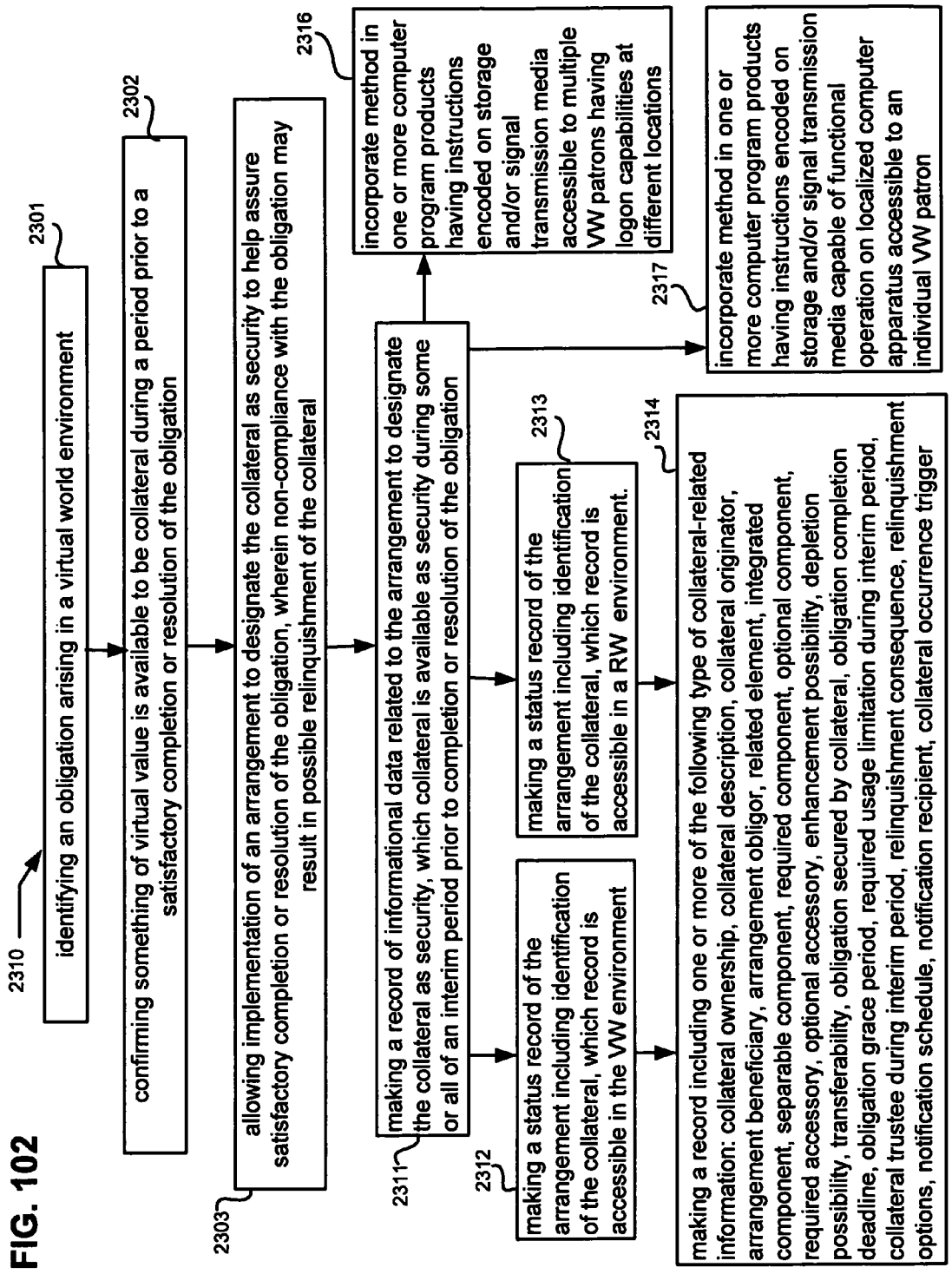
FIGS. 102-106 are more detailed flow charts for other possible exemplary embodiments.

Additional embodiments 2310 disclosed in FIG. 102 may include previously described process components 2301, 2302, 2303 along with various data record features. For example, exemplary aspects may include making a record of informational data related to the arrangement to designate the collateral as security, which collateral is available as security during some or all of an interim period prior to completion or resolution of the obligation (block 2311).

Other possible related aspects may include making a status record of the arrangement including identification of the collateral, which status record may be accessible in the virtual world environment (block 2312) and may be accessible in a real-world environment (block 2313). A further exemplary feature may provide for making a status record that includes one or more of the following type of collateral-related information: collateral ownership, collateral description, collateral originator, arrangement beneficiary, arrangement obligor, related element, integrated component, separable component, required component, optional component, required accessory, optional accessory, enhancement possibility, depletion possibility, transferability, obligation secured by collateral, obligation completion deadline, obligation grace period, required usage limitation during interim period, collateral trustee during interim period, relinquishment consequence, relinquishment options, notification schedule, notification recipient, and collateral occurrence trigger (block 2314)

As further shown in FIG. 102, an exemplary process embodiment may be incorporated in one or more computer program products having instructions encoded on storage and/or signal transmission media accessible to multiple virtual world patrons having logon capabilities at different locations (block 2316). In some implementation an exemplary process embodiment may be incorporated in one or more computer program products having instructions encoded on storage and/or signal transmission media capable of functional operation on localized computer apparatus accessible to an individual virtual world patron (block 2317).

Figure 103:
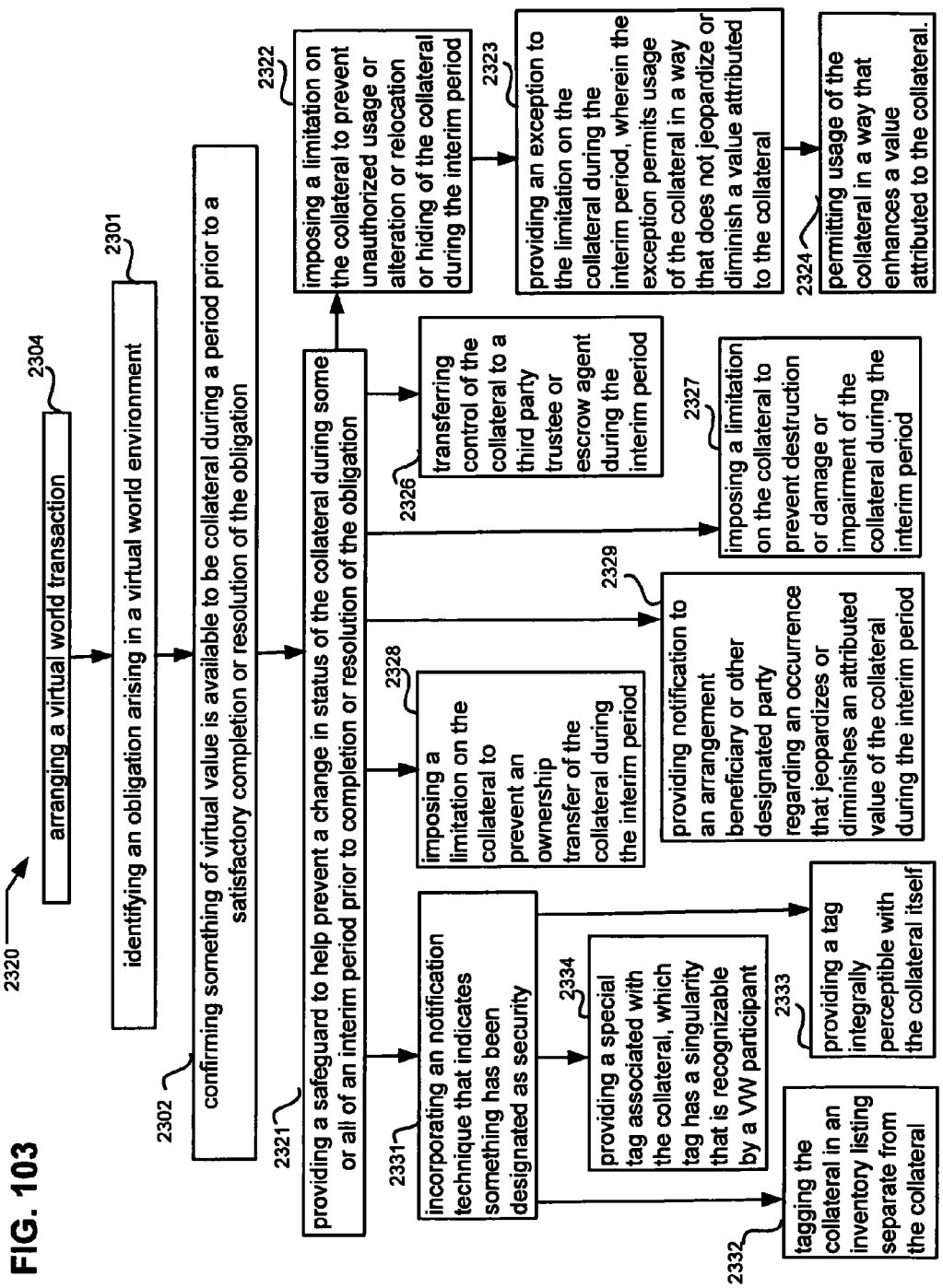

Referring to the exemplary embodiments 2320 of FIG. 103, a process implementation for arranging a virtual world transaction (block 2304) may include previously described process components 2301, 2302 along with providing a safeguard to help prevent a change in status of the collateral during some or all of an interim period prior to completion or resolution of the obligation (block 2321).

Additional aspects may include imposing a limitation on the collateral to prevent unauthorized usage or alteration or relocation or hiding of the collateral during the interim period (block 2322), and providing an exception to the limitation on the collateral during the interim period, wherein the exception permits usage of the collateral in a way that does not jeopardize or diminish a value attributed to the collateral (block 2323). A related aspect may include permitting usage of the collateral in a way that enhances a value attributed to the collateral (block 2324).

As further shown in FIG. 103, another safeguard feature may include transferring control of the collateral to a third party trustee or escrow agent during the interim period (block 2326). Other possible safeguard features may include imposing a limitation on the collateral to prevent destruction or damage or impairment of the collateral during the interim period (block 2327, imposing a limitation on the collateral to prevent an ownership transfer of the collateral during the interim period (block 2328), and providing notification to an arrangement beneficiary or other designated party regarding an occurrence that jeopardizes or diminishes an attributed value of the collateral during the interim period (block 2329).

Additional embodiment features may include incorporating a notification technique that indicates something has been designated as security (block 2331), tagging the collateral in an inventory listing separate from the collateral (block 2332), and providing a tag integrally perceptible with the collateral itself (block 2333). Another possible feature may include providing a special tag associated with the collateral, which tag has a singularity that is recognizable by a virtual world participant (block 2334).

Figure 104:
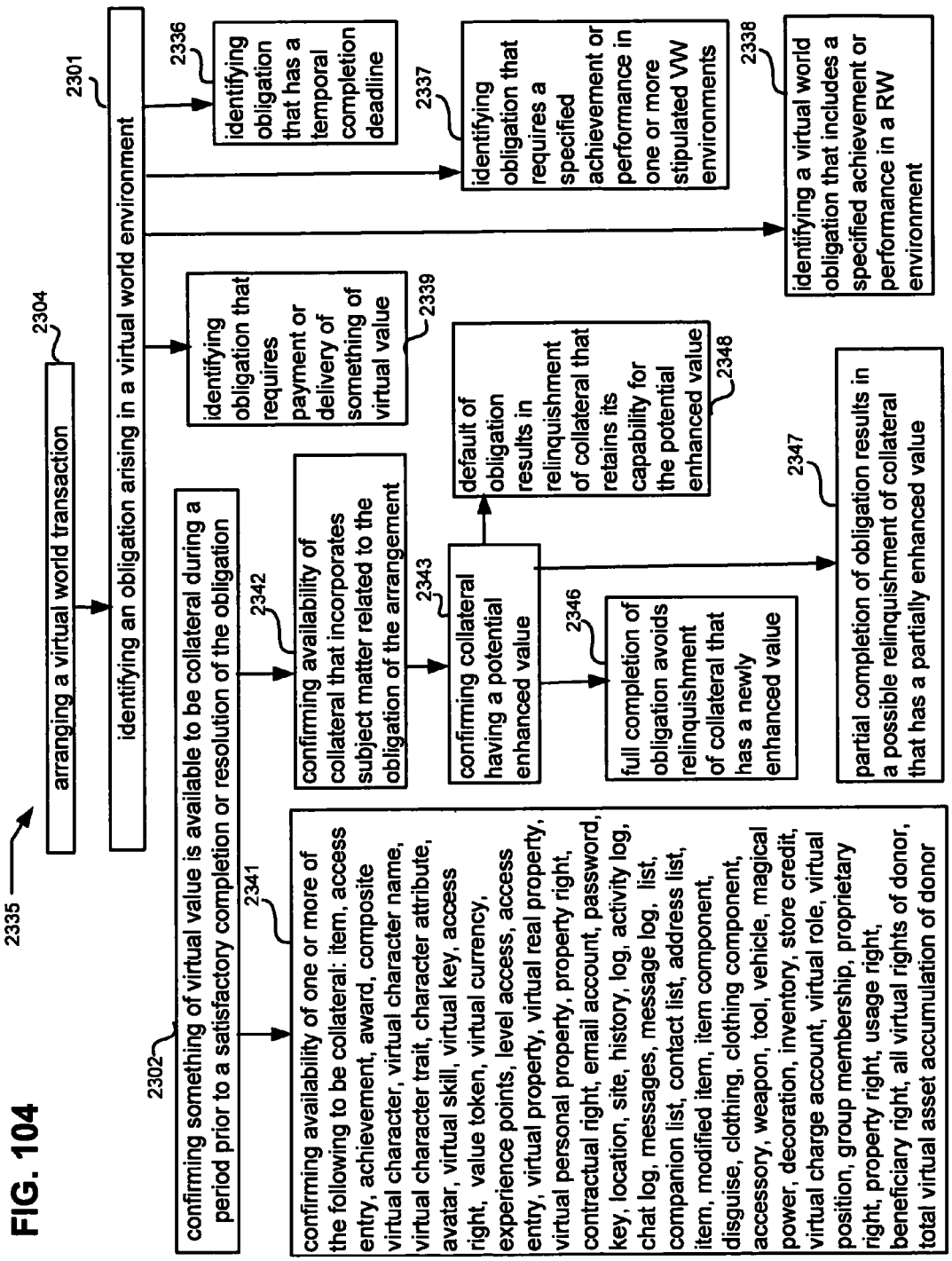

Referring to the more detailed embodiments 2335 of FIG. 104, exemplary components may include previously described features 2301, 2303, 2304 in combination with various types of obligations. For example, some implementations may include identifying the obligation that has a temporal completion deadline (block 2336), identifying the obligation that requires a specified achievement or performance in one or more stipulated virtual world environments (block 2337), and identifying a virtual world obligation that includes a specified achievement or performance in a real world environment (block 2338). Another aspect may include identifying the obligation that requires payment or delivery of something of virtual value (block 2339).

Some exemplary process components relating to types of possible virtual collateral may include confirming availability of one or more of the following to be collateral: item, access entry, achievement, award, composite virtual character, virtual character name, virtual character trait, character attribute, avatar, virtual skill, virtual key, access right, value token, virtual currency, experience points, level access, access entry, virtual property, virtual real property, virtual personal property, property right, contractual right, email account, password, key, location, site, history, log, activity log, chat log, messages, message log, list, companion list, contact list, address list, item, modified item, item component, disguise, clothing, clothing component, accessory, weapon, tool, vehicle, magical power, decoration, inventory, store credit, virtual charge account, virtual role, virtual position, group membership, proprietary right, property right, usage right, beneficiary right, all virtual rights of donor, and total virtual asset accumulation of donor (block 2341).

Also shown in FIG. 104 are other possible process components including confirming availability of specified virtual collateral that incorporates subject matter related to the obligation of the arrangement (block 2342). Possible related features may include confirming that such specified virtual collateral has a potential enhanced value (block 2343) wherein a full completion of the obligation avoids relinquishment of such collateral that has a newly enhanced value (block 2346) or wherein a partial completion of the obligation results in a possible relinquishment of such collateral that has a partially enhanced value (block 2347) or wherein a default of the obligation results in relinquishment of such collateral that retains its capability for the potential enhanced value (block 2348).

Figure 105:
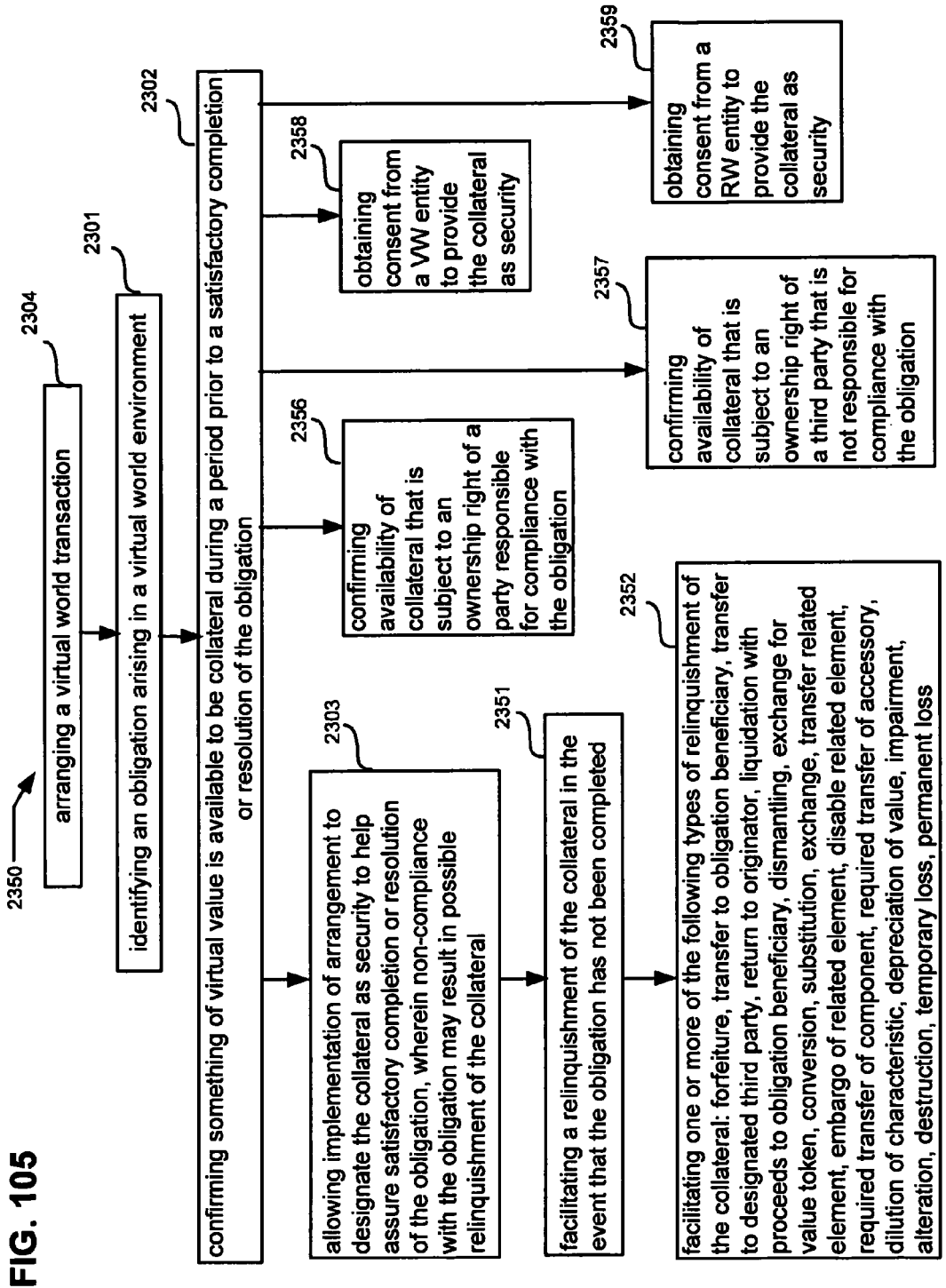

The exemplary process embodiments 2350 shown in the flow chart of FIG. 105 include previously described process features 2301, 2302, 2303, 2304 as well as other possible aspects relating to possible consequences involving virtual collateral. For example, a possible aspect includes facilitating a relinquishment of the collateral in the event that the obligation has not been completed (block 2351). A related aspect may include facilitating one or more of the following types of relinquishment of the collateral: forfeiture, transfer to obligation beneficiary, transfer to designated third party, return to originator, liquidation with proceeds to obligation beneficiary, dismantling, exchange for value token, conversion, substitution, exchange, transfer related element, embargo of related element, disable related element, required transfer of component, required transfer of accessory, dilution of characteristic, depreciation of value, impairment, alteration, destruction, temporary loss, and permanent loss (block 2352).

FIG. 105 further illustrates other possible implementation features including confirming availability of collateral that is subject to an ownership right of a party responsible for compliance with the obligation (block 2356), and confirming availability of collateral that is subject to an ownership right of a third party that is not responsible for compliance with the obligation (block 2357). Additional collateral aspects may include obtaining consent from a virtual world entity (block 2358) and in some instances from a real-world entity (block 2359) in order to provide the collateral as security. It will be understood that some circumstances may require consent from multiple virtual world and/or real-world parties as a basis for posting the virtual collateral as security for one or more obligations.

Figure 106:
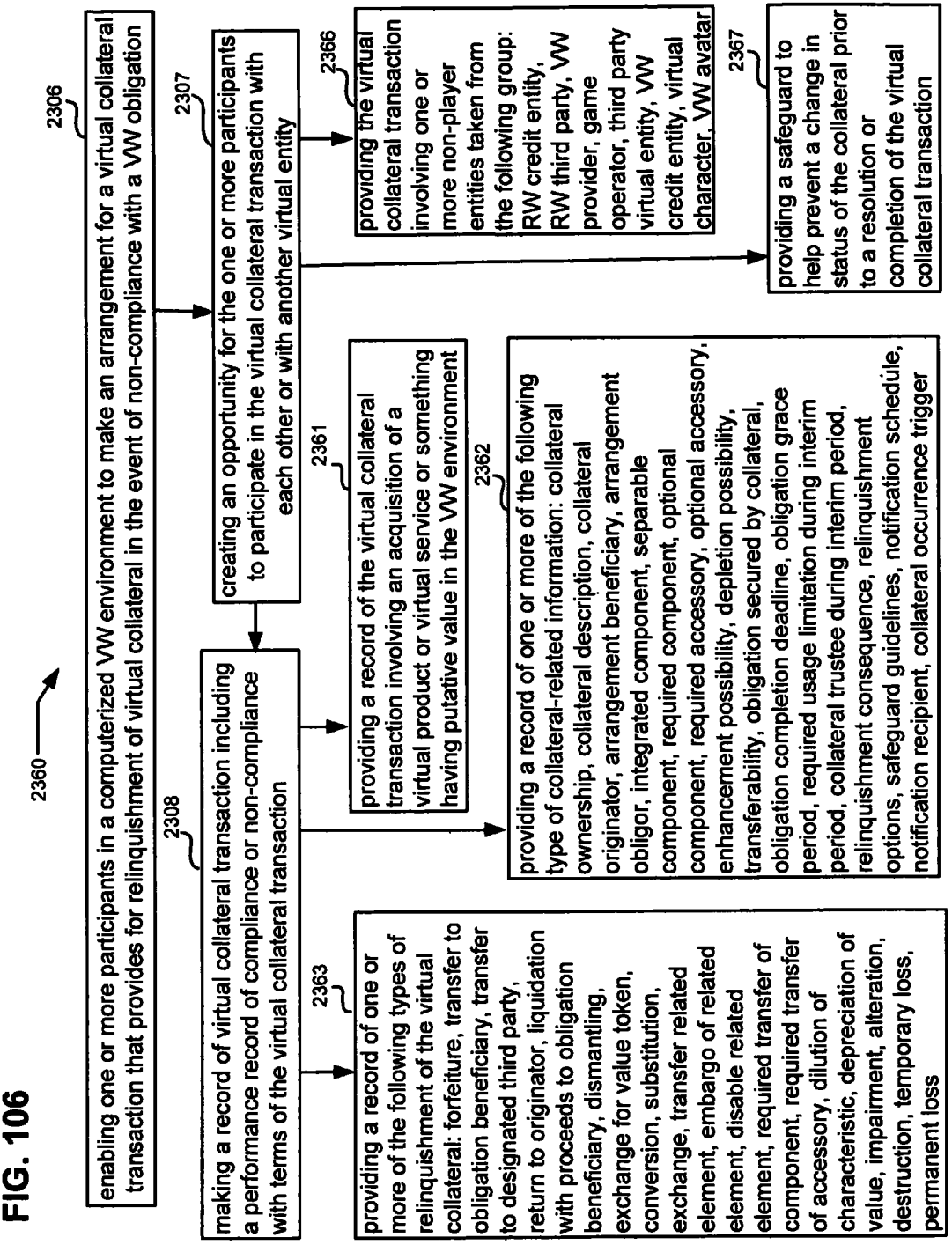

Referring to the detailed embodiments 2360 of FIG. 106, possible process components may include previously described features 2306, 2307, 2308 along with various record keeping aspects. For example, an exemplary implementation may include providing a record of the virtual collateral transaction involving an acquisition of a virtual product or virtual service or something having putative value in the virtual world environment (block 2361).

Another exemplary record keeping aspect may include providing a record of one or more of the following types of relinquishment of the virtual collateral: forfeiture, transfer to obligation beneficiary, transfer to designated third party, return to originator, liquidation with proceeds to obligation beneficiary, dismantling, exchange for value token, conversion, substitution, exchange, transfer related element, embargo of related element, disable related element, required transfer of component, required transfer of accessory, dilution of characteristic, depreciation of value, impairment, alteration, destruction, temporary loss, and permanent loss (block 2363).

A further exemplary record keeping aspect may include providing a record of one or more of the following type of collateral-related information: collateral ownership, collateral description, collateral originator, arrangement beneficiary, arrangement obligor, integrated component, separable component, required component, optional component, required accessory, optional accessory, enhancement possibility, depletion possibility, transferability, obligation secured by collateral, obligation completion deadline, obligation grace period, required usage limitation during interim period, collateral trustee during interim period, relinquishment consequence, relinquishment options, safeguard guidelines, notification schedule, notification recipient, and collateral occurrence trigger (block 2362).

The detailed embodiments 2360 of FIG. 106 further disclose other possible implementation features including providing the virtual collateral transaction involving one or more non-player entities taken from the following group: real-world credit entity, real-world third party, virtual world provider, game operator, third party virtual entity, virtual world credit entity, virtual character, and virtual world avatar (block 2366). An additional possible implementation feature includes providing a safeguard to help prevent a change in status of the collateral prior to a resolution or completion of the virtual collateral transaction (block 2367).

Computerized system embodiments and computer program products that incorporate features and aspects disclosed in herein may be implemented in various ways. For example, process instructions may be encoded on storage and/or signal transmission media accessible to multiple virtual world patrons having logon capabilities at different locations. In other implementations, process instructions may be encoded on storage and/or signal transmission media capable of functional operation on localized computer apparatus accessible to an individual virtual world patron.

It will be understood from the disclosure herein that a virtual reality environment may include a simulated world having a monetary system based on putative value symbols that constitute a medium of exchange, wherein the simulated world allows a virtual world arrangement to have a commitment for future payment of one or more putative value symbols.

An aspect of the simulated world may allow a virtual world transaction such as a credit arrangement to provide for future payment of one or more of the following types of value symbols: virtual currency, monetary chips, discount coupons, award points, access rights, entrance keys, experience medals, level permits, bonus vouchers, skill merits, character traits, health benefits, success awards, entrance tickets, authorization passes, eligibility credentials, benefit tokens, vested rights, license permissions, decryption codes, bonus vouchers, test certificates, game time credits, additional characters, control over other player characters, control over non-player characters, aliases, privacy levels, visibility levels, and disguises.

Another aspect of the simulated world may allow a VW arrangement to include a commitment by a debtor participant for future payment of a value symbol that can be acquired in connection with one or more of the following types of events or activities occurring in the simulated world: sports, races, competitions, combat, battles, survival, achievements, opportunities, challenges, character choices, training, academics, education, careers, jobs, journeys, attendance, entertainment, amusement, parties, shopping reading, calculating, analysis, healthcare, sharing communication, music, philanthropy, religion, socializing, companionship, dating, lovemaking, gambling, lotteries, tests, awards, gifts, barter, negotiations, sales, purchases, services, loans, journaling, record keeping, posting information, networking, and building. It will be understood from the disclosure herein that such events or activities occurring in the simulated world includes events or activities that occur wholly in the simulated world as well as events or activities that are only initiated or partly pursued in the simulated world, or combinations of both of these.

The simulated world may provide a game environment for one or more players, wherein a virtual world arrangement includes the acquisition of one or more of the following types of things of potential value: products, services, items, virtual value tokens, virtual currency, monetary chips, discount coupons, award points, access rights, entrance keys, experience medals, level permits, bonus vouchers, skill merits, character traits, health benefits, success awards, entrance tickets, authorization passes, eligibility credentials, benefit tokens, vested rights, license permissions, decryption codes, bonus vouchers, and test certificates.

In accordance with the disclosure herein, any acquisition of something having present or potential virtual value (e.g., in some instances combined virtual and real-world value) that is part of an ongoing or future obligation (e.g., debt, achievement, delivery, work, attendance, etc.) may involve virtual collateral that is provided as security. Such virtual collateral acts as an incentive for an obligor to complete (e.g., pay, perform, resolve, etc.) the obligation. Based on the terms of the virtual collateral arrangement, a beneficiary of an unfulfilled obligation may obtain some recompense, remuneration or compensation that may include a relinquishment (e.g., transfer, diminution, suspension, etc.) of rights originally associated with the virtual collateral.

Figure 107:
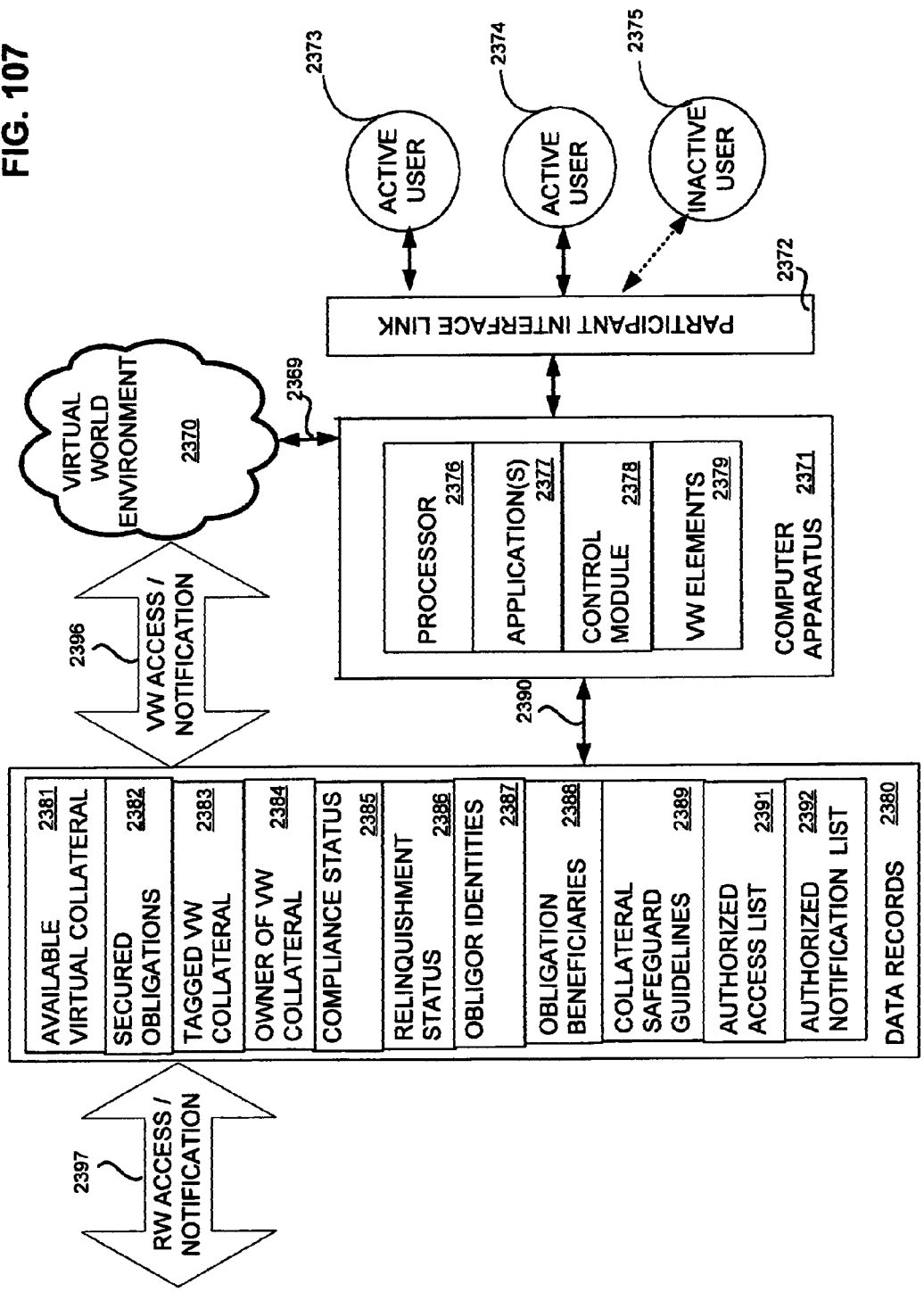
FIG. 107 is a schematic block diagram showing embodiments involving virtual collateral arrangements.

Referring to the schematic block diagram of FIG. 107, an exemplary virtual world environment 2370 is accessible through a participant interface link 2372 to one or more on-line active users 2373, 2374 as well as to one or more inactive users 2375 who are currently off-line. A local or network computer apparatus 2371 may include processor 2376, program application(s) 2377, and control module 2378. As shown by bidirectional arrow 2369, the various components of the illustrated computerized system work together to activate virtual world elements 2379 incorporated in the virtual world environment 2370.

The embodiment of FIG. 107 is configured to facilitate implementation of virtual world arrangements involving virtual collateral that serves as security for an obligation. A communication link 2390 is provided between computer apparatus 2371 and data records 2380. Possible exemplary types of data records incorporated in the exemplary embodiment include informational data relating to available virtual collateral 2381, secured obligations 2382, tagged VW collateral 2383, and ownership of VW collateral 2384. Other possible types of data records may include informational data relating to compliance status 2385, collateral relinquishment status 2386, obligor identities 2387, obligation beneficiaries 2388, and collateral safeguard guidelines 2389.

Of course, the exemplary data record embodiments are not intended to be limiting. It is understood that certain of the illustrative type of data records may not be necessary in certain implementations, and additional types of data records may also be provided depending on the circumstances.

It will be understood that important provisions regarding status notification and read/write access regarding data records 2380 may be deemed to be desirable. Accordingly, another exemplary system aspect may include an authorized access list 2391 and a authorized notification list 2392. Such lists may be part of security protocol wherein various types of controls may be implemented to provide limited (or in some instances widespread) VW access/notification 2396 as well as RW access/notification 2397 with respect to the data records 2380. Of course, access and/or notification for each type of data record may be collectively standardized or separately customized depending on applicable implementation issues (e.g., security, privacy, VW rules, legal requirements, etc.).

Some computerized virtual world system embodiments may include data records for one or more of the following type of collateral-related information: collateral ownership, collateral description, collateral originator, arrangement beneficiary, arrangement obligor, integrated component, separable component, required component, optional component, required accessory, optional accessory, enhancement possibility, depletion possibility, transferability, obligation secured by collateral, obligation completion deadline, obligation grace period, required usage limitation during interim period, collateral trustee during interim period, relinquishment consequence, relinquishment options, safeguard guidelines, notification schedule, notification recipient, and collateral occurrence trigger.

Exemplary system data records may include collateral-related informational data accessible to one or more of the following: collateral owner, collateral trustee, collateral escrow holder, party to arrangement, arrangement obligor, arrangement beneficiary, virtual world owner, virtual world operator, and collateral originator. Other possible system aspects may provide informational data records related to one or more virtual world obligations based on acquisition of a virtual product and/or a virtual service and/or something having value in the virtual world environment.

Additional system implementations may include informational data records regarding compliance and/or non-compliance with one or more virtual world obligations that are secured by the virtual collateral and in some instances may further include a record of a consequence imposed as a result of non-compliance with such virtual world obligations. Related system aspects may also provide data records of any transfer or relinquishment of the collateral as a result of such non-compliance.

It will be understood that some system embodiments may include data records of one or more of the following types of possible or actual relinquishments of the virtual collateral: forfeiture, transfer to obligation beneficiary, transfer to designated third party, return to originator, liquidation with proceeds to obligation beneficiary, dismantling, exchange for value token, conversion, substitution, exchange, transfer related element, embargo of related element, disable related element, required transfer of component, required transfer of accessory, dilution of characteristic, depreciation of value, impairment, alteration, destruction, temporary loss, and permanent loss.

Figure 108:
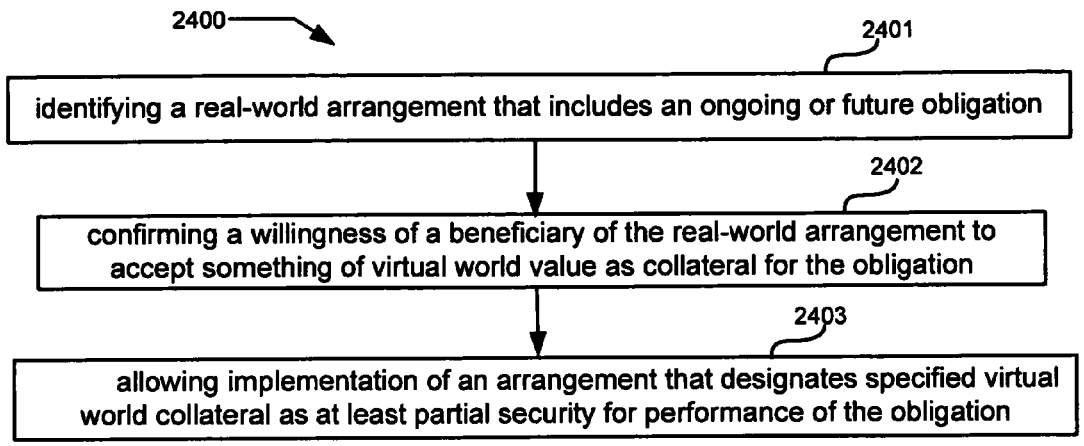
FIG. 108 is a high level flow chart for a further exemplary embodiment.

Referring to an exemplary embodiment 2400 shown in the high level flow chart of FIG. 108, possible process components include identifying a real-world arrangement that includes an ongoing or future obligation (block 2401), confirming a willingness of a beneficiary of the real-world arrangement to accept something of virtual world value as collateral for the obligation (block 2402), and allowing implementation of an arrangement that designates specified virtual world collateral as at least partial security for performance of the obligation (block 2403).

Figure 109:
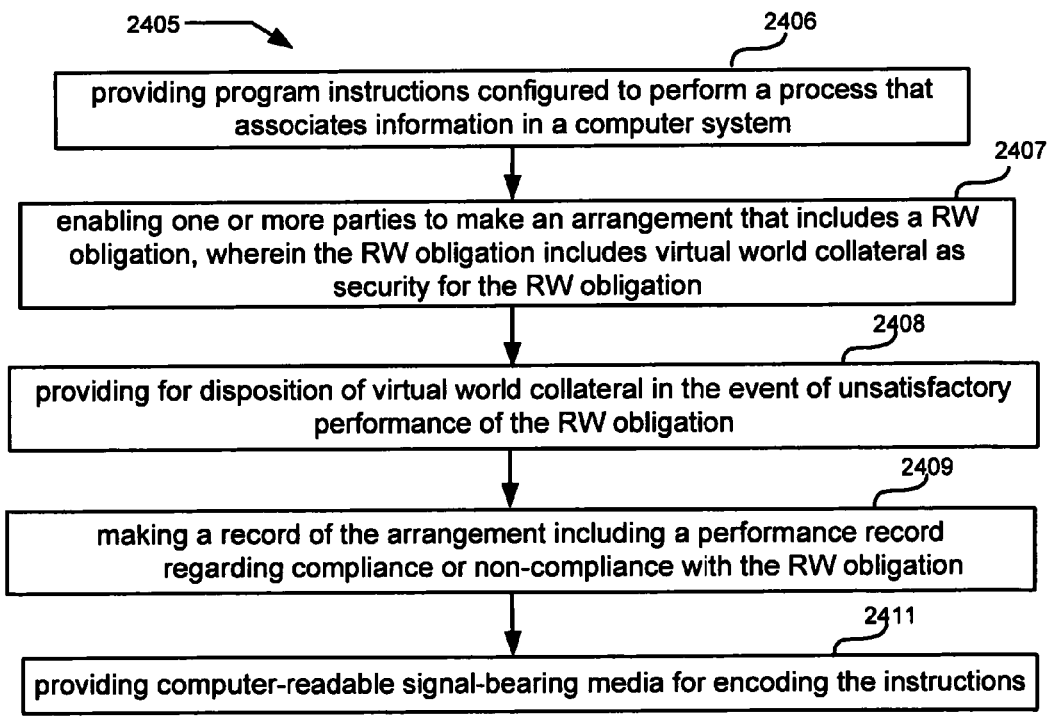
FIG. 109 shows another exemplary computer program product implementation.

The high level flow chart of FIG. 109 illustrates an exemplary embodiment 2405 for a computer program product, including providing program instructions configured to perform a process that associates information in a computer system (block 2406). A process implementation may include enabling one or more parties to make an arrangement that includes a real-world obligation, wherein the real-world obligation includes virtual world collateral as security for the real-world obligation (block 2407); providing for disposition of virtual world collateral in the event of unsatisfactory performance of the real-world obligation (block 2408); and making a record of the arrangement including a performance record regarding compliance or non-compliance with the real-world obligation (block 2409). Another aspect may include providing computer-readable signal-bearing media for encoding the instructions (block 2411).

With respect to virtual collateral posted as security for real-world obligations, it will be understood that an exemplary process incorporated in a computer program product may provide limited read/write access to informational data records from a virtual world environment associated with the virtual world collateral. Also such an exemplary process may provide limited read/write access to informational data records from a real-world environment.

Figure 110:
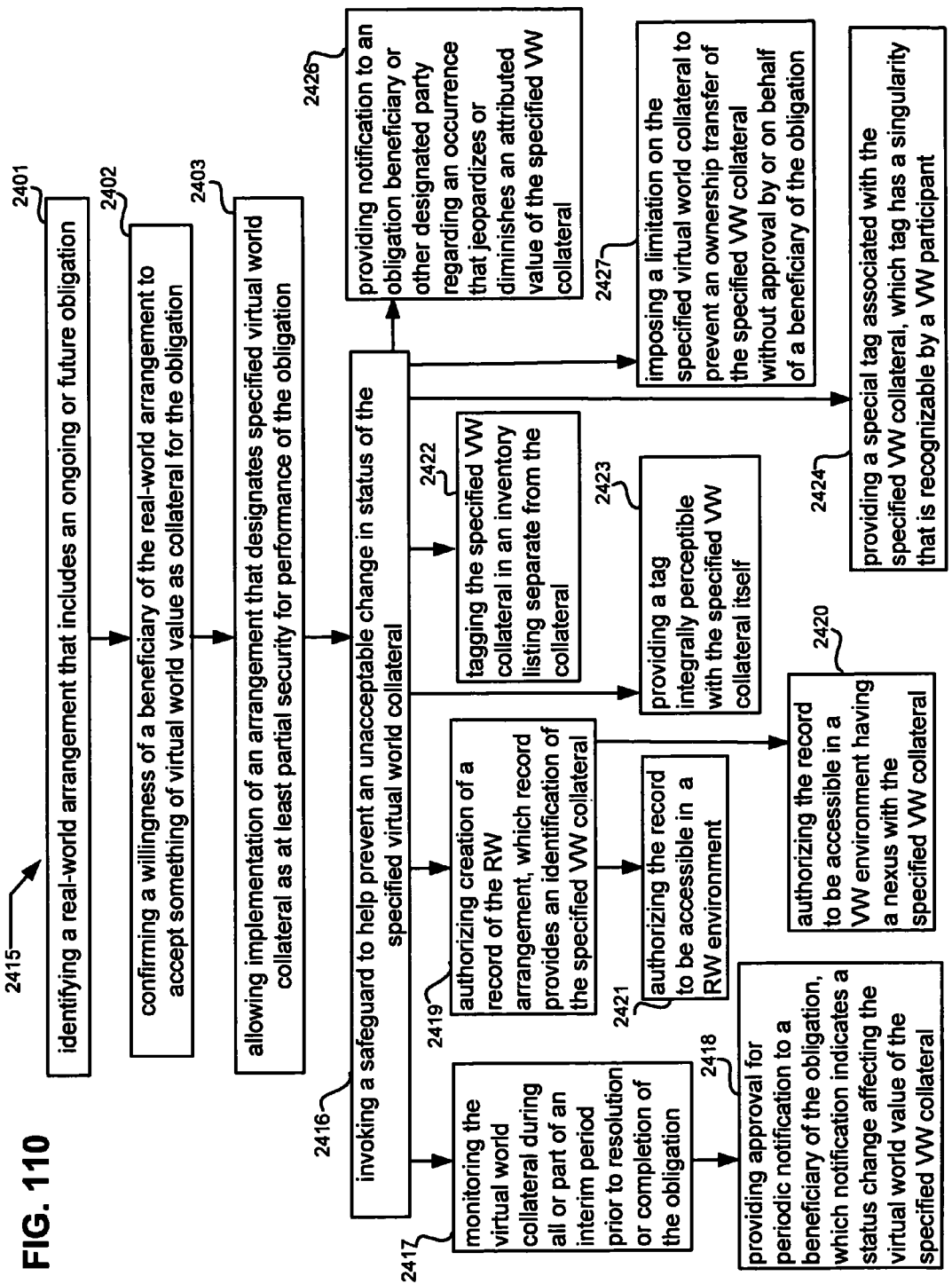
FIGS. 110-113 are more detailed flow charts showing further exemplary embodiments.

Referring to the more detailed flow chart of FIG. 110, exemplary process embodiments 2415 may include previously described components 2401, 2402, 2403 along with invoking a safeguard to help prevent an unacceptable change in status of the specified virtual world collateral (block 2416). Additional aspects may include monitoring the virtual world collateral during all or part of an interim period prior to resolution or completion of the obligation (block 2417), and providing approval for periodic notification to a beneficiary of the obligation, which notification indicates a status change affecting the virtual world value of the specified virtual world collateral (block 2418).

Other possible implementation features may include authorizing creation of a record of the real-world arrangement, which record provides an identification of the specified virtual world collateral (block 2419); authorizing the record to be accessible in a virtual world environment having a nexus with the specified virtual world collateral (block 2420); and authorizing the record to be accessible in a real-world environment (block 2421).

FIG. 110 also illustrates further possible process components including tagging the specified virtual world collateral in an inventory listing separate from the collateral (block 2422), providing a tag integrally perceptible with the specified virtual world collateral itself (block 2423), and providing a special tag associated with the specified virtual world collateral, which tag has a singularity that is recognizable by a virtual world participant (block 2424).

Other possible aspects may include providing notification to an obligation beneficiary or other designated party regarding an occurrence that jeopardizes or diminishes an attributed value of the specified virtual world collateral (block 2426), and imposing a limitation on the specified virtual world collateral to prevent an ownership transfer of the specified virtual world collateral without approval by or on behalf of a beneficiary of the obligation block (2427).

Figure 111:
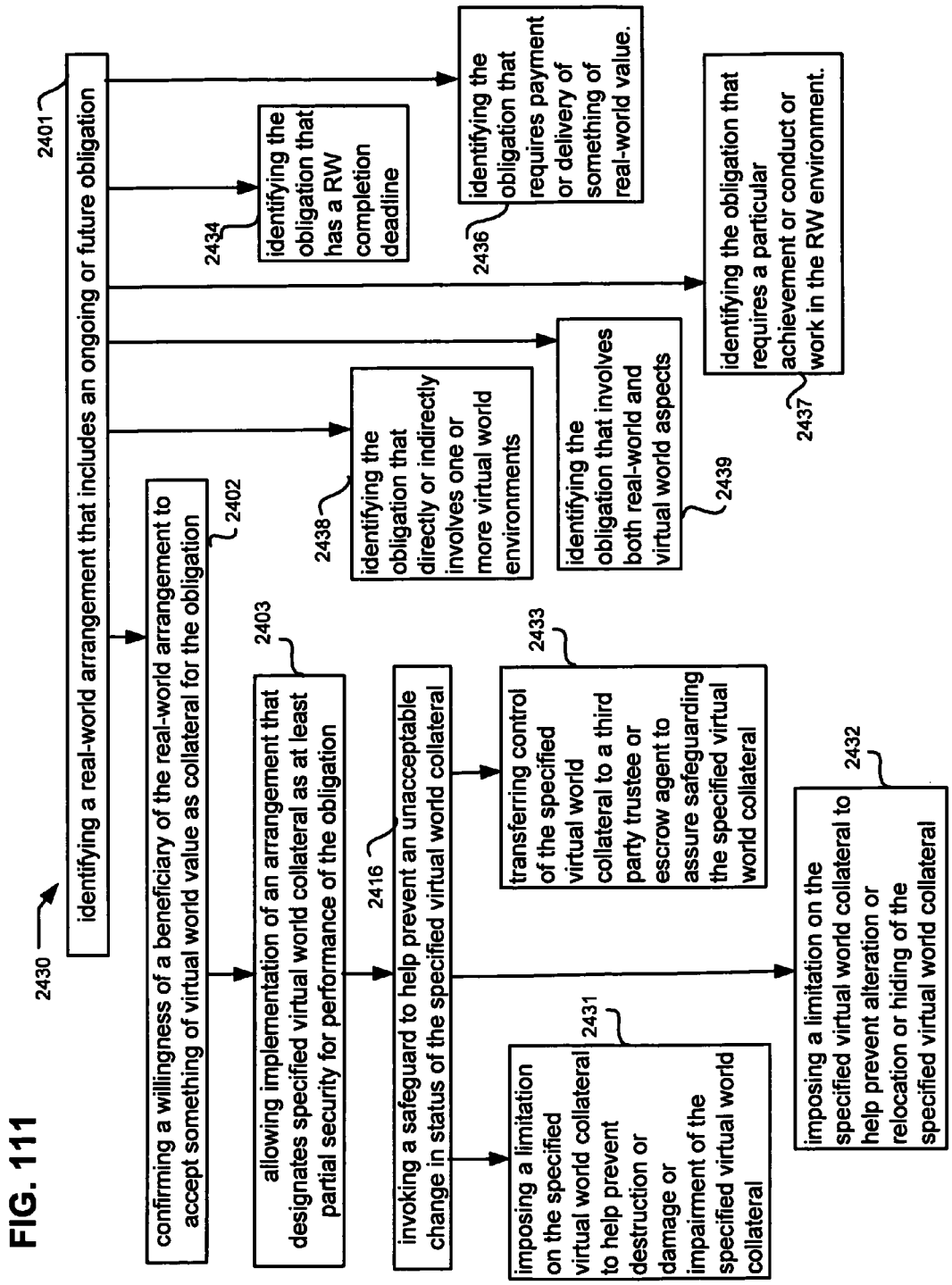

The exemplary embodiments 2430 of FIG. 111 include previously described process features 2401, 2402, 2403, 2416 along with various possible safeguarding aspects regarding the specified virtual world collateral. For example, some implementations may include imposing a limitation on the specified virtual world collateral to help prevent destruction or damage or impairment of the specified virtual world collateral (block 2431), imposing a limitation on the specified virtual world collateral to help prevent alteration or relocation or hiding of the specified virtual world collateral (block 2432), and transferring control of the specified virtual world collateral to a third party trustee or escrow agent to assure safeguarding the specified virtual world collateral (block 2433).

Other possible features disclosed in FIG. 111 include identifying the obligation that has a real-world completion deadline (block 2434), identifying the obligation that requires payment or delivery of something of real-world value (block 2436), and identifying the obligation that requires a particular achievement or conduct or work in the real-world environment (block 2437). Further aspects may include identifying the obligation that directly or indirectly involves one or more virtual world environments (block 2438), and identifying the obligation that involves both real-world and virtual world aspects (block 2439).

For example, a secured real-world obligation involving a virtual world environment may include an obligation to close a VW game account. Another possible real-world obligation may include an ongoing requirement to keep VW subscription payments current. A further possible real-world obligation may include keeping other achievement, activity or status aspects of a VW account up to date and in good standing. Such obligations may be associated with virtual collateral, and also have other different implications and consequences affecting one or more VW environments.

Figure 112:
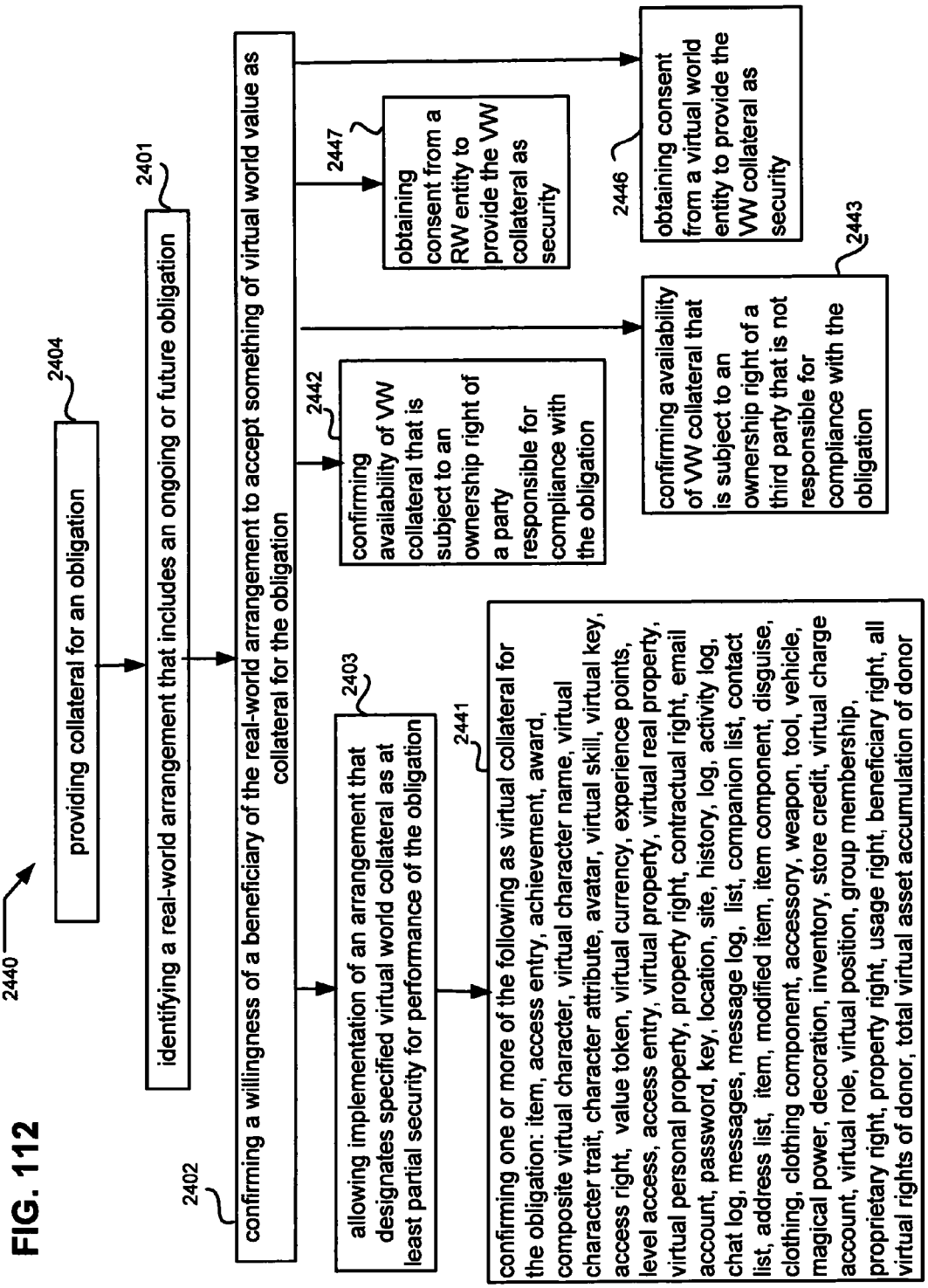

Additional exemplary embodiments 2440 shown in FIG. 112 may involve providing collateral for an obligation (block 2404), and may further include previously described process components 2401, 2404, 2403. Some exemplary implementations may include confirming one or more of the following as virtual collateral for the obligation: item, access entry, achievement, award, composite virtual character, virtual character name, virtual character trait, character attribute, avatar, virtual skill, virtual key, access right, value token, virtual currency, experience points, level access, access entry, virtual property, virtual real property, virtual personal property, property right, contractual right, email account, password, key, location, site, history, log, activity log, chat log, messages, message log, list, companion list, contact list, address list, item, modified item, item component, disguise, clothing, clothing component, accessory, weapon, tool, vehicle, magical power, decoration, inventory, store credit, virtual charge account, virtual role, virtual position, group membership, proprietary right, property right, usage right, beneficiary right, all virtual rights of donor, and total virtual asset accumulation of donor (block 2441).

Other possible features shown in FIG. 112 include confirming availability of virtual world collateral that is subject to an ownership right of a party responsible for compliance with the obligation (block 2442), and confirming availability of virtual world collateral that is subject to an ownership right of a third party that is not responsible for compliance with the obligation (block 2443). Additional exemplary aspects may include obtaining consent from a virtual world entity (block 2446) and obtaining consent from a real-world entity (block 2447) to provide the virtual world collateral as security.

Figure 113:
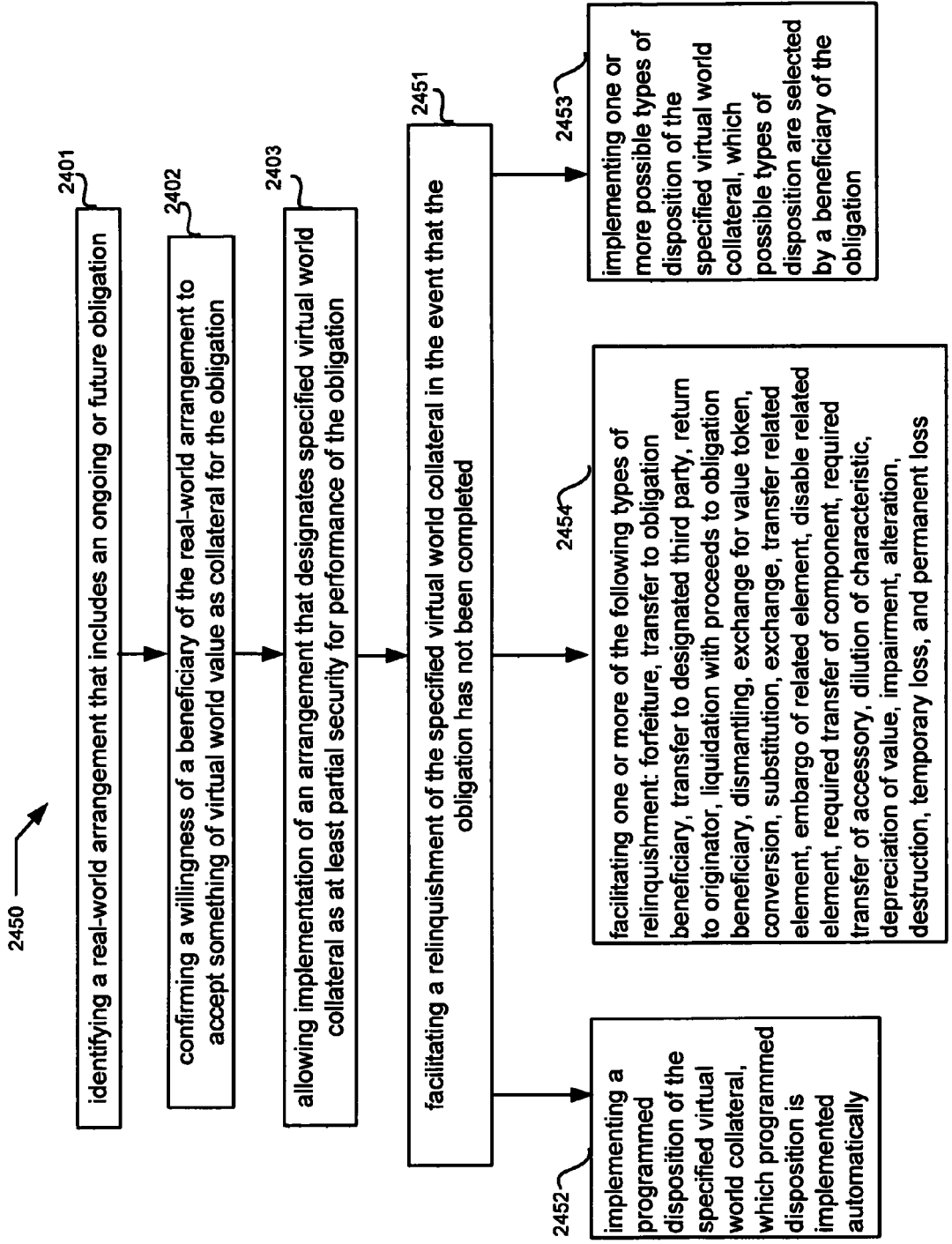

Referring to the exemplary embodiments 2450 shown in FIG. 113, some implementations may include previously described process components 2401, 2402, 2403 along with facilitating a relinquishment of the specified virtual world collateral in the event that the obligation has not been completed (block 2451). Other possible aspects include implementing a programmed disposition of the specified virtual world collateral, which programmed disposition is implemented automatically (block 2452). In some instances, a further aspect may include implementing one or more possible types of disposition of the specified virtual world collateral, which possible types of disposition are selected by a beneficiary of the obligation (block 2453).

Additional related features regarding possible disposition of the specified virtual world collateral that may be incorporated in exemplary embodiments include facilitating one or more of the following types of relinquishment: forfeiture, transfer to obligation beneficiary, transfer to designated third party, return to originator, liquidation with proceeds to obligation beneficiary, dismantling, exchange for value token, conversion, substitution, exchange, transfer related element, embargo of related element, disable related element, required transfer of component, required transfer of accessory, dilution of characteristic, depreciation of value, impairment, alteration, destruction, temporary loss, and permanent loss (block 2454).

Figure 114:
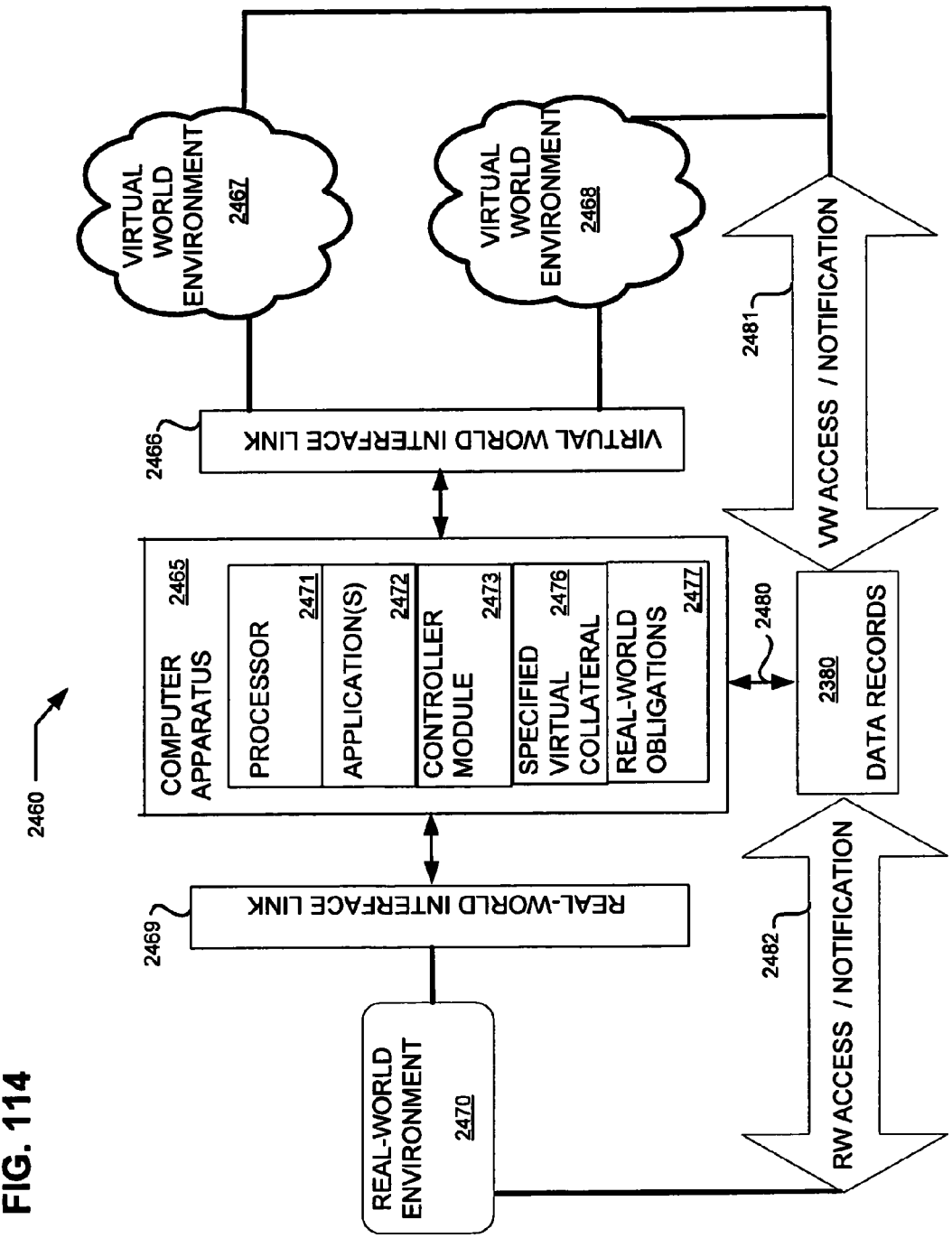
FIG. 114 is a schematic block diagram showing further embodiments involving virtual collateral arrangements.

Additional exemplary computerized system, process and program product embodiments 2460 are illustrated in the schematic block diagram of FIG. 114. Computer apparatus 2465 may be operatively coupled through virtual world interface link 2466 with one or more virtual world environments 2467, 2468. Also shown is a real-world interface link 2469 that may provide an operative coupling connection between computer apparatus 2465 and real-world environment 2470. It will be understood that computer apparatus 2465 may be configured to provide read/write access (see arrow 2480) to data records 2380. Possible types of informational data files that may be incorporated in data records 2380 were previously shown and described with respect to the exemplary embodiments of FIG. 107.

Computer apparatus 2465 may include processor 2471, one or more program applications 2472, and controller module 2473. Various computer operations may involve informational data listings for specified virtual collateral 2476 and associated real-world obligations 2477. In some implementations an additional communication channel may be provided between real-world environment 2470 and virtual world environments 2467, 2468. Such a communication channel may provide real-world access and/or real-world notification links 2482 directly to data records 2380. Such a communication channel may also provide virtual world access and/or virtual world notification links 2481 directly to data records 2380.

Exemplary system aspects may include a record of one or more real-world obligations based on acquisition of a real-world product and/or a real-world service and/or something having value in a real-world environment. Other possible data records may include a record of compliance and/or non-compliance regarding the one or more real-world obligations secured by virtual collateral. Related informational data aspects may include a record of a consequence imposed as a result of non-compliance with such real-world obligations, and in some instances may further include a record of a transfer or relinquishment of the virtual collateral as a result of non-compliance with such real-world obligations.

Some system embodiments may provide data records that include safeguard guidelines to help prevent transfer or alteration or relocation or hiding of the virtual collateral for a real-world obligation.

Some system components may include a controller module configured to impose transfer or relinquishment of the virtual collateral in the event the real-world obligation is not resolved or not completed. In some implementations the controller module may be configured to implement safeguard guidelines to help prevent transfer or alteration or relocation or hiding of the virtual collateral. The controller module may also be configured to safeguard the virtual collateral against an unacceptable change in status.

A further exemplary system feature may include a notification link to the virtual world environment for communicating a status of the real-world obligation for which the virtual collateral has been posted as security.

A user interface communication link to the simulated world may in some implementations enable a player or participant to be the obligor participant in a VW arrangement that includes an obligation for future compensation to be tendered in said simulated world by or on behalf of the obligor participant. In some exemplary embodiments the simulated world allows such an obligation for future compensation to be transferable by the obligor participant to another party.

In additional implementations, a user interface communication link to the simulated world may enable a player or participant to be the obligor participant in a VW arrangement that includes a right for future compensation to be received in said simulated world by or on behalf of a beneficiary participant. In some exemplary embodiments the simulated world allows such a right for future compensation to be transferred by the beneficiary participant to another party.

A further aspect of the disclosed system enables interaction in the simulated world between the debtor participant and the creditor participant regarding one or more of the following activities: creating the credit arrangement, negotiating terms of the credit arrangement, revising the credit arrangement, resolving the credit arrangement, transferring the debtor's credit arrangement obligations, transferring the creditor's credit arrangement rights, and terminating the credit arrangement.

Various embodiments of the simulated world allow the virtual world arrangement to be based on a commitment with a real-world due date for resolution. In some embodiments, the virtual world arrangement may be based on a commitment for future real-world compensation.

Another aspect of the disclosed system provides a simulated world that allows the virtual world arrangement to include one or more of the following penalties based on a failure of an obligor participant to keep one or more obligations of the credit arrangement: a penalty in the simulated world, and a real-world penalty. Also some embodiments further allow the virtual world arrangement to include one or more of the following benefits based on compliance by an obligor participant with one or more obligations of the credit arrangement: a benefit in the simulated world, and a real-world benefit.

It will also be understood by those skilled in the art in view of the present disclosure that a user interface communication link to a simulated world may include login and logoff capability for the player of participant, wherein a memory device maintains the record of the virtual world arrangement after the player or participant has logged off or become dormant in the simulated world. Such a user interface communication link may be accessible via wired and/or wireless links.

Some embodiments of the simulated world environment may include a communication link that provides disclosure of sufficient information necessary to decrypt, decode, or otherwise obtain the identification of a real-world person or real-world entity responsible for obligations arising from the virtual world arrangement, as well as the identification of a real-world person or entity having beneficiary rights arising from the VW arrangement.

In some implementations, multiple players at different locations can use virtual accounts and/or real world accounts for arranging or resolving a virtual world transaction. Some embodiments enable an obligation and/or a right arising from a virtual world transaction to be transferred to another party, in some instances without having to obtain any permission for such transfer. In some embodiments such a transfer may be contingent upon a future event such as a real-world death and/or a virtual character demise of one of the parties to the virtual world transaction.

Some embodiments of a computer implemented system include a transfer-related tag or flag associated with a patron, a transferable right, or a designated successor party. A database may identify the patron, the transferable right, the transfer authorization, date of transfer, and the designated successor party in connection with an authorized transfer. Of course other data pertinent to the authorized transfer and any adverse claims may also be maintained and updated in a database depending on the circumstances.

Some system embodiment provide a database related to transferability of virtual world property or property rights, wherein a patron may have read-only access or read/write access to the database records. A designated successor party may have real-only database access. An owner or operator of a virtual world may have read/write database access. Of course other types of access may be provided based on the circumstances.

Computer program product implementations as well as system and process embodiments may allow a transfer to a VW successor party, and may also allow a transfer to a RW successor party.

It will be understood that method, system and computer program product embodiments as disclosed herein may include process instructions encoded on storage and/or signal transmission media accessible to multiple virtual world patrons having logon capabilities at different locations. In addition such embodiments may include process instructions encoded on storage and/or signal transmission media capable of functional operation on localized computer apparatus.

Computerized system embodiments and computer program product implementations may incorporate a component feature for making a determination that the virtual character is no longer deemed a viable participant includes confirming one or more of the following virtual world occurrences: virtual character death, virtual character destruction, virtual character disappearance, lack of virtual character participation for given period of time, no change of programmed participation of virtual character for given period of time, virtual character banned from the virtual world environment, violation by virtual character of one or more virtual environment rules, non-compliance with VW oversight rule, failure of virtual character to pay a virtual world debt, default on virtual world agreement, default on payment of virtual world subscription, disqualification of virtual world group, eviction from virtual world group, violation of oversight rule, breach of rating restriction, overdraft of virtual account, guilty of virtual crime, conviction of virtual crime, illegal virtual activity, detection of change in VW resource use pattern; detection of lack of change in VW resource use pattern, lack of response to specific probes, incorrect response to specific probes, unauthorized character impersonation, and satisfaction of conditions established by owner of virtual character.

Other computerized system embodiments and computer program product implementations may include a component feature for making a record of one or more of the following types of informational data: authorization for transferring, date of authorization, identity of designated successor party, identity of virtual property right to be transferred, secondary beneficiary, transfer requirements, transfer fee, and required third party approval.

Other aspects of a computerized system embodiment may include database records that relate to an authorized transfer of a property right in one or more of the following types of virtual elements: composite virtual character, virtual character name, virtual character trait, character attribute, composite avatar, virtual skill, virtual key, access right, value tokens, virtual currency, experience points, level access, virtual property, virtual real property, virtual personal property, property right, contractual right, email account, password, key, location, site, history, log, activity log, chat log, activity log, messages, message log, list, companion list, contact list, address list, item, modified item, item component, disguise, clothing, clothing component, accessory, weapon, tool, vehicle, magical power, decoration, inventory, store credit, virtual charge account, virtual role, virtual position, group membership, all virtual rights of donor, and total asset accumulation of donor.

Further aspects of a computerized system embodiment may include database records that are accessible in a real-world environment or a virtual world environment to one or more of the following: owner of virtual-world environment, operator of virtual-world environment, real-world party donor, party selected by donor, agent of donor, designated successor party, party selected by successor party, approved representative of real-world party donor, approved representative of designated successor party, secondary beneficiary, contingent beneficiary, joint beneficiary, parent of successor who is a minor, guardian of successor who is a minor, officer of successor entity, and officer of successor group.

Additional features of a computerized system may provide database records including one or more of the following types of transfer requirements: secondary beneficiary; group beneficiary, charitable beneficiary, joint beneficiaries, real-world party donor to be anonymous, disclose identity of real-world donor only after confirmation of death, subject to contingency, contingent on successor having attribute, contingent on successor not having attribute, contingent on successor having certain item, contingent on successor not having certain item, contingent on successor having related item, contingent on successor having right to acquire related item, contingent on successor having right to inherit related item, conditional transfer based on successor party's age, conditional transfer based on successor party's education, conditional transfer based on successor party's marital status, transfer conditional upon acceptance by successor party; transfer conditional upon timely acceptance, transfer conditional upon inspection by successor party, collective transfer of all virtual property rights of real-world party donor, transfer of multiple versions of the subject matter of the property right; authorize duplicate virtual attributes or aspects to be transferred; collective transfer of all virtual property rights to respective designated beneficiaries, transfer voided if successor party deceased, further transferability not authorized; transfer to occur at given date even if real-world party donor still alive; transfer conditional upon approval of third party; transfer made to trustee on behalf of successor party, transfer made to trustee on behalf of beneficiary; liquidating virtual world property right prior to transfer, obtaining liquidated virtual world value as subject of transfer, and obtaining liquidated real-world value as subject of transfer.

Further exemplary database records may include a record of one or more adverse claims made in response to a virtual world notification of a pending disposition of the transferable right to the designated successor party.

Method and system embodiments as disclosed herein provide transactions and arrangements in virtual world environments. A user can participate in transactions to acquire virtual property and related virtual rights. In some implementations, real-world and virtual parties can be involved in virtual collateral transactions as well as conditional transfers and/or revocations involving various types of virtual objects and virtual rights (e.g., virtual property, virtual property rights, virtual proprietary rights, etc.). A transfer or relinquishment of designated aspects of the virtual collateral may result from unsatisfactory compliance with a real-world obligation or virtual world obligation that is secured by the virtual collateral.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further definition of "open" terms in the present specification and claims, it will be understood that usage of a language construction "A or B" is generally interpreted as a non-exclusive "open term" meaning: A alone, B alone, A and B together.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system comprising:
   at least one processor; and
   one or more media bearing one or more instructions that when executed by the at least one processor facilitate a process including at least:
   identifying at least one arrangement that includes at least one real world obligation to keep current with one or more virtual world subscription payments; and
   implementing at least one arrangement that designates virtual world collateral as at least partial security for performance of the at least one real world obligation to keep current with one or more virtual world subscription payments.

2. The system of claim 1, wherein the process further includes:
   invoking at least one safeguard to help prevent at least one unacceptable change in status of the virtual world collateral.

3. The system of claim 2, wherein the invoking the at least one safeguard to help prevent at least one unacceptable change in status of the virtual world collateral comprises:
monitoring the virtual world collateral.

4. The system of claim 3, wherein the process further includes:
providing approval for notification of one or more status changes affecting the virtual world collateral to at least one beneficiary of the at least one real world obligation.

5. The system of claim 2, wherein the invoking the at least one safeguard to help prevent at least one unacceptable change in status of the virtual world collateral comprises:
authorizing creation of at least one record which provides identification of the virtual world collateral.

6. The system of claim 5, wherein the authorizing creation of at least one record which provides identification of the virtual world collateral comprises:
authorizing creation of at least one record which provides identification of the virtual world collateral and that is accessible in at least one virtual world environment having at least one nexus with the virtual world collateral.

7. The system of claim 5, wherein the authorizing creation of at least one record which provides identification of the virtual world collateral comprises:
authorizing creation of at least one record which provides identification of the virtual world collateral and that is accessible in at least one real world environment.

8. The system of claim 2, wherein the invoking the at least one safeguard to help prevent at least one unacceptable change in status of the virtual world collateral comprises:
tagging the virtual world collateral in at least one inventory listing separate from the virtual world collateral.

9. The system of claim 2, wherein the invoking the at least one safeguard to help prevent at least one unacceptable change in status of the virtual world collateral comprises:
providing notification to at least one beneficiary or at least one other designated party regarding at least one occurrence that jeopardizes or diminishes one or more attributed values of the virtual world collateral.

10. The system of claim 2, wherein the invoking the at least one safeguard to help prevent at least one unacceptable change in status of the virtual world collateral comprises:
imposing at least one limitation on the virtual world collateral to prevent ownership transfer of the virtual world collateral without approval by or on behalf of at least one beneficiary of the at least one real world obligation.

11. The system of claim 2, wherein the invoking the at least one safeguard to help prevent at least one unacceptable change in status of the virtual world collateral comprises:
imposing at least one limitation on the virtual world collateral to help prevent destruction or damage or impairment of the virtual world collateral.

12. The system of claim 2, wherein the invoking the at least one safeguard to help prevent at least one unacceptable change in status of the virtual world collateral comprises:
imposing at least one limitation on the virtual world collateral to help prevent alteration or relocation or hiding of the virtual world collateral.

13. The system of claim 2, wherein the invoking the at least one safeguard to help prevent at least one unacceptable change in status of the virtual world collateral comprises:
transferring control of the virtual world collateral to a third party trustee or escrow agent for safeguarding the virtual world collateral.

14. The system of claim 1, wherein the identifying at least one arrangement that includes at least one real world obligation to keep current with one or more virtual world subscription payments comprises:
identifying at least one arrangement that includes at least one real world obligation to be current with at least one virtual world subscription payment by at least one real world deadline.

15. The system of claim 1, wherein the identifying at least one arrangement that includes at least one real world obligation to keep current with one or more virtual world subscription payments comprises:
identifying at least one arrangement that includes at least one real world obligation to keep current with one or more virtual world subscription payments involving something of real world value.

16. The system of claim 1, wherein the identifying at least one arrangement that includes at least one real world obligation to keep current with one or more virtual world subscription payments comprises:
identifying at least one arrangement that includes at least one real world obligation to keep current with one or more virtual world subscription payments in at least one real world environment.

17. The system of claim 1, wherein the implementing at least one arrangement that designates virtual world collateral as at least partial security for performance of the at least one real world obligation to keep current with one or more virtual world subscription payments comprises:
implementing at least one arrangement that designates virtual world collateral as at least partial security for performance of the at least one real world obligation to keep current with one or more virtual world subscription payments, the virtual world collateral being one or more of the following: item, access entry, achievement, award, composite virtual character, virtual character name, virtual character trait, character attribute, avatar, virtual skill, virtual key, access right, value token, virtual currency, experience point, level access, access entry, virtual property, virtual real property, virtual personal property, property right, contractual right, email account, password, key, location, site, message, list, companion list, contact list, address list, item, modified item, item component, disguise, clothing, clothing component, accessory, weapon, tool, vehicle, magical power, decoration, inventory, store credit, virtual charge account, virtual role, virtual position, group membership, proprietary right, and/or usage right.

18. The system of claim 1, wherein the process further includes:
confirming availability of the virtual world collateral.

19. The system of claim 1, wherein the process further includes:
obtaining consent from at least one virtual world entity to provide the virtual world collateral as security.

20. The system of claim 1, wherein the process further includes:
obtaining consent from at least one real world entity to provide the virtual world collateral as security.

21. The system of claim 1, wherein the process further includes:
facilitating relinquishment of the virtual world collateral in an event that the at least one real world obligation has not been satisfied.

22. The system of claim 1, wherein the process further includes:
  facilitating programmed disposition of the virtual world collateral in an event that the at least one real world obligation has not been satisfied.

23. The system of claim 1, wherein the process further includes:
  facilitating selected disposition of the virtual world collateral in an event that the at least one real world obligation has not been satisfied.

24. The system of claim 1, wherein the process further includes:
  facilitating one or more of the following types of relinquishment of the virtual world collateral in an event that the at least one real world obligation has not been satisfied: forfeiture, transfer to obligation beneficiary, transfer to designated third party, return to originator, liquidation with proceeds to obligation beneficiary, dismantling, exchange for value token, conversion, substitution, exchange, transfer embargo, disable transfer of component, transfer of accessory, dilution of characteristic, depreciation of value, impairment, alteration, destruction, temporary loss, and/or permanent loss.

25. The system of claim 1, wherein the identifying at least one arrangement that includes at least one real world obligation to keep current with one or more virtual world subscription payments comprises:
  identifying at least one arrangement that includes at least one ongoing real world obligation to keep current with one or more virtual world subscription payments.

26. The system of claim 1, wherein the identifying at least one arrangement that includes at least one real world obligation to keep current with one or more virtual world subscription payments comprises:
  identifying at least one arrangement that includes at least one real world obligation to keep current with one or more virtual world subscription payments having one or more grace periods.

27. The system of claim 1, wherein the process further includes:
  providing at least one tag integrally perceptible with the virtual world collateral itself.

28. The system of claim 1, wherein the process further includes:
  associating at least one special tag with the virtual world collateral.

29. The system of claim 1, wherein the process further includes:
  providing status information associated with the at least one real world obligation.

30. A system comprising:
  circuitry configured for identifying at least one arrangement that includes at least one real world obligation to keep current with one or more virtual world subscription payments; and
  circuitry configured for implementing at least one arrangement that designates virtual world collateral as at least partial security for performance of the at least one real world obligation to keep current with one or more virtual world subscription payments.

31. A system comprising:
  one or more non-transitory media bearing one or more instructions for facilitating a process including at least:
  identifying at least one arrangement that includes at least one real world obligation to keep current with one or more virtual world subscription payments; and
  implementing at least one arrangement that designates virtual world collateral as at least partial security for performance of the at least one real world obligation to keep current with one or more virtual world subscription payments.

* * * * *